(12) United States Patent
De Jong et al.

(10) Patent No.: US 11,968,594 B2
(45) Date of Patent: Apr. 23, 2024

(54) USER INTERFACES FOR TRACKING AND FINDING ITEMS

(71) Applicant: Apple Inc., Cupertino, CA (US)

(72) Inventors: Frank De Jong, San Francisco, CA (US); Nicole R. Ryan, San Francisco, CA (US); Arian Behzadi, San Francisco, CA (US); Corey Keiko Wang, San Francisco, CA (US); Marcel Van Os, San Francisco, CA (US); Craig M. Federighi, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/455,821

(22) Filed: Nov. 19, 2021

(65) Prior Publication Data

US 2022/0103974 A1    Mar. 31, 2022

Related U.S. Application Data

(63) Continuation of application No. 17/448,491, filed on Sep. 22, 2021.

(Continued)

(51) Int. Cl.
*H04W 4/00* (2018.01)
*G06F 3/038* (2013.01)
(Continued)

(52) U.S. Cl.
CPC .......... *H04W 4/029* (2018.02); *G06F 3/0383* (2013.01); *G06F 3/04886* (2013.01); *G06F 3/04895* (2013.01); *G06F 3/14* (2013.01); *G06F 3/04817* (2013.01); *G06F 3/0482* (2013.01); *G06F 3/04883* (2013.01); *G06F 2203/0384* (2013.01)

(58) Field of Classification Search
CPC ....... H04W 4/029; H04W 4/023; H04W 4/02; H04W 64/00
See application file for complete search history.

(56) References Cited

U.S. PATENT DOCUMENTS 5,672,820 A    9/1997    Rossi et al.
5,956,038 A    9/1999    Rekimoto
(Continued)

FOREIGN PATENT DOCUMENTS

EP    2439920 A1    4/2012
JP    2006-284458 A    10/2006
(Continued)

OTHER PUBLICATIONS

Final Office Action received for U.S. Appl. No. 17/452,971, dated Jun. 1, 2022, 22 Pages.

(Continued)

*Primary Examiner* — Omoniyi Obayanju
(74) *Attorney, Agent, or Firm* — Kubota & Basol LLP

(57) ABSTRACT

In some embodiments, an electronic device presents user interfaces for defining identifiers for remote locator objects. In some embodiments, an electronic device locates a remote locator object. In some embodiments, an electronic device provides information associated with a remote locator object. In some embodiments, an electronic device displays notifications associated with a trackable device. In some embodiments, a first device generates alerts.

45 Claims, 96 Drawing Sheets

Related U.S. Application Data

(60) Provisional application No. 63/176,883, filed on Apr. 19, 2021, provisional application No. 63/110,715, filed on Nov. 6, 2020, provisional application No. 63/083,735, filed on Sep. 25, 2020.

(51) Int. Cl.

| | |
|---|---|
| *G06F 3/04886* | (2022.01) |
| *G06F 3/04895* | (2022.01) |
| *G06F 3/14* | (2006.01) |
| *H04W 4/029* | (2018.01) |
| *G06F 3/04817* | (2022.01) |
| *G06F 3/0482* | (2013.01) |
| *G06F 3/04883* | (2022.01) |

(56) References Cited

U.S. PATENT DOCUMENTS

| | | | |
|---|---|---|---|
| 6,144,956 | A | 11/2000 | Yajima et al. |
| 6,323,846 | B1 | 11/2001 | Westerman et al. |
| 6,421,608 | B1 | 7/2002 | Motoyama et al. |
| 6,570,557 | B1 | 5/2003 | Westerman et al. |
| 6,636,249 | B1 | 10/2003 | Rekimoto |
| 6,677,932 | B1 | 1/2004 | Westerman |
| 7,274,292 | B2 | 9/2007 | Velhal et al. |
| 7,372,276 | B2 | 5/2008 | Mulcahey |
| 7,523,871 | B1 | 4/2009 | Wilson et al. |
| 7,575,065 | B1 | 8/2009 | Podhrasky |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,788,032 | B2 | 8/2010 | Moloney |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,094,011 | B2 | 1/2012 | Faris et al. |
| 8,239,784 | B2 | 8/2012 | Hotelling et al. |
| 8,279,180 | B2 | 10/2012 | Hotelling et al. |
| 8,380,430 | B2 | 2/2013 | Malone et al. |
| 8,381,135 | B2 | 2/2013 | Hotelling et al. |
| 8,433,722 | B2 | 4/2013 | Shin et al. |
| 8,462,591 | B1 | 6/2013 | Marhaben |
| 8,479,122 | B2 | 7/2013 | Hotelling et al. |
| 8,526,677 | B1 | 9/2013 | Crichton et al. |
| 8,576,669 | B2 | 11/2013 | Onda |
| 8,847,754 | B2 | 9/2014 | Buchheim et al. |
| 8,878,671 | B2 | 11/2014 | Buchheim et al. |
| 9,002,372 | B2 | 4/2015 | Shakespeare et al. |
| 9,348,458 | B2 | 5/2016 | Hotelling et al. |
| 9,357,348 | B2 | 5/2016 | Evans et al. |
| 9,443,414 | B2 | 9/2016 | Scavezze et al. |
| 9,514,630 | B1 | 12/2016 | Steven |
| 9,547,939 | B2 | 1/2017 | Hittel et al. |
| 9,549,282 | B1 | 1/2017 | Mcdonough et al. |
| 9,609,515 | B2 | 3/2017 | Tredoux et al. |
| 9,654,598 | B1 | 5/2017 | Crawford et al. |
| 9,706,357 | B2 | 7/2017 | Heo et al. |
| 9,836,187 | B2 | 12/2017 | Lee et al. |
| 9,892,535 | B1 | 2/2018 | Guy |
| 9,900,733 | B2 | 2/2018 | Beattie, Jr. |
| 9,911,310 | B2 | 3/2018 | Neumeyer et al. |
| 9,933,937 | B2 | 4/2018 | Lemay et al. |
| 9,997,043 | B2 | 6/2018 | H. Kazerouni |
| 10,102,749 | B1 | 10/2018 | Wagner |
| 10,147,303 | B1 | 12/2018 | Carter |
| 10,154,379 | B2 | 12/2018 | Mei et al. |
| 10,212,541 | B1 | 2/2019 | Brody et al. |
| 10,292,006 | B2 | 5/2019 | Yu et al. |
| 10,318,811 | B1 | 6/2019 | Gold et al. |
| 10,386,960 | B1 | 8/2019 | Smith |
| 10,424,189 | B2 | 9/2019 | Daoura et al. |
| 10,438,409 | B2 | 10/2019 | Todeschini et al. |
| 10,448,211 | B1 | 10/2019 | Shen et al. |
| 10,462,611 | B1 | 10/2019 | Klinkner et al. |
| 10,568,035 | B1 | 2/2020 | Tong |
| 10,757,057 | B2 | 8/2020 | Friend et al. |
| 10,757,676 | B1 | 8/2020 | De La Broise et al. |
| 10,777,053 | B2 | 9/2020 | Jenkins et al. |
| 10,852,918 | B1 | 12/2020 | Voss |
| 11,047,702 | B1 | 6/2021 | Meyer et al. |
| 11,138,251 | B2 | 10/2021 | Estruch Tena et al. |
| 11,145,183 | B2 | 10/2021 | Daoura et al. |
| 11,216,624 | B2 | 1/2022 | Zarshchikov et al. |
| 11,221,752 | B2 | 1/2022 | Howard et al. |
| 11,222,203 | B2 | 1/2022 | Dante et al. |
| 2002/0015024 | A1 | 2/2002 | Westerman et al. |
| 2002/0183077 | A1* | 12/2002 | Fomukong ............ G08G 1/207 340/8.1 |
| 2004/0021567 | A1 | 2/2004 | Dunn |
| 2004/0212630 | A1 | 10/2004 | Hobgood et al. |
| 2004/0217859 | A1 | 11/2004 | Pucci et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0197753 | A1 | 9/2006 | Hotelling |
| 2006/0255935 | A1 | 11/2006 | Scalisi et al. |
| 2006/0277469 | A1 | 12/2006 | Chaudhri et al. |
| 2007/0021108 | A1 | 1/2007 | Bocking et al. |
| 2007/0037582 | A1 | 2/2007 | Mohi et al. |
| 2007/0037587 | A1 | 2/2007 | Mohi et al. |
| 2007/0037588 | A1 | 2/2007 | Mohi et al. |
| 2007/0042790 | A1 | 2/2007 | Mohi et al. |
| 2007/0101291 | A1 | 5/2007 | Forstall et al. |
| 2007/0106457 | A1 | 5/2007 | Rosenberg |
| 2007/0157089 | A1 | 7/2007 | Van et al. |
| 2007/0197229 | A1 | 8/2007 | Kalliola et al. |
| 2007/0229350 | A1 | 10/2007 | Scalisi et al. |
| 2007/0252696 | A1 | 11/2007 | Belisle et al. |
| 2007/0291104 | A1 | 12/2007 | Petersen et al. |
| 2008/0102786 | A1 | 5/2008 | Griffin |
| 2008/0170118 | A1 | 7/2008 | Albertson et al. |
| 2008/0242278 | A1 | 10/2008 | Rekimoto |
| 2008/0254808 | A1 | 10/2008 | Rekimoto |
| 2009/0076723 | A1 | 3/2009 | Moloney |
| 2009/0260022 | A1 | 10/2009 | Louch et al. |
| 2009/0300511 | A1 | 12/2009 | Behar et al. |
| 2010/0002938 | A1 | 1/2010 | Mulcahey |
| 2010/0107179 | A1 | 4/2010 | Quintanilla et al. |
| 2010/0198867 | A1 | 8/2010 | Rekimoto |
| 2010/0255882 | A1 | 10/2010 | Kozitsyn et al. |
| 2010/0325194 | A1 | 12/2010 | Williamson et al. |
| 2011/0052083 | A1 | 3/2011 | Rekimoto |
| 2011/0081920 | A1 | 4/2011 | Hung et al. |
| 2011/0148625 | A1 | 6/2011 | Velusamy |
| 2011/0181289 | A1 | 7/2011 | Rushing |
| 2011/0187527 | A1 | 8/2011 | Goodwill et al. |
| 2011/0210847 | A1 | 9/2011 | Howard et al. |
| 2011/0222729 | A1 | 9/2011 | Gabara |
| 2011/0234399 | A1 | 9/2011 | Yan |
| 2011/0285506 | A1 | 11/2011 | Hillis |
| 2011/0286310 | A1 | 11/2011 | Onda |
| 2012/0008526 | A1 | 1/2012 | Borghei |
| 2012/0052870 | A1 | 3/2012 | Habicher |
| 2012/0075099 | A1 | 3/2012 | Brown |
| 2012/0092373 | A1 | 4/2012 | Ryu et al. |
| 2012/0166077 | A1 | 6/2012 | Herzog et al. |
| 2012/0171998 | A1 | 7/2012 | Kang |
| 2012/0229400 | A1 | 9/2012 | Birnbaum et al. |
| 2013/0030931 | A1 | 1/2013 | Moshfeghi |
| 2013/0107057 | A1 | 5/2013 | Zhou et al. |
| 2013/0113715 | A1 | 5/2013 | Grant et al. |
| 2013/0172016 | A1 | 7/2013 | Ooka |
| 2013/0288719 | A1 | 10/2013 | Alonzo |
| 2013/0328665 | A1 | 12/2013 | Cranfill et al. |
| 2013/0332721 | A1 | 12/2013 | Chaudhri et al. |
| 2014/0044305 | A1 | 2/2014 | Scavezze et al. |
| 2014/0089810 | A1 | 3/2014 | Chen et al. |
| 2014/0101189 | A1 | 4/2014 | Schenkel |
| 2014/0135042 | A1 | 5/2014 | Buchheim et al. |
| 2014/0136633 | A1 | 5/2014 | Murillo et al. |
| 2014/0173439 | A1 | 6/2014 | Gutierrez et al. |

(56) References Cited

U.S. PATENT DOCUMENTS

| | | |
|---|---|---|
| 2014/0213301 A1 | 7/2014 | Evans et al. |
| 2014/0242972 A1 | 8/2014 | Slotznick |
| 2014/0267411 A1 | 9/2014 | Fein et al. |
| 2014/0300452 A1 | 10/2014 | Rofe et al. |
| 2014/0327518 A1 | 11/2014 | Loutit |
| 2014/0329460 A1 | 11/2014 | Loutit |
| 2014/0364099 A1 | 12/2014 | Pai et al. |
| 2014/0365923 A1 | 12/2014 | Lee et al. |
| 2015/0012307 A1 | 1/2015 | Moss |
| 2015/0058744 A1 | 2/2015 | Dhingra et al. |
| 2015/0154851 A1 | 6/2015 | Vincent et al. |
| 2015/0172393 A1 | 6/2015 | Oplinger et al. |
| 2016/0026869 A1 | 1/2016 | Rekimoto |
| 2016/0027307 A1 | 1/2016 | Abhyanker et al. |
| 2016/0055676 A1 | 2/2016 | Kasahara et al. |
| 2016/0092705 A1 | 3/2016 | Wadman et al. |
| 2016/0171777 A1 | 6/2016 | Todeschini et al. |
| 2016/0203641 A1 | 7/2016 | Bostick et al. |
| 2016/0350639 A1 | 12/2016 | Tere |
| 2017/0006577 A1 | 1/2017 | Koum et al. |
| 2017/0048686 A1 | 2/2017 | Chang et al. |
| 2017/0053560 A1 | 2/2017 | Aldossary et al. |
| 2017/0064511 A1 | 3/2017 | Mccormick |
| 2017/0092085 A1 | 3/2017 | Agarwal |
| 2017/0092090 A1 | 3/2017 | Lerner |
| 2017/0168159 A1 | 6/2017 | Gatland |
| 2017/0180934 A1 | 6/2017 | Brice et al. |
| 2017/0353833 A1 | 12/2017 | De Barros Chapiewski et al. |
| 2017/0365100 A1 | 12/2017 | Walton |
| 2018/0077097 A1 | 3/2018 | Alfaro et al. |
| 2018/0084517 A1 | 3/2018 | Do et al. |
| 2018/0147472 A1 | 5/2018 | Deangelis et al. |
| 2018/0158197 A1 | 6/2018 | Dasgupta et al. |
| 2018/0165924 A9 | 6/2018 | Olsson et al. |
| 2018/0184286 A1* | 6/2018 | Patterson ............... H04W 12/02 |
| 2018/0189567 A1 | 7/2018 | Maheriya et al. |
| 2018/0198973 A1 | 7/2018 | Eronen et al. |
| 2018/0227393 A1 | 8/2018 | Daub |
| 2018/0240176 A1 | 8/2018 | Cronin et al. |
| 2018/0276427 A1 | 9/2018 | Depew et al. |
| 2018/0278888 A1 | 9/2018 | Kasahara et al. |
| 2018/0349516 A1 | 12/2018 | Dutta et al. |
| 2018/0357876 A1 | 12/2018 | Smoak |
| 2019/0050901 A1 | 2/2019 | Vincent et al. |
| 2019/0073113 A1 | 3/2019 | Yang |
| 2019/0086666 A1 | 3/2019 | Wu |
| 2019/0102372 A1 | 4/2019 | Hailpern et al. |
| 2019/0103012 A1 | 4/2019 | Daoura et al. |
| 2019/0114921 A1 | 4/2019 | Cazzoli |
| 2019/0163748 A1 | 5/2019 | Cuthbert et al. |
| 2019/0174265 A1 | 6/2019 | Chen |
| 2019/0285413 A1 | 9/2019 | Hallett |
| 2019/0362556 A1 | 11/2019 | Ben-dor et al. |
| 2019/0370544 A1 | 12/2019 | Wright et al. |
| 2020/0107165 A1 | 4/2020 | Pai et al. |
| 2020/0110934 A1 | 4/2020 | Paul |
| 2020/0117339 A1 | 4/2020 | Amitay et al. |
| 2020/0139929 A1 | 5/2020 | Turley |
| 2020/0242848 A1 | 7/2020 | Ambler et al. |
| 2020/0257865 A1 | 8/2020 | Zarshchikov et al. |
| 2020/0259908 A1 | 8/2020 | Klinkner et al. |
| 2020/0260142 A1 | 8/2020 | Kasahara et al. |
| 2020/0273235 A1 | 8/2020 | Emami et al. |
| 2020/0382908 A1 | 12/2020 | Behzadi et al. |
| 2020/0382912 A1 | 12/2020 | Dancie et al. |
| 2021/0264154 A1 | 8/2021 | Lamont |
| 2021/0314735 A1* | 10/2021 | Klinkner ............... H04W 4/38 |
| 2022/0035510 A1 | 2/2022 | Behzadi et al. |
| 2022/0050563 A1 | 2/2022 | Behzadi et al. |
| 2022/0075503 A1 | 3/2022 | Behzadi et al. |
| 2022/0100286 A1 | 3/2022 | De Jong et al. |
| 2022/0223013 A1 | 7/2022 | Persson et al. |
| 2022/0335807 A1 | 10/2022 | Jong et al. |
| 2022/0365633 A1 | 11/2022 | Rochette et al. |
| 2023/0164103 A1 | 5/2023 | Ham et al. |
| 2023/0262420 A1 | 8/2023 | Behzadi et al. |
| 2023/0342009 A1 | 10/2023 | De Jong et al. |

FOREIGN PATENT DOCUMENTS

| | | |
|---|---|---|
| JP | 2007-88943 A | 4/2007 |
| JP | 2017-15593 A | 1/2017 |
| WO | 2012/047920 A1 | 4/2012 |
| WO | 2013/169849 A2 | 11/2013 |
| WO | 2014/105276 A1 | 7/2014 |
| WO | 2018/034053 A1 | 2/2018 |
| WO | 2020/214864 A1 | 10/2020 |

OTHER PUBLICATIONS

Final Office Action received for U.S. Appl. No. 17/503,246, dated May 20, 2022, 17 Pages.

International Search Report received for PCT Patent Application No. PCT/US2020/028595, dated Aug. 14, 2020, 5 pages.

International Search Report received for PCT Patent Application No. PCT/US2020/030149, dated Sep. 4, 2020, 6 pages.

International Search Report received for PCT Patent Application No. PCT/US2021/071555, dated Feb. 14, 2022, 6 pages.

Non-Final Office Action received for U.S. Appl. No. 17/452,971, dated Jan. 21, 2022, 12 pages.

Non-Final Office Action received for U.S. Appl. No. 17/455,843, dated May 26, 2022, 20 Pages.

Non-Final Office Action received for U.S. Appl. No. 17/503,246, dated Feb. 3, 2022, 15 pages.

Mokatren et al., "Exploring the Potential of a Mobile Eye Tracker as an Intuitive Indoor Pointing Device: A Case Study in Cultural Heritage", In: Future Generation Computer Systems, Available online at: < https://is-web.hevra.haifa.ac.il/images/lecturers_files/ishimshoni_files/MokatrenFGCS.pdf>, [retrieved on Jul. 26, 2020], Jul. 1, 2017, 14 pages.

Final Office Action received for U.S. Appl. No. 17/455,843, dated Oct. 3, 2022, 27 Pages.

Non-Final Office Action received for U.S. Appl. No. 17/448,491, dated Jul. 27, 2022, 16 Pages.

Extended European Search Report received for European Patent Application No. 20790659.5, mailed on Nov. 29, 2022, 11 pages.

Extended European Search Report received for European Patent Application No. 20798438.6, mailed on Jan. 3, 2023, 11 pages.

Google Maps' Location Sharing Feature Can Show Your Friends' Battery Status, Available online at: <https://www.firstpost.com/tech/news-analysis/google-maps-location-sharing-feature-can-show-your-friends-battery-status-4885521.html>, [Retrieved Jan. 27, 2023], Aug. 3, 2018, 2 pages.

Howtechs, Motorola Moto G—How to reorganize app and widget, https://www.youtube.com/watch?v=0szKlr7xnqs, Dec. 22, 2013, 15 pages.

International Search Report received for PCT Application No. PCT/US2023/019402, mailed on Sep. 19, 2023, 6 pages.

International Search Report received for PCT Patent Application No. PCT/US2022/071806, mailed on Oct. 21, 2022, 6 pages.

International Search Report received for PCT Patent Application No. PCT/US2022/072389, mailed on Nov. 30, 2022, 7 pages.

Non-Final Office Action received for U.S. Appl. No. 17/452,971, mailed on Feb. 15, 2023, 17 pages.

Non-Final Office Action received for U.S. Appl. No. 17/455,843, mailed on Feb. 15, 2023, 28 pages.

Non-Final Office Action received for U.S. Appl. No. 17/663,816, mailed on Oct. 19, 2023, 35 pages.

Notice of Allowance received for U.S. Appl. No. 17/448,491, mailed on Jan. 18, 2023, 8 pages.

Notice of Allowance received for U.S. Appl. No. 17/448,491, mailed on May 4, 2023, 7 pages.

Notice of Allowance received for U.S. Appl. No. 17/452,971, mailed on Aug. 17, 2023, 11 pages.

Notice of Allowance received for U.S. Appl. No. 17/455,843, mailed on Jul. 19, 2023, 9 pages.

(56) References Cited

OTHER PUBLICATIONS

Notice of Allowance received for U.S. Appl. No. 17/455,843, mailed on Nov. 1, 2023, 7 pages.
Notice of Allowance received for U.S. Appl. No. 17/503,246, mailed on Dec. 7, 2022, 10 pages.
Notice of Allowance received for U.S. Appl. No. 17/503,246, mailed on Jan. 25, 2023, 9 pages.
Notice of Allowance received for U.S. Appl. No. 17/503,246, mailed on May 18, 2023, 9 pages.
Notice of Allowance received for U.S. Appl. No. 17/594,742, mailed on Jul. 24, 2023, 8 pages.
Notice of Allowance received for U.S. Appl. No. 17/594,742, mailed on Mar. 29, 2023, 9 pages.
Hill, Spencer, "Does Airplane Mode Stop GPS Tracking?", Retrieved from the Internet: <https://web.archive.org/web/20200921071851/https://www.imyfone.com/change-location/does-airplane-mode-stop-tracking/>, [retrieved on Aug. 18, 2022], Part 1. Does Airplane Mode Stop GPS Tracking?, Sep. 21, 2020, pp. 1-2.
Roberts et al., "The Use of Augmented Reality, GPS and INS for Subsurface Data Visualisation", FIG XXII International Congress, Washington, D.C. USA, Apr. 19-26, 2002, 12 pages.
Stolyar, Brenda, "Google Maps' Location Sharing Now Lets You Track Battery Status", https://www.digitaltrends.com/mobile/google-maps-lets-you-share-your-location-and-battery-level/, Aug. 3, 2018, pp. 1-4.

\* cited by examiner

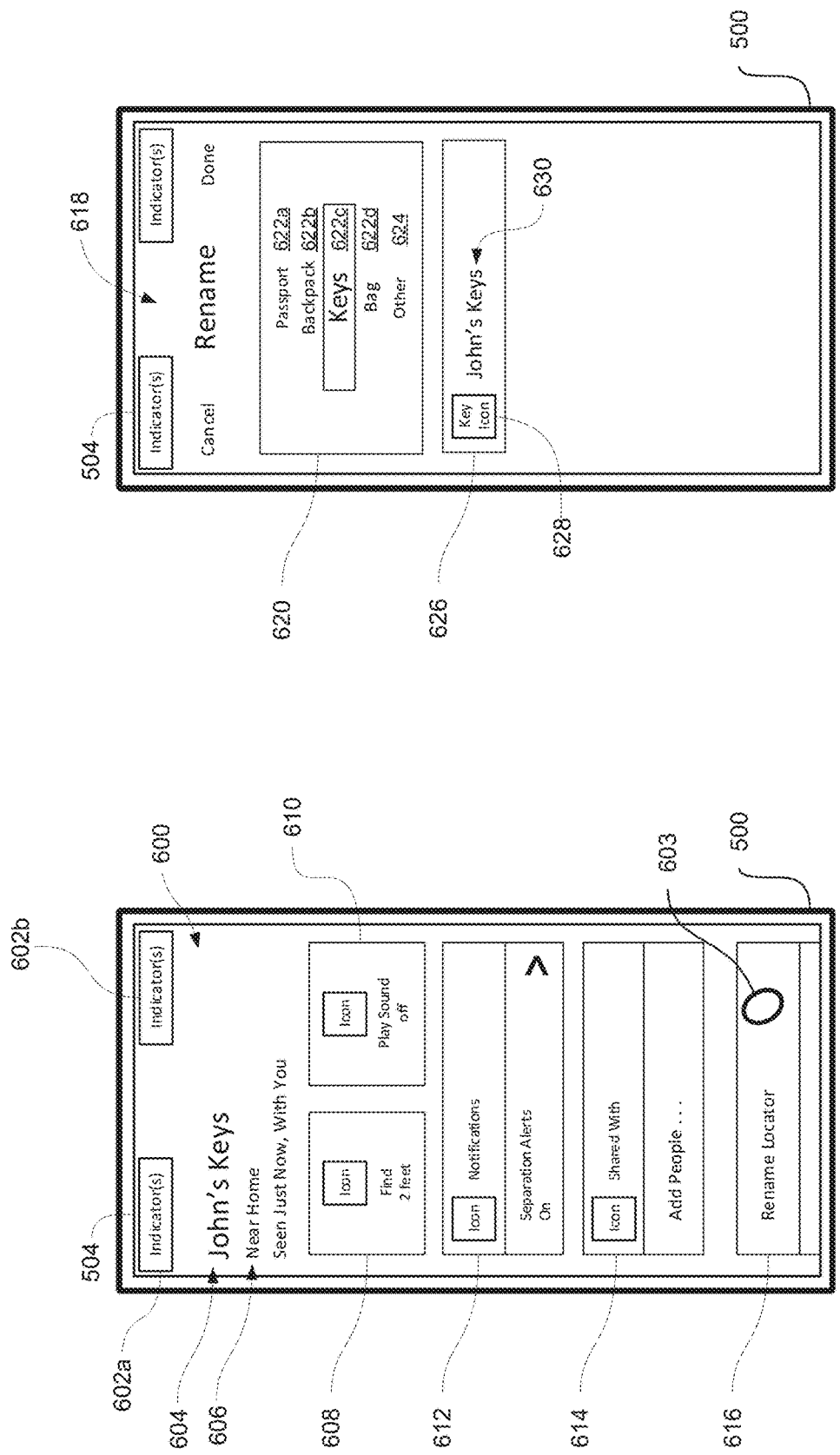

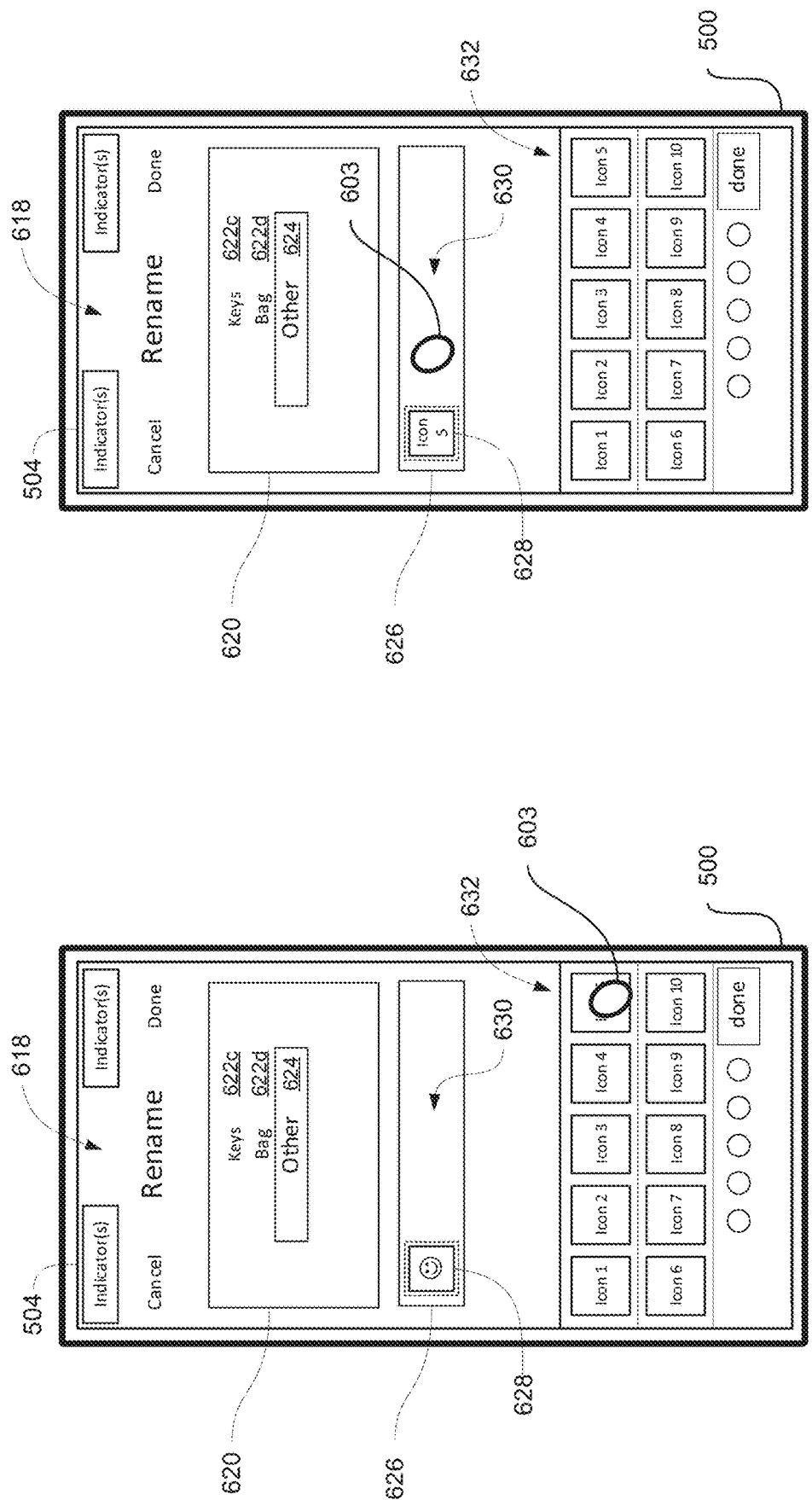

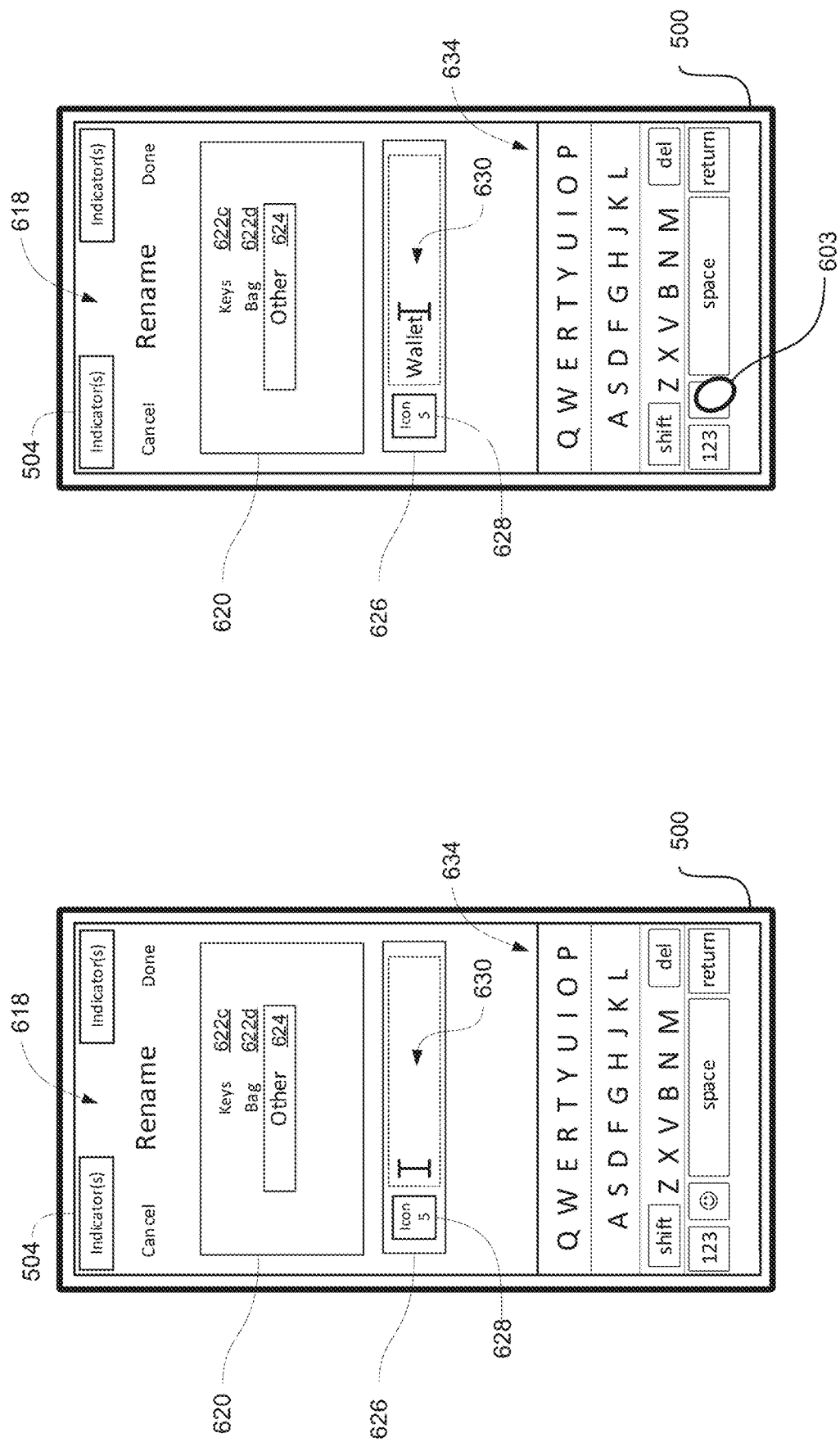

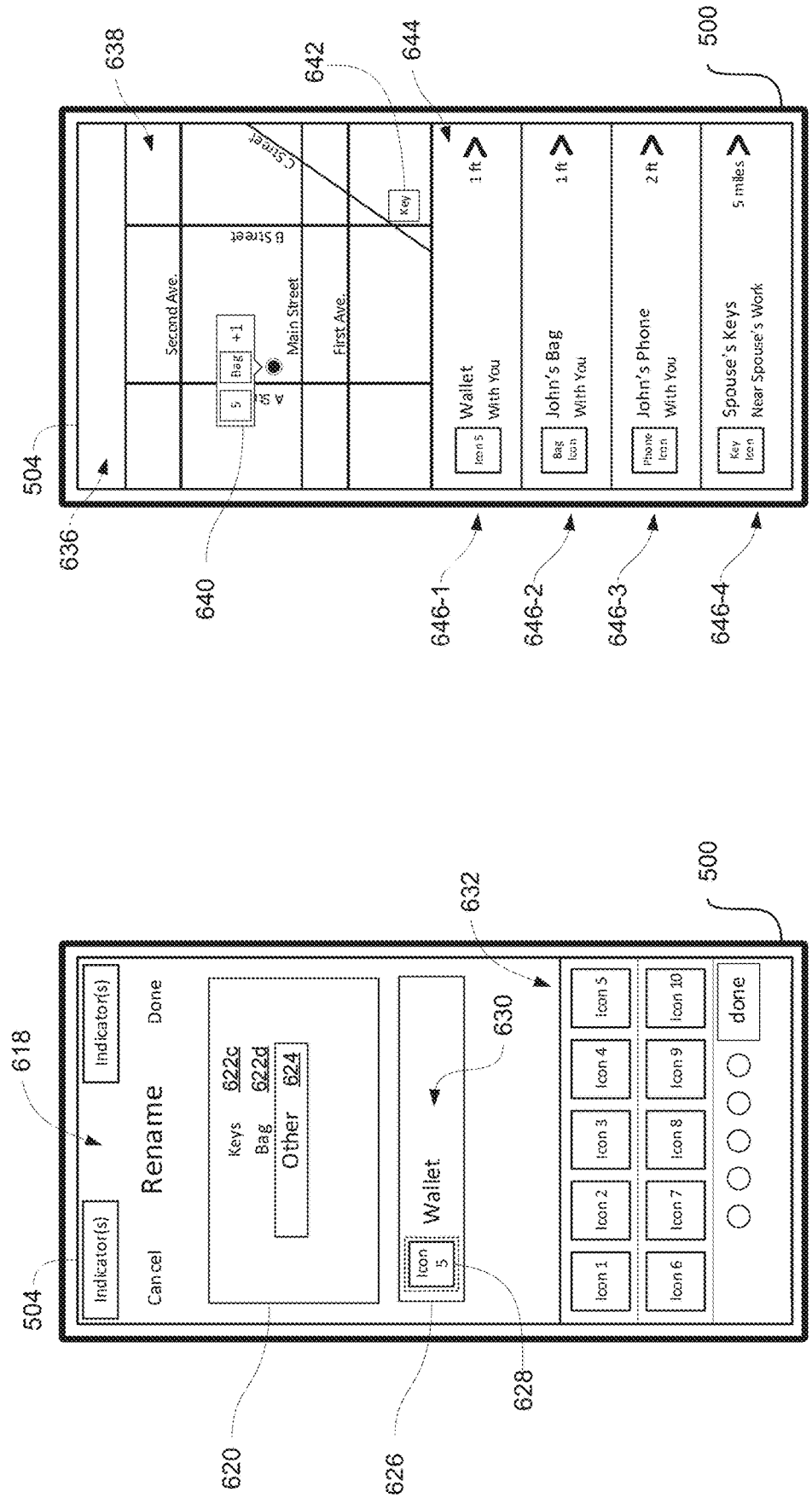

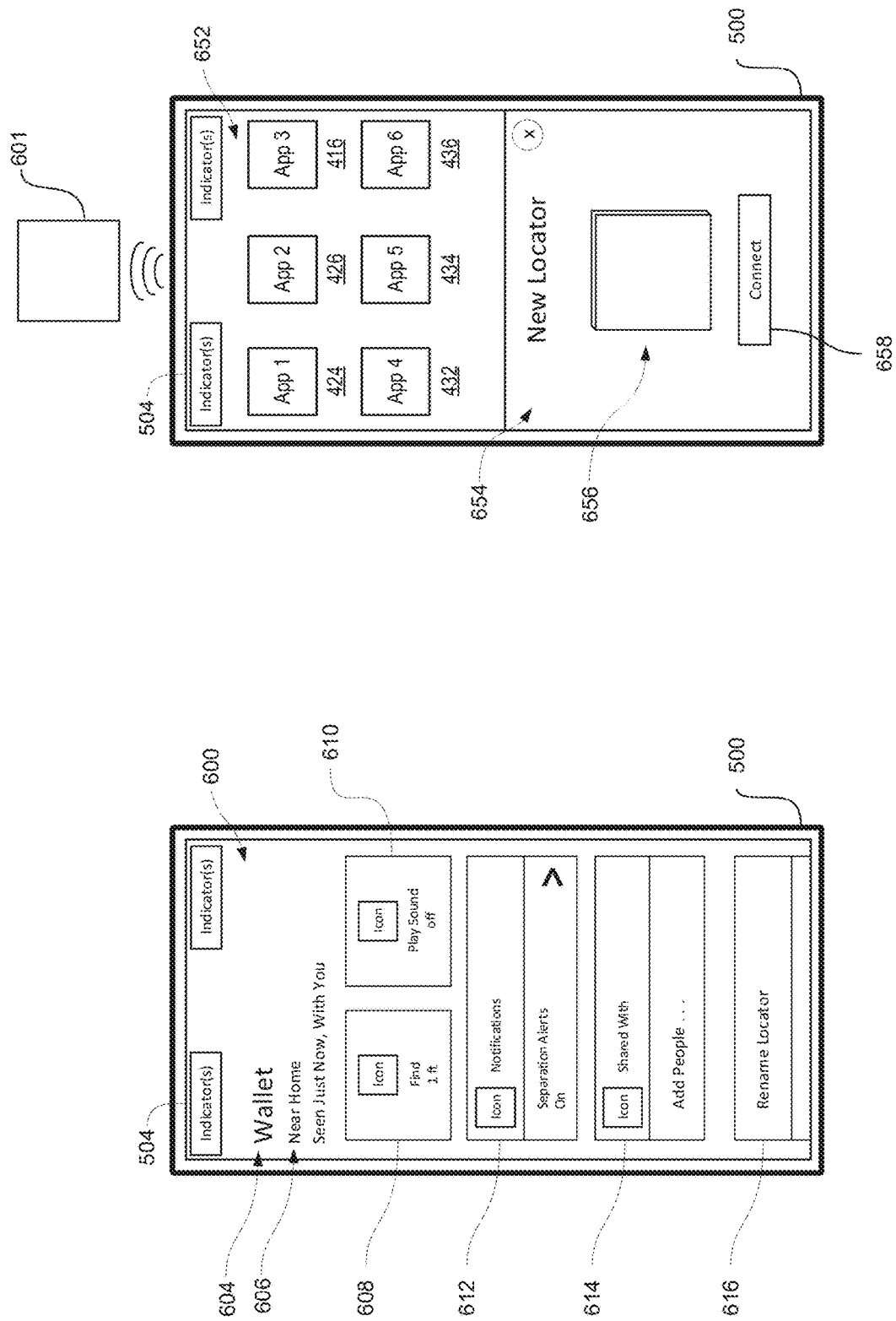

700

---

702 — While displaying, via a display generation component, a respective user interface for inputting an identifier for a remote locator object, wherein the respective user interface includes a representation of a first portion of the identifier and a representation of a second portion of the identifier, receive, via one or more input devices, a respective input

704 — In response to receiving the respective input:

706 — In accordance with a determination that the respective input corresponds to selection of the representation of the first portion of the identifier, display, via the display generation component, a first user interface for selecting a graphic for the first portion of the identifier

708 — In accordance with a determination that the respective input corresponds to selection of the representation of the second portion of the identifier, display, via the display generation component, a second user interface for selecting one or more text characters for the second portion of the identifier (A)

FIG. 7A

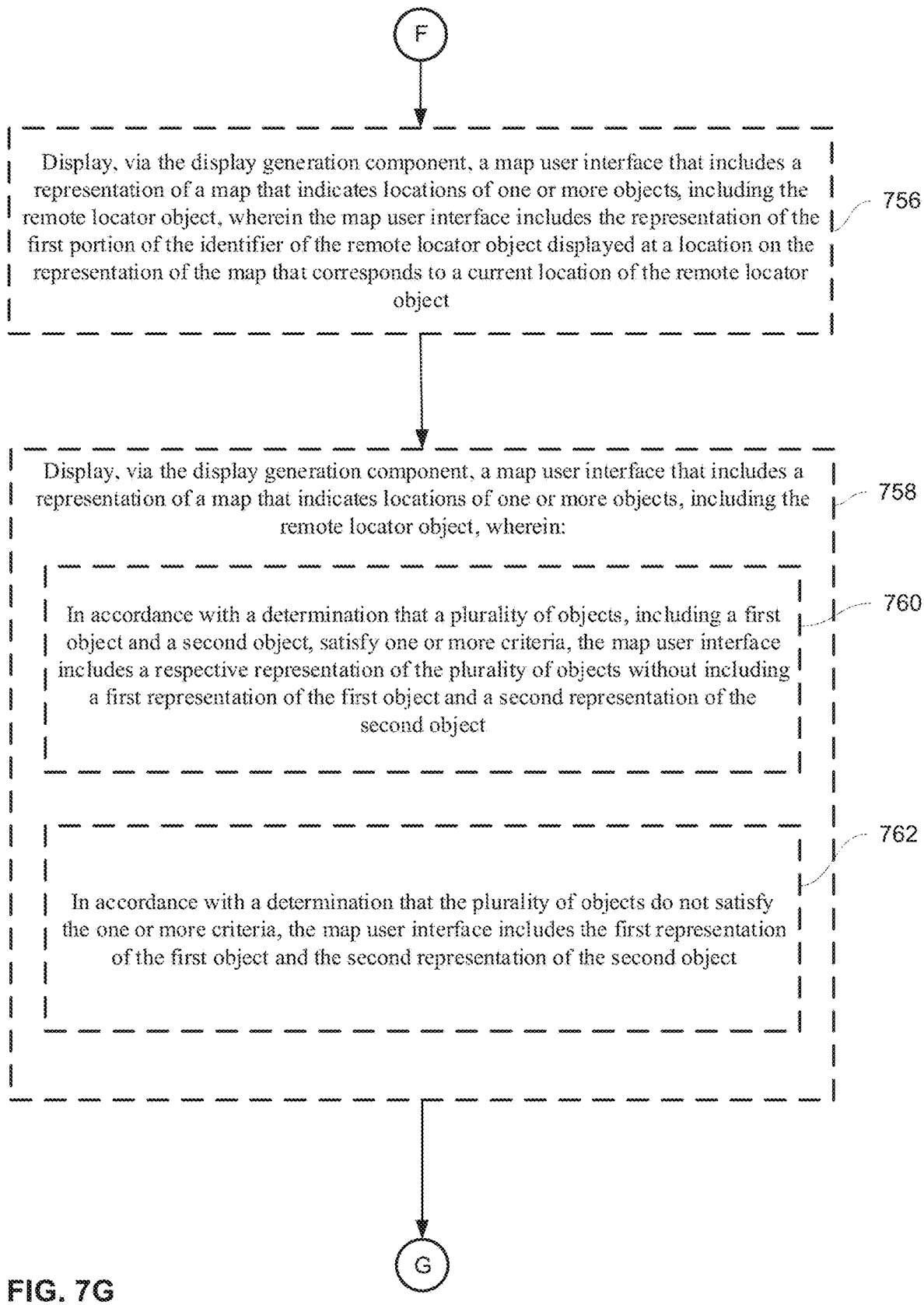

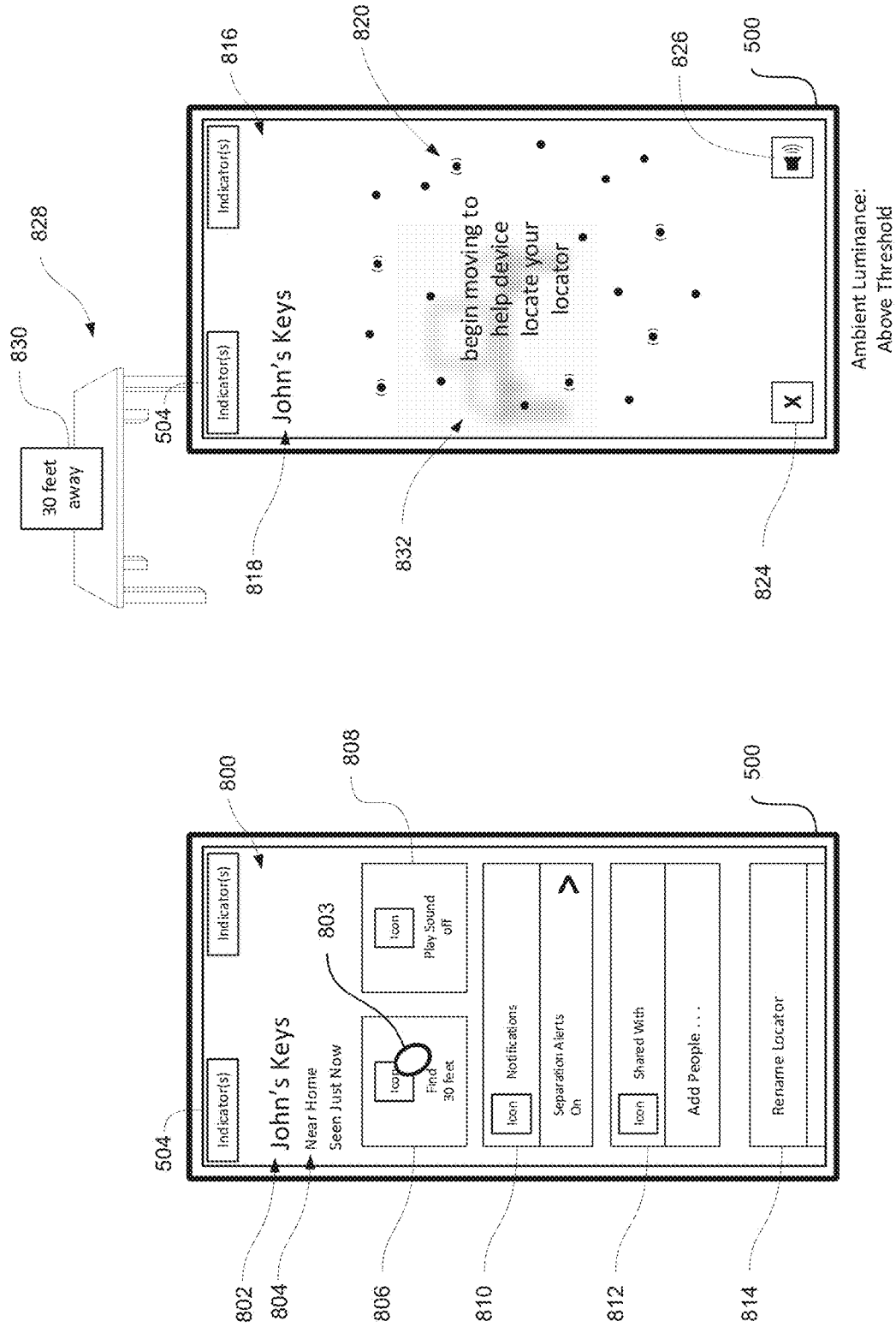

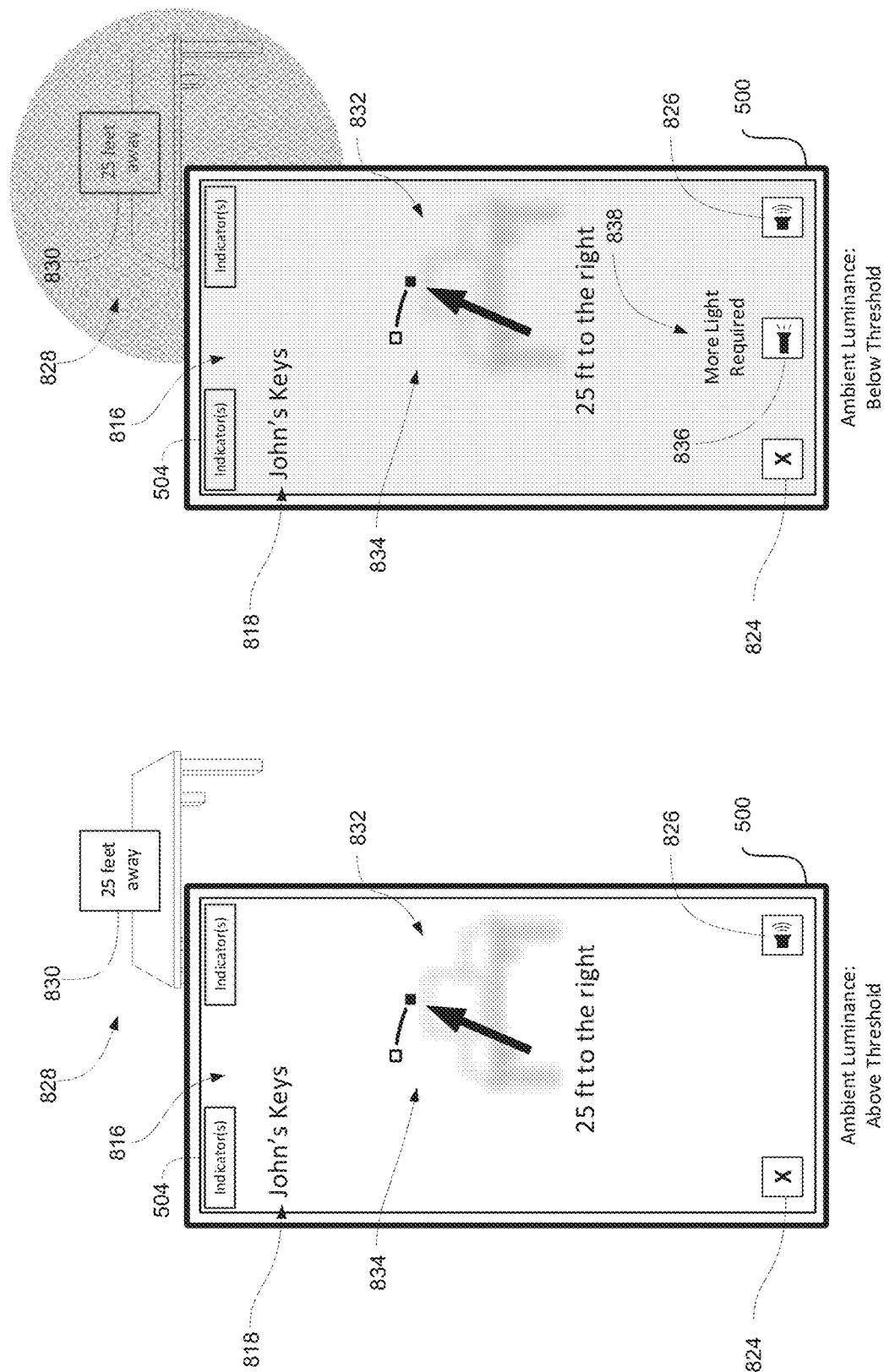

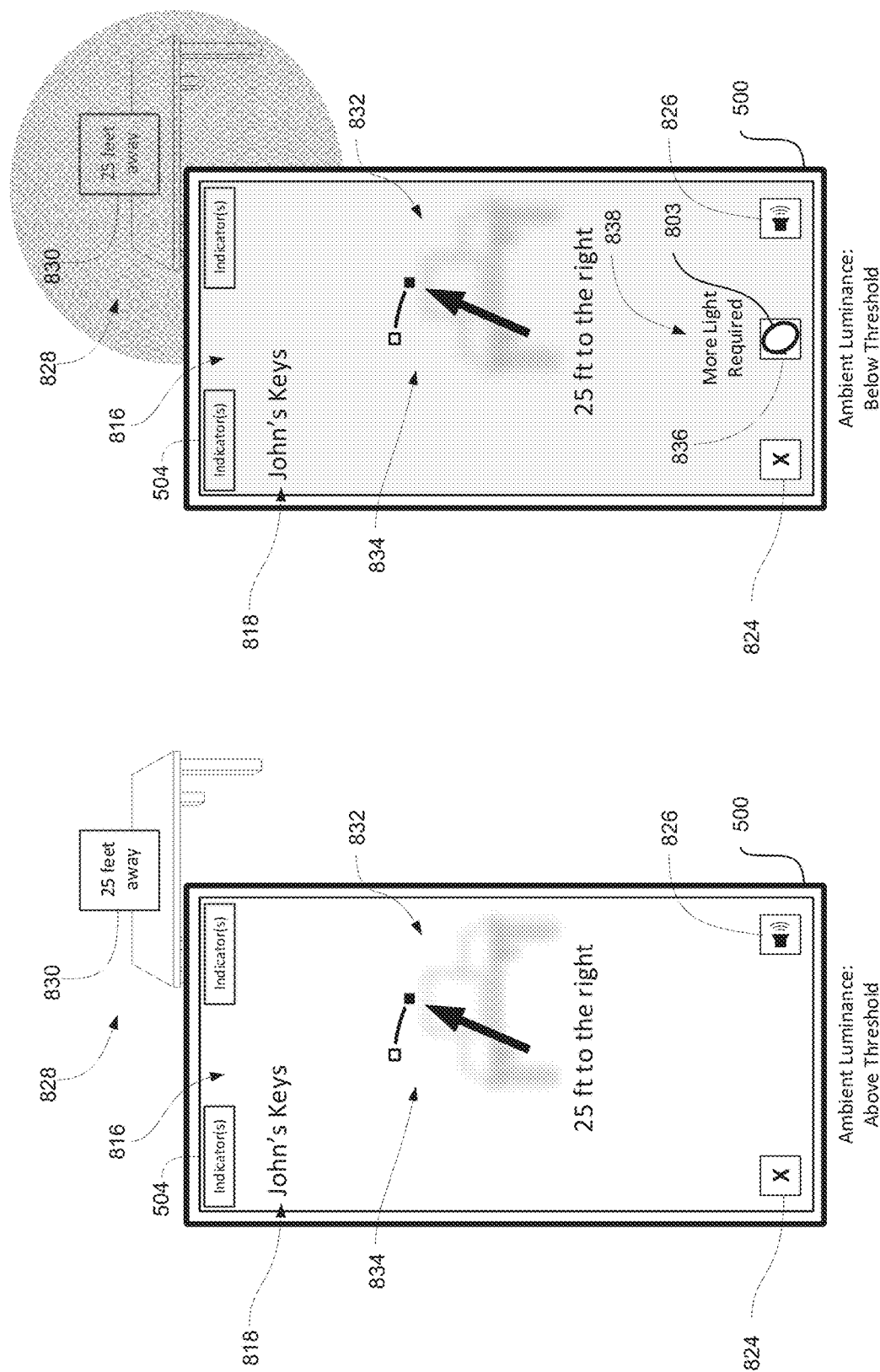

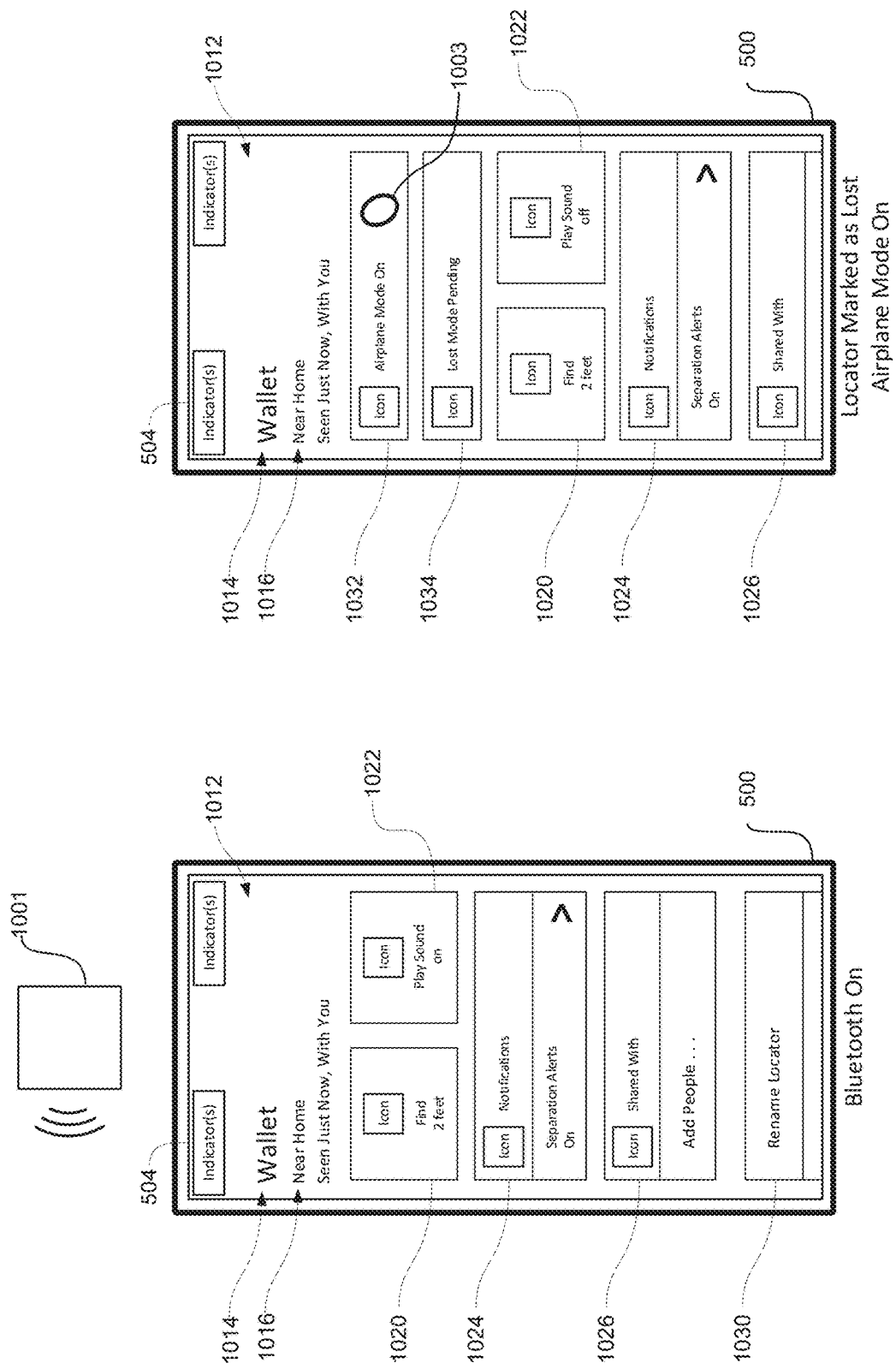

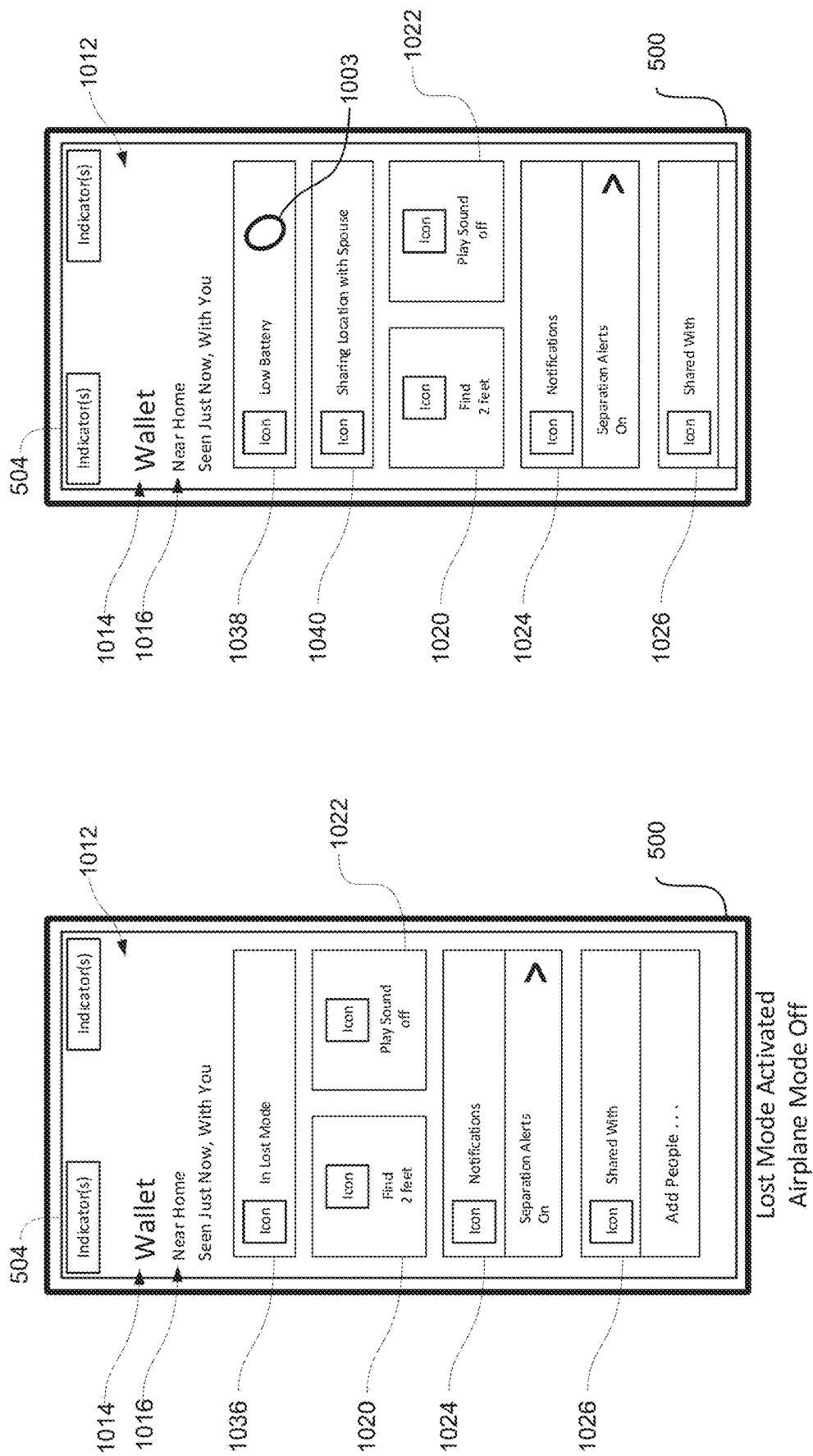

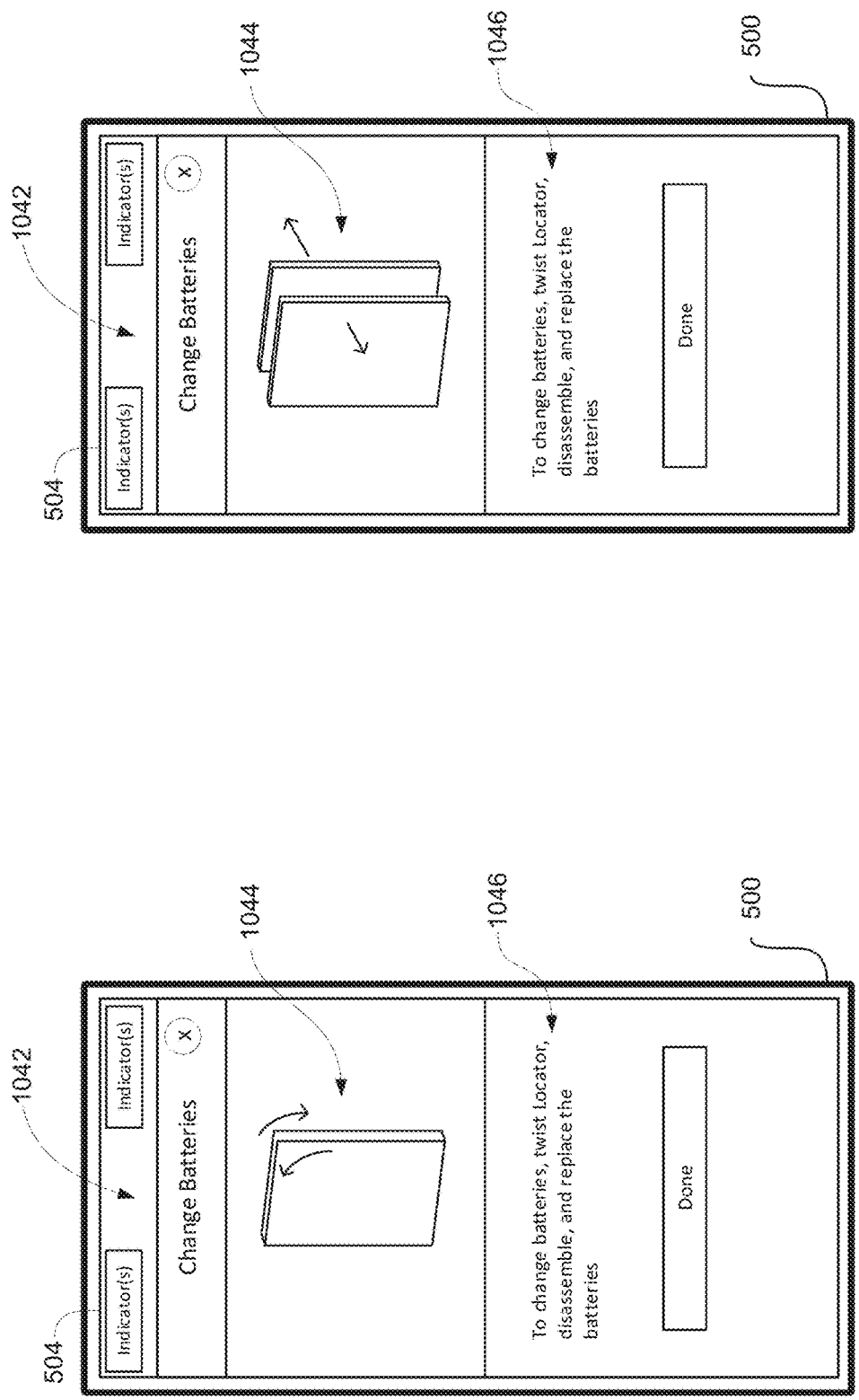

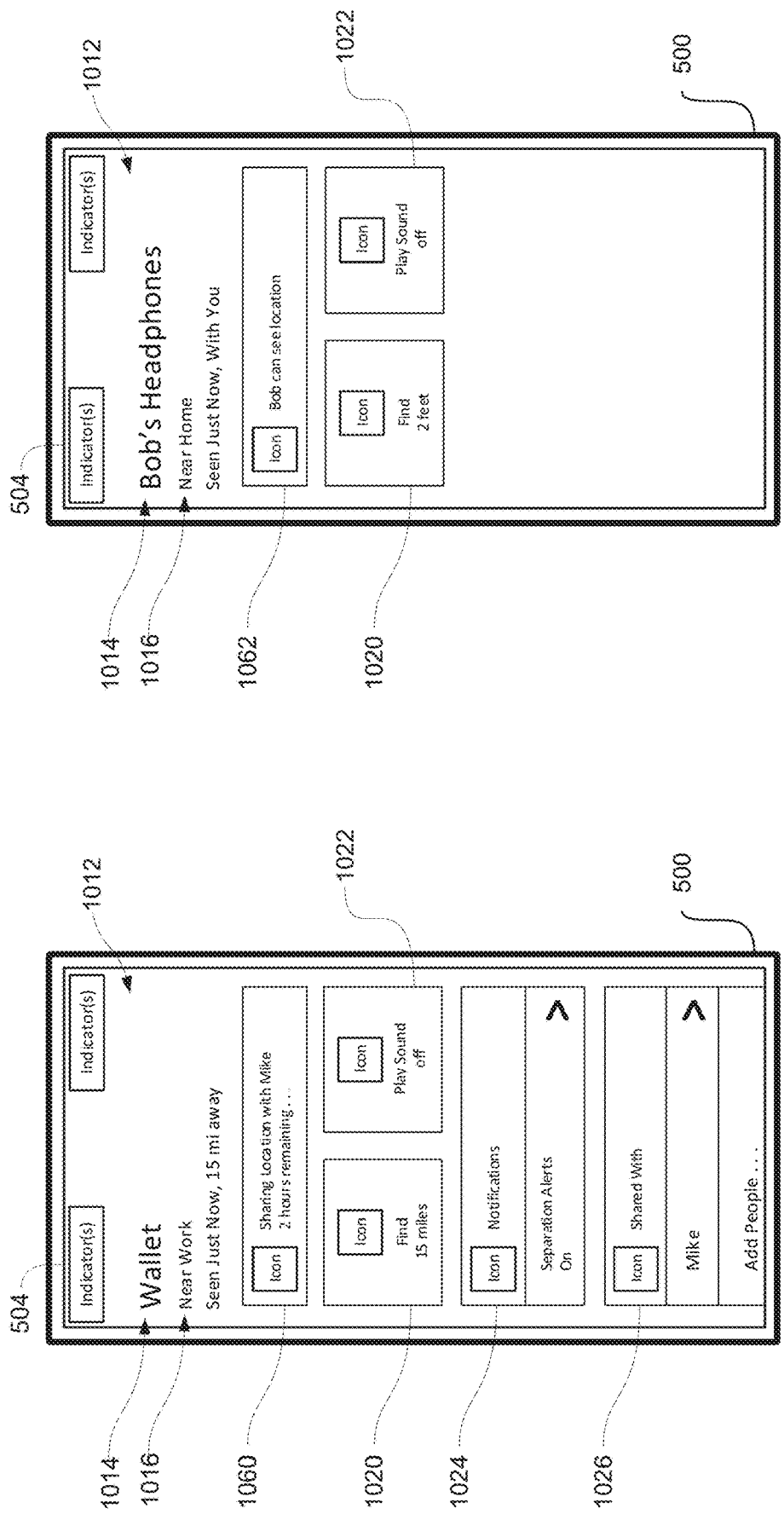

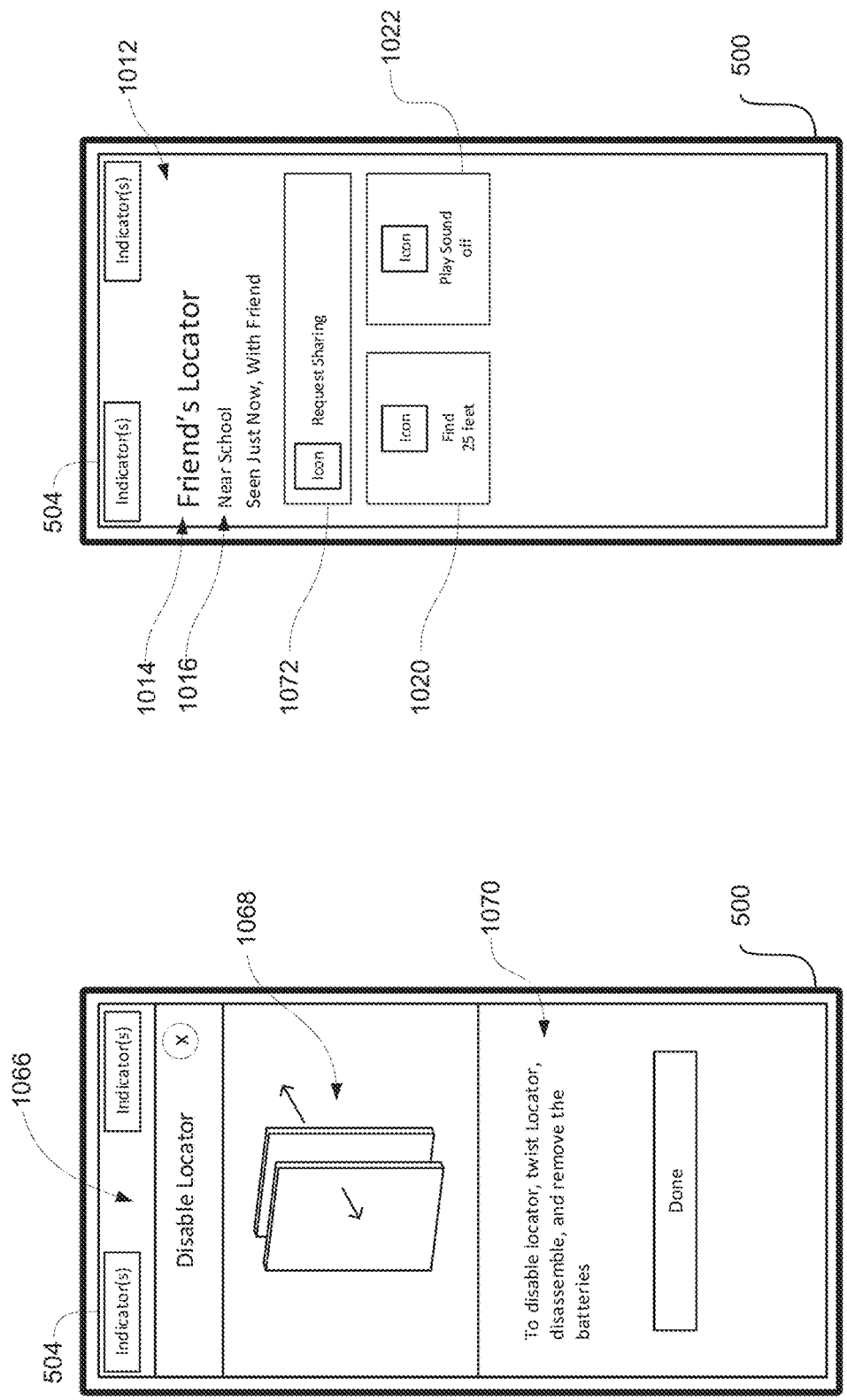

USER INTERFACES FOR TRACKING AND FINDING ITEMS

CROSS-REFERENCE TO RELATED APPLICATIONS

This application is a continuation of U.S. application Ser. No. 17/448,491, filed Sep. 22, 2021, which claims the benefit of U.S. Provisional Application No. 63/083,735, filed Sep. 25, 2020, U.S. Provisional Application No. 63/110,715, filed Nov. 6, 2020, and U.S. Provisional Application No. 63/176,883, filed Apr. 19, 2021, the contents of which are herein incorporated by reference in their entireties for all purposes.

FIELD OF THE DISCLOSURE

This relates generally to user interfaces that enable a user to track and find items using an electronic device.

BACKGROUND OF THE DISCLOSURE

User interaction with electronic devices has increased significantly in recent years. These devices can be devices such as televisions, multimedia devices, mobile devices, computers, tablet computers, and the like.

In some circumstances, users may wish to use such devices to track and/or find items. Enhancing the user's interactions with the device improves the user's experience with the device and decreases user interaction time, which is particularly important where input devices are battery-operated.

It is well understood that personally identifiable information data should be managed and handled so as to minimize risks of unintentional or unauthorized access or use, and the nature of authorized use should be clearly indicated to users. In particular, the use of personally identifiable information should follow privacy policies and practices that are generally recognized as meeting or exceeding industry or governmental requirements for maintaining the privacy of users.

SUMMARY OF THE DISCLOSURE

Some embodiments described in this disclosure are directed to user interfaces for defining identifiers for remote locator objects. Some embodiments described in this disclosure are directed to locating a remote locator object. Some embodiments described in this disclosure are directed to providing information associated with a remote locator object. Some embodiments described in this disclosure are directed to displaying notifications associated with a trackable device. Some embodiments described in this disclosure are directed to generating alerts. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 7A-7H are flow diagrams illustrating a method of providing user interfaces for defining identifiers for remote locator objects in accordance with some embodiments of the disclosure.

FIGS. 8A-8I illustrate exemplary ways in which an electronic device locates a remote locator object in accordance with some embodiments of the disclosure.

DETAILED DESCRIPTION

Figure 1A:
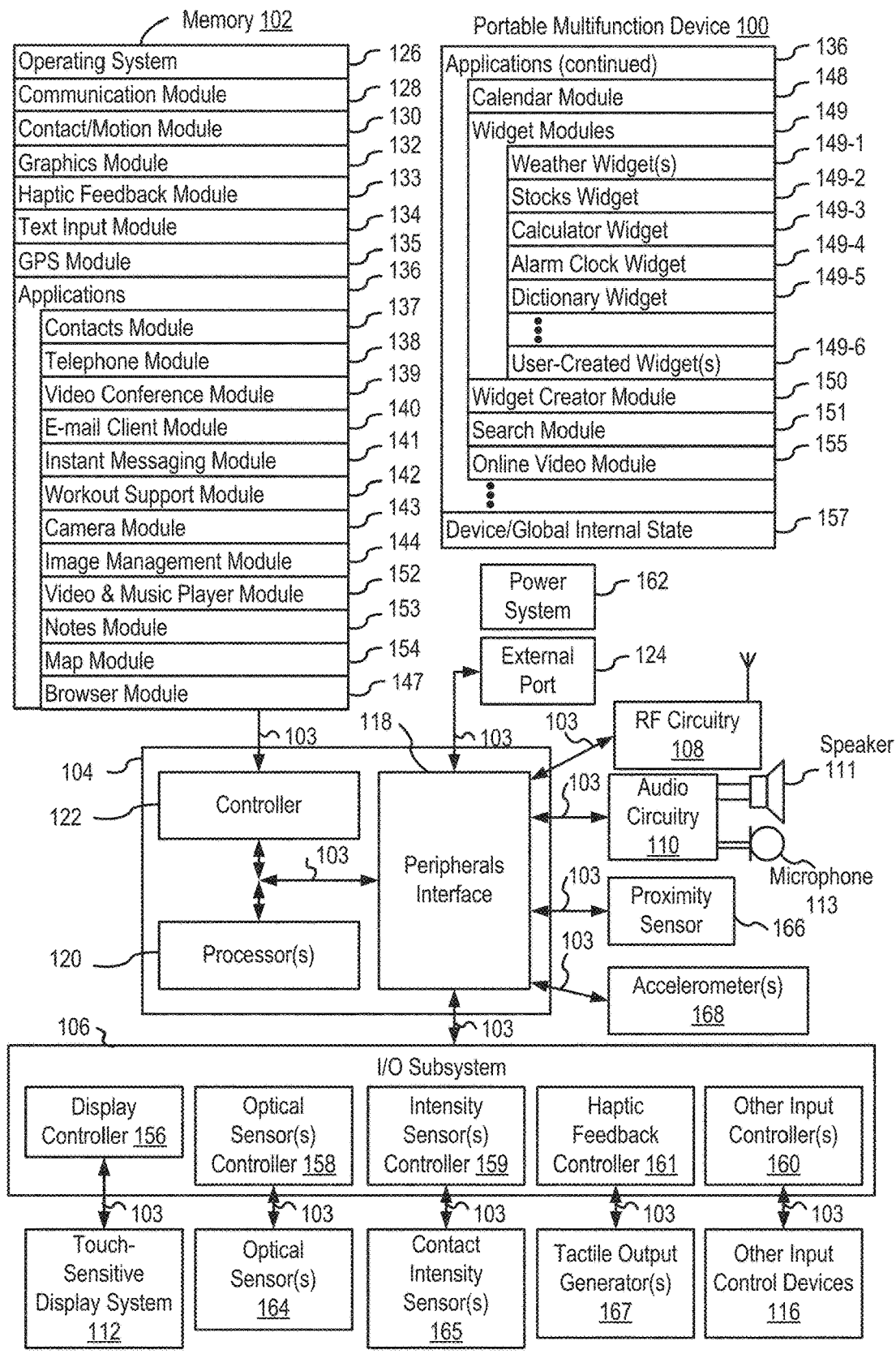
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices to name remote locator objects and/or locate remote locator objects. Such techniques can reduce the cognitive burden on a user who uses such devices and/or wishes to control their use of such devices. Further, such techniques can reduce processor and battery power otherwise wasted on redundant user inputs.

Although the following description uses terms "first," "second," etc. to describe various elements, these elements should not be limited by the terms. For example, a first touch could be termed a second touch, and, similarly, a second touch could be termed a first touch, without departing from the scope of the various described embodiments. The first touch and the second touch are both touches, but they are not the same touch. These terms are only used to distinguish one element from another.

The terminology used in the description of the various described embodiments herein is for the purpose of describing particular embodiments only and is not intended to be limiting. It will be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used in the description of the various described embodiments and the appended claims, the singular forms "a," "an," and "the" are intended to include the plural forms as well, unless the context clearly indicates otherwise.

The phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context. The term "if" is, optionally, construed to mean "when" or "upon" or "in response to determining" or "in response to detecting," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. It should also be understood that, in some embodiments, the device is not a portable communications device, but is a desktop computer with a touch-sensitive surface (e.g., a touch screen display and/or a touchpad). Other portable electronic devices, such as laptops or tablet computers with touch-sensitive surfaces (e.g., touch screen displays and/or touchpads), are, optionally, used.

It should be understood that the electronic device optionally includes one or more other physical user-interface devices, such as a physical keyboard, a mouse, and/or a joystick. In the discussion that follows, an electronic device that includes a display and a touch-sensitive surface is described.

The device typically supports a variety of applications, such as one or more of the following: a web browsing application, a website creation application, a word processing application, a disk authoring application, a spreadsheet application, a gaming application, a telephone application, a drawing application, a presentation application, a video conferencing application, a workout support application, a digital camera application, a digital video camera application, a photo management application, an e-mail application, an instant messaging application, a digital music player application, and/or a digital video player application.

One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user. The various applications that are executed on the device optionally use at least one common physical user-interface device, such as the touch-sensitive surface.

Attention is now directed toward embodiments of portable devices with touch-sensitive displays. FIG. 1A is a block diagram illustrating portable multifunction device 100 with touch-sensitive display system 112 in accordance with some embodiments. Device 100 includes memory 102 (which optionally includes one or more computer-readable storage mediums), memory controller 122, one or more processing units (CPUs) 120, audio circuitry 110, speaker 111, microphone 113, input/output (I/O) subsystem 106, peripherals interface 118, RF circuitry 108, other input control devices 116, and external port 124. Touch-sensitive display 112 is sometimes called a "touch screen" for convenience and is sometimes known as or called a "touch-sensitive display system." Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). Device 100 optionally includes one or more optical sensors 164. These components optionally communicate over one or more communication buses or signal lines 103.

Using the intensity of a contact as an attribute of a user input allows for user access to additional device functionality that may otherwise not be accessible by the user on a reduced-size device with limited real estate for receiving user input (e.g., via a touch-sensitive display, a touch-sensitive surface, or a physical/mechanical control such as a knob or a button) and/or displaying affordances (e.g., on a touch-sensitive display). As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. The intensity of a contact has a range of values that includes at least four distinct values and more typically includes hundreds of distinct values (e.g., at least 256). In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). In some implementations, the substitute measurements for contact force or pressure are used directly to determine whether an intensity threshold has been exceeded (e.g., the intensity threshold is described in units corresponding to the substitute measurements).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. In some cases, a user will feel a tactile sensation such as an "down click" or "up click" even when there is no movement of a physical actuator button associated with the touch-sensitive surface that is physically pressed (e.g., displaced) by the user's movements. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

The various components shown in FIG. 1A are implemented in hardware, software, or a combination of both hardware and software, including one or more signal processing and/or application-specific integrated circuits. It should be appreciated that device 100 is only one example of a portable multifunction device, and that device 100 optionally has more or fewer components than shown, optionally combines two or more components, or optionally has a different configuration or arrangement of the components.

Memory controller 122 optionally controls access to memory 102 by other components of device 100. Memory 102 optionally includes high-speed random access memory and optionally also includes non-volatile memory, such as one or more flash memory devices, magnetic disk storage devices, or other non-volatile solid-state memory devices.

The one or more processors 120 run or execute various software programs and/or sets of instructions stored in memory 102 to perform various functions for device 100 and to process data. Peripherals interface 118 can be used to couple input and output peripherals of the device to CPU 120 and memory 102. In some embodiments, peripherals interface 118, memory controller 122, and CPU 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 optionally includes well-known circuitry for detecting near field communication (NFC) fields, such as by a short-range communication radio. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols, and technologies, including but not limited to high-speed uplink packet access (HSUPA), Evolution, Data-Only (EV-DO), HSPA, HSPA+, Dual-Cell HSPA (DC-HSPDA), Global System for Mobile Communications (GSM), Enhanced Data GSM Environment (EDGE), high-speed downlink packet access (HSDPA), long term evolution (LTE), near field communication (NFC), wideband code division multiple access (W-CDMA), code division multiple access (CDMA), time division multiple access (TDMA), Wireless Fidelity (Wi-Fi) (e.g., IEEE 802.11a, IEEE 802.11b, IEEE 802.11g, IEEE 802.11n, and/or IEEE 802.11ac), Bluetooth, Bluetooth Low Energy (BTLE), voice over Internet Protocol (VoIP), Wi-MAX, a protocol for e-mail (e.g., Internet message access protocol (IMAP) and/or post office protocol (POP)), Session Initiation Protocol for Instant Messaging and Presence Leveraging Extensions (SIMPLE), Instant Messaging and Presence Service (IMPS)), Short Message Service (SMS), and/or instant messaging (e.g., extensible messaging and presence protocol (XMPP), or any other suitable communication protocol, including communication protocols not yet developed as of the filing date of this document.

Audio circuitry 110, speaker 111, and microphone 113 provide an audio interface between a user and device 100. Speaker 111 converts the electrical signal to human-audible sound waves. Audio circuitry 110 receives audio data from peripherals interface 118, converts the audio data to an electrical signal, and transmits the electrical signal to speaker 111. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). Other input control devices 116 optionally include physical buttons (e.g., push buttons, rocker buttons, etc.), dials, slider switches, joysticks, click wheels, and so forth.

A quick press of the push button optionally disengages a lock of touch screen 112 or optionally begins a process that uses gestures on the touch screen to unlock the device. A longer press of the push button (e.g., 206) optionally turns power to device 100 on or off. Touch screen 112 is used to implement virtual or soft buttons and one or more soft keyboards. The functionality of one or more of the buttons are, optionally, user-customizable.

Touch-sensitive display 112 provides an input interface and an output interface between the device and a user. Touch screen 112 displays visual output to the user. In some embodiments, some or all of the visual output optionally corresponds to user-interface objects. The visual output optionally includes graphics, text, icons, video, and any combination thereof (collectively termed "graphics"). Display controller 156 receives and/or sends electrical signals from/to touch screen 112.

Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. Touch screen 112 has a touch-sensitive surface, sensor, or set of sensors that accepts input from the user based on haptic and/or tactile contact. In an exemplary embodiment, a point of contact between touch screen 112 and the user corresponds to a finger of the user.

Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used. Touch screen 112 optionally uses LED (light emitting diode) technology LCD (liquid crystal display) technology, or LPD (light emitting polymer display) technology, although other display technologies are used in other embodiments.

A touch-sensitive display in some embodiments of touch screen 112 is, optionally, analogous to multi-touch sensitive touchpads. However, touch screen 112 displays visual output from device 100, whereas touch-sensitive touchpads do not provide visual output.

The user optionally makes contact with touch screen 112 using any suitable object or appendage, such as a stylus, a finger, and so forth. In some embodiments, the device translates the rough finger-based input into a precise pointer/cursor position or command for performing the actions desired by the user. In some embodiments, the user interface is designed to work primarily with finger-based contacts and gestures, which can be less precise than stylus-based input due to the larger area of contact of a finger on the touch screen. Touch screen 112 optionally has a video resolution in excess of 100 dpi. In some embodiments, the touch screen has a video resolution of approximately 160 dpi.

In some embodiments, in addition to the touch screen, device 100 optionally includes a touchpad (not shown) for activating or deactivating particular functions. The touchpad is, optionally, a touch-sensitive surface that is separate from touch screen 112 or an extension of the touch-sensitive surface formed by the touch screen. In some embodiments, the touchpad is a touch-sensitive area of the device that, unlike the touch screen, does not display visual output.

Device 100 also includes power system 162 for powering the various components. Power system 162 optionally includes a power management system, one or more power sources (e.g., battery, alternating current (AC)), a power converter or inverter, a power status indicator (e.g., a light-emitting diode (LED)), a recharging system, a power failure detection circuit, and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 receives light from the environment, projected through one or more lenses, and converts the light to data representing an image. Optical sensor 164 optionally includes charge-coupled device (CCD) or complementary metal-oxide semiconductor (CMOS) phototransistors. In conjunction with imaging module 143 (also called a camera module), optical sensor 164 optionally captures still images or video. In some embodiments, an optical sensor is located on the front of the device so that the user's image is, optionally, obtained for video conferencing while the user views the other video conference participants on the touch screen display. In some embodiments, an optical sensor is located on the back of device 100, opposite touch screen display 112 on the front of the device so that the touch screen display is enabled for use as a viewfinder for still and/or video image acquisition. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

FIG. 1A shows a contact intensity sensor coupled to intensity sensor controller 159 in I/O subsystem 106. Device 100 optionally also includes one or more contact intensity sensors 165. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is located on the back of device 100, opposite touch screen display 112, which is located on the front of device 100. In some embodiments, at least one contact intensity sensor is collocated with, or proximate to, a touch-sensitive surface (e.g., touch-sensitive display system 112).

Device 100 optionally also includes one or more proximity sensors 166. FIG. 1A shows proximity sensor 166 coupled to peripherals interface 118. In some embodiments, the proximity sensor turns off and disables touch screen 112 when the multifunction device is placed near the user's ear (e.g., when the user is making a phone call). Alternately, proximity sensor 166 is, optionally, coupled to input controller 160 in I/O subsystem 106.

FIG. 1A shows a tactile output generator coupled to haptic feedback controller 161 in I/O subsystem 106. Device 100 optionally also includes one or more tactile output generators 167. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator sensor is located on the back of device 100, opposite touch screen display 112, which is located on the front of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100).

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
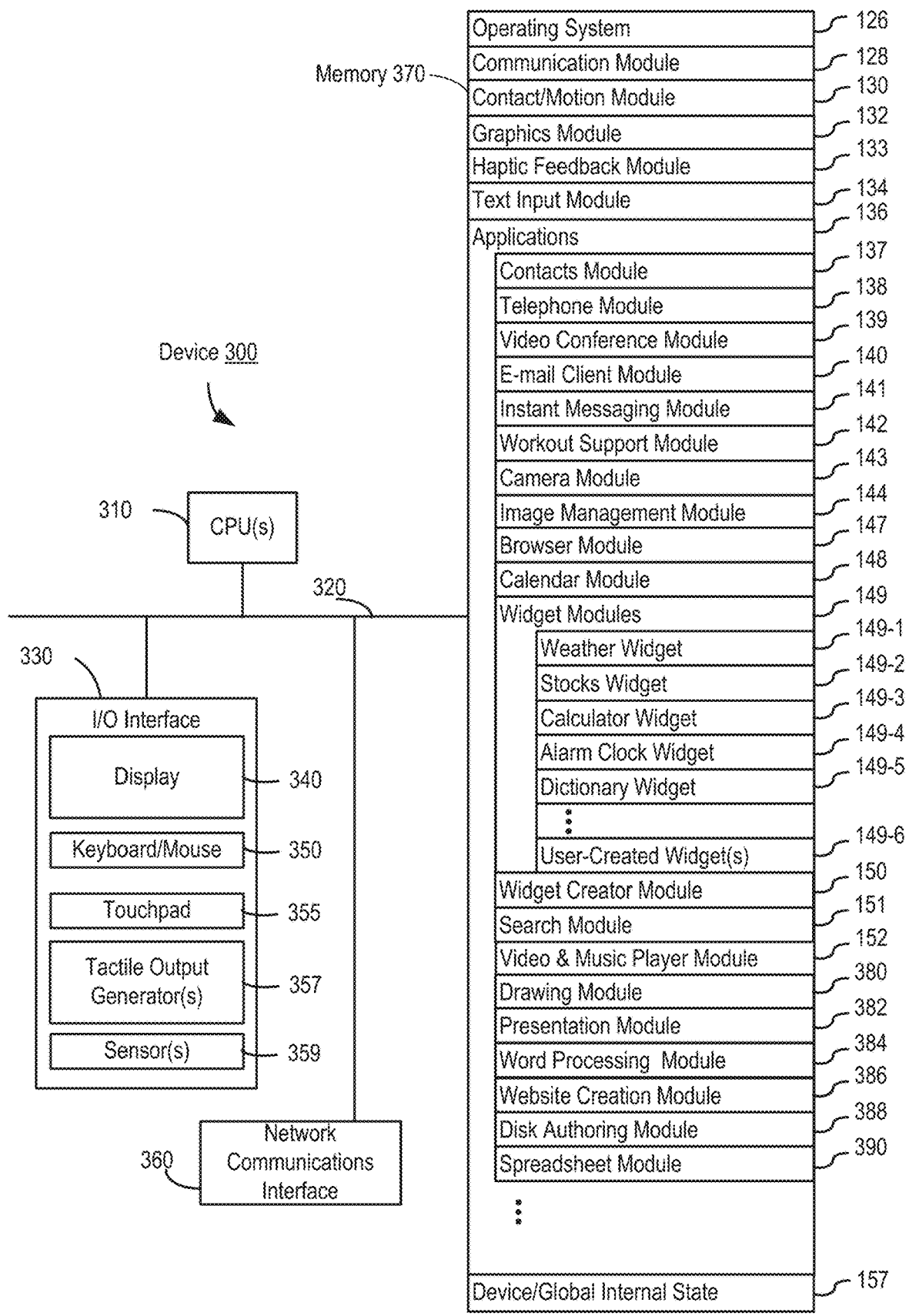
FIG. 3 is a block diagram of an exemplary multifunction device with a display and a touch-sensitive surface in accordance with some embodiments.

In some embodiments, the software components stored in memory 102 include operating system 126, applications (or sets of instructions) 136, communication module (or set of instructions) 128, contact/motion module (or set of instructions) 130, text input module (or set of instructions) 134, graphics module (or set of instructions) 132, and Global Positioning System (GPS) module (or set of instructions) 135. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., WINDOWS, Darwin, RTXC, LINUX, UNIX, OS X, iOS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. In some embodiments, the external port is a multi-pin (e.g., 30-pin) connector. External port 124 (e.g., Universal Serial Bus (USB), FIREWIRE, etc.) is adapted for coupling directly to other devices or indirectly over a network (e.g., the Internet, wireless LAN, etc.).

Contact/motion module 130 optionally detects contact with touch screen 112 (in conjunction with display controller 156) and other touch-sensitive devices (e.g., a touchpad or physical click wheel). Contact/motion module 130 receives contact data from the touch-sensitive surface. Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). For example, a mouse "click" threshold of a trackpad or touch screen display can be set to any of a large range of predefined threshold values without changing the trackpad or touch screen display hardware. In some embodiments, at least a subset of the intensity thresholds are determined in accordance with software parameters (e.g., the intensity thresholds are not determined by the activation thresholds of particular physical actuators and can be adjusted without changing the physical hardware of device 100). Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). For example, detecting a finger tap gesture includes detecting a finger-down event followed by detecting a finger-up (liftoff) event at the same position (or substantially the same position) as the finger-down event (e.g., at the position of an icon). Thus, a gesture is, optionally, detected by detecting a particular contact pattern. As another example, detecting a finger swipe gesture on the touch-sensitive surface includes detecting a finger-down event followed by detecting one or more finger-dragging events, and subsequently followed by detecting a finger-up (liftoff) event.

As used herein, the term "graphics" includes any object that can be displayed to a user, including, without limitation, text, web pages, icons (such as user-interface objects including soft keys), digital images, videos, animations, and the like. Graphics module 132 includes various known software components for rendering and displaying graphics on touch screen 112 or other display, including components for changing the visual impact (e.g., brightness, transparency, saturation, contrast, or other visual property) of graphics that are displayed.

In some embodiments, graphics module 132 stores data representing graphics to be used. Graphics module 132 receives, from applications etc., one or more codes specifying graphics to be displayed along with, if necessary, coordinate data and other graphic property data, and then generates screen image data to output to display controller 156. Each graphic is, optionally, assigned a corresponding code.

Haptic feedback module 133 includes various software components for generating instructions used by tactile output generator(s) 167 to produce tactile outputs, in response to user interactions with device 100, at one or more locations on device 100.

Text input module 134, which is, optionally, a component of graphics module 132, provides soft keyboards for entering text in various applications (e.g., contacts 137, browser 147, IM 141, e-mail 140, and any other application that needs text input).

GPS module 135 determines the location of the device and provides this information for use in various applications (e.g., to camera 143 as picture/video metadata; to telephone 138 for use in location-based dialing; and to applications that provide location-based services such as local yellow page widgets, weather widgets, and map/navigation widgets).

Applications 136 optionally include the following modules (or sets of instructions), or a subset or superset thereof:
  Video player module;
  Music player module;
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Browser module 147;
  Calendar module 148;
  Widget modules 149, which optionally include one or more of: dictionary widget 149-5, weather widget 149-1, stocks widget 149-2, alarm clock widget 149-4, calculator widget 149-3, and other widgets obtained by the user, as well as user-created widgets 149-6;
  Widget creator module 150 for making user-created widgets 149-6;
  Search module 151;
  Video and music player module 152, which merges music player module and video player module;
  Notes module 153;
  Map module 154; and/or
  Online video module 155.

Examples of other applications 136 that are, optionally, stored in memory 102 include JAVA-enabled applications, other word processing applications, drawing applications, presentation applications, other image editing applications, encryption, digital rights management, voice recognition, and voice replication.

In conjunction with touch screen 112, contact/motion module 130, graphics module 132, text input module 134, and display controller 156, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), physical address(es), e-mail address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

As noted above, the wireless communication optionally uses any of a plurality of communications standards, protocols, and technologies. In conjunction with RF circuitry 108, audio circuitry 110, speaker 111, microphone 113, touch screen 112, contact/motion module 130, graphics module 132, text input module 134, and display controller 156, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed.

In conjunction with RF circuitry 108, audio circuitry 110, speaker 111, microphone 113, touch screen 112, contact/motion module 130, graphics module 132, text input module 134, contacts module 137, telephone module 138, display controller 156, optical sensor controller 158, and optical sensor 164, video conference module 139 includes executable instructions to initiate, conduct, and terminate a video conference between a user and one or more other participants in accordance with user instructions.

In conjunction with RF circuitry 108, touch screen 112, contact/motion module 130, graphics module 132, text input module 134, and display controller 156, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

As used herein, "instant messaging" refers to both telephony-based messages (e.g., messages sent using SMS or MMS) and Internet-based messages (e.g., messages sent using XMPP, SIMPLE, or IMPS). In conjunction with RF circuitry 108, touch screen 112, contact/motion module 130, graphics module 132, text input module 134, and display controller 156, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using SIMPLE, XMPP, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS).

In conjunction with RF circuitry 108, touch screen 112, contact/motion module 130, graphics module 132, text input module 134, GPS module 135, map module 154, display controller 156, and music player module, workout support module 142 includes executable instructions to create workouts (e.g., with time, distance, and/or calorie burning goals); select and play music for a workout; communicate with workout sensors (sports devices); receive workout sensor data; calibrate sensors used to monitor a workout; and display, store, and transmit workout data.

In conjunction with touch screen 112, contact/motion module 130, graphics module 132, image management module 144, display controller 156, optical sensor(s) 164, and optical sensor controller 158, camera module 143 includes executable instructions to capture still images or video (including a video stream) and store them into memory 102, modify characteristics of a still image or video, or delete a still image or video from memory 102.

In conjunction with touch screen 112, contact/motion module 130, graphics module 132, text input module 134, display controller 156, and camera module 143, image management module 144 includes executable instructions to arrange, label, delete, modify (e.g., edit), or otherwise manipulate, present (e.g., in a digital slide show or album), and store still and/or video images.

In conjunction with RF circuitry 108, touch screen 112, contact/motion module 130, graphics module 132, text input module 134, and display controller 156, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, contact/motion module 130, graphics module 132, text input module 134, e-mail client module 140, display controller 156, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an XML (Extensible Markup Language) file and a JavaScript file (e.g., Yahoo! Widgets). In some embodiments, a widget includes an HTML (Hypertext Markup Language) file, a CSS (Cascading Style Sheets) file, and a JavaScript file.

In conjunction with RF circuitry 108, touch screen 112, contact/motion module 130, graphics module 132, text input module 134, display controller 156, and browser module 147, the widget creator module 150 are, optionally, used by a user to create widgets (e.g., turning a user-specified portion of a web page into a widget).

In conjunction with touch screen 112, contact/motion module 130, graphics module 132, text input module 134, and display controller 156, search module 151 includes executable instructions to search for text, sound, music, image, video, and/or other files in memory 102 that match one or more search criteria (e.g., one or more user-specified search terms) in accordance with user instructions.

In some embodiments, device 100 optionally includes the functionality of an MP3 player. In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124).

In conjunction with touch screen 112, display controller 156, contact/motion module 130, graphics module 132, and text input module 134, notes module 153 includes executable instructions to create and manage to-do lists, notes, and the like in accordance with user instructions.

In conjunction with RF circuitry 108, touch screen 112, contact/motion module 130, graphics module 132, text input module 134, GPS module 135, browser module 147, and display controller 156, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, contact/motion module 130, graphics module 132, audio circuitry 110, speaker 111, RF circuitry 108, text input module 134, e-mail client module 140, browser module 147, and display controller 156, online video module 155 includes instructions that allow the user to receive, access, browse (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. In some embodiments, memory 102 optionally stores a subset of the modules and data structures identified above. For example, video player module is, optionally, combined with music player module into a single module (e.g., video and music player module 152, FIG. 1A). Furthermore, memory 102 optionally stores additional modules and data structures not described above.

By using a touch screen and/or a touchpad as the primary input control device for operation of device 100, the number of physical input control devices (such as push buttons, dials, and the like) on device 100 is, optionally, reduced. In some embodiments, device 100 is a device where operation of a predefined set of functions on the device is performed exclusively through a touch screen and/or a touchpad.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In some embodiments, the menu button is a physical push button or other physical input control device instead of a touchpad. In such other embodiments, a "menu button" is implemented using a touchpad.

Figure 1B:
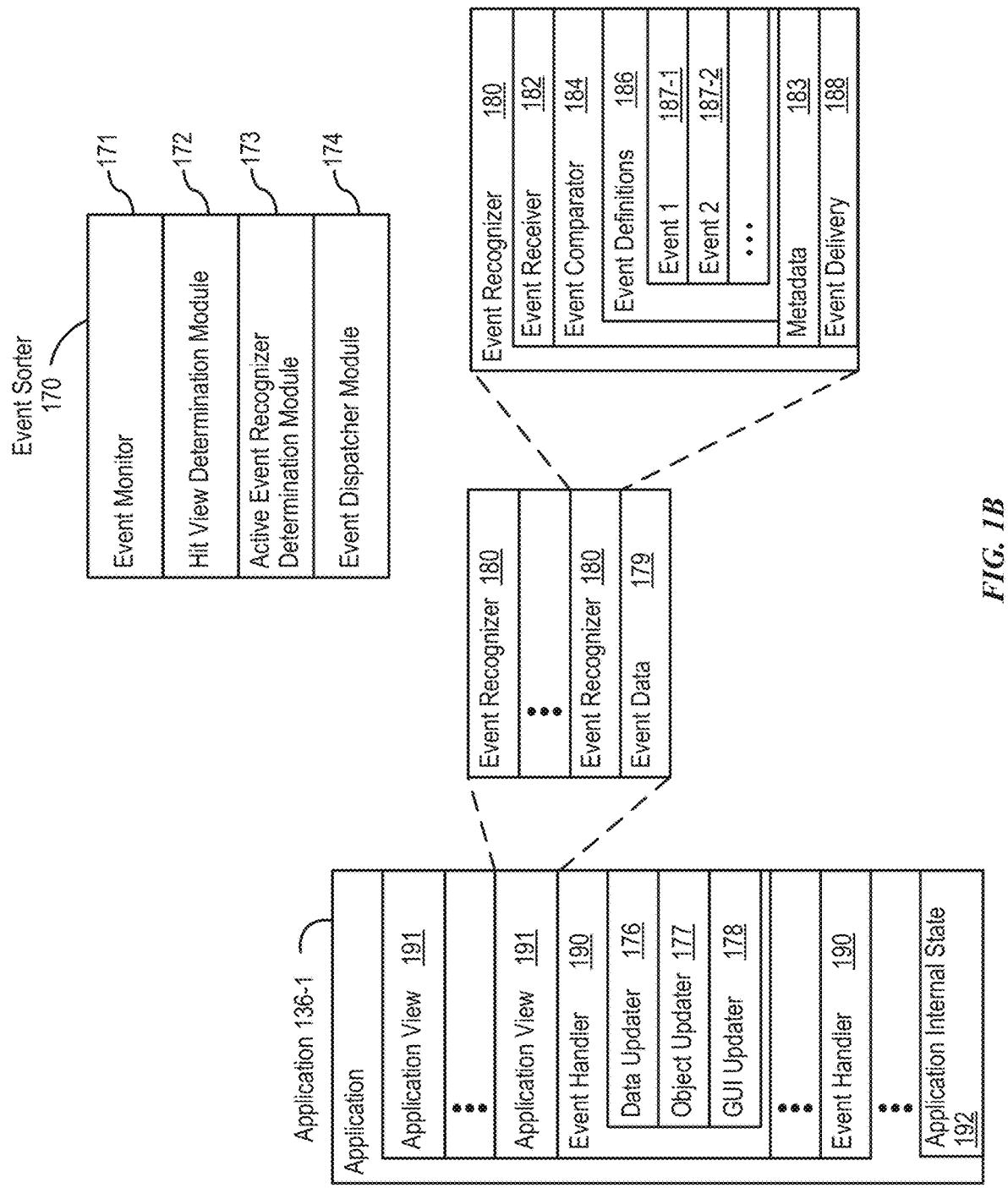
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes a respective application 136-1 (e.g., any of the aforementioned applications 137-151, 155, 380-390) and event sorter 170 (e.g., in operating system 126).

Event sorter 170 includes event monitor 171 and event dispatcher module 174. Event sorter 170 receives event information and determines the application 136-1 and application view 191 of application 136-1 to which to deliver the event information. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: user interface state information that indicates information being displayed or that is ready for display by application 136-1, resume information to be used when application 136-1 resumes execution, a state queue for enabling the user to go back to a prior state or view of application 136-1, and a redo/undo queue of previous actions taken by the user.

Event monitor 171 receives event information from peripherals interface 118. Peripherals interface 118 transmits information it receives from I/O subsystem 106 or a sensor, such as proximity sensor 166, accelerometer(s) 168, and/or microphone 113 (through audio circuitry 110). Event information includes information about a sub-event (e.g., a user touch on touch-sensitive display 112, as part of a multi-touch gesture). Information that peripherals interface 118 receives from I/O subsystem 106 includes information from touch-sensitive display 112 or a touch-sensitive surface.

In some embodiments, peripherals interface 118 transmits event information only when there is a significant event (e.g., receiving an input above a predetermined noise threshold and/or for more than a predetermined duration). In other embodiments, event monitor 171 sends requests to the peripherals interface 118 at predetermined intervals. In response, peripherals interface 118 transmits event information.

In some embodiments, event sorter 170 also includes an active event recognizer determination module 173 and/or a hit view determination module 172.

Views are made up of controls and other elements that a user can see on the display. Hit view determination module 172 provides software procedures for determining where a sub-event has taken place within one or more views when touch-sensitive display 112 displays more than one view.

Another aspect of the user interface associated with an application is a set of views, sometimes herein called application views or user interface windows, in which information is displayed and touch-based gestures occur. In some embodiments, the lowest level view in which a touch is detected is, optionally, called the hit view, and the set of events that are recognized as proper inputs are, optionally, determined based, at least in part, on the hit view of the initial touch that begins a touch-based gesture. Thus, the application views (of a respective application) in which a touch is detected optionally correspond to programmatic levels within a programmatic or view hierarchy of the application.

When an application has multiple views organized in a hierarchy, hit view determination module 172 identifies a hit view as the lowest view in the hierarchy which should handle the sub-event. Hit view determination module 172 receives information related to sub-events of a touch-based gesture. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that all views that include the physical location of a sub-event are actively involved views, and therefore determines that all actively involved views should receive a particular sequence of sub-events. In other embodiments, active event recognizer determination module 173 determines that only the hit view should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In some embodiments, event dispatcher module 174 stores in an event queue the event information, which is retrieved by a respective event receiver 182. In embodiments including active event recognizer determination module 173, event dispatcher module 174 delivers the event information to an event recognizer determined by active event recognizer determination module 173.

In some embodiments, operating system 126 includes event sorter 170. Alternatively, application 136-1 includes event sorter 170. In yet other embodiments, event sorter 170 is a part of another module stored in memory 102, such as contact/motion module 130, or is a stand-alone module.

In some embodiments, application 136-1 includes a plurality of event handlers 190 and one or more application views 191, each of which includes instructions for handling touch events that occur within a respective view of the application's user interface. Typically, a respective application view 191 includes a plurality of event recognizers 180.

Each application view 191 of the application 136-1 includes one or more event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Also, in some embodiments, one or more of data updater 176, object updater 177, and GUI updater 178 are included in a respective application view 191. Alternatively, one or more of the application views 191 include one or more respective event handlers 190.

A respective event recognizer 180 receives event information (e.g., event data 179) from event sorter 170 and identifies an event from the event information. In some embodiments, event recognizer 180 also includes at least a subset of: metadata 183, and event delivery instructions 188 (which optionally include sub-event delivery instructions). Event recognizer 180 includes event receiver 182 and event comparator 184.

Event receiver 182 receives event information from event sorter 170. The event information includes information about a sub-event, for example, a touch or a touch movement. When the sub-event concerns motion of a touch, the event information optionally also includes speed and direction of the sub-event. Depending on the sub-event, the event information also includes additional information, such as location of the sub-event. In some embodiments, events include rotation of the device from one orientation to another (e.g., from a portrait orientation to a landscape orientation, or vice versa), and the event information includes corresponding information about the current orientation (also called device attitude) of the device.

In some embodiments, event comparator 184 includes event definitions 186. Event comparator 184 compares the event information to predefined event or sub-event definitions and, based on the comparison, determines an event or sub-event, or determines or updates the state of an event or sub-event. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In another example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In some embodiments, the event also includes information for one or more associated event handlers 190.

In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test. In some embodiments, event definition 187 includes a definition of an event for a respective user-interface object.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event failed, event impossible, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate whether sub-events are delivered to varying levels in the view or programmatic hierarchy. In some embodiments, metadata 183 includes configurable properties, flags, and/or lists that indicate how event recognizers interact, or are enabled to interact, with one another.

In some embodiments, a respective event recognizer 180 activates event handler 190 associated with an event when one or more particular sub-events of an event are recognized. Activating an event handler 190 is distinct from sending (and deferred sending) sub-events to a respective hit view. In some embodiments, a respective event recognizer 180 delivers event information associated with the event to event handler 190. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with actively involved views or with the series of sub-events receive the event information and perform a predetermined process.

In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display. In some embodiments, data updater 176 creates and updates data used in application 136-1. For example, data updater 176 updates the telephone number used in contacts module 137, or stores a video file used in video player module.

In some embodiments, event handler(s) 190 includes or has access to data updater 176, object updater 177, and GUI updater 178. In other embodiments, they are included in two or more software modules. In some embodiments, data updater 176, object updater 177, and GUI updater 178 are included in a single module of a respective application 136-1 or application view 191.

It shall be understood that the foregoing discussion regarding event handling of user touches on touch-sensitive displays also applies to other forms of user inputs to operate multifunction devices 100 with input devices, not all of which are initiated on touch screens. For example, oral instructions; mouse movement and mouse button presses, optionally coordinated with single or multiple keyboard presses or holds; pen stylus inputs; contact movements such as taps, drags, scrolls, etc. on touchpads; movement of the device; detected eye movements; biometric inputs; and/or any combination thereof are optionally utilized as inputs corresponding to sub-events which define an event to be recognized.

Figure 2:
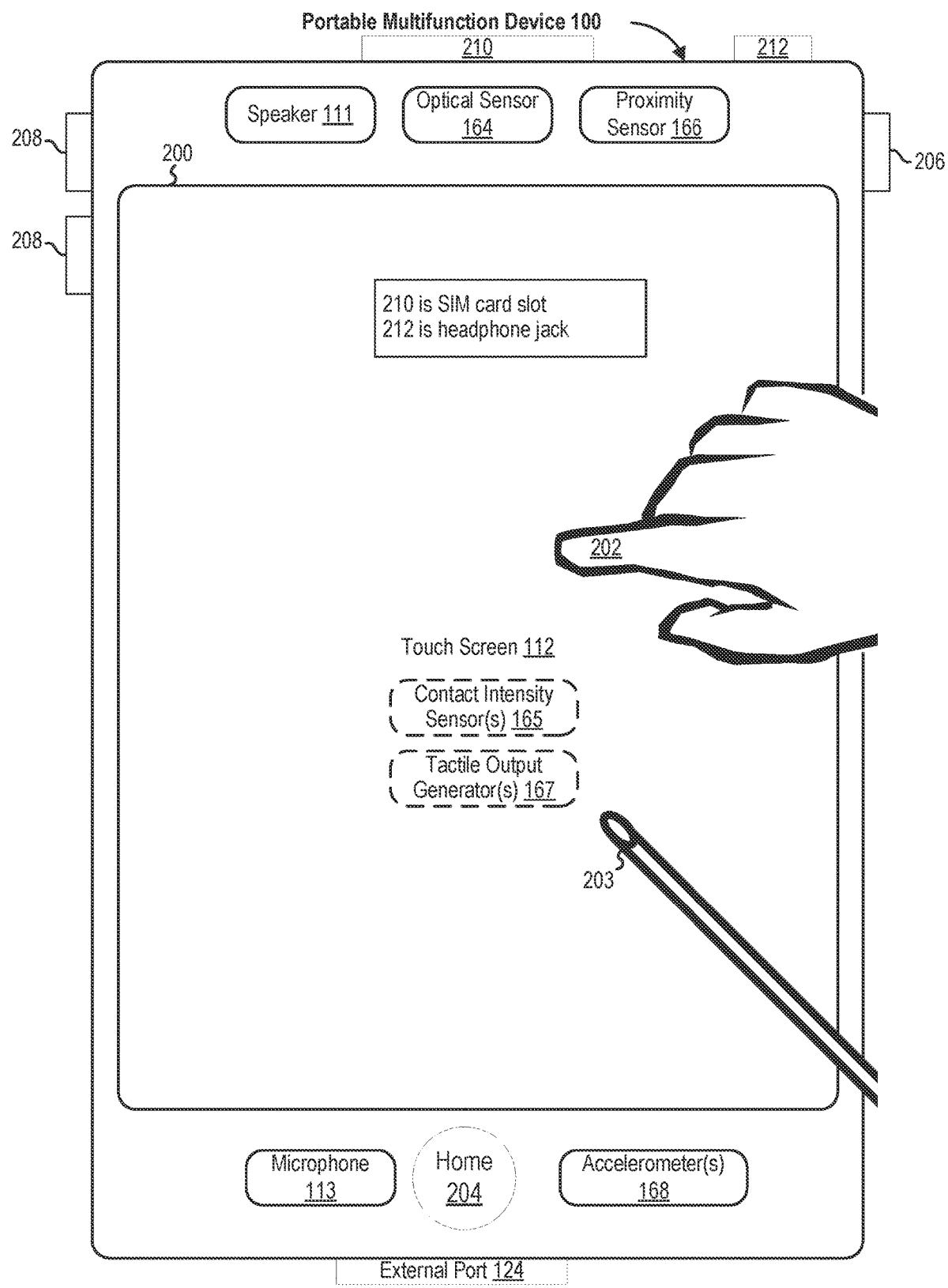
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, the gesture optionally includes one or more taps, one or more swipes (from left to right, right to left, upward and/or downward), and/or a rolling of a finger (from right to left, left to right, upward and/or downward) that has made contact with device 100. In some embodiments, selection of one or more graphics occurs when the user breaks contact with the one or more graphics. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. Alternatively, in some embodiments, the menu button is implemented as a soft key in a GUI displayed on touch screen 112. As described previously, menu button 204 is, optionally, used to navigate to any application 136 in a set of applications that are, optionally, executed on device 100.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Device 100 also, optionally, includes one or more contact intensity sensors 165 for detecting intensity of contacts on touch screen 112 and/or one or more tactile output generators 167 for generating tactile outputs for a user of device 100. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113.

FIG. 3 is a block diagram of an exemplary multifunction device with a display and a touch-sensitive surface in accordance with some embodiments. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 need not be portable. Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 optionally includes one or more storage devices remotely located from CPU(s) 310. Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. In some embodiments, memory 370 optionally stores a subset of the modules and data structures identified above. Furthermore, memory 370 optionally stores additional modules and data structures not described above. The above-identified modules or programs (e.g., sets of instructions) need not be implemented as separate software programs, procedures, or modules, and thus various subsets of these modules are, optionally, combined or otherwise rearranged in various embodiments.

Attention is now directed towards embodiments of user interfaces that are, optionally, implemented on, for example, portable multifunction device 100.

Figure 4A:
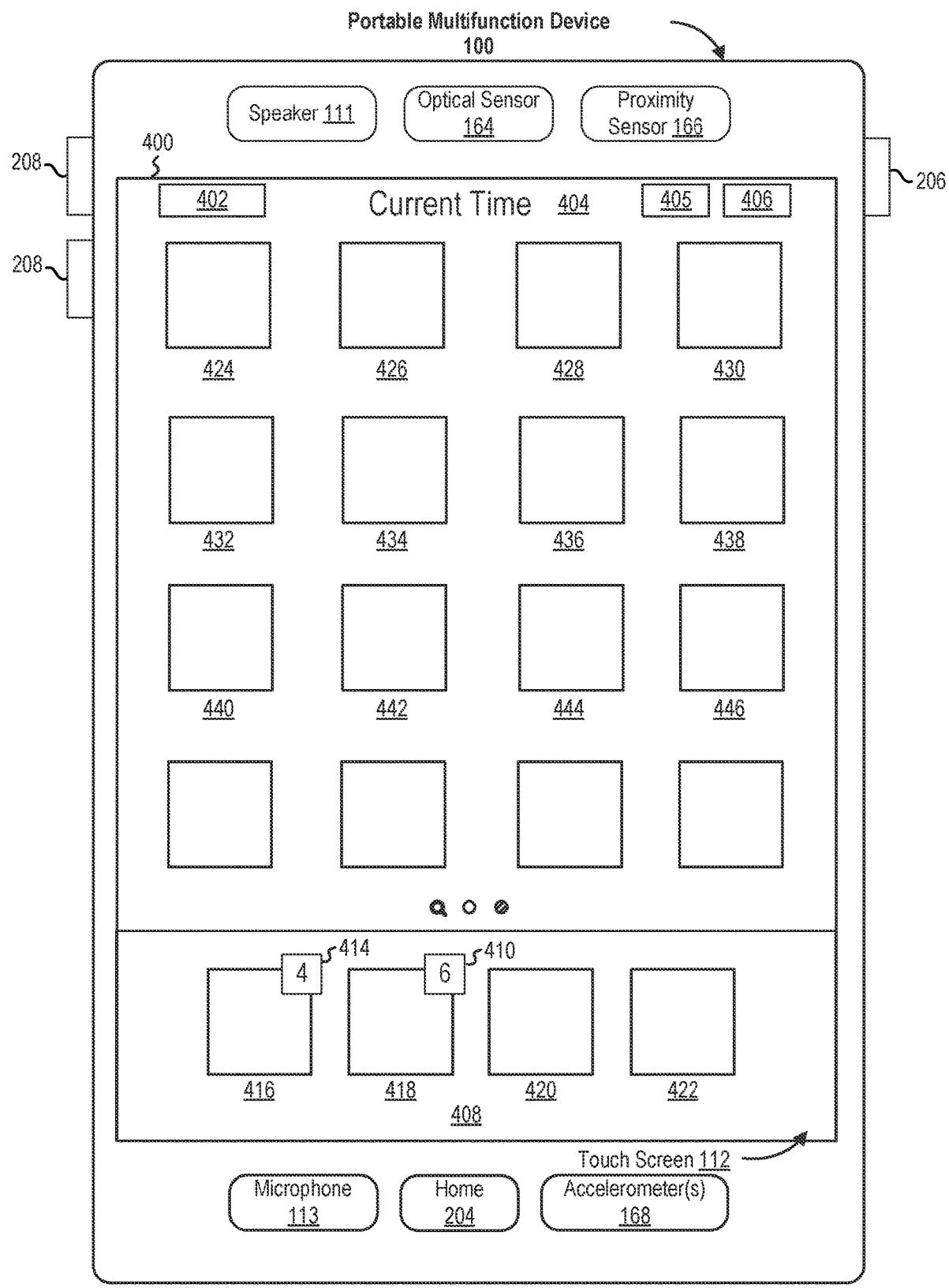
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, which optionally includes an indicator 414 of the number of missed calls or voicemail messages;

Icon 418 for e-mail client module 140, which optionally includes an indicator 410 of the number of unread e-mails;

Icon 422 for video and music player module 152; and

Icon 420 for browser module 147; and

Icons for other applications, such as:

Icon 424 for IM module 141;

Icon 442 for workout support module 142;

Icon 430 for camera module 143;

Icon 428 for image management module 144;

Icon 426 for calendar module 148;

Icon 438 for weather widget 149-1;

Icon 434 for stocks widget 149-2;

Icon 440 for alarm clock widget 149-4;

Icon 444 for notes module 153;

Icon 436 for map module 154;

Icon 432 for online video module 155; and

Icon 446 for a settings application or module, which provides access to settings for device 100 and its various applications 136.

In some embodiments, a label for a respective application icon includes a name of an application corresponding to the respective application icon. In some embodiments, a label for a particular application icon is distinct from a name of an application corresponding to the particular application icon.

Figure 4B:
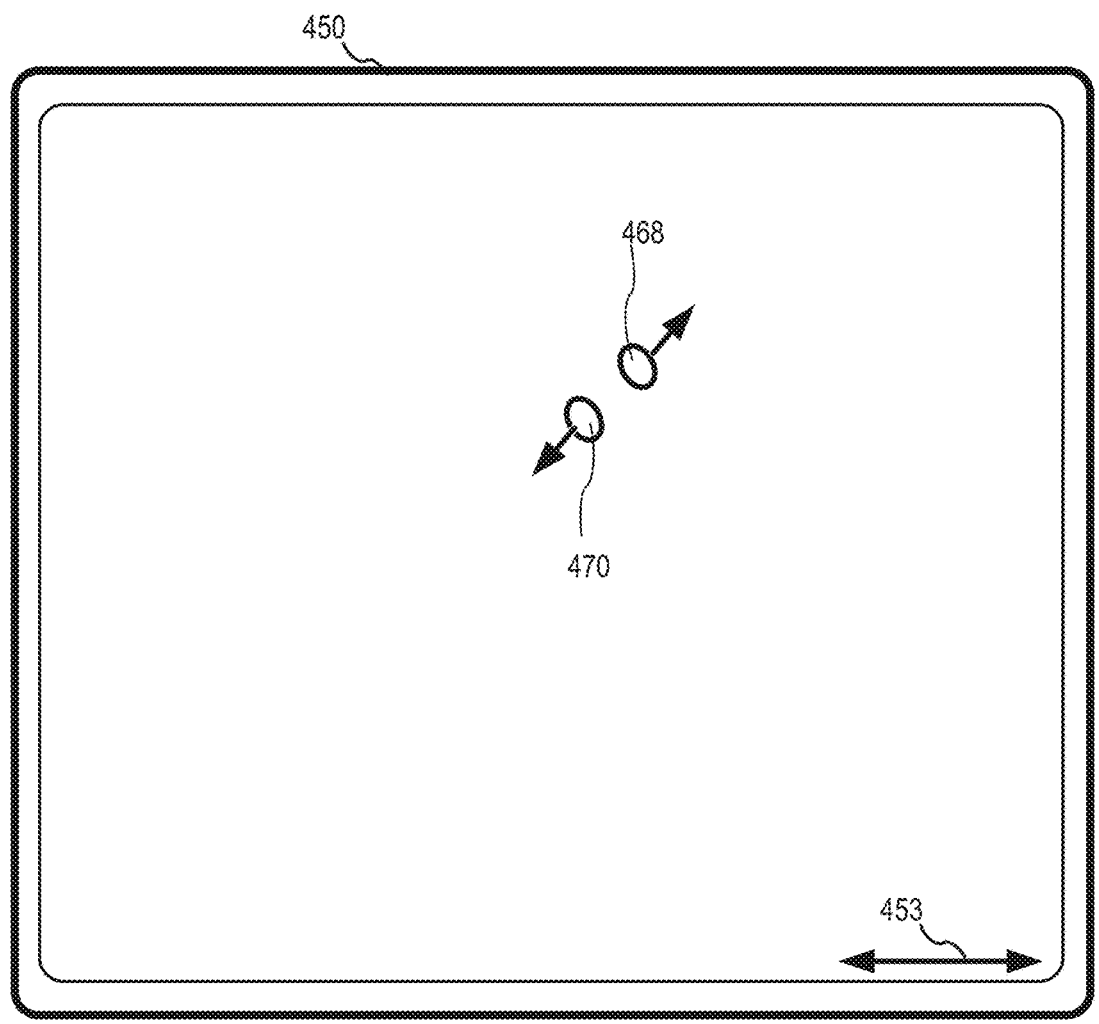
FIG. 4B illustrates an exemplary user interface for a multifunction device with a touch-sensitive surface that is separate from the display in accordance with some embodiments.
Figure 4B:
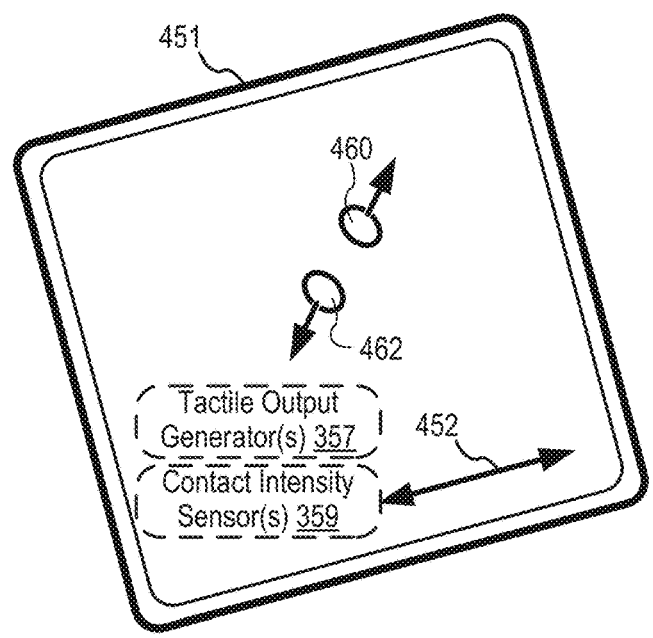

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more tactile output generators 357 for generating tactile outputs for a user of device 300 and/or one or more contact intensity sensors (e.g., one or more of sensors 359) for detecting intensity of contacts on touch-sensitive surface 451.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a tap gesture is, optionally, replaced with a mouse click while the cursor is located over the location of the tap gesture (e.g., instead of detection of the contact followed by ceasing to detect the contact). As another example, a swipe gesture is, optionally, replaced with a mouse click (e.g., instead of a contact) followed by movement of the cursor along the path of the swipe (e.g., instead of movement of the contact). Similarly, when multiple user inputs are simultaneously detected, it should be understood that multiple computer mice are, optionally, used simultaneously, or a mouse and finger contacts are, optionally, used simultaneously.

Figure 5A:
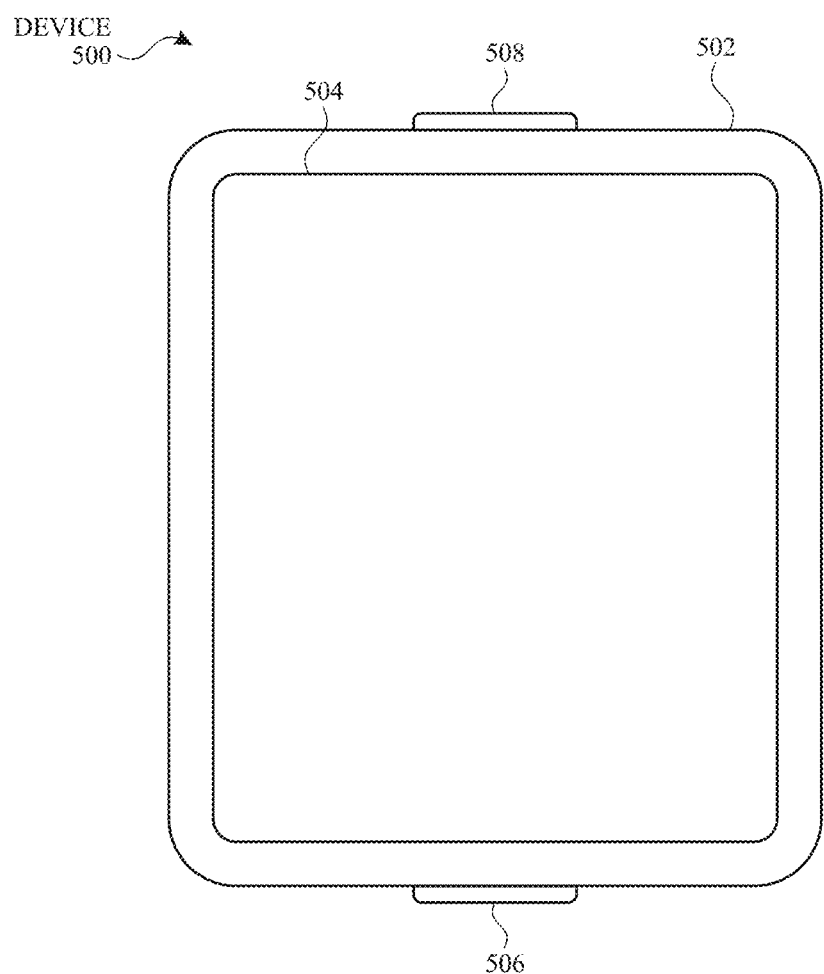
FIG. 5A illustrates a personal electronic device in accordance with some embodiments.

FIG. 5A illustrates exemplary personal electronic device 500. In some embodiments, device 500 can include some or all of the features described with respect to devices 100 and 300 (e.g., FIGS. 1A-4B). Device 500 includes body 502. In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

In some embodiments, device 500 has one or more input mechanisms 506 and 508. Examples of physical input mechanisms include push buttons and rotatable mechanisms. Input mechanisms 506 and 508, if included, can be physical. In some embodiments, device 500 has one or more attachment mechanisms. These attachment mechanisms permit device 500 to be worn by a user. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth.

Figure 5B:
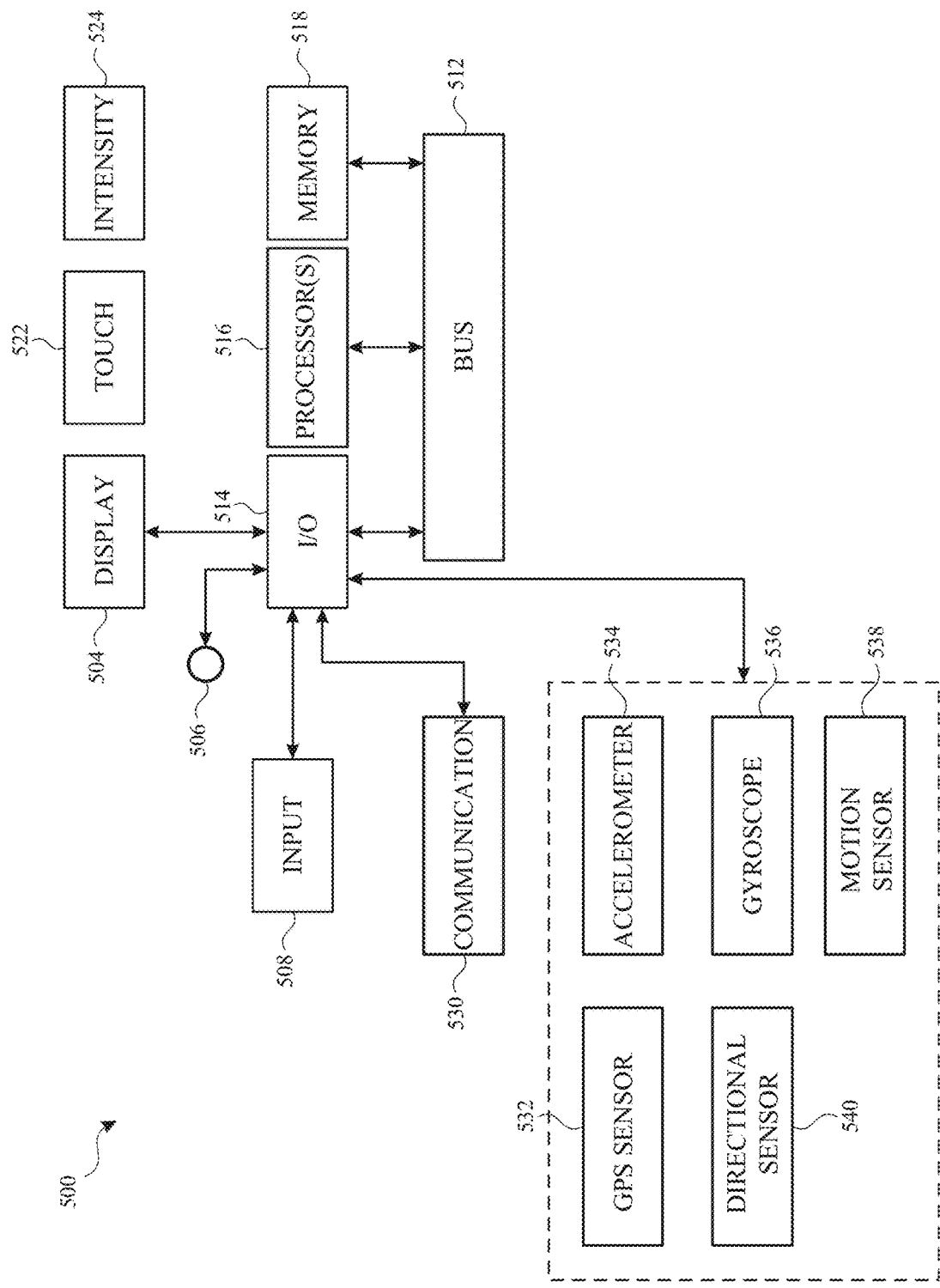
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 can include input mechanisms 506 and/or 508. Input mechanism 506 is, optionally, a rotatable input device or a depressible and rotatable input device, for example. Input mechanism 508 is, optionally, a button, in some examples. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques.

Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514. Input mechanism 508 is, optionally, a microphone, in some examples.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300 and 1500 (FIGS. 7, 9, 11, 13 and 15). In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. A computer-readable storage medium can be any medium that can tangibly contain or store computer-executable instructions for use by or in connection with the instruction execution system, apparatus, or device. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, a button, an image (e.g., icon), and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). In some embodiments, the characteristic intensity is based on multiple intensity samples. A characteristic intensity of a contact is, optionally, based on one or more of: a maximum value of the intensities of the contact, an average value of the intensities of the contact, a mean value of the intensities of the contact, a top 10 percentile value of the intensities of the contact, a value at the half maximum of the intensities of the contact, a value at the 90 percent maximum of the intensities of the contact, or the like. In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, the duration of the contact is used in determining the characteristic intensity (e.g., when the characteristic intensity is an average of the intensity of the contact over time). In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
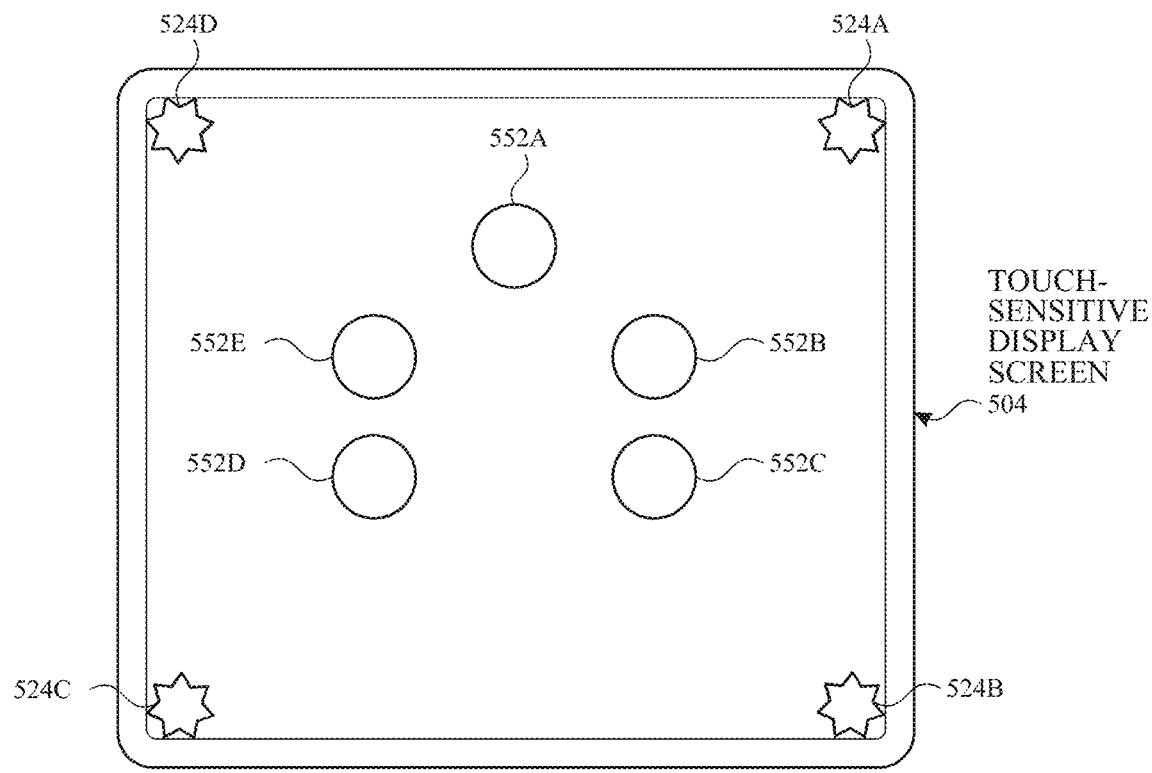
FIGS. 5C-5D illustrate exemplary components of a personal electronic device having a touch-sensitive display and intensity sensors in accordance with some embodiments.
Figure 5C:
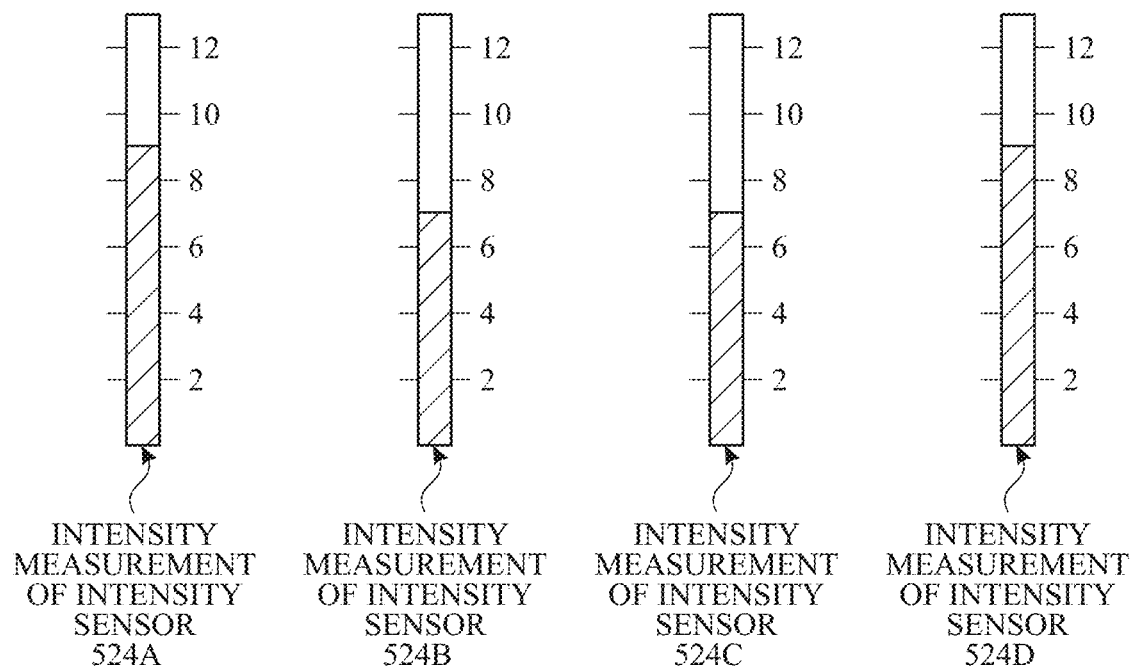
Figure 5D:
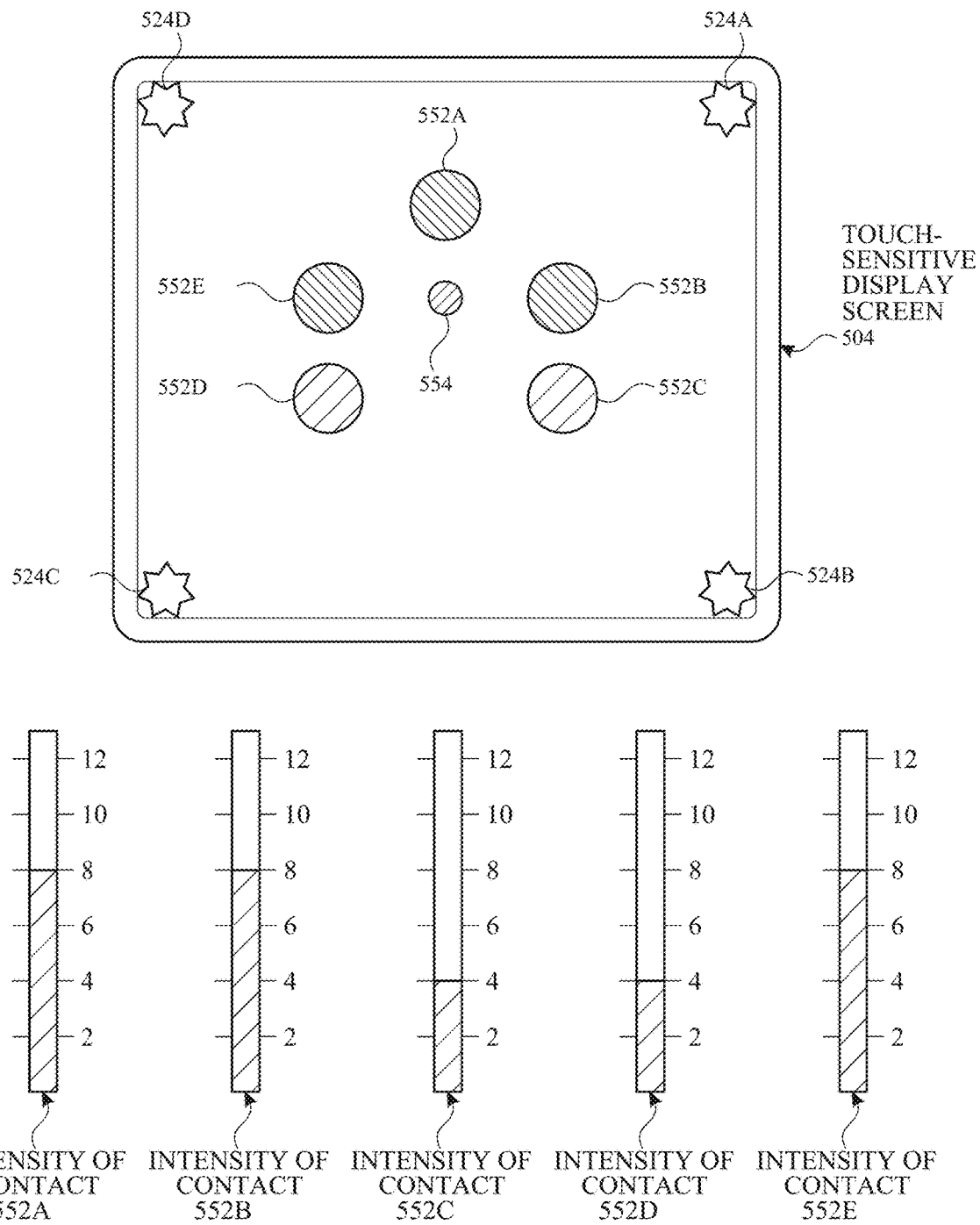

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. More generally, in some implementations, each contact j is assigned a respective intensity $I_j$ that is a portion of the aggregate intensity, A, in accordance with a predefined mathematical function, $I_j=A\cdot(D_j/\Sigma D_i)$, where $D_j$ is the distance of the respective contact j to the center of force, and $\Sigma D_i$ is the sum of the distances of all the respective contacts (e.g., i=1 to last) to the center of force. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. The operations described with reference to FIGS. 5C-5D can be performed using an electronic device similar or identical to device 100, 300, or 500. In some embodiments, the intensity sensors are used to determine a single characteristic intensity (e.g., a single characteristic intensity of a single contact). In some embodiments, a characteristic intensity of a contact is based on one or more intensities of the contact. It should be noted that the intensity diagrams are not part of a displayed user interface, but are included in FIGS. 5C-5D to aid the reader.

In some embodiments, a smoothing algorithm is, optionally, applied to the intensities of the swipe contact prior to determining the characteristic intensity of the contact. For example, the smoothing algorithm optionally includes one or more of: a triangular smoothing algorithm, an unweighted sliding-average smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity. In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location).

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the deep press intensity threshold corresponds to an intensity at which the device will perform operations that are different from operations typically associated with clicking a button of a physical mouse or a trackpad. In some embodiments, the light press intensity threshold corresponds to an intensity at which the device will perform operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the deep press intensity threshold to an intensity above the deep press intensity threshold is sometimes referred to as a "deep press" input. An increase of characteristic intensity of the contact from an intensity below the light press intensity threshold to an intensity between the light press intensity threshold and the deep press intensity threshold is sometimes referred to as a "light press" input. A decrease of characteristic intensity of the contact from an intensity above the contact-detection intensity threshold to an intensity below the contact-detection intensity threshold is sometimes referred to as detecting liftoff of the contact from the touch-surface. An increase of characteristic intensity of the contact from an intensity below the contact-detection intensity threshold to an intensity between the contact-detection intensity threshold and the light press intensity threshold is sometimes referred to as detecting the contact on the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input). In some embodiments, the respective operation is performed in response to detecting the increase in intensity of the respective contact above the press-input intensity threshold (e.g., a "down stroke" of the respective press input).

Figure 5E:
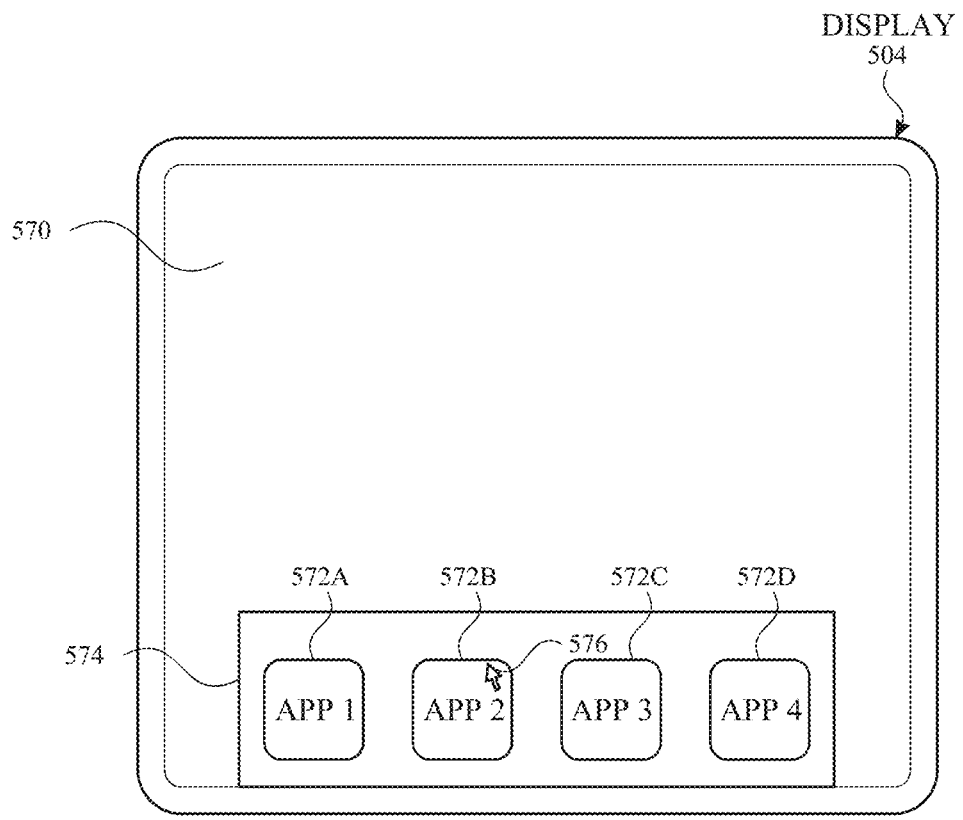
FIGS. 5E-5H illustrate exemplary components and user interfaces of a personal electronic device in accordance with some embodiments.
Figure 5E:
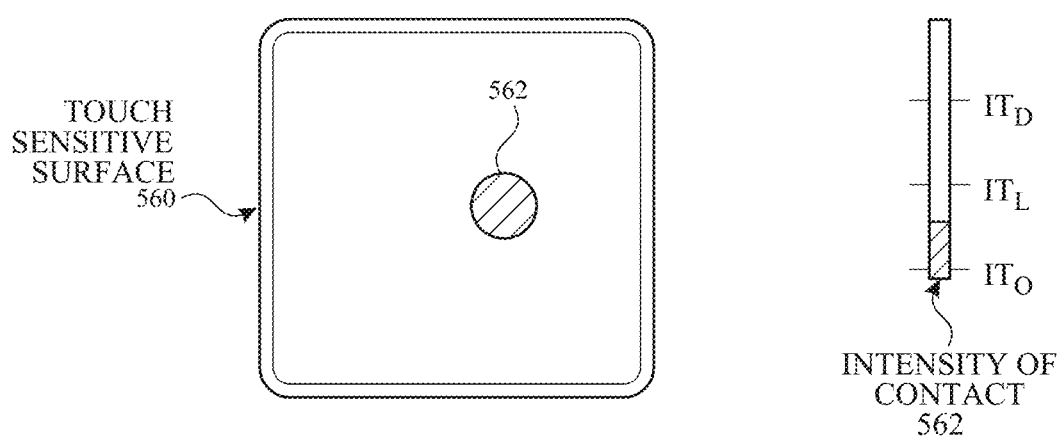
Figure 5F:
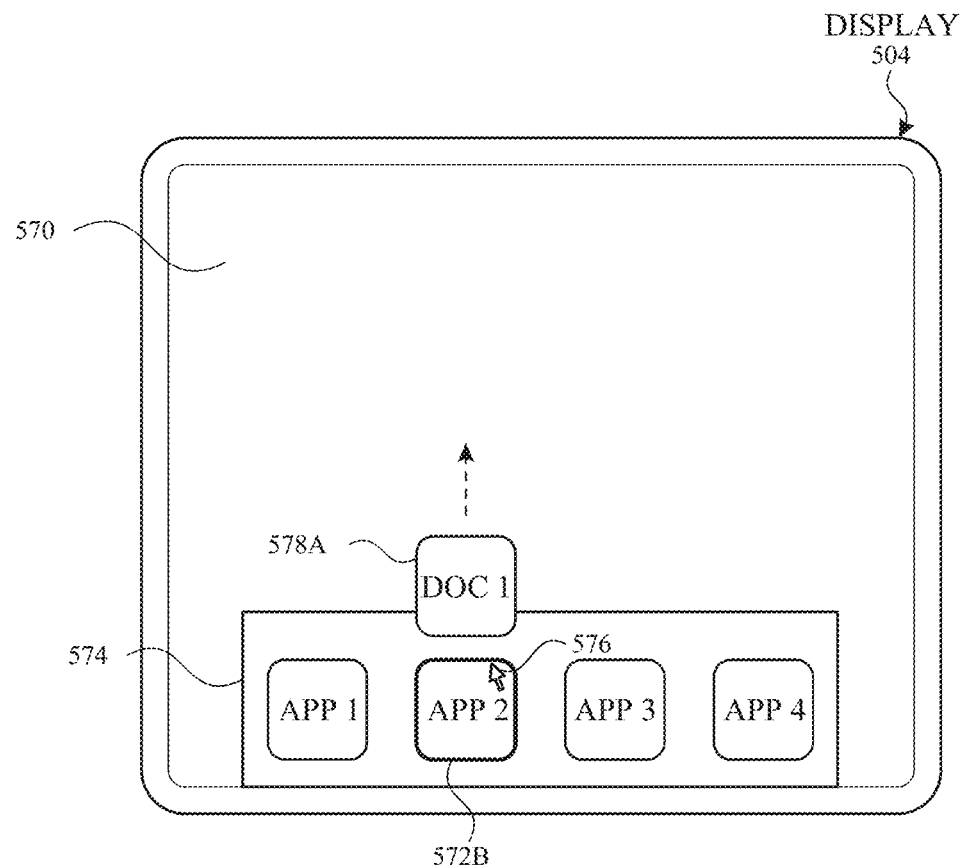
Figure 5F:
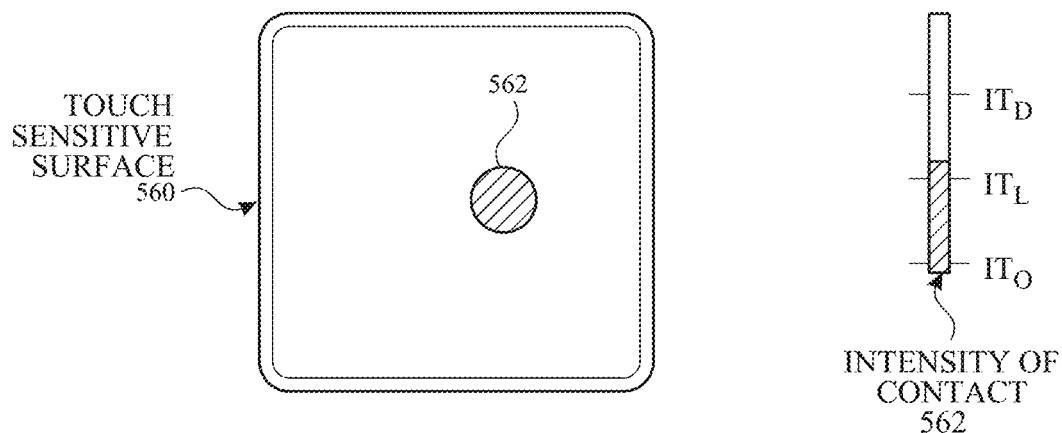
Figure 5G:
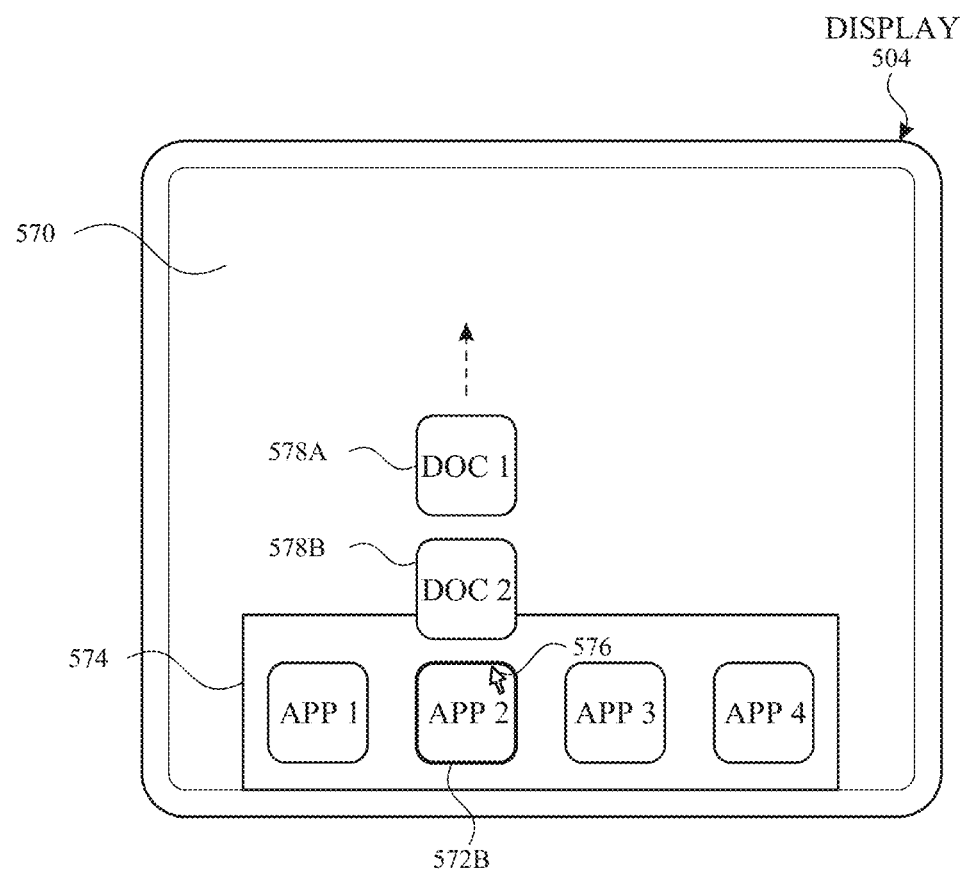
Figure 5G:
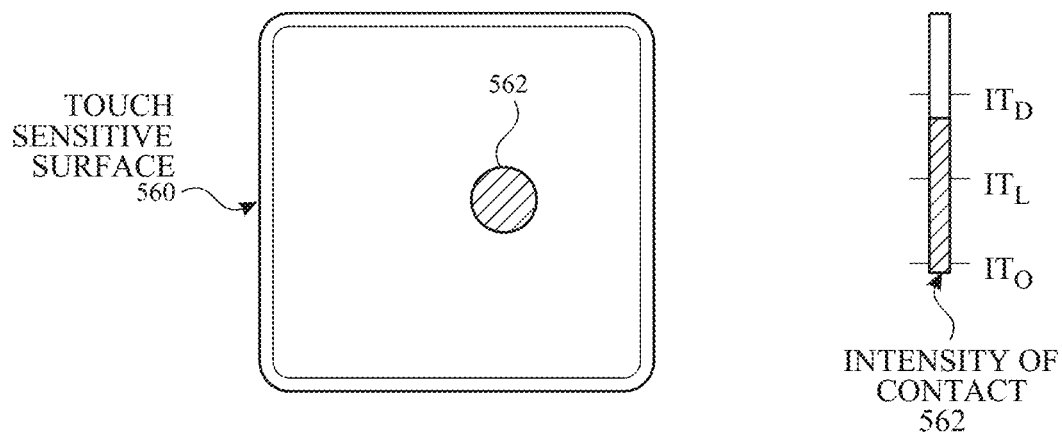
Figure 5H:
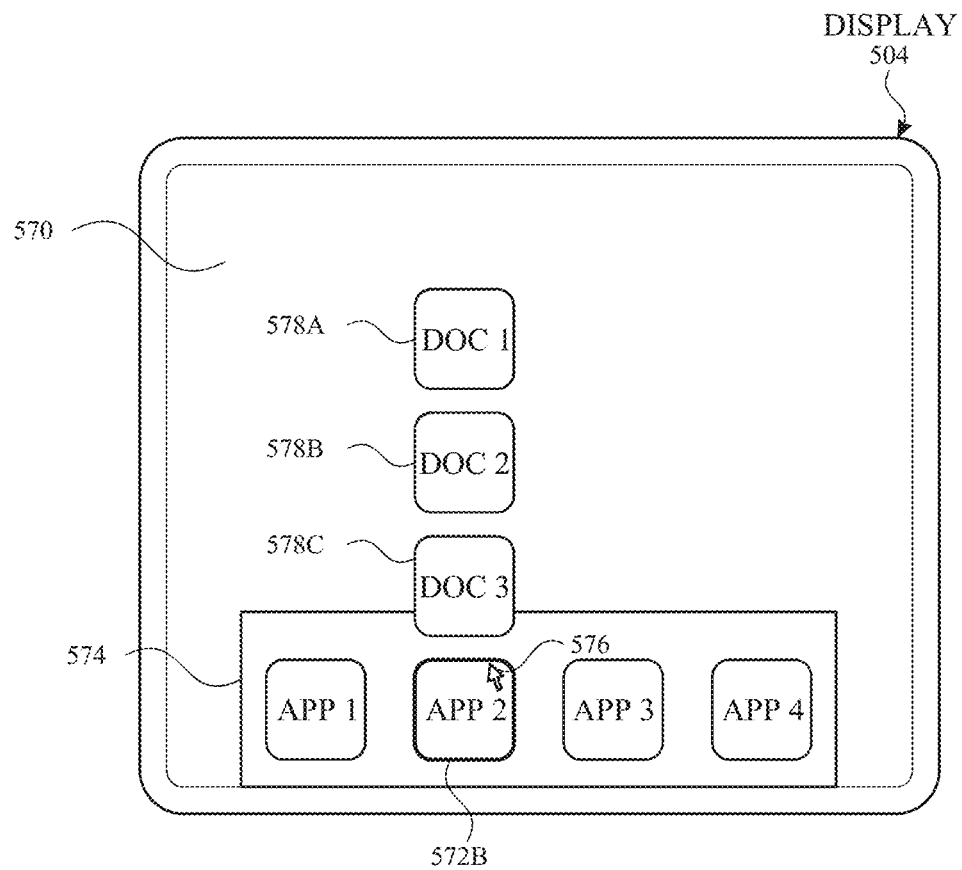
Figure 5H:
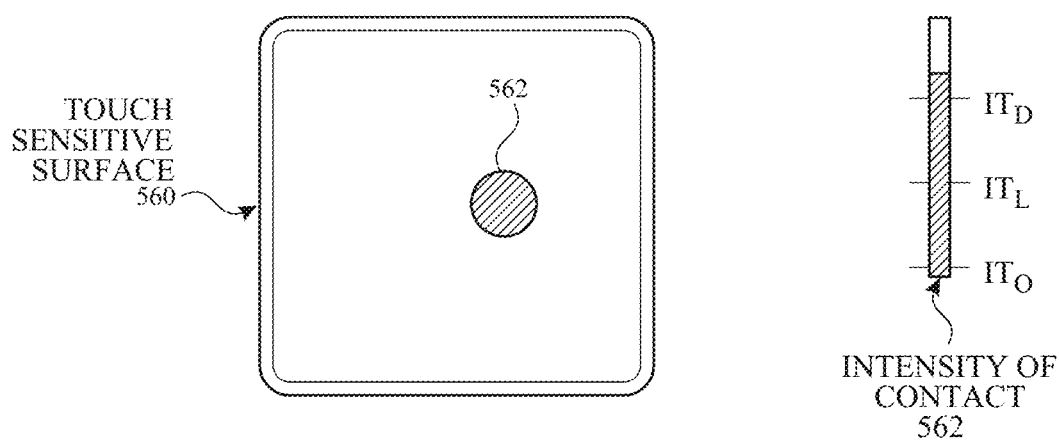

FIGS. 5E-5H illustrate detection of a gesture that includes a press input that corresponds to an increase in intensity of a contact 562 from an intensity below a light press intensity threshold (e.g., "IT$_L$") in FIG. 5E, to an intensity above a deep press intensity threshold (e.g., "IT$_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. Contact 562 is maintained on touch-sensitive surface 560. The device determines that the intensity of contact 562 peaked above the deep press intensity threshold (e.g., "IT$_D$"). In some embodiments, the intensity, which is compared to the one or more intensity thresholds, is the characteristic intensity of a contact. In response to the detection of the gesture, and in accordance with contact 562 having an intensity that goes above the deep press intensity threshold (e.g., "IT$_D$") during the gesture, reduced-scale representations 578A-578C (e.g., thumbnails) of recently opened documents for App 2 are displayed, as shown in FIGS. 5F-5H. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. Representations 578A-578C form an array above icon 572B. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT$_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). In some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances). In some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input).

For ease of explanation, the descriptions of operations performed in response to a press input associated with a press-input intensity threshold or in response to a gesture including the press input are, optionally, triggered in response to detecting either: an increase in intensity of a contact from an intensity below the hysteresis intensity threshold to an intensity above the press-input intensity threshold, an increase in intensity of a contact above the press-input intensity threshold, a decrease in intensity of the contact below the hysteresis intensity threshold corresponding to the press-input intensity threshold, and/or a decrease in intensity of the contact below the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

In some embodiments, a downloaded application becomes an installed application by way of an installation program that extracts program portions from a downloaded package and integrates the extracted portions with the operating system of the computer system. As used herein, an "installed application" refers to a software application that has been downloaded onto an electronic device (e.g., devices 100, 300, and/or 500) and is ready to be launched (e.g., become opened) on the device.

As used herein, the terms "executing application" or "open application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a suspended or hibernated application, which is not running, but has state information that is stored in memory (volatile and non-volatile, respectively) and that can be used to resume execution of the application; and a background application (or background processes), which is not currently displayed, but one or more processes for the application are being processed by one or more processors.

Generally, opening a second application while in a first application does not close the first application. When the second application is displayed and the first application ceases to be displayed, the first application becomes a background application. As used herein, the term "closed application" refers to software applications without retained state information (e.g., state information for closed applications is not stored in a memory of the device). Accordingly, closing an application includes stopping and/or removing application processes for the application and removing state information for the application from the memory of the device.

Attention is now directed towards embodiments of user interfaces ("UI") and associated processes that are implemented on an electronic device, such as portable multifunction device 100, device 300, or device 500.

User Interfaces and Associated Processes

Naming a Remote Locator Object

Users interact with electronic devices in many different manners. In some embodiments, an electronic device is able to track the location of an object such as a remote locator object. In some embodiments, the remote locator object, which supports location tracking functions, can be given a user-selected identifier (e.g., user-selected name). The embodiments described below provide ways in which an electronic device provides user interfaces for defining the identifier for a remote locator object, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figures 6C, 6D:
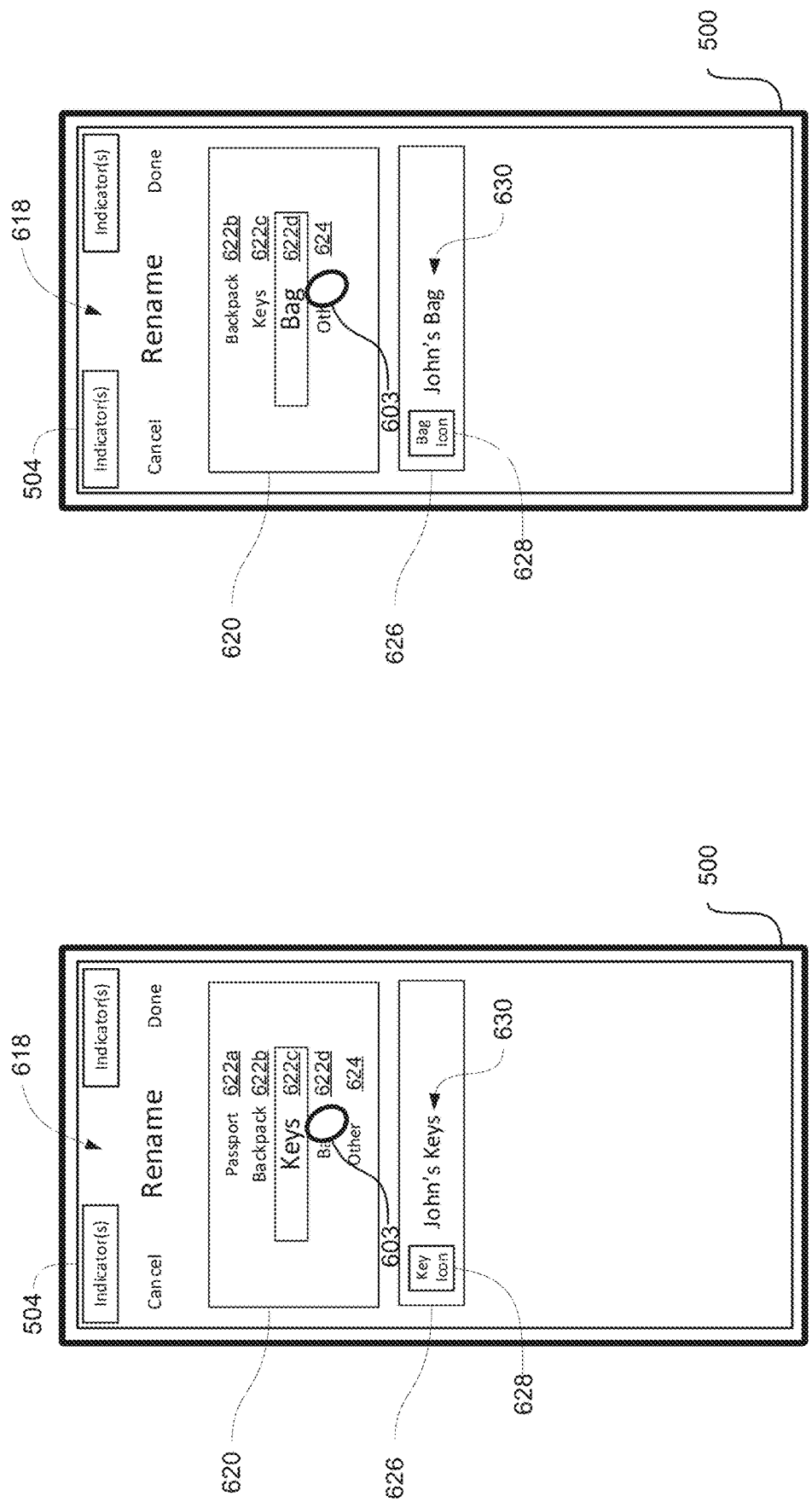
FIGS. 6A-6R illustrate exemplary ways in which an electronic device provides user interfaces for defining identifiers for remote locator objects in accordance with some embodiments of the disclosure.
Figure 6F:
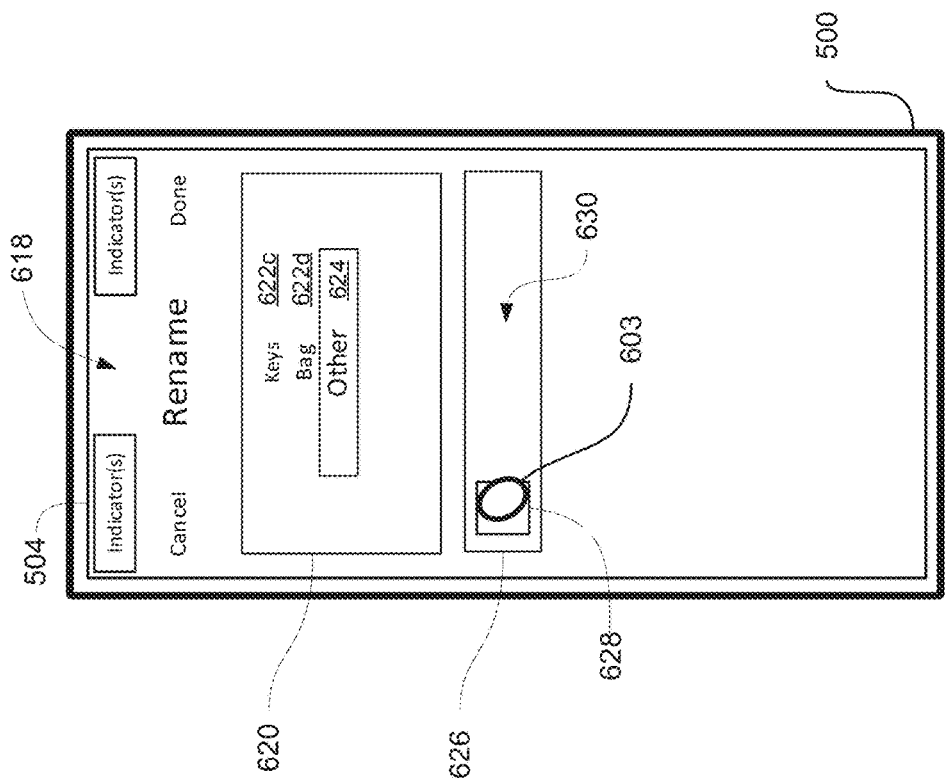
Figure 6E:
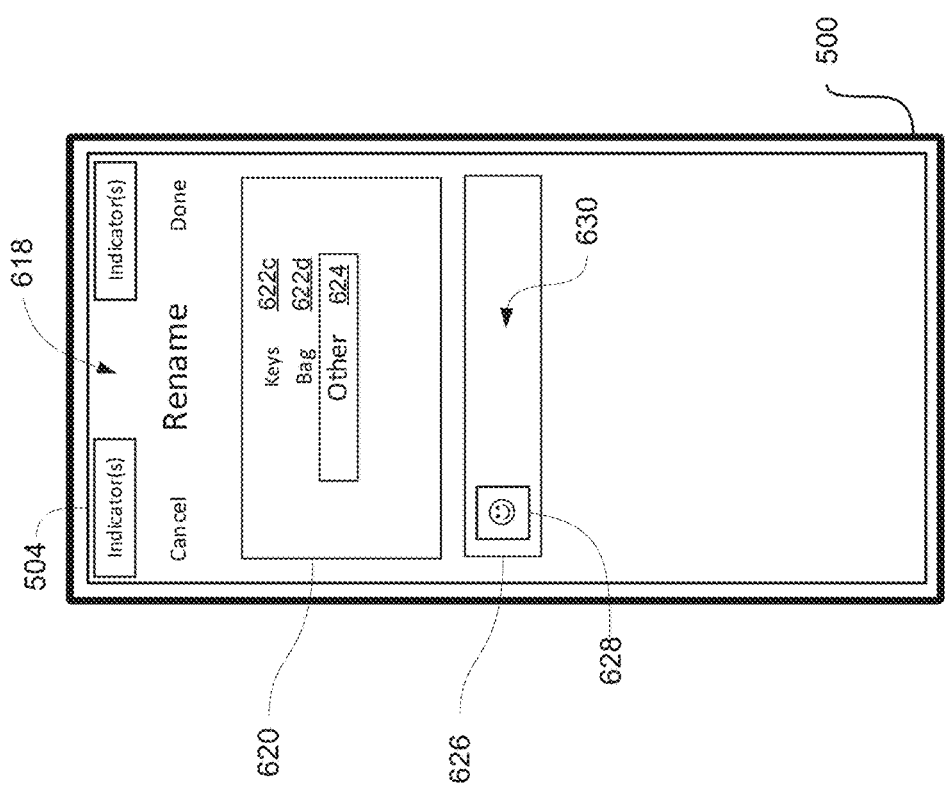
Figure 6N:
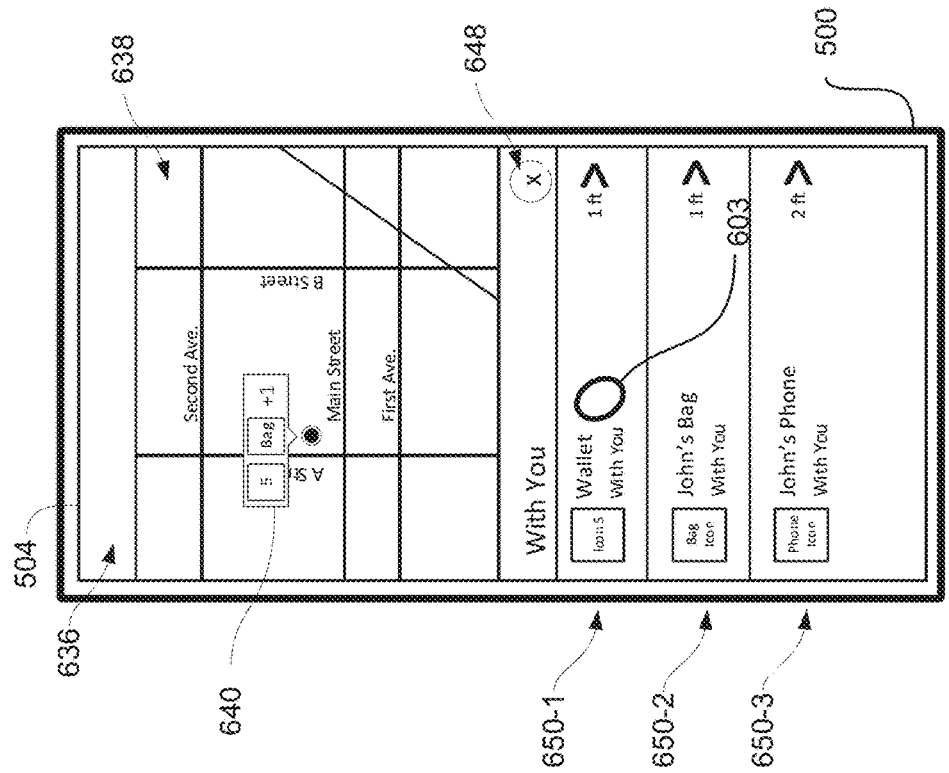
Figure 6M:
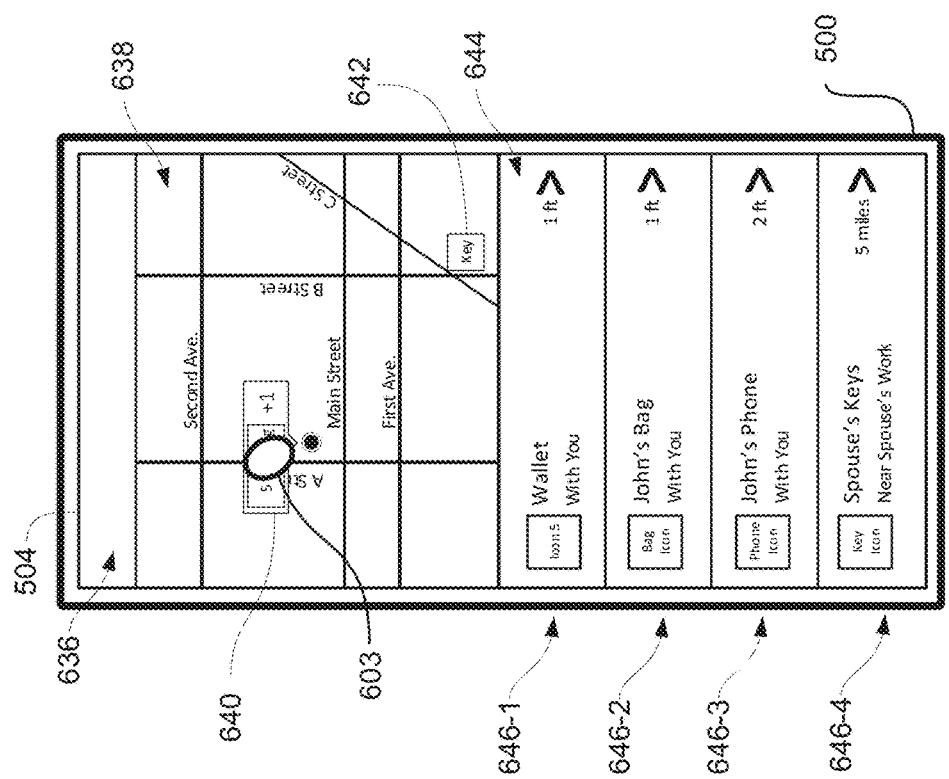
Figures 6Q, 6R:
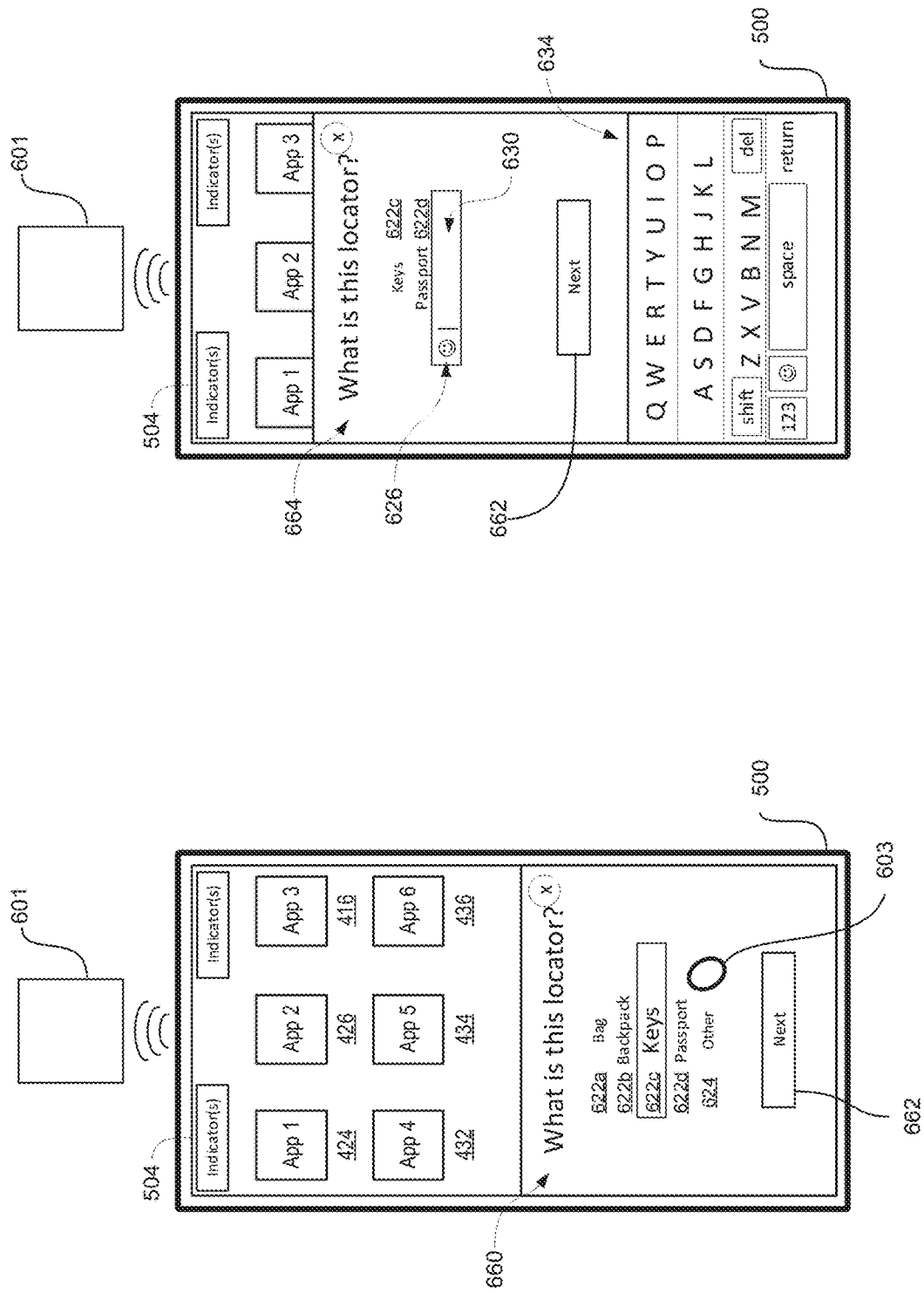
Figure 7B:
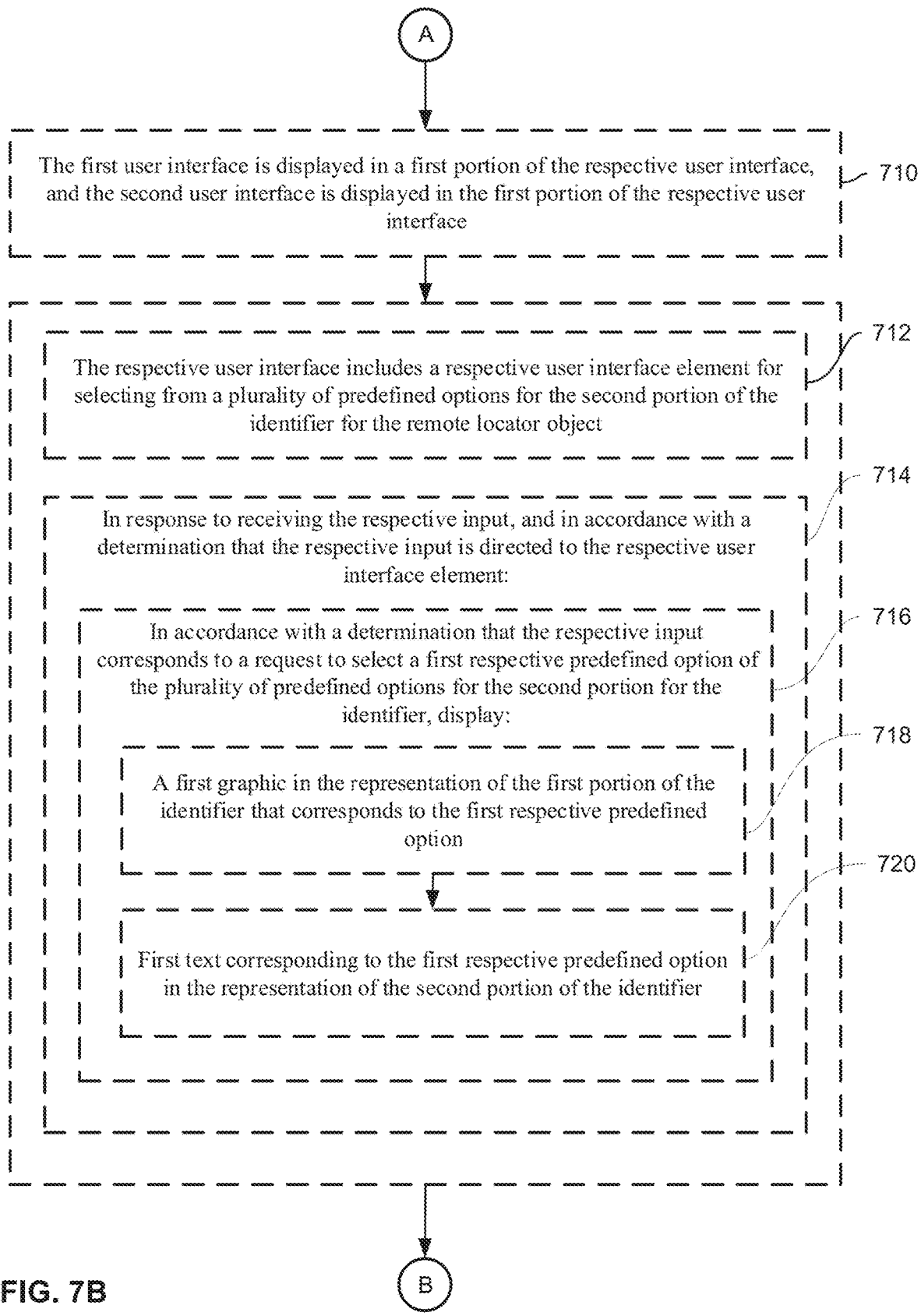
Figure 7C:
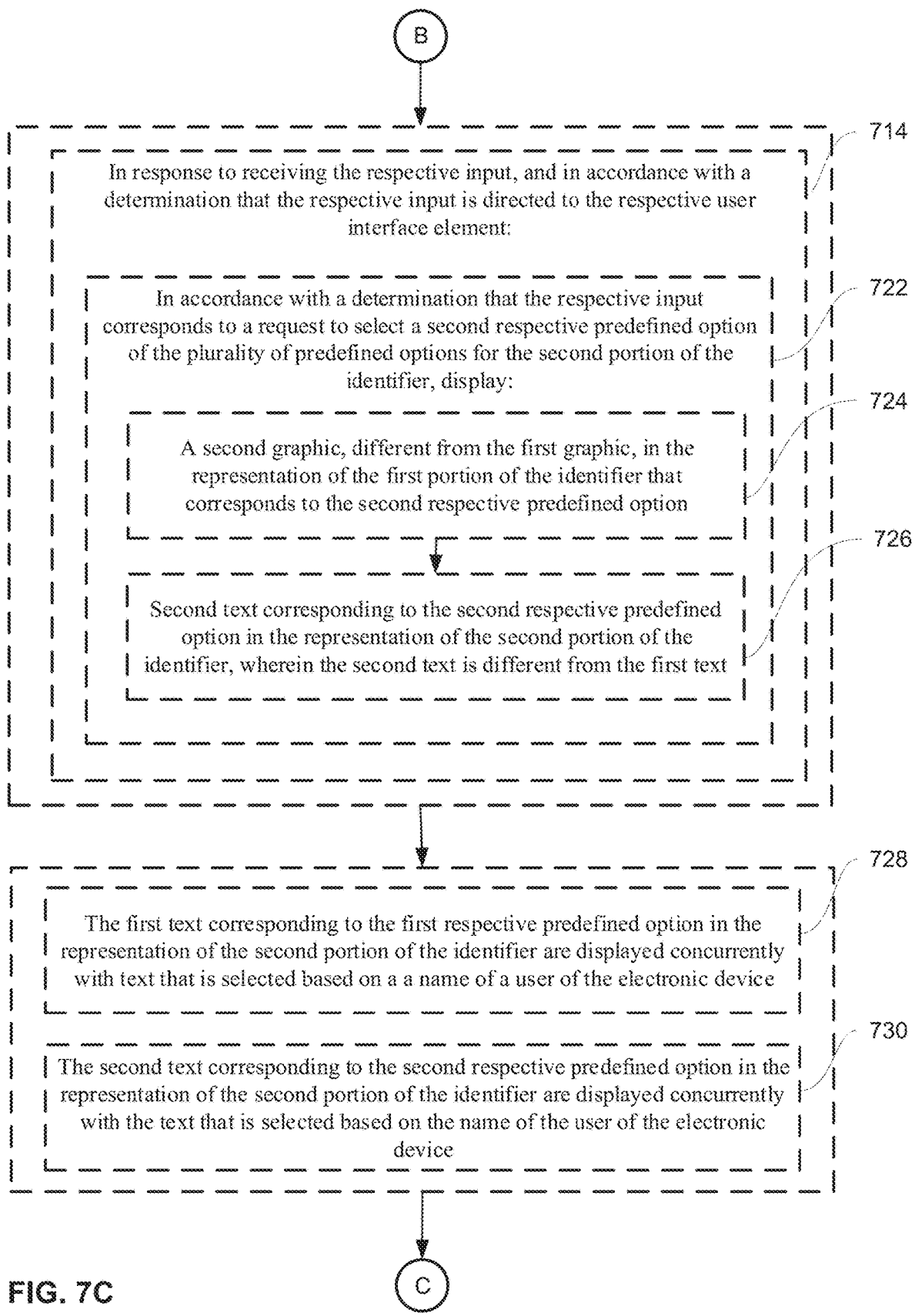
Figure 7D:
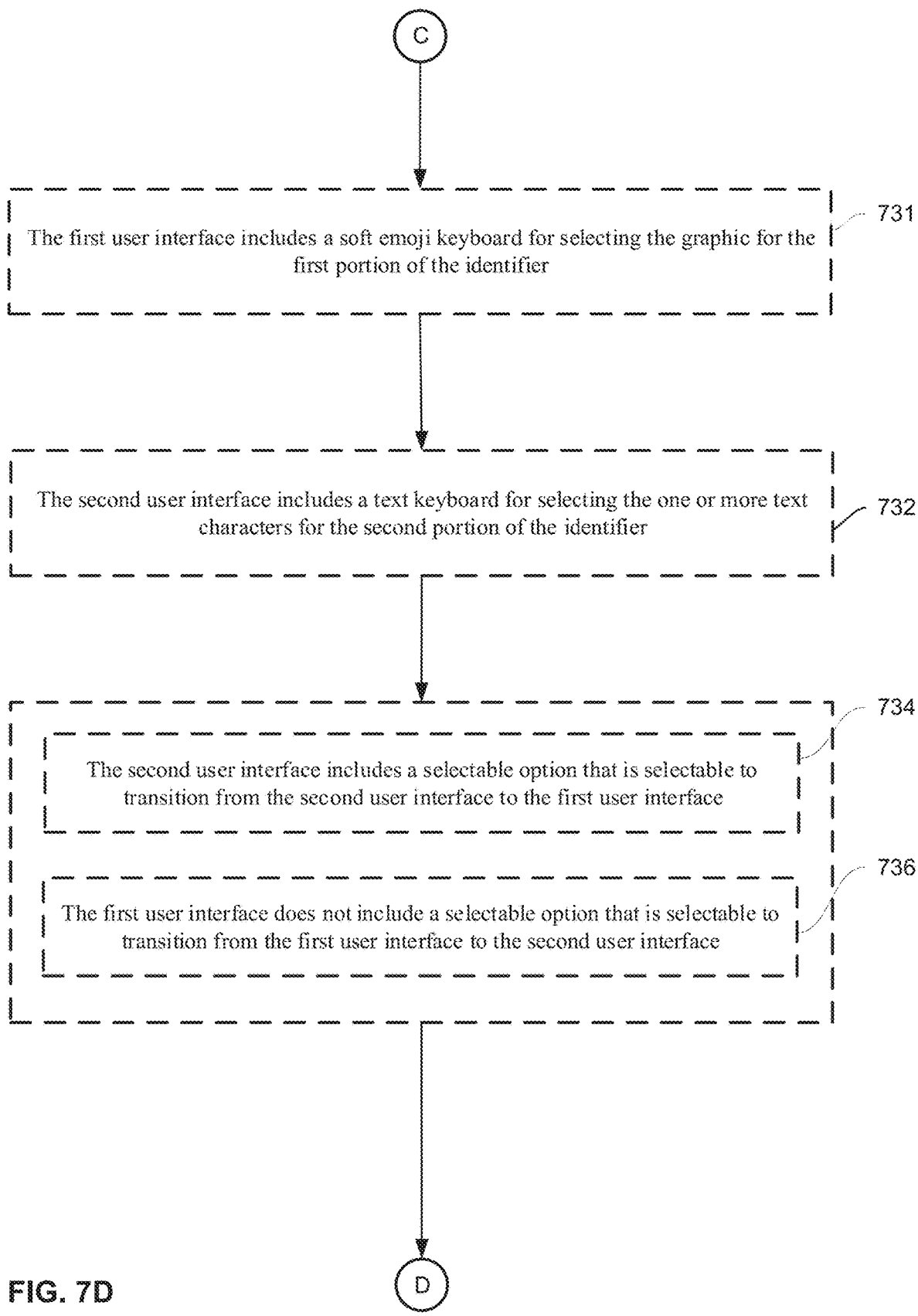
Figure 7E:
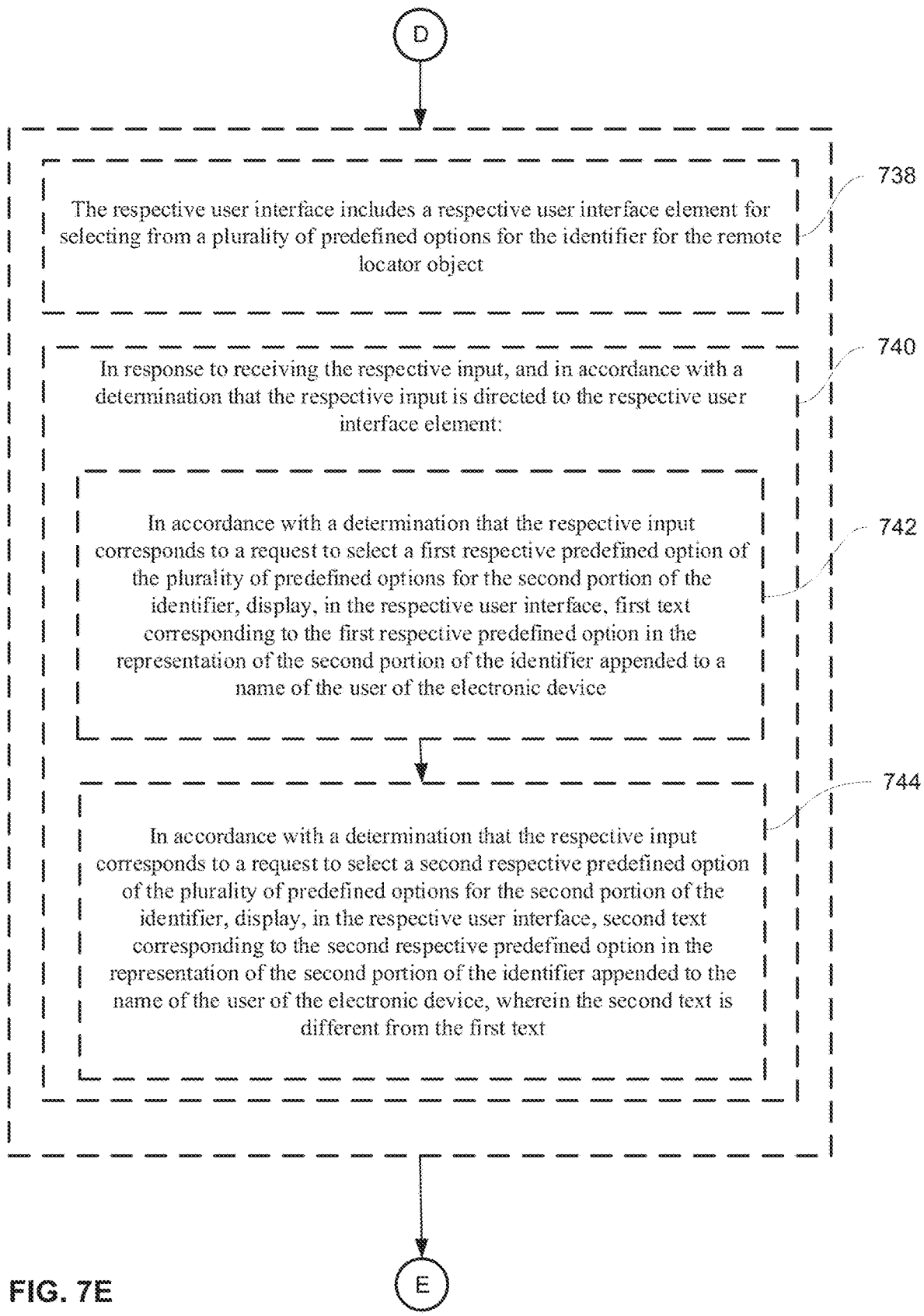
Figure 7F:
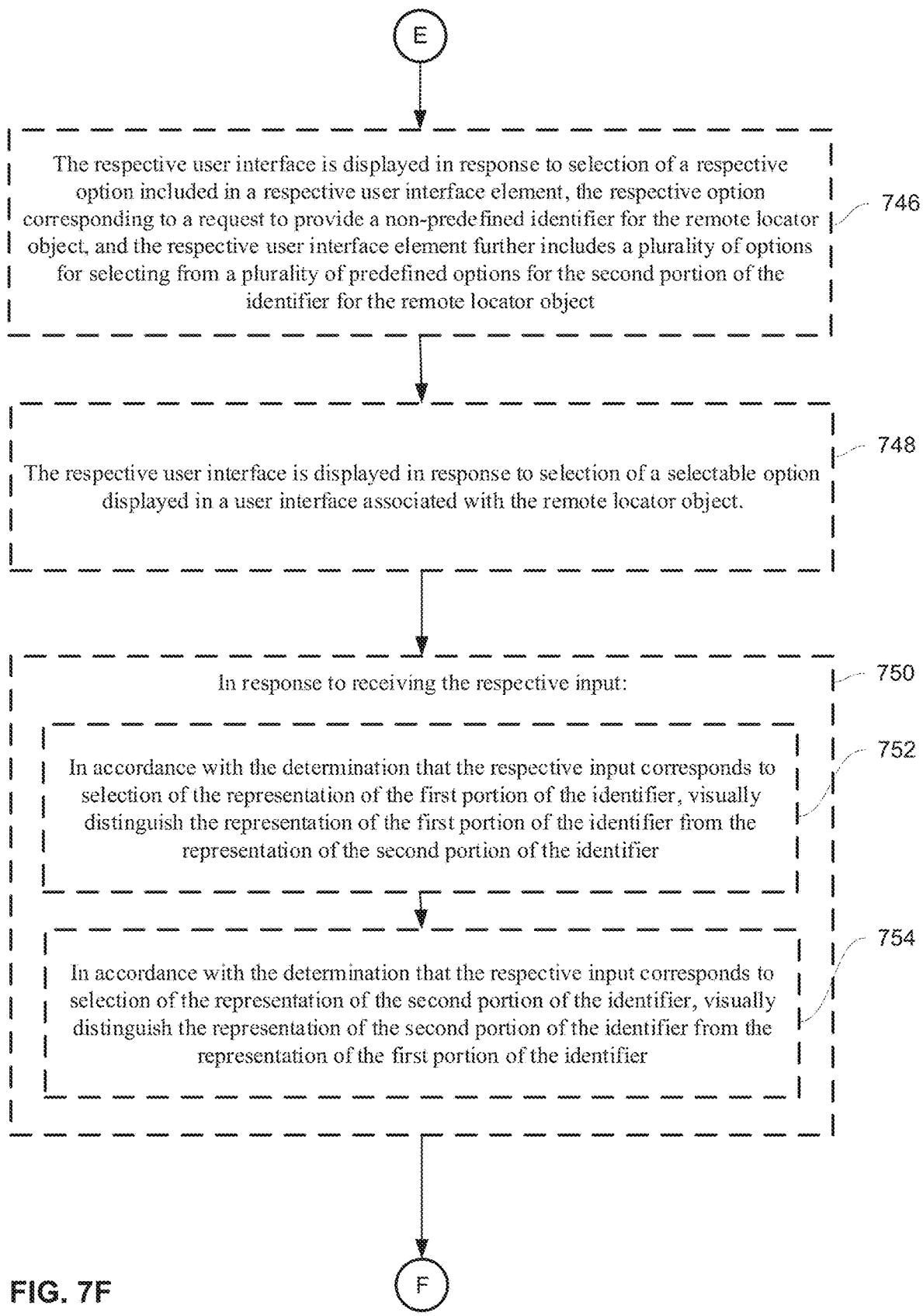
Figure 7H:
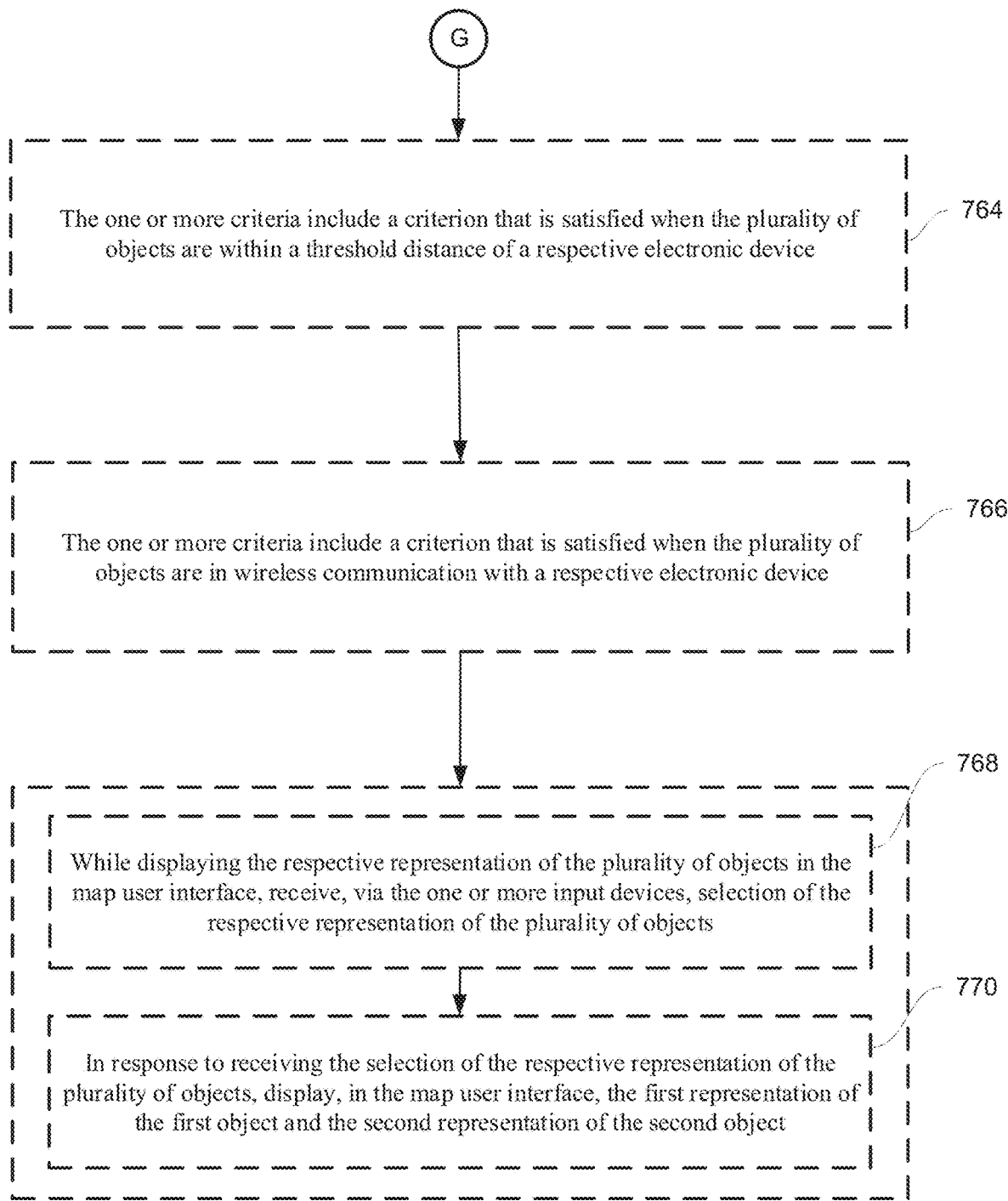

FIGS. 6A-6R illustrate exemplary ways in which an electronic device 500 provides user interfaces for defining identifiers for remote locator objects in accordance with some embodiments of the disclosure. The embodiments in these figures are used to illustrate the processes described below, including the processes described with reference to FIGS. 7A-7H.

FIG. 6A illustrates electronic device 500 displaying user interface 600 (e.g., via a display device, etc.). In some embodiments, user interface 600 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 600 is a user interface associated with a respective remote locator object, optionally for managing and changing one or more settings associated with the respective remote locator object, for viewing information about the respective remote locator object, and/or for locating the respective remote locator object. In FIG. 6A, user interface 600 is the user interface for a remote locator object referred to as "John's Keys". For example, the respective remote locator object has been named by the user of device 500 as "John's Keys," because, for example, the respective remote locator object is physically attached to John's keys such that the respective remote locator object allows a user (e.g., John) to keep track of the location of John's keys.

In some embodiments, a remote locator object is a device with a battery, one or more wireless antenna and a low power processor that enables the device to function as a special-purpose remote locator object when associated with another physical object (e.g., wallet, purse, backpack, suitcase, car, set of keys, or the like). In some embodiments, the remote locator object is a multi-purpose device with location tracking capabilities such as a smartphone, tablet, computer, or watch. In some embodiments, a remote locator object is capable of transmitting location data to an electronic device (such as device 500). For example, a remote locator object optionally includes a GPS locator. In some embodiments, a remote locator object does not include location tracking capability and relies on other electronic devices (e.g., such as device 500) to receive location data. In some embodiments, a remote locator object is able to wirelessly communicate with other electronic devices, such as electronic device 500 (e.g., over Bluetooth, RF, IR, NFC, etc.).

In some embodiments, user interface 600 includes a representation of identifier 604 and current location 606. In some embodiments, identifier 604 is a user-selected identifier (e.g., name) for the respective remote locator object indicating that user interface 600 is the user interface for John's keys. In some embodiments, current location 606 is the determined current geographic location of John's keys, optionally indicating if the current location is associated a known labeled location, such as "Home", "Work", "You", etc., and/or when the current location was most recently updated (e.g., "Just Now"). For example, in FIG. 6A, current location 606 indicates that John's keys are near a location defined as "Home", that John's keys are with the user (e.g., within a threshold distance, such as within 1 foot, 3 feet, 6 feet, 10 feet, etc., of the user's device, such as device 500), and that the location information was most recently received "Just Now" (e.g., within the past 30 seconds, 1 minute, 3 minutes, 5 minutes, 10 minutes, etc.).

In some embodiments, user interface 600 includes one or more selectable options for performing operations associated with the remote locator object and/or viewing and/or changing one or more settings associated with the remote locator object. In some embodiments, user interface 600 includes additional information associated with the status of the remote locator object In FIG. 6A, user interface 600 includes selectable option 608 which is selectable to initiate a process to find and/or locate the respective remote locator object (e.g., in a manner similar to described below with respect to method 900, selectable option 610 to cause the respective remote locator object to emit an audible sound, notification settings 612 for managing one or more notification settings associated with the remote locator object, sharing settings 614 for managing the settings for sharing the location of the remote locator object with other people (e.g., other users), and selectable option 616 for renaming the remote locator object (e.g., for editing the identifier of the remote locator object).

In FIG. 6A, a user input 603 (e.g., a tap on touch screen 504) is received selecting selectable option 616. In some embodiments, in response to receiving user input 603, device 500 initiates a process to rename the remote locator object, including displaying user interface 618, as shown in FIG. 6B. In some embodiments, user interface 618 includes list 620, which includes one or more predefined options for the identifier, and preview 626, which displays a preview of the currently selected identifier.

In FIG. 6B, list 620 includes predefined options 622a to 622d, which are selectable to select the respective option as the new name of the remote locator object. In some embodiments, list 620 is scrollable to display more predefined options. In some embodiments, predefined options 622a to 622d are predefined textual identifiers. For example, in FIG. 6B, predefined option 622c corresponding to "Keys" is the currently selected option (e.g., as illustrated by the box around predefined option 622c). In some embodiments, the predefined textual identifiers are associated with respective predefined graphical identifiers (e.g., emojis, icons, etc.). For example, a graphical identifier for the textual identifier "keys" is optionally a key emoji or key icon 628. In some embodiments, list 620 does not include representations of the corresponding graphical identifiers. As will be discussed in further detail below, the graphical identifier and textual identifiers are optionally used to refer to the remote locator object and in certain situations, the graphical identifier is used to refer to the remote locator object while in other situations, the textual identifier is used to refer to the remote locator object (optionally in some situations, both identifiers are used in combination to refer to the remote locator object). In some embodiments, list 620 includes custom option 624, which is not associated with a predefined textual identifier and is selectable to allow the user to provide a custom name for the remote locator object, as will be described in further detail below with respect to FIGS. 6D-6K.

In some embodiments, preview 626 includes a preview of the identifier for the remote locator object based on the currently selected option from list 620. For example, in FIG. 6B, preview 626 includes icon 628 and text field 630 corresponding to the graphical identifier and the textual identifier, respectively, for the remote locator object. In some embodiments, because predefined option 622c corresponding to the "Key" option is currently selected, icon 628 corresponds to the graphical representation of "Keys" (e.g., a key image) and text field 630 reads "John's Keys". As shown in FIG. 6B, the name of the owner of the remote locator object (e.g., "John") is optionally prepended to the selected predefined option (e.g., "Keys"). In some embodiments, the owner of a remote locator object is the user whose electronic device (e.g., device 500) is paired with the remote locator object and/or the user that initialized the remote locator object and has been associated with the remote locator object as the owner and who optionally is authorized to change one or more settings of the remote locator object. In some embodiments, icon 628 includes a representation of the corresponding graphical identifier associated with the selected predefined textual identifier. For example, in FIG. 6B, icon 628 includes a representation of a key emoji.

In FIG. 6C, while displaying user interface 618, a user input 603 is received selecting predefined option 622d corresponding to the "Bag" textual identifier. In some embodiments, in response to receiving user input 603 selecting predefined option 622d, list 620 is updated to indicate that predefined option 622d is the currently selected option and preview 626 is updated to reflect the updated selection, as shown in FIG. 6D. In FIG. 6D, the items in list 620 are scrolled upwards such that predefined option 622d is centered in list 620 (e.g., and optionally displayed with a selection and/or focus indicator), and preview 626 is updated such that icon 628 includes a representation of a bag icon (e.g., or bag emoji, which is a predefined graphical identifier associated with the "Bag" predefined textual identifier), and text field 630 is updated to display the name of the owner of the device prepended to "Bag" (e.g., the textual identifier associated with selectable option 622d). Thus, as shown in FIG. 6D, selecting a predefined option from list 620 causes a selection of both a graphical identifier and a textual identifier as the identifier for the remote locator object, which optionally causes preview 626 to update both the preview of the graphical identifier (e.g., icon 628) to reflect the predefined graphical identifier associated with the selected predefined textual identifier and the preview of the textual identifier (e.g., text field 630) to reflect the selected predefined textual identifier.

In FIG. 6D, a user input 603 is received selecting custom option 624 from list 620. In some embodiments, in response to receiving user input 603 selecting custom option 624, device 500 updates preview 626 such that icon 628 includes a generic or blank emoji icon (e.g., not associated with a predefined option) indicating that a graphical identifier has not been selected and text field 630 is blank (optionally text 630 includes textual instructions indicating that a custom name should be provided), as shown in FIG. 6E.

In FIG. 6F, a user input 603 is received selecting icon 628. In some embodiments, the user input 603 selecting icon 628 is interpreted as a request to provide a custom graphical icon as the graphical identifier for the remote locator object. In some embodiments, in response to receiving user input 603, device 500 displays an emoji keyboard 632 for selecting an emoji as the graphical identifier for the remote locator object, as shown in FIG. 6G. As shown in FIG. 6G, emoji keyboard 632 is displayed at or near the bottom of user interface 618 (e.g., below preview 626 and list 620). In some embodiments, emoji keyboard 632 includes a plurality of emojis (e.g., graphical representations, icons, etc.) from which a graphical identifier is selected. In some embodiments, emoji keyboard 632 does not include an option for causing display of a text keyboard, as will be described in further detail below. In some embodiments, in response to receiving user input 603 in FIG. 6F, device 500 highlights or otherwise visually distinguishes icon 628 to indicate that icon 628 has the current focus and that the graphical identifier for the remote locator object is being currently edited and/or selected (e.g., via emoji keyboard 632), as shown in FIG. 6G.

In some embodiments, selecting a respective emoji from emoji keyboard 632 causes the respective emoji to be selected as the graphical identifier of the remote locator object and to be displayed as icon 628. For example, in FIG. 6G, a user input 603 is received selecting Icon 5 from emoji keyboard 632. In some embodiments, in response to receiving the user input 603 selecting Icon 5, Icon 5 is selected as the graphical identifier for the remote locator object and preview 626 is updated such that icon 628 includes Icon 5. In some embodiments, only one emoji or icon is used as the graphical identifier (e.g., a selection of a second emoji from the emoji keyboard overrides the previous selection).

In FIG. 6H, a user input 603 is received selecting text field 630 of preview 626. In some embodiments, the user input 603 selecting text field 630 is interpreted as a request to provide a custom name as the textual identifier for the remote locator object. In some embodiments, in response to receiving user input 603, device 500 highlights or otherwise visually distinguishes text field 630 to indicate that text field 630 has the current focus and that the textual identifier for the remote locator object is being currently edited and/or selected and displays text keyboard 634 in user interface 618, as shown in FIG. 6I. As shown in FIG. 6I, text keyboard 634 is displayed at or near the bottom of user interface 618 (e.g., at or near the same location in user interface 618 that emoji keyboard 632 was displayed). In some embodiments, text keyboard 634 replaces emoji keyboard 632. In some embodiments, text keyboard 634 is a soft (e.g., virtual) keyboard that includes a plurality of key that are selectable to insert the corresponding letter (or number) into text field 630. For example, in FIG. 6J, in response to receiving user inputs selecting letters from text keyboard 634, text field 630 is populated accordingly. As shown in FIG. 6J, when providing a custom textual identifier, the textual identifier is optionally not automatically prepended with the name of the owner of the remote locator object (e.g., optionally the owner is the user of device 500). In some embodiments, instead, the textual identifier is the custom textual identifier, without the name of the owner. In some embodiments, a user is able to manually enter the name of the owner (e.g., via text keyboard 634), as desired. In some embodiments, when providing a custom textual identifier, the textual identifier is automatically prepended with the name of the owner of the remote locator object (e.g., in a manner similar to predefined names, described above).

In some embodiments, text keyboard 634 includes a selectable option that is selectable to cause display of emoji keyboard 632. For example, in FIG. 6J, a user input 603 is received selecting an emoji button on text keyboard 634. In some embodiments, in response to receiving the user input 603 selecting the emoji button, device 500 replaces display of text keyboard 634 with emoji keyboard 632, as shown in FIG. 6K. In some embodiments, in response to the display of emoji keyboard 632, the focus moves from text field 630 in preview 626 to icon 628 in preview 626 such that selection of an emoji from emoji keyboard 632 causes the selected emoji to be selected as the graphical identifier for the remote locator object (e.g., similarly to as described above with respect to FIGS. 6G-6H). Thus, while editing the textual identifier for the remote locator object, the user is optionally able to switch to editing the graphical identifier by selecting a respective option on the text keyboard, but while editing the graphical identifier, the user is optionally not able to switch to editing the textual identifier via an option on the emoji keyboard. In some embodiments, a user is able to switch from editing the textual identifier to editing the graphical identifier or vice versa by selecting the respective field in preview 626 (e.g., selecting icon 628 to edit the graphical identifier and selecting text field 630 to edit the textual identifier). In some embodiments, text cannot be used for the graphical identifier and an emoji cannot be used for the textual identifier.

It is understood that the above-described method of providing a custom graphical identifier and textual identifier for a remote locator object can be applied to editing a predefined identifier for the remote locator object. For example, after selecting a predefined identifier from list 620 (e.g., such as selecting "Bag" in FIG. 6C), a user is optionally able to select icon 628 and/or text field 630 to cause display of the emoji keyboard or text keyboard, respectively, to edit or otherwise modify the predefined identifier (e.g., optionally without causing the owner's name from being removed from the textual identifier).

FIGS. 6L-6N illustrate an embodiment in which remote locator objects are referred to by their graphical identifier and/or textual identifier, including grouping a plurality of remote locator objects. In FIG. 6L, device 500 is displaying user interface 636 corresponding to a user interface for displaying a plurality of tracked objects. For example, user interface 636 includes a representation 638 of a map that includes one or more representations of tracked objects. In some embodiments, representation 638 of a map includes group 640 and icon 642. In some embodiments, group 640 corresponds to a plurality of tracked objects (e.g., such as a remote locator object) that are paired with device 500, or within a threshold distance from device 500 (e.g., 2 feet, 5 feet, 15 feet, etc.) and icon 642 corresponds to the remote locator object associated with "Spouse's Keys". In some embodiments, a plurality of tracked objects are grouped together if they are within a threshold distance from each other (e.g., 2 feet, 5 feet, 15 feet, etc.), and/or if they are paired to the same electronic device (e.g., optionally the primary device of the owner of the tracked objects, such as the user's phone, the user's computer, etc., not necessarily device 500). In some embodiments, group 640 includes one or more graphical representations of the objects in the group (e.g., icons from the identifiers of the objects), optionally with an indication that additional objects are in the group (e.g., if there are more than a threshold number of objects in the group, such as 2, 3, 6 items, etc.). As will be described in further detail below, a group of tracked objects is optionally able to be expanded to display all objects in the group.

As shown above, the graphical identifier of remote locator objects are used to represent a remote locator object in a representation of a map. For example, icon 642 is the graphical identifier for "Spouse's Keys" and represents the location of the respective remote locator object on the representation of the map. Similarly, "Icon 5" and "Key Icon" in group 640 are the graphical identifiers for "Wallet" and "John's Bag", respectively. Thus, in some embodiments, the graphical identifier for a remote locator object is used to refer to a remote locator object, for example, on graphical user interface elements, such as representation 638 of a map.

In FIG. 6L, user interface 636 includes list 644 that includes an entry for remote locator objects and/or trackable objects for which device 500 receives location information, optionally sorted by distance. For example, in FIG. 6L, list 644 includes entry 646-1 corresponding to a remote locator object associated with the user's wallet, entry 646-2 corresponding to a remote locator object associated with the user's bag, entry 646-3 corresponding to the user's phone, and entry 646-4 corresponding to a remote locator object associated with the user's spouse's keys. In some embodiments, the entries include a graphical and/or textual indicator of the respective remote locator object (e.g., that optionally were selected via a process described above with respect to FIGS. 6A-6K) and/or an indication of the distance of the object from the user. For example, entry 646-1 includes a graphic corresponding to the graphical identifier for the respective remote locator object (e.g., "Icon 5"), a textual description (e.g., "Wallet"), and an indication that the respective remote locator object is with the user and determined to be 1 foot away. As shown in FIG. 6L, entry 646-1 corresponding to the remote locator object associated with the user's wallet does not include an indication of the user's name (e.g., does not include the label "John's). In some embodiments, entry 646-1 does not include an indication of the user's name because the remote locator object is identified using a custom name, in a process similar to described above with respect to FIGS. 6D-6K). In some embodiments, the entries are selectable to display a user interface associated with the respective remote locator object, as will be described in further detail below with respect to FIGS. 6N-6O.

In FIG. 6M, a user input 103 is received selecting group 640. In some embodiments, in response to receiving user input 103 selecting group 640, device 500 displays list 648, as shown in FIG. 6N. In some embodiments, list 648 is a listing of the remote locator objects and/or tracked objects that are included in group 640. For example, in FIG. 6N, list 648 includes entry 650-1 corresponding to a remote locator object associated with the user's wallet, entry 650-2 corresponding to a remote locator object associated with the user's bag, and entry 650-3 corresponding to the user's phone, which have been determined to be with the user. In FIG. 6N, list 648 does not include an entry corresponding to a remote locator object associated with spouse's keys (e.g., entry 646-4 from FIG. 6M) because, for example, the respective remote locator object has not been determined to be with the user (e.g., within the threshold distance of the user and/or paired with the user's device). Thus, in response to a user input selecting a group of a plurality of remote locator objects, device 500 updates the user interface to display the remote locator objects in the group and cease displaying the remote locator objects that are not in the group. In some embodiments, the representation 638 of the map no longer includes icon 642 (e.g., the icon indicating the location of the remote locator object associated with spouse's keys) and is optionally shifted such that group 640 is centered in the representation 638 of the map (e.g., optionally representation 638 is zoomed into the location of group 640).

In FIG. 6N, a user input 603 is received selecting entry 650-1 corresponding to a remote locator object associated with the user's wallet. In some embodiments, in response to user input 603, device 500 displays user interface 600 (e.g., similar to user interface 600 illustrated in FIG. 6A), as shown in FIG. 6O. As shown in FIG. 6O, identifier 604 in user interface 600 uses the textual identifier for the remote locator object to refer to the remote locator object (e.g., as opposed to the graphical identifier). Thus, in some embodiments, for example, when the remote locator object is being referred to in a textual context (e.g., as opposed to a graphical context such as a representation of a map), the textual identifier is used to refer to the remote locator object.

FIGS. 6P-6R illustrate an exemplary method of selecting an identifier for a remote locator object that has not before been paired with device 500 and/or is not currently paired with device 500. In FIG. 6P, device 500 detects that remote locator object 601 is within a threshold distance from device 500 (e.g., 1 inch, 2 inches, 5 inches, 1 foot, etc.). In some embodiments, in response to detecting that remote locator object 601 is within the threshold distance from device 500, device 500 pairs with remote locator object 601 or otherwise establishes a wireless communication session with remote locator object 601. In FIG. 6P, remote locator object 601 is in an uninitialized state such that upon pairing with device 500 for the first time, device 500 initiates a process to set up (e.g., initialize) remote locator object 601, including displaying user interface 654. In some embodiments, user interface 654 includes a representation 656 of remote locator object 601 and indicates that a new remote locator object has been detected. In some embodiments, user interface 654 includes selectable option 658 that is selectable to continue the process to set up remote locator object 601.

In FIG. 6Q, after continuing the process to set up remote locator object 601 (e.g., in response to receiving an input selecting selectable option 658 in FIG. 6O), device 500 displays user interface 660 for selecting an identifier for remote locator object 601. In some embodiments, user interface 660 includes one or more predefined options for the identifier of remote locator object 601. In FIG. 6Q, user interface 660 includes predefined options 622a to 622d (e.g., similar to predefined options 622a to 622d described above with respect to FIG. 6B) and custom option 624 (e.g., similar to custom option 624 described above with respect to FIG. 6B). In some embodiments, the list of predefined options is scrollable (e.g., upwards and/or downwards) to display other predefined options. In some embodiments, the predefined options are selectable to select the respective predefined option as the textual identifier for remote locator object 601 (e.g., and optionally also select the corresponding predefined graphical identifier associated with the selected textual identifier for remote locator object 601, similar to as described with reference to FIGS. 6B-6K). In some embodiments, user interface 660 does not include a preview of the selected identifier for remote locator object 601. Thus, in the embodiment illustrated in FIG. 6Q, selecting a predefined option does not cause display of a corresponding predefined graphical identifier in a preview user interface element, but optionally does cause the corresponding predefined graphical identifier to be selected as the graphical identifier for remote locator object 601 (e.g., even though it is not displayed). In some embodiments, user interface 660 includes a preview of the selected identifier, similar to preview 626 described above with respect to FIGS. 6B-6K.

In FIG. 6Q, a user input 603 is received selecting custom option 624 for providing a custom name for remote locator object 601. In some embodiments, in response to receiving user input 603 selecting custom option 624, device 500 displays text keyboard 634, as shown in FIG. 6R. In some embodiments, text keyboard 634 is displayed below user interface 664 and user interface 664 is optionally displaced upwards (e.g., or text keyboard 634 is displayed in the bottom region of user interface 664). In some embodiments, custom option 624 is replaced with a content entry field including icon 626 and text entry field 630. In some embodiments, icon 626 and text entry field 630 share features similar to icon 626 and text entry field 630 described above with respect to FIGS. 6E-6K (e.g., being selectable to display an emoji keyboard or a text keyboard, respectively, etc., for selecting a graphical identifier and/or a textual identifier for remote locator object 601). Details for selecting the graphical identifier and/or textual identifier for remote locator object 601 in user interface 664 are optionally the same as those described with reference to FIGS. 6E-6K.

FIGS. 7A-7H are flow diagrams illustrating a method 700 of providing user interfaces for defining identifiers for remote locator objects in accordance with some embodiments, such as illustrated in FIGS. 6A-6R. The method 700 is optionally performed at an electronic device such as device 100, device 300, device 500 as described above with reference to FIGS. 1A-1B, 2-3, 4A-4B and 5A-5H. Some operations in method 700 are, optionally combined and/or order of some operations is, optionally, changed.

As described below, the method 700 provides ways to define identifiers for remote locator objects. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device in communication with one or more wireless antenna, a display generation component, and one or more input devices (e.g., electronic device 500, a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.), while displaying, via the display generation component, a respective user interface for inputting an identifier for a remote locator object, wherein the respective user interface includes a representation of a first portion of the identifier and a representation of a second portion of the identifier, receives (702), via the one or more input devices, a respective input, such as user input 603 selecting icon 628 or text field 630 in FIGS. 6F and 6H, respectively (e.g., a respective remote locator object is able to be identified by a user-selected identifier (e.g., the name of the remote locator object)).

In some embodiments, the identifier for the respective remote locator object includes a graphic portion and a text portion. In some embodiments, the graphic portion is an icon, picture, symbol, emoji, or any other suitable graphical identifier. In some embodiments, the text portion is a textual description, name, or other suitable textual identifier. For example, if the remote locator object is associated with the user's keys, the user is able to set the graphic portion of the identifier as a key icon or key emoji and the text portion of the identifier as the word "key". In some embodiments, the remote locator object is referred to by either the first portion of the identifier, the second portion of the identifier, or a combination of both the first and second portions of the identifier. For example, when referring to the remote locator object on a representation of a map, the first portion of the identifier is used to identify the remote locator object (e.g., as an emoji, icon, symbol, or graphic), and when referring to the remote locator object on a list of devices, the second portion of the identifier is used to identify the remote locator object. In some embodiments, the user interface for defining, inputting, and/or selecting the identifier for the remote locator object includes a representation of the first portion of the identifier that is interactable to define the graphical identifier and a representation of the second portion of the identifier that is interactable to define the textual identifier. In some embodiments, the representations are two different user interface elements and/or fields. In some embodiments, the representations are two portions of one user interface element and/or field. For example, the user interface includes a "name" field that includes a graphical identifier prepended to a textual identifier. In some embodiments, the respective input is a selection of a respective portion of the identifier, such as a tap input on a touch-sensitive display at a location associated with the respective portion of the identifier.

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, in response to receiving the respective input (704), in accordance with a determination that the respective input corresponds to selection of the representation of the first portion of the identifier, the electronic device displays (706), via the display generation component, a first user interface for selecting a graphic for the first portion of the identifier, such as displaying emoji keyboard 632 in FIG. 6G in response to user input 603 selecting icon 628 in FIG. 6F (e.g., if the user input selected the first portion of the identifier associated with the graphical identifier portion for the remote locator object, then display a user interface for selecting, configuring, and/or defining the graphical identifier for the remote locator object).

For example, the user interface includes an emoji keyboard from which the user is able to select an emoji as the graphical identifier for the remote locator object. In some embodiments, the user interface includes a scrollable list of available options for graphical identifiers. In some embodiments, the user interface includes an interface to search for or upload a graphical image for use as a graphical identifier. In some embodiments, the first user interface is displayed concurrently with the representation of a first portion of the identifier and a representation of a second portion of the identifier. For example, an emoji keyboard is displayed below the representation of the first and second portions of the identifier.

In some embodiments, in accordance with a determination that the respective input corresponds to selection of the representation of the second portion of the identifier, the electronic device displays (708), via the display generation component, a second user interface for selecting one or more text characters (e.g., numbers and/or letters) for the second portion of the identifier, such as displaying text keyboard 634 in FIG. 6I in response to receiving user input 603 selecting text field 630 in FIG. 6H (e.g., if the user input selected the second portion of the identifier that is associated with the textual identifier portion for the remote locator object, then display a second user interface for selecting, configuring, and/or defining the textual identifier for the remote locator object).

For example, the second user interface includes a soft or virtual keyboard from which the user is able to enter a name for the remote locator object. In some embodiments, the second user interface includes an interface to search for or upload a graphical image for use as a graphical identifier. In some embodiments, the second user interface is displayed concurrently with the representation of a first portion of the identifier and a representation of a second portion of the identifier. For example, a soft keyboard (e.g., text keyboard) is displayed below the representation of the first and second portions of the identifier.

The above-described manner of selecting an identifier for a remote locator object (e.g., by displaying a user interface for selecting a graphical identifier in response to a user selection of a representation of the graphical identifier or displaying a user interface for selecting a textual identifier in response to a user selection of a representation of the textual identifier) provides a quick and efficient way of selecting the graphical and textual identifier for the remote locator object (e.g., by providing the user with the option to set a particular portion of the identifier, without setting the other portions of the identifier, without requiring the user to perform additional inputs when setting just one portion of the identifier), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the first user interface is displayed in a first portion of the respective user interface, and the second user interface is displayed in the first portion of the respective user interface (710), such as emoji keyboard 632 in FIG. 6G being displayed in the same portion of the user interface as text keyboard 634 in FIG. 6I (e.g., the first user interface occupies a subset of the respective user interface and is displayed at a particular position in the respective user interface).

For example, the first user interface is an emoji keyboard and is displayed at or near the lower portion of the respective user interface. In some embodiments, the second user interface occupies a subset of the respective user interface (optionally the same amount, less, or more than the first user interface), and is displayed at or near the same portion that is occupied by the first user interface (e.g., the lower portion of the respective user interface). In some embodiments, display of the first and second user interface does not obscure the display of representation of the first and second portions of the identifier (e.g., optionally the representations are moved such that the first and second user interface does not obscure the representations).

The above-described manner of displaying user interfaces for selecting a graphic and text as the identifier for a remote locator object (e.g., at the same portion in the respective user interface) provides a quick and efficient way of selecting the graphical and textual identifier for the remote locator object (e.g., by displaying the respective user interfaces at the same location in the respective user interface), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the respective user interface includes a respective user interface element for selecting from a plurality of predefined options for the second portion of the identifier for the remote locator object (712), such as list 620 including a plurality of predefined options in FIG. 5B (e.g., the respective user interface includes a selectable list, a drop-down menu, or any other element for selecting an option for a plurality of predefined options as the textual identifier for the remote locator object). In some embodiments, the respective user interface element is pre-populated with a plurality of predefined options for naming the remote locator object. In some embodiments, the list includes a plurality of common items that the remote locator object is attached to (e.g., for the purpose of tracking the location of those objects). For example, the list includes keys, bag, backpack, purse, car, suitcase, etc.

In some embodiments, in response to receiving the respective input, and in accordance with a determination that the respective input is directed to the respective user interface element (714), such as user input 603 selecting a predefined option in FIG. 6C (e.g., the respective input corresponds to a selection of an option in the respective user interface element), in accordance with a determination that the respective input corresponds to a request to select a first respective predefined option of the plurality of predefined options for the second portion for the identifier (e.g., the respective input selected a first option from the list of options), the electronic device displays (716) a first graphic in the representation of the first portion of the identifier that corresponds to the first respective predefined option (718), such as displaying a bag emoji in icon 628 in FIG. 6D (e.g., the first respective predefined option is associated with a first respective predefined graphic such that selecting the first respective predefined option for the second portion of the identifier causes the first respective predefined graphic to be selected for the first portion of the identifier (e.g., the graphical identifier for the remote locator object) and first text corresponding to the first respective predefined option in the representation of the second portion of the identifier (720), such as including the text "Bag" in text field 630 in FIG. 6D (e.g., selecting the text associated with the first respective predefined option as the textual identifier (e.g., the second portion of the identifier) for the remote locator object).

For example, selecting the "key" option causes a key emoji to be selected for the first portion of the identifier. Thus, in some embodiments, a first graphic associated with the first option is displayed in the representation of the first portion of the identifier. Thus, the first respective predefined option is optionally displayed in the representation of the second portion of the identifier.

In some embodiments, in accordance with a determination that the respective input corresponds to a request to select a second respective predefined option of the plurality of predefined options for the second portion of the identifier, such as if user input 603 selected a different predefined option in FIG. 6C (e.g., the respective input selected a second option from the list of options), the electronic device displays (722) a second graphic, different from the first graphic, in the representation of the first portion of the identifier that corresponds to the second respective predefined option (724), such as if icon 628 included an emoji associated with the selected predefined option in FIG. 6D (e.g., the second respective predefined option is associated with a second respective predefined graphic such that selecting the second respective predefined option for the second portion of the identifier causes the second respective predefined graphic to be selected for the first portion of the identifier (e.g., the graphical identifier for the remote locator object) and second text corresponding to the second respective predefined option in the representation of the second portion of the identifier, wherein the second text is different from the first text (726), such as if text field 630 included the text associated with the selected predefined option in FIG. 6D (e.g., selecting the text associated with the second respective predefined option as the textual identifier (e.g., the second portion of the identifier) for the remote locator object).

For example, selecting the "bag" option causes a bag emoji to be selected for the first portion of the identifier. Thus, in some embodiments, a second graphic associated with the second option is displayed in the representation of the first portion of the identifier. Thus, the second respective predefined option is optionally displayed in the representation of the second portion of the identifier.

The above-described manner of selecting from a list of predefined identifiers for a remote locator object (e.g., by receiving an input selecting a predefined identifier, and in response, setting the textual identifier as the selected identifier and automatically setting the graphical identifier to a predefined graphic associated with the selected identifier) provides a quick and efficient way of selecting the graphical and textual identifier for the remote locator object (e.g., without requiring the user to perform additional inputs to select from a list of predefined graphical identifiers), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the first text corresponding to the first respective predefined option in the representation of the second portion of the identifier are displayed concurrently with text that is selected based on a name of a user of the electronic device (728), such as "key" being displayed with the owner's name "John" (e.g., optionally in the possessive form) in FIG. 6C (e.g., the text associated with the selected option for the textual identifier is displayed in the representation of the second portion of the identifier appended (e.g., prepended, optionally in possessive form) with the name of owner of the remote locator object). For example, if the user selected the option for "keys", the representation of the second portion of the identifier reads "John's Keys". In some embodiments, the name of the owner of the remote locator object is automatically prepended to the selected options.

In some embodiments, the second text corresponding to the second respective predefined option in the representation of the second portion of the identifier are displayed concurrently with the text that is selected based on the name of the user of the electronic device (730), such as text 630 including the owner's name "John" in FIG. 6C (e.g., the text associated with the selected option for the textual identifier is displayed in the representation of the second portion of the identifier appended (e.g., prepended) with the name of the owner of the remote locator object). For example, if the user selected the option for "bags", the representation of the second portion of the identifier reads "John's Bag". In some embodiments, the name of the owner of the remote locator object is automatically prepended to the selected options.

The above-described manner of setting the identifier for a remote locator object (e.g., by automatically adding the owner of the user's name to the selected textual identifier) provides a quick and efficient way of selecting the graphical and textual identifier for the remote locator object (e.g., without requiring the user to perform additional inputs to add his or her name to the textual identifier), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the first user interface includes a soft emoji keyboard for selecting the graphic for the first portion of the identifier (731), such as emoji keyboard 632 in FIG. 6G (e.g., a soft or virtual keyboard specifically for selecting emojis). In some embodiments, the emoji keyboard includes one or more tabs or pages associated with different categories of emojis, which are selectable to display emojis associated with the selected category. In some embodiments, the emoji keyboard does not include an option to switch to displaying a textual keyboard (e.g., for selecting numbers and/or letters).

The above-described manner of selecting the graphical identifier for a remote locator object (e.g., by displaying an emoji keyboard from which an emoji is able to be selected as the graphical identifier for the remote locator object) provides a quick and efficient way of selecting the graphical and textual identifier for the remote locator object (e.g., without requiring the user to perform additional inputs to cause display of an emoji keyboard), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the second user interface includes a text keyboard for selecting the one or more text characters for the second portion of the identifier (732), such as text keyboard 634 in FIG. 6I (e.g., a soft or virtual keyboard for selecting numbers and/or letters). In some embodiments, the text keyboard includes a plurality of keys that are selectable to insert the selected number and/or letter in the representation of the second portion of the identifier. In some embodiments, the text keyboard includes an option for switching to an emoji keyboard. In some embodiments, in response to a user input selecting the option for switching to an emoji keyboard, the text keyboard is replaced with an emoji keyboard for selecting emojis for the graphical identifier (e.g., the device switches from editing the textual identifier to editing the graphical identifier based on whether the keyboard being displayed is the text keyboard or the emoji keyboard).

The above-described manner of selecting the textual identifier for a remote locator object (e.g., by displaying a text keyboard to insert and/or edit text for the textual identifier for the remote locator object) provides a quick and efficient way of selecting the graphical and textual identifier for the remote locator object (e.g., without requiring the user to perform additional inputs to cause display of a text keyboard), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the second user interface includes a selectable option that is selectable to transition from the second user interface to the first user interface (734), such as text keyboard 634 including an emoji button that is selectable to switch to displaying an emoji keyboard as in FIGS. 6J-6K (e.g., the text keyboard includes an option for switching to an emoji keyboard, which optionally causes the device to switch from editing the textual identifier to editing the graphical identifier).

In some embodiments, the first user interface does not include a selectable option that is selectable to transition from the first user interface to the second user interface (736), such as in FIGS. 6J-6K (e.g., the emoji keyboard does not include an option to switch to a text keyboard).

The above-described manner of selecting an identifier for a remote locator object (e.g., by displaying a text keyboard that includes an option to switch to the emoji keyboard) provides a quick and efficient way of switching from editing the textual identifier to editing the graphical identifier (e.g., without requiring the user to perform additional inputs to complete the editing process for the textual identifier and then initiate the editing process for the graphical identifier), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the respective user interface includes a respective user interface element for selecting from a plurality of predefined options for the identifier for the remote locator object (738), such as in FIG. 6C (e.g., the respective user interface includes a selectable list, a drop-down menu, or any other element for selecting an option for a plurality of predefined options as the textual identifier for the remote locator object). In some embodiments, the respective user interface element is pre-populated with a plurality of predefined options for naming the remote locator object. In some embodiments, the list includes a plurality of common items that the remote locator object is attached to (e.g., for the purpose of tracking the location of those objects). For example, the list includes keys, bag, backpack, purse, car, suitcase, etc.

In some embodiments, in response to receiving the respective input, and in accordance with a determination that the respective input is directed to the respective user interface element (740) (e.g., the respective input corresponds to a selection of an option in the respective user interface element), in accordance with a determination that the respective input corresponds to a request to select a first respective predefined option of the plurality of predefined options for the second portion of the identifier, the electronic device displays (742), in the respective user interface, first text corresponding to the first respective predefined option in the representation of the second portion of the identifier appended to a name of the user of the electronic device, such as in FIG. 6D (e.g., when selecting an option from the list of predefined options, the representation of the second portion of the identifier includes the name of the owner of the remote locator object).

For example, in response to selecting the "key" option, the representation of the second portion of the identifier reads "John's keys". In some embodiments, the name of the owner of the remote is not appended (e.g., prepended) to the textual identifier if the textual identifier is not a predefined textual identifier. For example, if the user provided a custom textual identifier, then the representation of the second portion of the identifier includes the custom textual identifier, but does not include the name of the owner of the remote locator object.

In some embodiments, in accordance with a determination that the respective input corresponds to a request to select a second respective predefined option of the plurality of predefined options for the second portion of the identifier, the electronic device displays (744), in the respective user interface, second text corresponding to the second respective predefined option in the representation of the second portion of the identifier appended to the name of the user of the electronic device, wherein the second text is different from the first text, such as in FIG. 6D (e.g., if the user input selected a second option from the list of predefined options, then the representation of the second portion of the identifier includes the name of the owner of the remote locator object appended (e.g., prepended) to the selected second option.

The above-described manner of defining the identifier for a remote locator object (e.g., by automatically appending the name of the owner of the device to the textual identifier selected by the user) provides a quick and efficient way of switching from editing the textual identifier to editing the graphical identifier (e.g., without requiring the user to perform additional inputs to provide the owner's name when setting the textual identifier), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the respective user interface is displayed in response to selection of a respective option included in a respective user interface element, the respective option corresponding to a request to provide a non-predefined (e.g., first and/or second portion for the) identifier for the remote locator object, and the respective user interface element further includes a plurality of options for selecting from a plurality of predefined options for the second portion of the identifier for the remote locator object (746), such as user input 603 selecting custom option 624 in FIG. 6Q causing display of icon 628 and text field 630 in FIG. 6R (e.g., the user interface includes a list of predefined options as the textual identifier for the remote locator object).

In some embodiments, the list of predefined options includes a "custom" or "other" option, the selection of which provides the user the option to provide a custom name for remote locator object. In some embodiments, selection of the "custom" or "other" option causes the display of the respective user interface object that includes a representation of the first portion (e.g., graphical portion) and second portion (e.g., textual portion) of the identifier, which are selectable to select the graphical identifier and textual identifier, respectively (e.g., and optionally cause display of an emoji keyboard or text keyboard, respectively, as described above).

The above-described manner of defining a custom identifier for a remote locator object (e.g., by selecting a custom option from a list of predefined names) provides a quick and efficient way of providing a custom name (e.g., without limiting the user to only predefined names), which simplifies the interaction between the user and the electronic device and enhances the operability of the electronic device and makes the user-device interface more efficient (e.g., by reducing confusion between remote locator objects that have the same identifier if the identifiers were limited to only the predefined options), which additionally reduces power usage and improves battery life of the electronic device by enabling the user to use the electronic device more quickly and efficiently, while reducing errors in usage.

In some embodiments, the respective user interface is displayed in response to selection of a selectable option displayed in a user interface associated with the remote locator object (748), such as user input 603 selecting selectable option 616 in FIG. 6A (e.g., on a user interface associated with the remote locator object, such as a settings user interface for managing the remote locator object or change one or more settings of the remote locator object, display a selectable option to rename the remote locator object (e.g., a user interface that includes additional information about the remote locator device). In some embodiments, the user interface associated with the remote locator object includes a selectable option for finding and/or locating the remote locator object (e.g., in a manner similar to described below with respect to method 900).

The above-described manner of renaming a remote locator object (e.g., by selecting a selectable option to rename the remote locator object from a user interface associated with the remote locator object) provides a quick and efficient way of renaming a remote locator object (e.g., without requiring the user to reset the settings for the remote locator object and re-initialize the remote locator object to change the name of the remote locator object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, in response to receiving the respective input (750), in accordance with the determination that the respective input corresponds to selection of the representation of the first portion of the identifier, the electronic device visually distinguishes (752) the representation of the first portion of the identifier from the representation of the second portion of the identifier, such as in FIG. 6G (e.g., while the first user interface is displayed, visually highlight the representation of the first portion of the identifier or any other suitable visual indication, to indicate that the first portion of the identifier is being edited). For example, when the first portion of the identifier is visually distinguished, selecting an option from a soft keyboard (e.g., emoji keyboard or text keyboard) causes the first portion of the identifier to be edited according to the selection on the soft keyboard (e.g., and the second portion of the identifier is not edited).

In some embodiments, in accordance with the determination that the respective input corresponds to selection of the representation of the second portion of the identifier, the electronic device visually distinguishes (754) the representation of the second portion of the identifier from the representation of the first portion of the identifier, such as in FIG. 6I (e.g., while the second user interface is displayed, visually highlight the representation of the second portion of the identifier or any other suitable visual indication, to indicate that the first portion of the identifier is being edited). For example, when the second portion of the identifier is visually distinguished, selecting an option from a soft keyboard (e.g., emoji keyboard or text keyboard) causes the second portion of the identifier to be edited according to the selection on the soft keyboard (e.g., and the first portion of the identifier is not edited).

The above-described manner of indicating the portion of the identifier for the remote locator object being edited (e.g., by visually distinguishing the representation of the portion that was selected) provides a quick and efficient way of indicating the portion of the identifier that will be edited in response to an editing input (e.g., without requiring the user to perform inputs to determine whether the first portion or the second portion of the identifier is being edited), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the electronic device displays (756), via the display generation component, a map user interface that includes a representation of a map that indicates locations of one or more objects, including the remote locator object, wherein the map user interface includes the representation of the first portion of the identifier of the remote locator object displayed at a location on the representation of the map that corresponds to a current location of the remote locator object, such as in FIG. 6L (e.g., a map user interface includes a representation of the remote locator object that indicates the location of the remote locator object in the map (and which optionally includes one or more representations of other objects of which the location is known).

In some embodiments, the remote locator object is represented by the first portion of the identifier (e.g., the graphical identifier). For example, the map user interface includes one or more graphical icons that representations the location of one or more objects (including the remote locator object) in the map user interface. In some embodiments, the second portion of the identifier is not displayed with the graphical icons. In some embodiments, in response to selecting the graphical icon, the map user interface is updated to display information about the corresponding remote locator object, including optionally referring to the remote locator object using the textual identifier (e.g., the second portion of the identifier).

The above-described manner of representing a remote locator object (e.g., by representing the remote locator object using the graphical indicator) provides a quick and efficient way of representing a remote locator object (e.g., in a concise fashion, without requiring the display of the textual description, thus reducing the display area requirements), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the electronic device displays (758), via the display generation component, a map user interface that includes a representation of a map that indicates locations of one or more objects, including the remote locator object, such as in FIG. 6L (e.g., a map user interface includes a representation of the remote locator object that indicates the location of the remote locator object in the map (and which optionally includes one or more representations of other objects of which the location is known and/or tracked)).

In some embodiments, in accordance with a determination that a plurality of objects, including a first object and a second object, satisfy one or more criteria (e.g., if more than a threshold number of tracked objects (e.g., 2 objects, 3 objects, 5 objects, 10 objects) are determined to be located at a respective location or within a threshold distance of each other (e.g., within 2 feet, within 10 feet, within ¼ mile, within 5 miles, etc., or if a threshold number of tracked objects are paired with the electronic device)), the map user interface includes a respective representation of the plurality of objects without including a first representation of the first object and a second representation of the second object (760), such as group 640 in FIG. 6L (e.g., the plurality of objects are grouped together and represented as a set of objects).

In some embodiments, the electronic device is the user's primary device (e.g., the device is the user's phone or the user's computer, and optionally not the user's tablet or the user's watch). In some embodiments, the representation of the set of objects includes one or more representations of some objects in the set and optionally does not include representations of other objects in the set. For example, if the group includes four objects, then the representation of the set includes a representation of two of the objects and does not include representations of the other two objects. In some embodiments, the map user interface includes a user interface element that indicates the location on the representation of the map that the set of objects are located. For example, the map includes a black dot and the representation of the set of objects includes a graphical element (e.g., arrow, a dot, etc.) pointing towards the black dot.

In some embodiments, in accordance with a determination that the plurality of objects do not satisfy the one or more criteria, the map user interface includes the first representation of the first object and the second representation of the second object (762), such as icon 642 in FIG. 6L (e.g., without including the respective representation of the plurality of objects).

In some embodiments, if less than the threshold number of tracked objects are determined to be located at the respective location or within the threshold distance of each other, then the objects are not grouped together and are optionally represented individually by their identifiers (optionally only by their graphical identifiers). For example, the map user interface includes a plurality of black dots and the individual representations of the objects include graphical elements pointing towards their respective black dots.

The above-described manner of displaying the location of one or more tracked objects (e.g., by grouping together a set of objects and representing the group as one set if the set are close in proximity or by representing each object individually if the objects are not close in proximity) provides a quick and efficient way of indicating the location of multiple objects that are close together (e.g., without displaying a representation of each object, even if the objects are close together), which simplifies the interaction between the user and the electronic device and enhances the operability of the electronic device and makes the user-device interface more efficient (e.g., by conserving display space and increasing the visibility of the displayed objects), which additionally reduces power usage and improves battery life of the electronic device by enabling the user to use the electronic device more quickly and efficiently, while reducing errors in usage.

In some embodiments, the one or more criteria include a criterion that is satisfied when the plurality of objects are within a threshold distance of a respective electronic device (764), such as described in FIG. 6L (e.g., the plurality of objects are within 2 feet, 5 feet, 200 feet, ½ mile, 1 mile, 10 miles, etc. of the device). In some embodiments, if the plurality of objects are within the threshold distance of the device if, on the representation of the map, the objects would otherwise be displayed within 1 mm, 5 mm, 1 cm, of the location of the device. In some embodiments, the respective electronic device is the user's primary device (e.g., the user's phone, the user's laptop, etc.) and not necessarily the device that is displaying the user interface (e.g., the respective electronic device is not necessarily the device performing method 700, but can be another electronic device). In some embodiments, the respective electronic device is the device that is displaying the user interface and performing method 700.

The above-described manner of displaying a group of tracked objects (e.g., as a group, if the objects are within a threshold distance of the device) provides a quick and efficient way of indicating the location of multiple objects that are close together (e.g., without individually displaying a representation of each object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the one or more criteria include a criterion that is satisfied when the plurality of objects are in wireless communication with a respective electronic device (766), such as described in FIG. 6L (e.g., the plurality of objects are paired with the respective electronic device (e.g., via Bluetooth, WiFi, NFC, etc.)). For example, the plurality of objects are paired with the electronic device displaying the user interface. In another example, the plurality of objects are paired with the user's primary electronic device, which is optionally a different electronic device than the device that is displaying the user interface.

The above-described manner of displaying a group of tracked objects (e.g., as a group, if the objects are paired with the electronic device) provides a quick and efficient way of indicating the location of multiple objects that are close together (e.g., without individually displaying a representation of each object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the respective representation of the plurality of objects in the map user interface, the electronic device receives (768), via the one or more input devices, selection of the respective representation of the plurality of objects, such as in FIG. 6M (e.g., while the plurality of objects are grouped together and represented as a set of objects, receiving a user input selecting the representation of the set of objects).

In some embodiments, in response to receiving the selection of the respective representation of the plurality of objects, the electronic device displays (770), in the map user interface, the first representation of the first object and the second representation of the second object, such as in FIG. 6N (e.g., expanding the set of objects and displaying representations of the objects in the set of objects (e.g., optionally displaying representations of each object)).

In some embodiments, the user interface includes a list of the objects in the set of objects. In some embodiments, in response to receiving the selection of the respective representation of the plurality of objects, the map user interface is updated to cease displaying representations of other objects that are not in the plurality of objects (e.g., other objects that are not paired with the device, or other objects that are not within the threshold distance from the device). In some embodiments, in response to receiving the selection of the respective representation of the plurality of objects, the map user interface is updated to reposition the representation of the map such that the respective representation of the plurality of objects is centered. In some embodiments, the user interface displays more and/or different information about the set of objects (e.g., more and/or different information about the objects in the set) than was previously displayed before receiving the user input. For example, the user interface optionally includes entries for more objects in the group that was previously displayed. In some embodiments, the user interface displays a textual indication of the location of the group of objects (e.g., "With You", "Near Home", "With Spouse", etc.).

The above-described manner of displaying a group of tracked objects (e.g., displaying the objects in the group in response to an input selecting the representation of the group) provides a quick and efficient way of indicating objects that are near the device (e.g., by displaying the objects that are near the device in a single user interface, optionally without displaying other objects that are not near the device), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

It should be understood that the particular order in which the operations in FIGS. 7A-7H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, and 1300) are also applicable in an analogous manner to method 700 described above with respect to FIGS. 7A-7H. For example, providing user interfaces for defining identifiers for remote locator objects described above with reference to method 700 optionally has one or more of the characteristics of locating a remote locator object, providing information associated with a remote locator object, displaying notifications associated with a trackable device, etc., described herein with reference to other methods described herein (e.g., methods 900, 1100, and 1300). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 7A-7H are, optionally, implemented by components depicted in FIGS. 1A-1B. For example, displaying operations 706, 708, 716, 722, 742, 744, 756, 758, and 770 and receiving operations 702 and 768 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Locating a Remote Locator Object

Users interact with electronic devices in many different manners. In some embodiments, an electronic device is able to track the location of an object such as a remote locator object. In some embodiments, the remote locator object, which supports location tracking functions, can be attached to items that do not support location tracking functions. The embodiments described below provide ways in which an electronic device locates a remote locator object, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 8A-8I illustrate exemplary ways in which an electronic device 500 locates a remote locator object in accordance with some embodiments of the disclosure. The embodiments in these figures are used to illustrate the processes described below, including the processes described with reference to FIGS. 9A-9G.

FIG. 8A illustrates electronic device 500 displaying user interface 800 (e.g., via a display device, etc.). In some embodiments, user interface 800 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 800 is a user interface associated with a respective remote locator object, optionally for managing and/or changing one or more settings associated with the respective remote locator object, for viewing information about the respective remote locator object, and/or for locating the respective remote locator object, similar to user interface 600 described above with respect to FIG. 6A.

As shown in FIG. 8A, the respective remote locator object named "John's Keys" is determined to be (e.g., roughly) 30 feet from device 500. In FIG. 8A, a user input 803 is received selecting selectable option 806 to locate the respective remote locator object. In some embodiments, in response to receiving user input 803 selecting selectable option 806, device 500 initiates a process to locate the respective remote locator object, as shown in FIG. 8B. In some embodiments, the process to locate the respective remote locator object includes a plurality of different finding modes, and the finding mode that is used is optionally based on the distance that the remote locator object is from device 500. For example, if the distance between the remote locator object and device 500 is above a first threshold distance (e.g., more than 50 feet, 100 feet, ¼ mile, ½ mile, 1 mile, etc.), then the process to locate the respective remote locator object involves displaying one or more navigation directions on a representation of a map to travel from the current location to the determined location of the respective remote locator object (e.g., a map style finding mode). In some embodiments, if the distance is less than the first threshold distance, then the process to locate the respective remote locator object involves displaying one or more indications that are biased towards or point towards the location of the remote locator object to guide the user to move towards the remote locator object (e.g., a "compass" style finding mode). In some embodiments, either of the map style finding mode and the compass style finding mode has sub-modes based on the distance between the remote locator object and the device in which the user interface is updated or changes to provide a better finding experience, as will be discussed in more detail below.

In FIG. 8B, because the distance between device 500 and the remote locator object (e.g., remote locator object 830) is less than the first threshold distance (e.g., the distance is 30 feet), device 500 enters into the compass style finding mode and displays user interface 816. In some embodiments, user interface 816 includes a textual indication 818 of the remote locator object being located (e.g., the textual indicator of the remote locator object, which was optionally selected according to method 700 described above), exit affordance 824 that is selectable to exit the process of locating the remote locator object, and audio affordance 826 that is selectable to cause the remote locator object to generate an audible output.

In some embodiments, user interface 816 further includes a plurality of user interface elements 820 (e.g., a "point cloud") that, in combination, indicate the general location of remote locator object 830 (e.g., relative to device 500). In FIG. 8B, because remote locator object 830 is farther than a second threshold distance from device 500 (e.g., more than 10 feet, 20 feet, 30 feet, 50 feet, etc. away from device 500), user interface 816 includes the plurality of user interface elements 820 that move around in user interface 816 and are optionally biased towards the location of remote locator object 830 (e.g., device 500 is in the first sub-mode of the compass-style finding mode). For example, a majority of the plurality of user interface elements 820 are located at the portion of user interface 816 that is closer to the location of remote locator object 830.

In some embodiments, while performing the process to locate a remote locator object, device 500 optionally uses (e.g., automatically) one or more cameras of device 500 to capture images of the environment around device 500 (e.g., environment 828). In some embodiments, in addition to or alternatively to using the one or more cameras of device 500, device 500 uses one or more wireless communication circuitry (e.g., Bluetooth, NFC, etc.) to locate and/or identify the remote locator object. In some embodiments, device 500 analyzes the captured images to facilitate identifying remote locator object 830 in environment 828 and/or determining the location of remote locator object 830 in environment 828. In some embodiments, the one or more cameras that are used to capture images of environment 828 are located on the side of device 500 opposite to the display generation component (e.g., on the opposite side of touch screen 504). In some embodiments, the one or more cameras that are used to capture images of environment 828 are the same cameras that are used to take photographs and/or videos using a camera application installed on device 500.

In some embodiments, while the one or more cameras of device 500 are capturing images of environment 828 (e.g., continuously or at a predetermined interval, such as once every 0.5 seconds, every 1 second, every 5 seconds, every 10 seconds, etc.), user interface 816 includes representation 832 of the captured images of environment 828. In some embodiments, representation 832 is a visually modified version of the captured images (e.g., blurred, shaded, darkened, etc.). For example, in FIG. 8B, environment 828 includes a table and remote locator object 830 placed on top of the table. In some embodiments, representation 832 is a blurred representation of the captured images of environment 828 (e.g., a blurred image of a table and a remote locator object on the table) displayed in the background of user interface 816 (e.g., the elements of user interface 816, such as the plurality of user interface elements 820, are displayed overlaid on representation 832). In some embodiments, displaying representation 832 indicates that the one or more cameras of device 500 are in use to help locate remote locator object 830.

In FIG. 8C, device 500 has moved in environment 828 such that remote locator object 830 is 25 feet away from device 500 (e.g., and located ahead and to the right of device 500). In some embodiments, because the distance between device 500 and remote locator object 830 is less than the second threshold distance, device 500 is in a second sub-mode of the compass-style finding mode. For example, in FIG. 8C, user interface 816 is updated to include arrow 834 that points in the direction of remote locator object 830 (e.g., relative to device 500) and a textual description of the distance and direction of remote locator object 830. As shown in FIG. 8C, representation 832 of the captured images of environment 828 shows that the table on which remote locator object 830 is located is now on the right side of device 500 and is now closer to device 500 (e.g., the representation of the table and/or remote locator object is larger) as compared to FIG. 8B.

In FIG. 8C, the ambient luminance level of environment 828 is above a threshold level (e.g., above 10 lux, 50 lux, 100 lux, 500 lux, etc.). In some embodiments, device 500 determines the ambient luminance using an ambient light sensor of device 500 (e.g., such as optical sensor 164 and/or proximity sensor 166 described above with respect to FIG. 4A). In some embodiments, because the ambient luminance level of environment 828 is such that environment 828 is bright enough for the one or more cameras to be able to capture a sufficiently clear image of environment 828 and/or of remote locator object 830 (e.g., enough detail, enough resolution, enough contrast, etc.) and for device 500 to identify remote locator object 830, user interface 816 does not include a selectable option for turning on a lighting element of device 500 during the finding mode.

In FIG. 8D, during the finding mode, device 500 determines that the ambient luminance of environment 828 has dropped below the threshold level (e.g., the lights have turned off, the sun has set, the user has walked into a dark room, for example). As shown in FIG. 8D, because environment 828 is darker than in FIG. 8C, representation 832 of the captured images of environment 828 reflects the darkened environment. In some embodiments, in response to determining that the ambient luminance of environment 828 has dropped below the threshold level, device 500 displays selectable option 836 in user interface 816, which is selectable to turn on the lighting element of device 500. In some embodiments, the lighting element that is turned on is the same lighting element used as a flash when taking pictures or videos with the one or more cameras of device 500 (e.g., in a camera application on device 500). In some embodiments, the lighting element is located on the same side of device 500 as the one or more cameras that are capturing images of environment 828. In some embodiments, the lighting element is able to light up at least a part of the environment that is captured by the one or more cameras of device 500. In some embodiments, in response to determining that the ambient luminance of environment 828 has dropped below the threshold level, user interface includes textual description 838 that more light is required (e.g., suggesting that the user turn on the lighting element of device 500).

In FIG. 8E, while displaying selectable option 836 and textual description 838, device 500 detects that the ambient luminance of environment 828 has increased back above the threshold level. In some embodiments, in response to detecting that the ambient luminance of environment 828 has increased back above the threshold level, user interface 816 is updated to remove selectable option 826 and textual description 838. In some embodiments, if the lighting element was turned on when device 500 detects that the ambient luminance of environment 828 has increased back above the threshold level, device 500 turns off the lighting element of device 500 (e.g., optionally only if the lighting element was on in response to selecting selectable option 838).

In some embodiments, the threshold level above which the selectable option is ceased to be displayed (e.g., as in FIG. 8E) is different than the threshold level below which the selectable option is displayed (e.g., as in FIG. 8D). In some embodiments, the threshold level above which the selectable option is ceased to be displayed is more than the threshold level below which the selectable option is displayed. For example, while displaying selectable option 836, the ambient luminance has to increase to a level that is greater than the level that caused selectable option 836 to be displayed (e.g., 10 lux greater, 50 lux greater, 100 lux greater, 500 lux greater, 10% greater, 30% greater, 50% greater, 100% greater, etc.) in order for device 500 to cease displaying selectable option 836 in user interface 816. Thus, device 500 optionally implements a hysteresis effect for displaying selectable option 836 and ceasing display of selectable option 836. In some embodiments, implementing a hysteresis effect prevents selectable option 836 from flickering in and out of user interface 816 (e.g., prevents selectable option 836 from switching back and forth from being displayed and not being displayed) if, for example, the ambient luminance is near the threshold level.

In FIG. 8F, while the ambient luminance of environment 828 is below the threshold level and user interface 816 includes selectable option 836 and textual description 838, a user input 803 is received selecting selectable option 836. In some embodiments, in response to receiving the user input 803 selecting selectable option 836, device 500 enables lighting element 840 of device 500, as shown in FIG. 8G. In FIG. 8G, a portion of environment 828 is illuminated by lighting element 840 such that the table and remote locator object 830 are illuminated. In some embodiments, representation 832 of the captured images of environment 828 reflects that the environment has been illuminated (e.g., the area that is illuminated is brighter than the area that is not illuminated). In some embodiments, selectable option 836 is updated to indicate that lighting element 840 is enabled. For example, in FIG. 8G, the colors of selectable option 836 are inverted, although it is understood that any visual indication on selectable option 836 that lighting element 840 is enabled is possible. In some embodiments, in response to enabling lighting element 840, textual description 838 is removed from user interface 816 (e.g., due to no longer needing to indicate that more light is required). In some embodiments, selection of selectable option 836 when lighting element 840 is on causes lighting element 840 to be turned off (e.g., which optionally causes selectable option 836 to indicate that lighting element 840 is not enabled and optionally causes textual description 838 to be displayed in user interface 816).

Thus, as described above, while performing a process to locate a remote locator object (e.g., optionally while in a compass-style finding mode shown in FIGS. 8B-8G), if device 500 detects that the luminance level of the environment is below a threshold such that more light is needed to increase the accuracy and/or efficacy of locating the remote locator object in the environment, device 500 automatically displays a selectable option to turn on a lighting element of device 500 to increase the luminance level of the environment (e.g., a portion of the environment), optionally increasing the accuracy and/or efficacy of locating the remote locator object in the environment.

In some embodiments, while device 500 is in certain finding modes, device 500 does not display a selectable option to turn on the lighting element of device 500, even if the ambient luminance of the environment is below the threshold (e.g., even if all other criteria that cause display of the selectable option are satisfied).

Figure 8H:
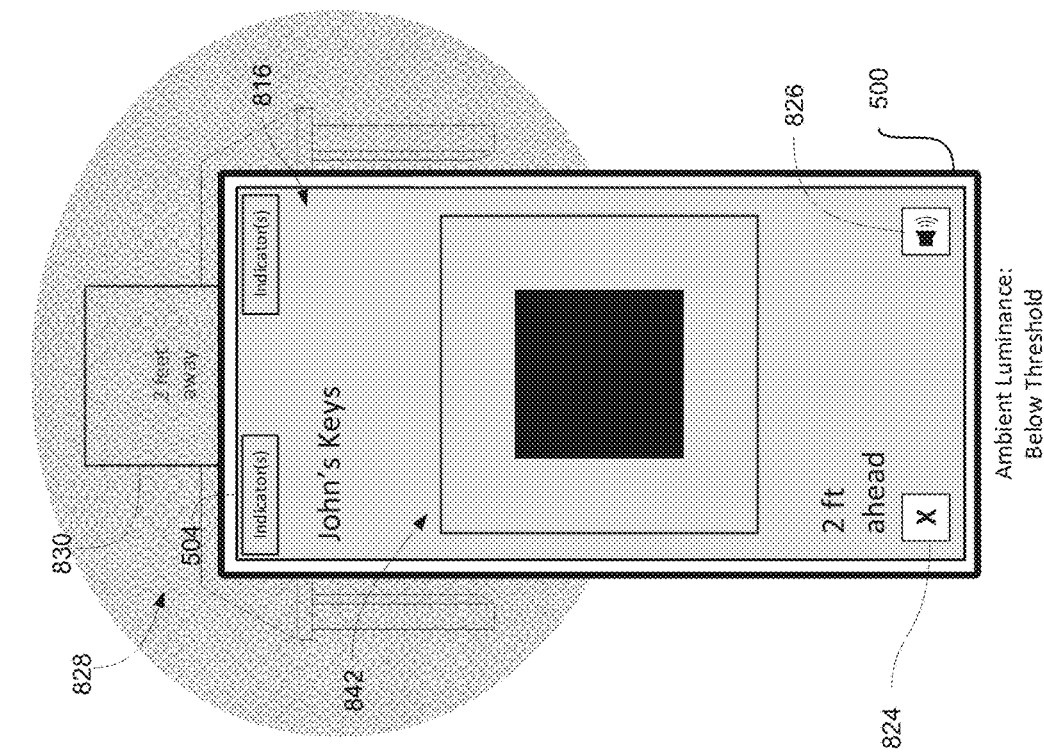
Figure 8G:
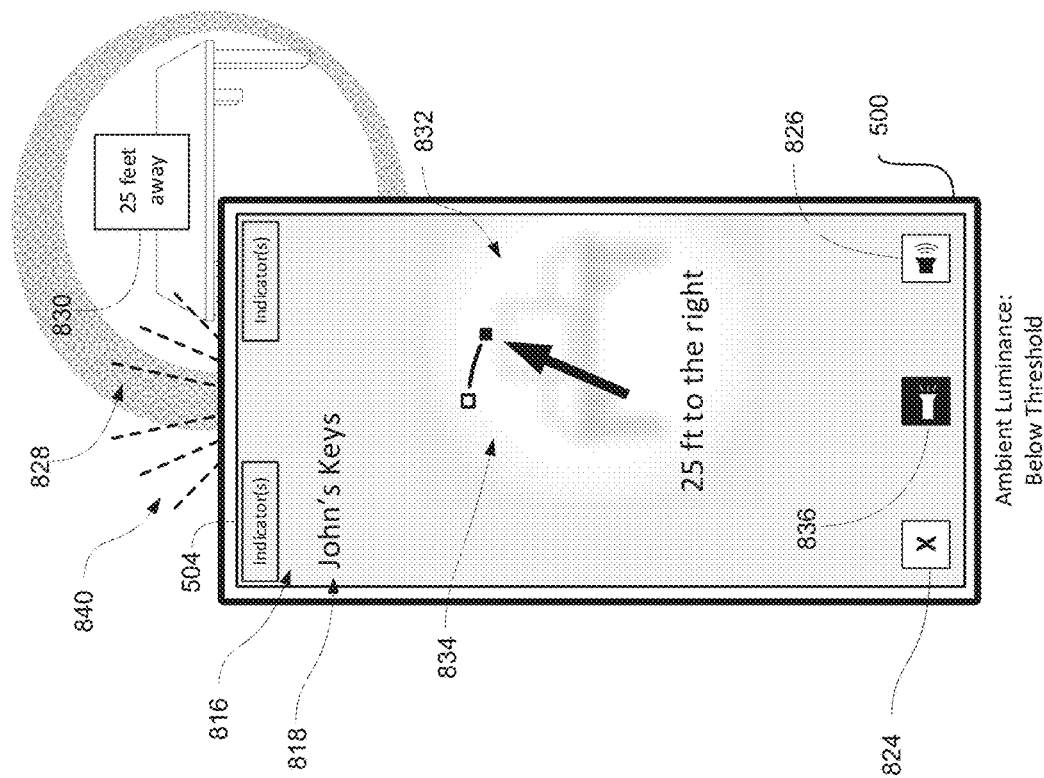

For example, in FIG. 8H, remote locator object 830 is less than a third threshold distance away from device 500 (e.g., less than ½ foot, 1 foot, 2 feet, 3 feet, 5 feet, etc.). In some embodiments, in response to determining that remote locator object 830 is less than the third threshold distance away from device 500, device 500 enters into a third sub-mode of the compass-style finding mode, as shown in FIG. 8H. In FIG. 8H, user interface 816 has been updated to display a representation 842 of remote locator object 830 and a bounding shape that closes into and merges with representation 842 of remote locator object 830 as device 500 approaches and reaches the location of remote locator object 830.

In some embodiments, because device 500 is in the third sub-mode in which remote locator object 830 is less than the third threshold distance away from device 500, even if environment 828 has an ambient luminance level below the threshold level, user interface 816 does not include a selectable option to turn on the lighting element of device 500. In some embodiments, while in the third sub-mode, device 500 does not use the one or more cameras to help locate the remote locator object and enabling the lighting element would not help device 500 in locating the remote locator object. In some embodiments, while in the third sub-mode, device 500 wirelessly communicates directly with remote locator object 830 to determine its location (e.g., via radio communication circuitry).

Figure 8I:
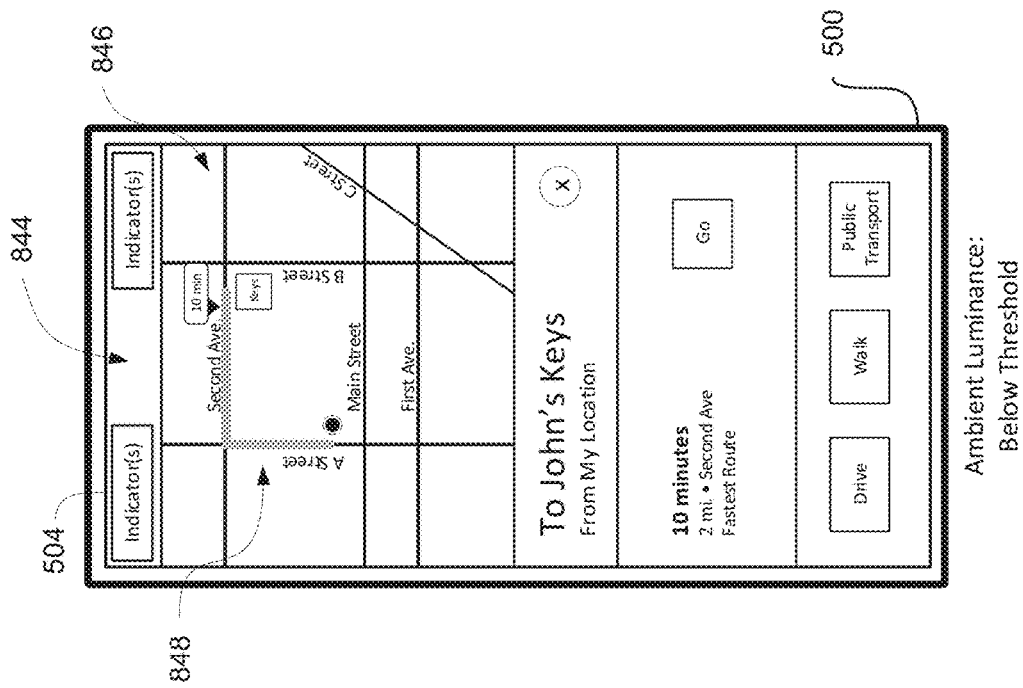
Figure 9A:
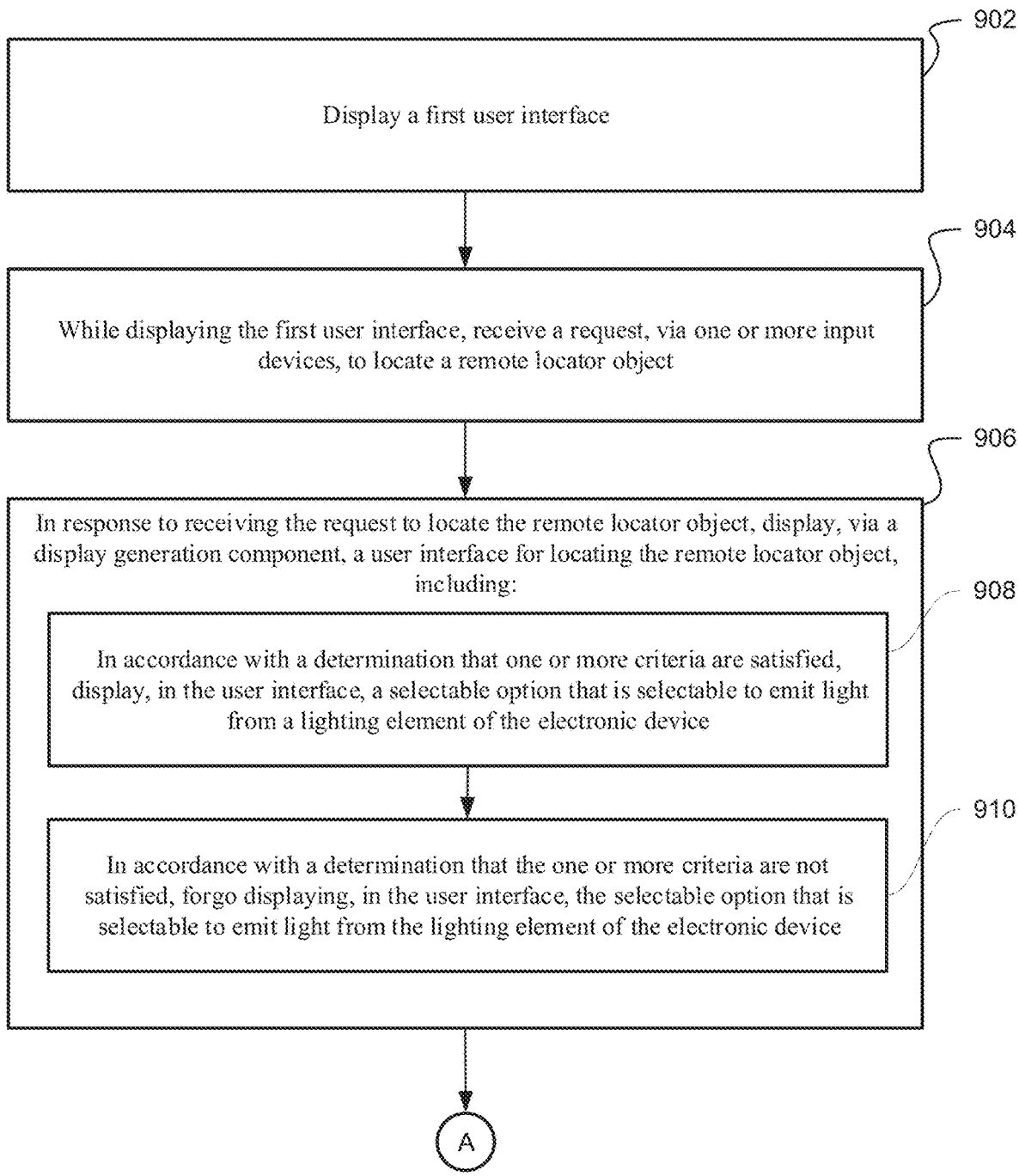
FIGS. 9A-9G are flow diagrams illustrating a method of locating a remote locator object in accordance with some embodiments of the disclosure.
Figure 9B:
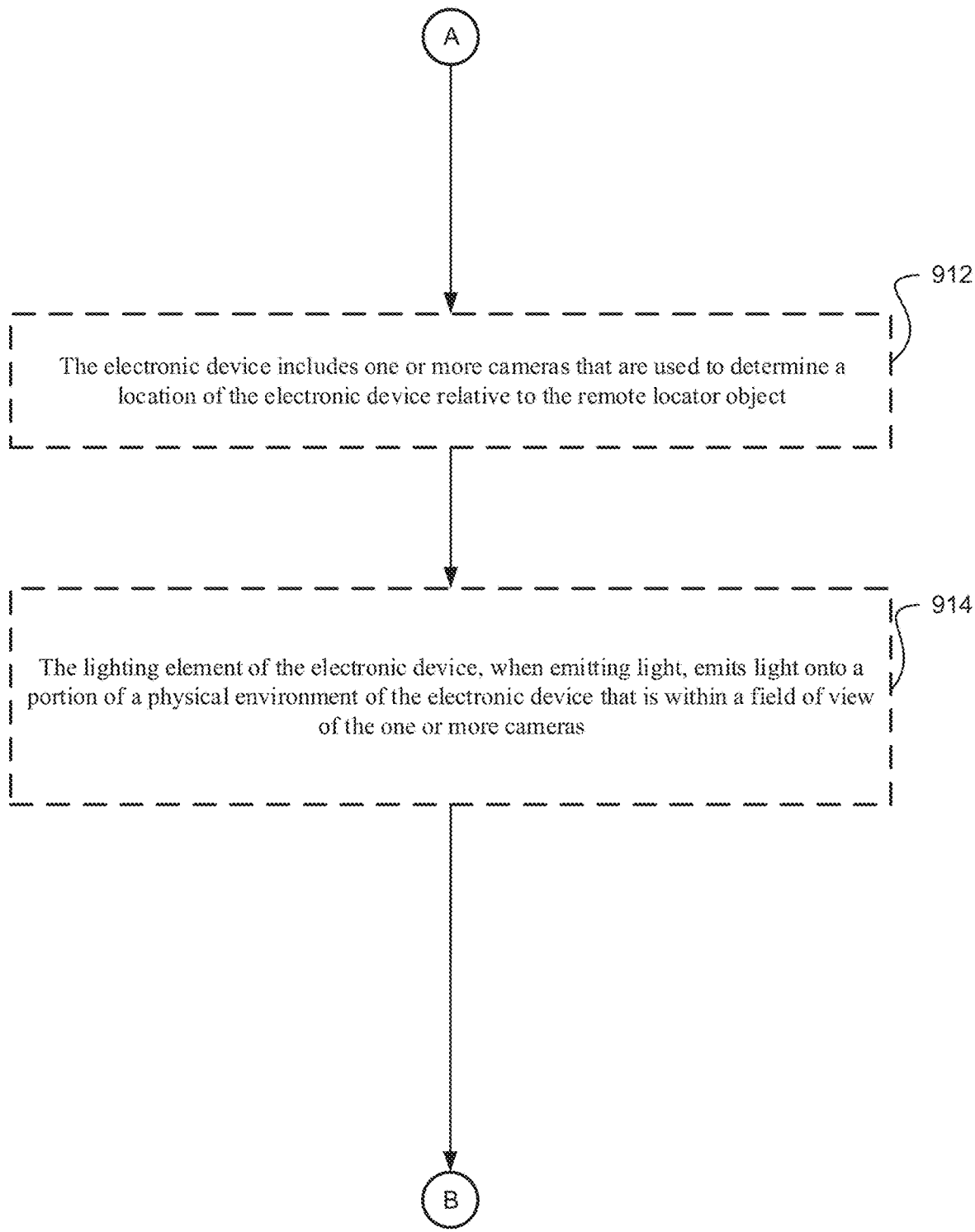
Figure 9C:
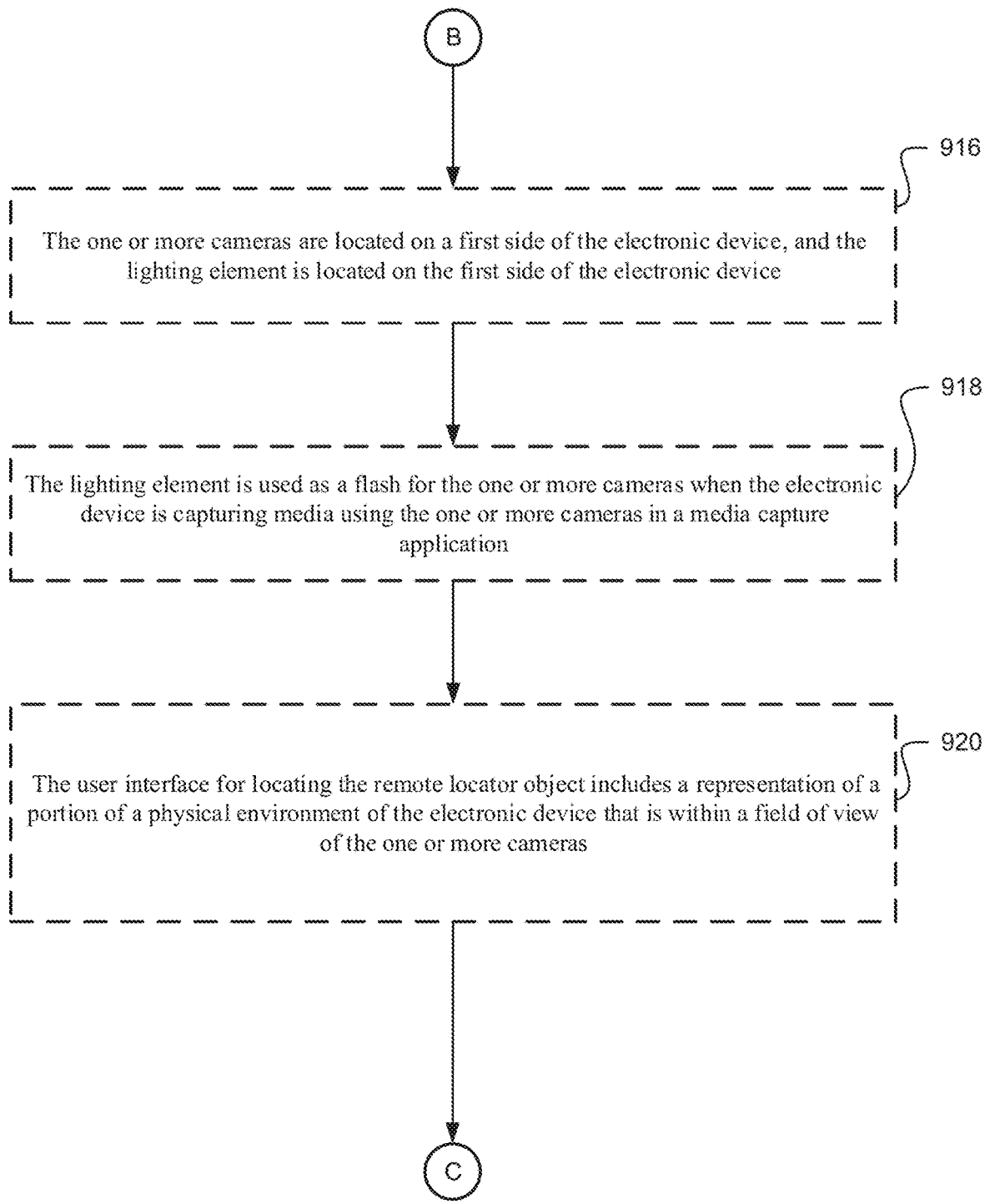
Figure 9D:
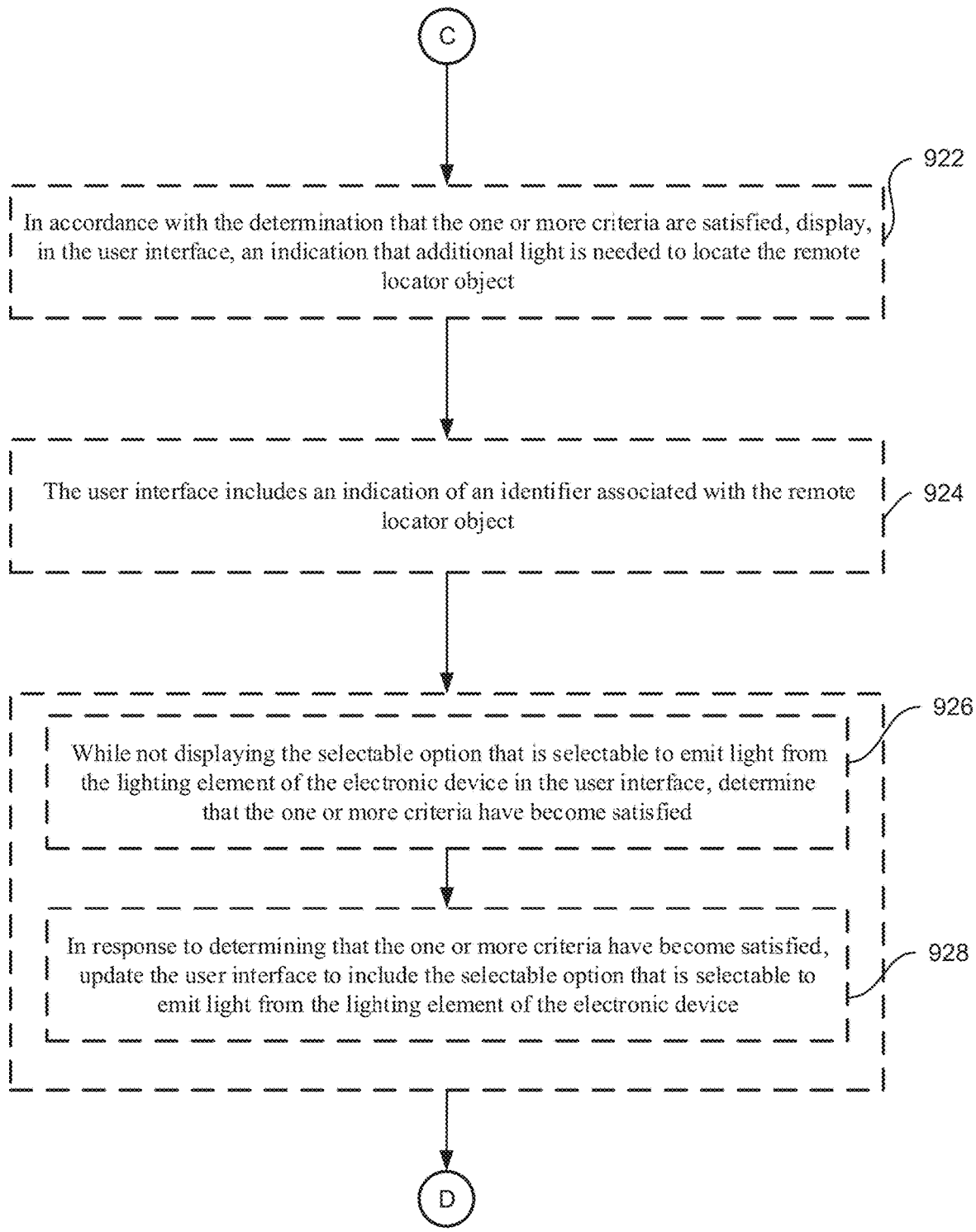
Figure 9E:
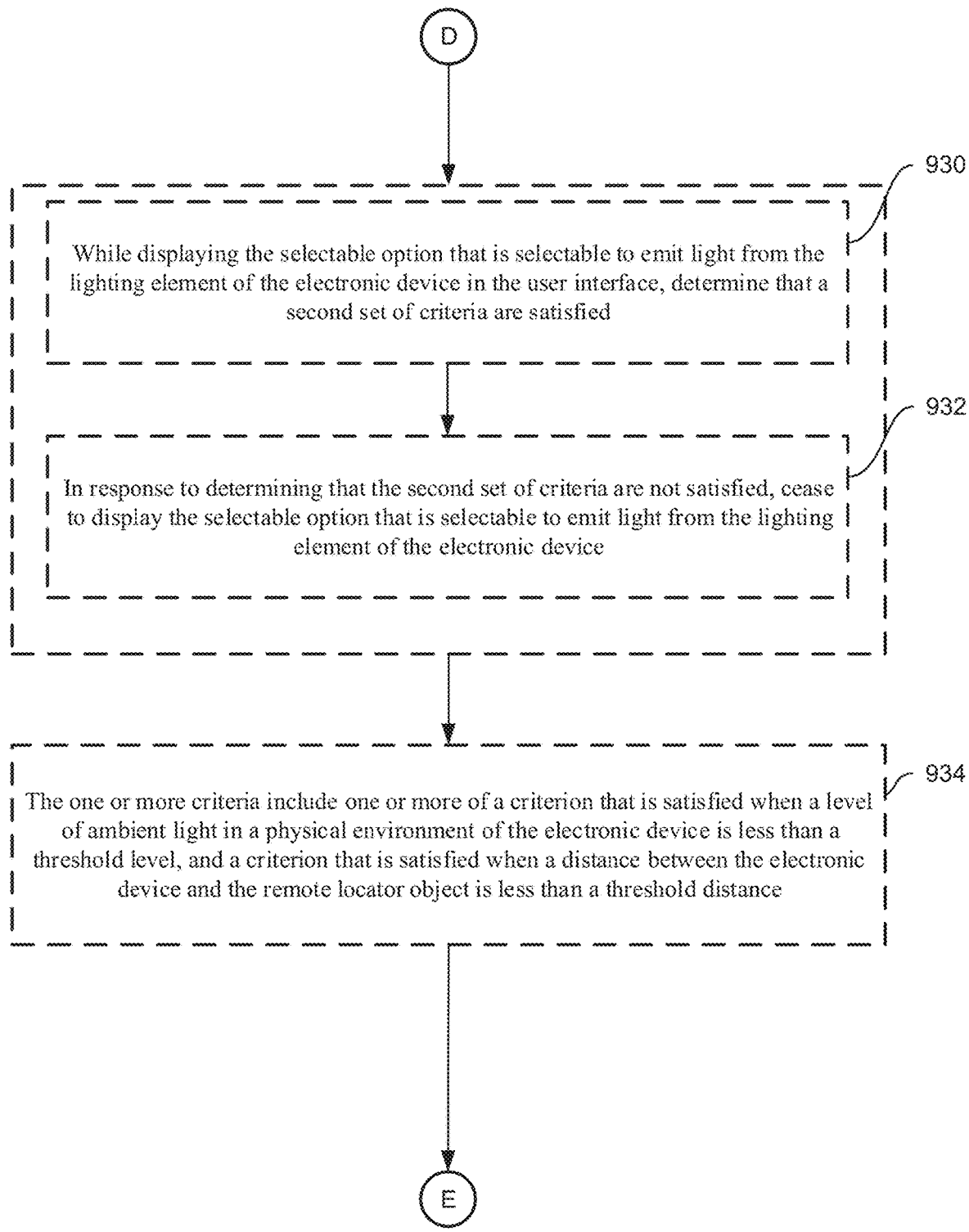
Figure 9F:
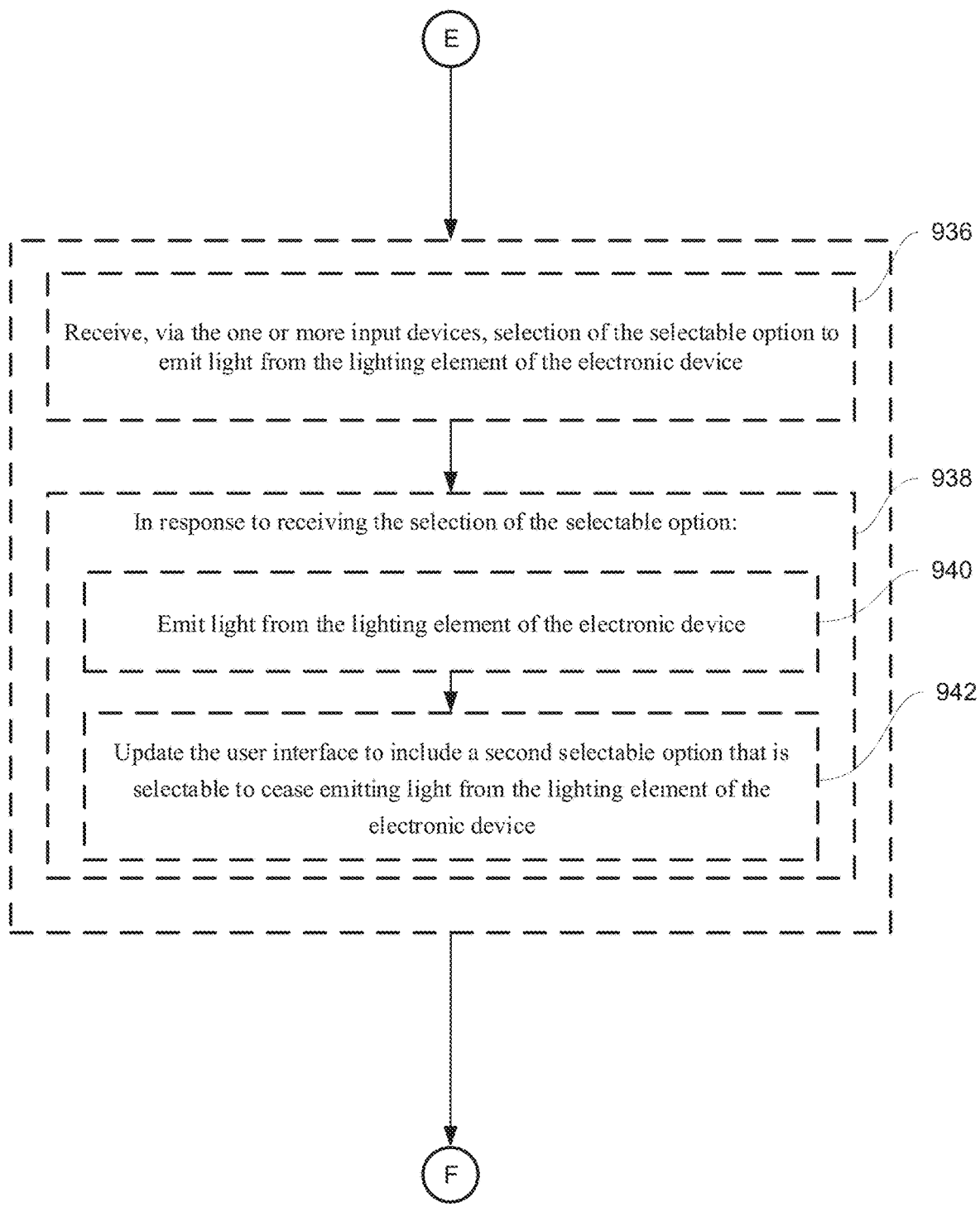
Figure 9G:
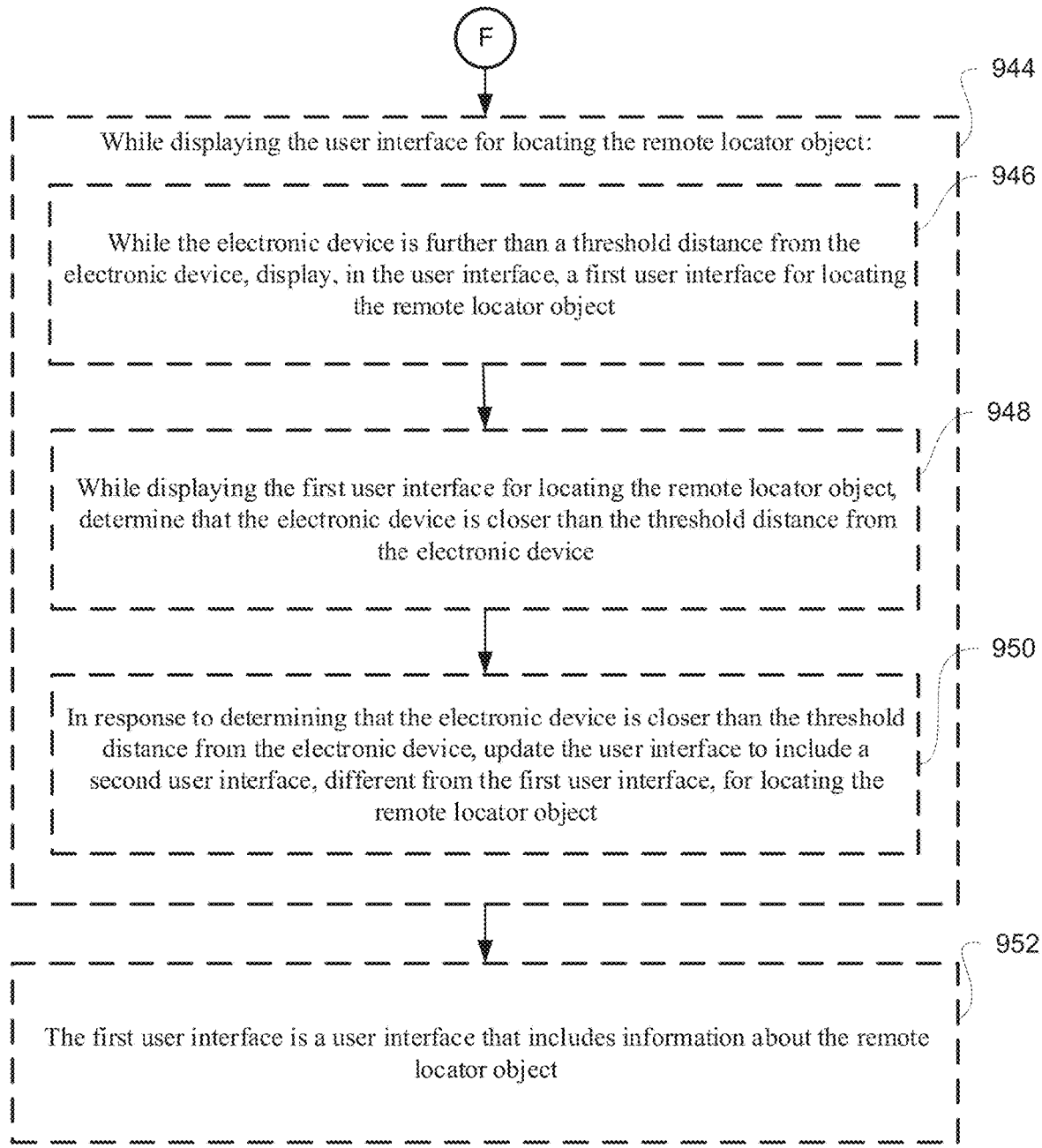

FIG. 8I illustrates another situation in which device 500 does not display a selectable option to turn on the lighting element of device 500 while in a finding mode. In FIG. 8I the distance between the remote locator object and device 500 is more than the first threshold distance (e.g., more than 50 feet, 100 feet, ¼ mile, ½ mile, 1 mile, etc.), and in response to determining that the distance between the remote locator object and device 500 is more than the first threshold distance, device 500 operates in a map style finding mode, which includes displaying one or more driving and/or navigation directions to travel from the current location of device 500 to the determined location of the remote locator object. In some embodiments, while in the map style finding mode, device 500 does not use the one or more cameras of device 500 to help locate the remote locator object and thus, device 500 does not display a selectable option to turn on the lighting element of device 500 in user interface 844, even though the ambient luminance level of the environment around device 500 is below the threshold value. As discussed above, in some embodiments, the remote locator object is optionally able to communicate with electronic devices in the vicinity of the remote locator object (e.g., devices which optionally do not have a previous relationship with the remote locator object) such that the remote locator object is able to cause its location to be updated and sent to device 500 (e.g., via a server). In some embodiments, in this way, device 500 is able to receive updates and/or access the location of the remote locator object (e.g., by querying a server that receives updated location information from the remote locator object) even if the remote locator object is not able to directly communicate with device 500.

FIGS. 9A-9G are flow diagrams illustrating a method 900 of locating a remote locator object in accordance with some embodiments, such as in FIGS. 8A-8I. The method 900 is optionally performed at an electronic device such as device 100, device 300, device 500 as described above with reference to FIGS. 1A-1B, 2-3, 4A-4B and 5A-5H. Some operations in method 900 are, optionally combined and/or order of some operations is, optionally, changed.

As described below, the method 900 provides ways to locate a remote locator object. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device in communication with one or more wireless antenna, a display generation component and one or more input devices (e.g., electronic device 500, a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.) displays (902) a first user interface (e.g., via the display generation component), such as user interface 800 in FIG. 8A (e.g., a user interface that includes information about one or more remote locator objects, a home screen user interface with a plurality of app launch icons, an application user interface, a virtual assistant user interface, or any other suitable user interface).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, while displaying the first user interface, the electronic device receives (904) a request, via the one or more input devices, to locate a remote locator object, such as user input 803 selecting selectable option 806 for locating the respective remote locator object in FIG. 8A (e.g., a user input tapping on a "find remote locator object" affordance or a request to a virtual assistant (e.g., voice request) to "find remote locator object").

In some embodiments, in response to receiving the request to locate the remote locator object, the electronic device displays (906), via the display generation component, a user interface for locating the remote locator object, such as user interface 816 in FIG. 8B (e.g., initiate a process for finding and/or locating the remote locator object).

In some embodiments, while the device is in a process for finding and/or locating a remote locator object, the device displays a user interface for guiding the user to locate the remote locator object. In some embodiments, the electronic device is used as a compass-like device for locating the remote locator object (e.g., a compass-style finding mode). For example, the device is able to determine the direction of the remote locator object and guide the user to move in the determined direction. In some embodiments, in the finding mode, the user interface includes visual indicators that are displayed via the display generation component to indicate the direction and/or distance of the remote locator object (e.g., arrows pointing in the direction of the remote locator object and/or a textual indication of the approximate distance that the remote locator object is from the device). In some embodiments, the device determines the location of the remote locator object (e.g., direction and distance) based on wireless communication with the remote locator object, such as via the one or more wireless antenna (e.g., via Bluetooth, WiFi, an ad-hoc wireless network, etc.). In some embodiments, the device determines the location of the remote locator object by using one or more cameras of the device to capture images of the environment around the device and analyze the images to identify and locate the remote locator object. In some embodiments, while using the one or more cameras of the device to find and identify the remote locator object, the device displays an augmented-reality environment to guide the user to the location of the remote locator object (e.g., an augmented reality finding mode). For example, the augmented-reality environment includes a representation of the real world environment being captured by the one or more cameras (e.g., a photorealistic live image of what is being captured by the cameras) that is modified to include one or more electronically generated elements that indicate the identified position of the remote locator object. For example, the electronically generated elements include an arrow pointing towards the remote locator object, a circle around the remote locator object, and/or a flag or balloon that appears attached to the remote locator object that is able to indicate the location of the remote locator object even if it is obscured behind a physical object, etc.

In some embodiments, in accordance with a determination that one or more criteria are satisfied, the electronic device displays (908), in the user interface, a selectable option that is selectable to emit light from a lighting element of the electronic device, such as selectable option 836 in FIG. 8D (e.g., while in a process for finding and/or locating a remote locator object, if one or more criteria are satisfied, the user interface includes a flashlight affordance that is selectable to activate a flashlight or any other suitable lighting element associated with the electronic device to assist the user in finding the remote locator object).

In some embodiments, the criteria are satisfied if the amount of ambient light (optionally determined using one or more ambient light sensors) is less than a threshold amount (e.g., less than 20 lux, less than 50 lux, less than 100 lux, less than 500 lux, etc.). In some embodiments, enabling the lighting element helps the user visibly identify the remote locator object in the environment. In some embodiments, enabling the lighting element helps the device capture images of the environment for the purpose of accurately identifying the remote locator object.

In some embodiments, in accordance with a determination that the one or more criteria are not satisfied, the electronic device forgoes displaying (910), in the user interface, the selectable option that is selectable to emit light from the lighting element of the electronic device, such as the lack of selectable option 836 in user interface 816 in FIG. 8C (e.g., while in the process for finding and/or locating the remote locator object, if the one or more criteria are not satisfied, the user input does not include a flashlight affordance for enabling or disabling a lighting element of the electronic device). For example, if the ambient luminance is above the threshold, the user interface does not include a flashlight affordance for enabling the lighting element of the device.

The above-described manner of displaying a selectable option that is selectable to turn on a lighting element if certain criteria are satisfied provides a quick and efficient way of improve visibility while looking for the remote locator object (e.g., by automatically displaying the selectable option for enabling the lighting element when needed, without requiring the user to perform additional inputs to determine whether enabling a lighting element would help with locating the remote locator object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the electronic device includes one or more cameras that are used to determine a location of the electronic device relative to the remote locator object (912), such as described in FIG. 8B (e.g., the one or more cameras of the electronic device capture one or more images of the environment around the electronic device, and the electronic device analyzes the one or more captured images to identify and locate the remote locator object). In some embodiments, based on the analysis, the electronic device is able to determine the location of the remote locator object and guide the user to the determined location. In some embodiments, the images captured by the one or more cameras are analyzed to determine the orientation of the electronic device with respect to objects in the environment around the electronic device. In some embodiments, the location of the remote locator object is determined based on both on the analysis of the images captured by the one or more cameras and wireless communication with the remote locator object.

The above-described manner of finding a remote locator object (e.g., using one or more cameras of the electronic device to visually find the remote locator object) provides a quick and efficient way of finding the remote locator object, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the lighting element of the electronic device, when emitting light, emits light onto a portion of a physical environment of the electronic device that is within a field of view of the one or more cameras (914), such as described in FIG. 8D (e.g., the lighting element is facing a respective direction such that when the lighting element is turned on, the scene that is captured by the one or more cameras is brightened due to the lighting element).

Thus, the effective area of the lighting element (e.g., the portion of the environment that is brightened by the lighting element) at least partially overlaps with the field of view of the one or more cameras (e.g., the portion of the environment that is captured by the one or more cameras). In some embodiments, the one or more cameras and/or the lighting element are located on a side other than the side that the display generation device is located. For example, the one or more cameras and the lighting element are located on the opposite side of the display generation component such that the user is able to see the display while the one or more cameras captures images to find the remote locator object.

The above-described manner of finding a remote locator object (e.g., using one or more lighting elements to brighten the environment to improve the ability to identify and find the remote locator object) provides a quick and efficient way of finding the remote locator object (e.g., by using lighting elements to increase the brightness of the environment that is being captured by the one or more cameras of the device), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the one or more cameras are located on a first side of the electronic device, and the lighting element is located on the first side of the electronic device (916), such as described in FIG. 8D (e.g., the lighting element and the one or more cameras are located on the same side of the electronic device, optionally opposite of the display generation component).

The above-described manner of finding a remote locator object (e.g., using one or more lighting elements that are located on the same side of the electronic device as the one or more cameras to illuminate the environment to improve the ability to identify and find the remote locator object) provides a quick and efficient way of finding the remote locator object, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the lighting element is used as a flash for the one or more cameras when the electronic device is capturing media using the one or more cameras in a media capture application (918), such as described in FIG. 8D (e.g., the lighting element used to brighten the environment to locate the remote locator object is the same lighting element that is used as a flash when using the one or more cameras to take pictures and/or videos using a camera application on the electronic device.

The above-described manner of illuminating the environment to assist in finding the remote locator object (e.g., using the same lighting elements to illuminate the environment that is used as a flash when taking a picture or video using the one or more cameras) provides a quick and efficient way of finding the remote locator object, which simplifies the interaction between the user and the electronic device and enhances the operability of the electronic device and makes the user-device interface more efficient (e.g., without requiring multiple lighting elements), which additionally reduces power usage and improves battery life of the electronic device by enabling the user to use the electronic device more quickly and efficiently, while reducing errors in usage.

In some embodiments, the user interface for locating the remote locator object includes a representation of a portion of a physical environment of the electronic device that is within a field of view of the one or more cameras (920), such as representation 832 in FIG. 8B (e.g., the user interface includes a representation of the environment that is captured by the one or more cameras).

In some embodiments, the representation of the environment is visually modified to blur, obscure, reduce the resolution and/or reduce the level of detail of the captured images. In some embodiments, the representation of the environment is displayed in the background of the user interface. In some embodiments, displaying the representation of the environment provides an indication that the one or more cameras have been enabled and/or are assisting in locating the remote locator object. In some embodiments, if the one or more cameras are not enabled, the user interface does not include a representation of the captured environment.

The above-described manner of indicating that the one or more cameras of the device are capturing images of the environment to locate the remote locator object (e.g., by displaying a representation of the environment that is being captured by the one or more cameras) provides a quick and efficient way of indicating that the one or more cameras are in use, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, in accordance with the determination that the one or more criteria are satisfied, the electronic device displays (922), in the user interface, an indication that additional light is needed to locate the remote locator object, such as textual description 838 in FIG. 8D (e.g., when the one or more criteria are satisfied such that the user interface includes the selectable option that is selectable to emit light from a lighting element, the user interface includes an indication that the one or more criteria are satisfied and that more light is required and/or that enabling the lighting element is recommended (e.g., to assist in locating the remote locator object)). In some embodiments, the indication is a textual description that more light is required. In some embodiments, the indication is a graphical element that indicates that more light is required.

The above-described manner of locating a remote locator object (e.g., by displaying an indication that more light is required when the ambient light is below a threshold luminance) provides a quick and efficient way of finding the remote locator object (e.g., by automatically determining that more light is required and instructing the user to enable a lighting element to illuminate the environment), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the user interface includes an indication of an identifier associated with the remote locator object (924), such as textual indication 818 in FIG. 8B (e.g., the user interface includes the identifier of the remote locator, for example, to indicate which remote locator object is being located). In some embodiments, the user interface includes a graphical identifier, a textual identifier, or any other suitable identifier, optionally including the name of the owner of the remote locator object. For example, the user interface includes a textual description "John's Keys" In some embodiments, the graphical and/or textual identifier are selected via a process described above with respect to method 700.

The above-described manner of indicating the remote locator object being located (e.g., by displaying an indication of the identifier being located) provides a quick and efficient way of identifying the remote locator object being located, which simplifies the interaction between the user and the electronic device and enhances the operability of the electronic device and makes the user-device interface more efficient (e.g., without requiring the user to perform additional inputs and/or interrupt the finding process to determine which remote locator object is being located), which additionally reduces power usage and improves battery life of the electronic device by enabling the user to use the electronic device more quickly and efficiently, while reducing errors in usage.

In some embodiments, while not displaying the selectable option that is selectable to emit light from the lighting element of the electronic device in the user interface, the electronic device determines (926) that the one or more criteria have become satisfied, such as in FIG. 8C illustrating device 500 not displaying selectable option 836 and subsequently detecting that the ambient luminance has dropped below the threshold level in FIG. 8D (e.g., while displaying the user interface without the selectable option that is selectable to emit light from a lighting element of the electronic device, determining that the criteria for displaying the selectable option have become satisfied). For example, while in the process to find the remote locator object, detecting that the ambient light has reduced to below a threshold amount of luminance (e.g., the user walked into a dark room, the sun set, a light turned off, etc.).

In some embodiments, in response to determining that the one or more criteria have become satisfied, the electronic device updates (928) the user interface to include the selectable option that is selectable to emit light from the lighting element of the electronic device, such as in FIG. 8D (e.g., in response to determining that the criteria have become satisfied, displaying the selectable option for enabling the lighting element).

The above-described manner of displaying a selectable option that is selectable to turn on a lighting element if certain criteria are satisfied provides a quick and efficient way of improve visibility while looking for the remote locator object (e.g., by automatically displaying the selectable option for enabling the lighting element when needed, without requiring the user to perform additional inputs to determine whether enabling a lighting element would help with locating the remote locator object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the selectable option that is selectable to emit light from the lighting element of the electronic device in the user interface, the electronic device determines (930) that a second set of one or more criteria are satisfied, such as in FIG. 8D illustrating device 500 displaying selectable option 836 and subsequently detecting that the ambient luminance has risen above the threshold level in FIG. 8E (e.g., while displaying the user interface with the selectable option that is selectable to emit light from a lighting element of the electronic device, determining that a second set of criteria are satisfied).

In some embodiments, the second set of criteria are satisfied when the first set of criteria are no longer satisfied. For example, while in the process to find the remote locator object, detecting that the ambient light has increased to above the threshold amount of luminance (e.g., the user walked into a brighter room, a light turned on, etc.). In some embodiments, the second set of criteria includes the same luminance threshold as the luminance threshold of the first set of criteria. In some embodiments, the second set of criteria includes a different luminance threshold than the luminance threshold of the first set of criteria. For example, the luminance threshold exhibits a hysteresis effect such that the luminance threshold for the first set of criteria is lower than the luminance threshold for the second criteria (e.g., lower by 10 lux, 50 lux, 100 lux, 500 lux, 5%, 10%, 30%, 50%, etc.). For example, when the selectable option is displayed, the ambient light level has to increase to above a level that is higher than the level that caused the selectable option to be displayed in order for the selectable option to be removed from display. In some embodiments, implementing a hysteresis effect prevents the selectable option from rapidly switching back and forth from being displayed and not being displayed, for example, if the ambient luminance is at or near the threshold level.

In some embodiments, in response to determining that the second set of one or more criteria are no longer satisfied, the electronic device ceases (932) to display the selectable option that is selectable to emit light from the lighting element of the electronic device, such as in FIG. 8E (e.g., while displaying the user interface with the selectable option that is selectable to emit light from a lighting element of the electronic device, determining that the second criteria for ceasing display of the selectable option are satisfied, and in response to determining that the second criteria are satisfied, ceasing display of the selectable option for enabling the lighting element). In some embodiments, if the second criteria are satisfied, the lighting element is automatically disabled (e.g., turned off, optionally only if the lighting element was turned on as a result of a user input selecting the selectable option).

The above-described manner of displaying a selectable option that is selectable to turn on a lighting element (e.g., when certain criteria are satisfied, but ceasing display of the selectable option of the criteria are no longer satisfied) provides a quick and efficient way of improve visibility while looking for the remote locator object (e.g., by automatically ceasing display of the selectable option for enabling the lighting element when no longer needed, without requiring the user to perform additional inputs to determine whether enabling a lighting element would help with locating the remote locator object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the one or more criteria include one or more of a criterion that is satisfied when a level of ambient light in a physical environment of the electronic device is less than a threshold level, and a criterion that is satisfied when a distance between the electronic device and the remote locator object is less than a threshold distance (934), such as described in FIG. 8D and FIG. 8I (e.g., the one or more criteria includes a requirement that the ambient light is less than a luminance threshold (e.g., less than 10 lux, 50 lux, 100 lux, 500 lux, 1000 lux, etc.)).

In some embodiments, the one or more criteria includes a requirement that the current time of day is within a predetermined time window (e.g., after sunrise, after 30 minutes before sunrise, etc., before sunset, before 30 minutes after sunset, etc.), optionally alternatively to the requirement that the ambient light is less than the luminance threshold. In some embodiments, the one or more criteria includes a requirement that the distance between the device and the remote locator object is less than a first threshold distance (e.g., less than 5 feet, 10 feet, 30 feet, 50 feet, 100 feet, etc.). In some embodiments, the first threshold distance is the distance within which the device initiates a compass-style finding mode to find the remote locator object (e.g., as opposed to a map navigation mode). In some embodiments, the first threshold distance is the distance within which the one or more cameras of the device are able to accurately identify the remote locator object and/or the distance within which the lighting element is able to illuminate the environment around the remote locator object. In some embodiments, the one or more criteria includes a requirement that the distance between the device and the remote locator object is more than a second threshold distance (e.g., more than 1 foot, 3 feet, 6 feet, 10 feet, etc.). In some embodiments, the second threshold distance is a distance within which the device is able to directly communicate with the remote locator object to determine an accurate position of the remote locator object (e.g., the distance within which the device is connected with the remote locator object via Bluetooth). In some embodiments, the second threshold distance is a distance within which the one or more cameras of the device is not used to determine the location of the remote locator object and enabling the lighting element optionally does not assist in locating the remote locator object.

The above-described manner of displaying a selectable option that is selectable to turn on a lighting element (e.g., when the remote locator object is within a threshold distance of the device and when the ambient light is less than a threshold amount) provides a quick and efficient way of improve visibility while looking for the remote locator object (e.g., by automatically displaying the selectable option for enabling the lighting element if the lighting element is able to assist in locating the locator object, without requiring the user to perform additional inputs to determine whether enabling a lighting element would help with locating the remote locator object), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the electronic device receives (936), via the one or more input devices, selection of the selectable option to emit light from the lighting element of the electronic device, such as in FIG. 8F (e.g., a tap input on the selectable option for turning on the lighting device).

In some embodiments, in response to receiving the selection of the selectable option (938), the electronic device emits (940) light from the lighting element of the electronic device, such as in FIG. 8G (e.g., turning on the lighting element such that the environment is illuminated by the lighting element).

In some embodiments, the electronic device updates (942) the user interface to include a second selectable option that is selectable to cease emitting light from the lighting element of the electronic device, such as selectable option 836 being updated to become selectable to turn off the lighting element in FIG. 8G (e.g., replacing the selectable option with a second selectable option or updating the selectable option to be selectable to cause the lighting element to turn off).

The above-described manner of disabling the lighting element (e.g., while the lighting element is on, replacing the selectable option for turning on the lighting element with a selectable option for turning of the lighting element) provides a quick and efficient way of disabling the lighting element, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while displaying the user interface for locating the remote locator object (944), while the electronic device is further than a threshold distance from the electronic device, the electronic device displays (946), in the user interface, a first user interface for locating the remote locator object, such as in FIG. 8B (e.g., if the device is farther than a threshold distance from the remote locator object, the device is in a first locator mode).

For example, if the device is more than 30 feet, 50 feet, 100 feet, ½ mile, etc. from the remote locator object, then the process to find the remote locator object includes displaying a representation of a map and directions to travel to the location of the remote locator object. In some embodiments, if the device is more than a threshold distance such as 10 feet, 20 feet, 30 feet, etc. from the remote locator object, then the user interface includes one or more graphical elements (e.g., a point cloud) that are optionally biased in the direction of the remote locator object.

In some embodiments, while displaying the first user interface for locating the remote locator object, the electronic device determines (948) that the electronic device is closer than the threshold distance from the electronic device, such as in FIG. 8C (e.g., if the device is less than 10 feet, 20 feet, 30 feet, etc. from the remote locator object, the user interface replaces display of the point cloud with an arrow that is pointing toward the direction of the remote locator object (e.g., a compass style arrow), which optionally includes an indication of the distance between the device and the remote locator object).

Thus, as the device changes orientation and/or as the device moves around the physical environment, the arrow is updated to point towards the remote locator object. In some embodiments, if the device is less than 1 foot, 3 feet, 6 feet, etc. from the remote locator object, the user interface replaces display of the arrow with a representation of the remote locator object and a circular indicator around the remote locator object that reduces in size and merges into the representation of the remote locator object as the user approaches the remote locator object and reaches the location of the remote locator object.

In some embodiments, in response to determining that the electronic device is closer than the threshold distance from the electronic device, the electronic device updates (950) the user interface to include a second user interface, different from the first user interface, for locating the remote locator object, such as in FIG. 8C (e.g., updating the user interface to display a different user interface element for indicating the location of the remote locator object).

For example, if the device is less than 10 feet, 20 feet, 30 feet, etc. from the remote locator object, the user interface replaces display of the point cloud with an arrow that is pointing toward the direction of the remote locator object (e.g., a compass style arrow). In some embodiments, the user interface provides live feedback of the distance and location of the remote locator object relative to the electronic device. In some embodiments, if the device is less than a threshold distance from the remote locator object (e.g., 10 feet, 30 feet, 50 feet, etc.), and the device is held upwards to face the remote locator object, the device enters into an augmented reality finding mode in which a representation of the environment is displayed in the user interface, optionally with a virtual element that indicates the location of the remote locator object (e.g., a virtual representation of balloon attached to the remote locator object, a virtual arrow pointed at the remote locator object, etc.).

The above-described manner of displaying different user interfaces for finding the remote locator object based on the distance to the remote locator object provides a quick and efficient way of finding the remote locator object (e.g., by updating the user interface as the distance to the remote locator object changes to optimize the finding experience and provide a process that's optimized for the distance), which simplifies the interaction between the user and the electronic device and enhances the operability of the electronic device and makes the user-device interface more efficient (e.g., without requiring the user to perform additional user inputs to change the type of finding mode that is used), which additionally reduces power usage and improves battery life of the electronic device by enabling the user to use the electronic device more quickly and efficiently, while reducing errors in usage.

In some embodiments, the first user interface is a user interface that includes information about the remote locator object (952), such as user interface 800 in FIG. 8A (e.g., the user interface associated with the remote locator object includes a selectable option that is selectable to initiate the process to find the remote locator object). In some embodiments, the user interface associated with the remote locator object includes options for changing one or more settings of the remote locator object, such as to rename the remote locator object (e.g., as discussed in more detail above with respect to method 700) and/or includes one or more respective user interface elements that include information about the remote locator object.

The above-described manner of initiating a process to find a remote locator object (e.g., in response to selection of a selectable option from a user interface associated with the remote locator object provides a quick and efficient way of finding the remote locator object, which simplifies the interaction between the user and the electronic device and enhances the operability of the electronic device and makes the user-device interface more efficient (e.g., without requiring the user to perform additional user inputs to navigate to specific user interfaces to initiate the process to find the remote locator object), which additionally reduces power usage and improves battery life of the electronic device by enabling the user to use the electronic device more quickly and efficiently, while reducing errors in usage.

It should be understood that the particular order in which the operations in FIGS. 9A-9G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700, 1100, and 1300) are also applicable in an analogous manner to method 900 described above with respect to FIGS. 9A-9G. For example, locating a remote locator object described above with reference to method 900 optionally has one or more of the characteristics of providing user interfaces for defining identifiers for remote locator objects, providing information associated with a remote locator object, displaying notifications associated with a trackable device, etc., described herein with reference to other methods described herein (e.g., methods 700, 1100, and 1300). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 9A-9G are, optionally, implemented by components depicted in FIGS. 1A-1B. For example, displaying operations 902, 906, 908, 922, and 946 and receiving operations 904 and 936 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Providing Information Associated with a Remote Locator Object

Users interact with electronic devices in many different manners. In some embodiments, an electronic device is able to track the location of an object such as a remote locator object. In some embodiments, one or more settings of a remote locator object and/or of the electronic device and/or the status of the remote locator object and/or electronic device can affect the functionality of the remote locator object, such as the remote locator object's ability to provide location information, for example. The embodiments described below provide ways in which an electronic device provides information associated with a remote locator object and/or provides mechanisms for adjusting operation of the remote locator object or the electronic device, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 10B:
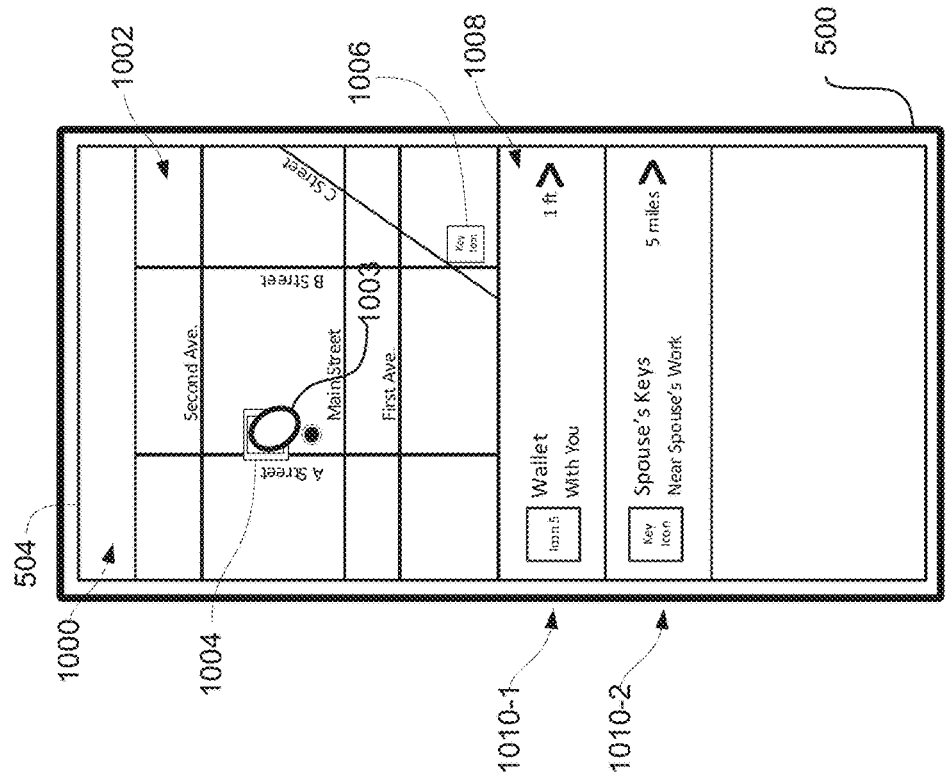
FIGS. 10A-10T illustrate exemplary ways in which an electronic device provides information associated with a remote locator object and/or provides mechanisms for adjusting operation of the remote locator object or the electronic device in accordance with some embodiments of the disclosure.
Figure 10A:
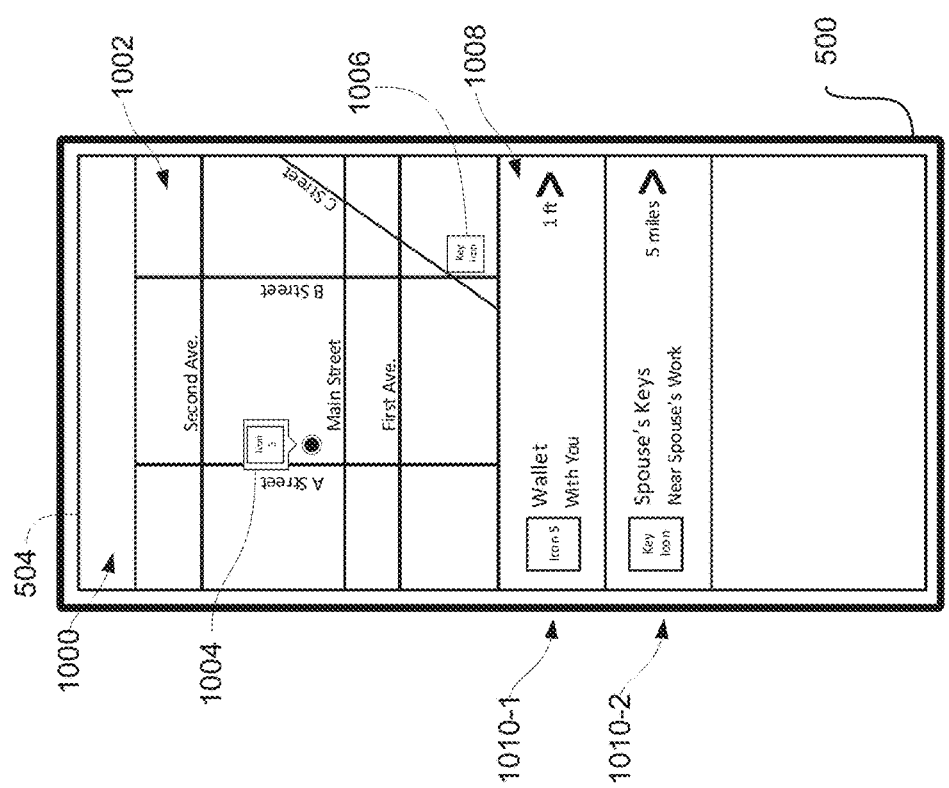

FIGS. 10A-10T illustrate exemplary ways in which an electronic device 500 provides information associated with a remote locator object and/or provides mechanisms for adjusting operation of the remote locator object or the electronic device in accordance with some embodiments of the disclosure. The embodiments in these figures are used to illustrate the processes described below, including the processes described with reference to FIGS. 11A-11I.

FIG. 10A illustrates electronic device 500 displaying user interface 1000 (e.g., via a display device, etc.). In some embodiments, user interface 1000 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 1000 is a user interface for displaying a plurality of tracked objects, similar to user interface 636 described above with respect to FIGS. 6L-6N (e.g., sharing similar characteristics and behaviors as user interface 636). In some embodiments, user interface 1000 includes representation 1002 of a map that includes one or more representations of tracked objects. For example, representation 1002 of the map includes icon 1004 corresponding to the "Wallet" tracked object and is displayed at a location on representation 1002 of the map associated with the determined location of the "Wallet" tracked object. Similarly, representation 1002 of the map optionally includes icon 1006 corresponding to the "Spouse's Keys" tracked object and is displayed at a location on representation 1002 of the map associated with the determined location of the "Spouse's Key" tracked object. In some embodiments, the "Wallet" and "Spouse's Keys" tracked objects are remote locator objects that are associated with (e.g., attached to) the user's wallet and the user's spouse's keys. In some embodiments, tracked objects other than remote locator objects are displayed in representation 1002 of the map, such as mobile phones, computers, laptops, wearable devices, headphones, GPS trackers, or any other suitable electronic device capable of determining location information.

In some embodiments, user interface 1000 includes list 1008 (e.g., similar to list 644 described above with respect to FIGS. 6L-6N) that includes one or more entries associated with the one or more trackable items that are displayed on representation 1002 of the map. For example, in FIG. 10A, list 1008 includes entry 1010-1 and entry 1010-2. In some embodiments, entry 1010-1 corresponds to the "Wallet" tracked object (e.g., represented on representation 1002 of the map by icon 1004), and entry 1010-2 corresponds to the "Spouse's Keys" tracked object (e.g., represented on representation 1002 of the map by icon 1006).

In some embodiments, selection of a respective icon on representation 1002 and/or a respective entry on list 1008 causes display of a user interface associated with the respective tracked object associated with the selected item. For example, in FIG. 10B, a user input 1003 (e.g., a tap input) is received selecting icon 1004 corresponding to the "Wallet" tracked object. In some embodiments, in response to receiving user input 1003, device 500 displays user interface 1012 (e.g., optionally replacing list 1008 with user interface 1012 and displayed concurrently with representation 1002 of the map), as shown in FIG. 10C. In some embodiments, user interface 1012 is a user interface associated with the "Wallet" tracked object, similar to user interface 600 described above with respect to FIG. 6A. As shown in FIG. 10C, user interface 1012 encompasses less than the entire display area of touch screen 504. For example, user interface 1012 has a preview mode and a full screen mode, as will be described in further detail below.

As shown in FIG. 10C, user interface 1012 includes a representation of an identifier 1014 for the "Wallet" remote locator object, and a representation of the current location 1016 of the "Wallet" remote locator object. In some embodiments, identifier 1014 is a user-selected identifier (e.g., that was optionally selected via a process described above with respect to method 700) for the respective remote locator object indicating that user interface 1012 is the user interface for the remote locator object identified as "Wallet". In some embodiments, user interface 1012 includes selectable option 1020 that is selectable to initiate a process to find and/or locate the respective remote locator object (e.g., in a manner similar to described above with respect to method 900) and selectable option 1022 to cause the respective remote locator object to emit an audible sound.

In some embodiments, user interface 1012 includes one or more information modules that provides status information that is relevant to the respective remote locator object. In some embodiments, the one or more information modules are included on user interface 1012 when certain criteria associated with the respective information module are satisfied (and are optionally not included on user interface 1012 when the criteria are not satisfied). For example, in FIG. 10C, user interface 1012 includes information module 1018 that indicates that the "Wallet" remote locator object is in the process of finishing setup. In some embodiments, user interface 1012 includes information module 1018 if the respective remote locator object has not yet completed setup. In some embodiments, a remote locator object is in the process of finishing setup if one or more settings are being configured and/or one or more initialization steps are being performed (e.g., optionally which was initiated by device 500 or another device, in a process similar to described above with respect to FIGS. 6P-6R). In some embodiments, one or more functions of the remote locator object are not available until setup is completed. In some embodiments, module 1018 is selectable to display more information associated with respective module (e.g., information associated with the conditions that caused the respective module to be included in user interface 1012). For example, module 1018 is optionally selectable to display the status of the setup, to interrupt the setup, and/or to change one or more setup settings of the respective remote locator object. In some embodiments, module 1018 is not selectable to display additional information.

Figure 10D:
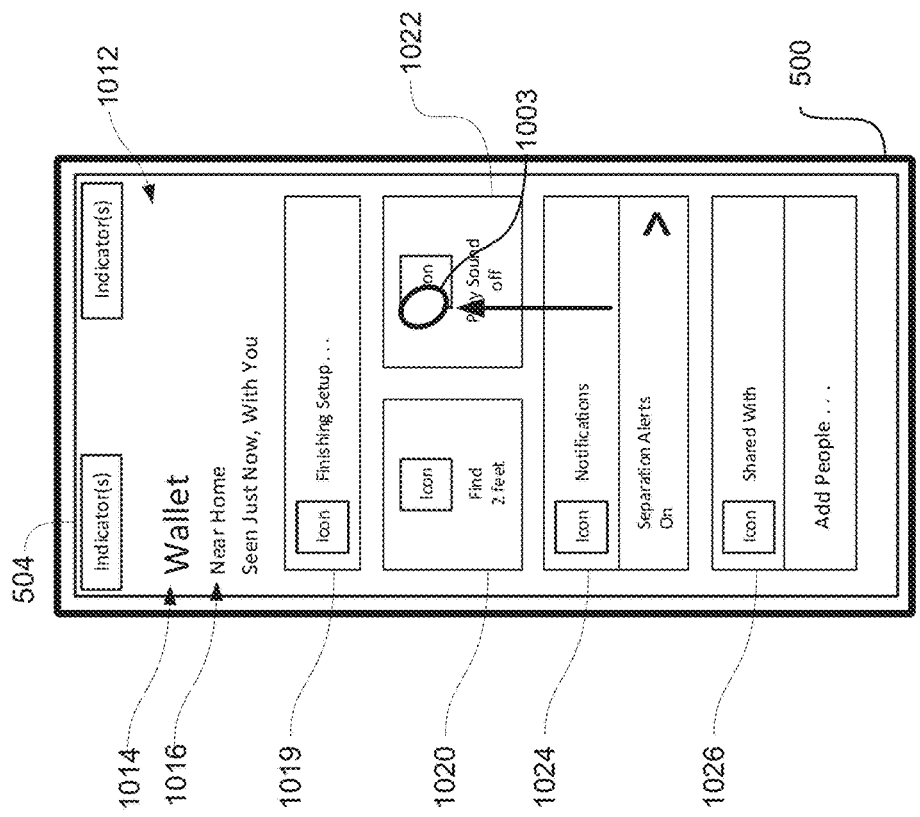
Figure 10C:
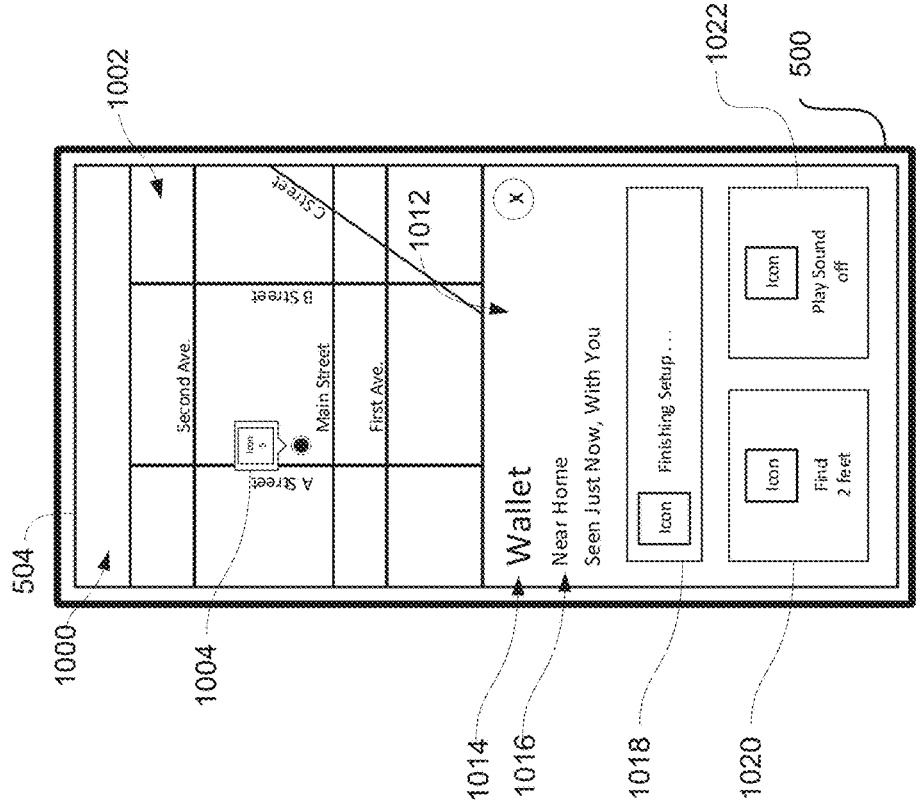

In FIG. 10D, an upward swipe of contact 1003 in user interface 1012 is received. In some embodiments, in response to receiving the upward swipe from contact 1003, user interface 1012 is updated to expand the size of user interface 1012, as shown in FIG. 10D (e.g., optionally to encompass more of the display area of touch screen 504). As shown, in some embodiments, user interface 1012 is optionally displayed in a small mode and concurrently with another user interface or optionally displayed in a full screen mode. In some embodiments, user interface 1012 is not displayed in a small mode and in response to user input 1003 in FIG. 10B, device 500 displays user interface 1012 in a full screen mode such as in FIG. 10D (e.g., without requiring an upward swipe of contact 1003 as shown in FIG. 10D).

Figure 10F:
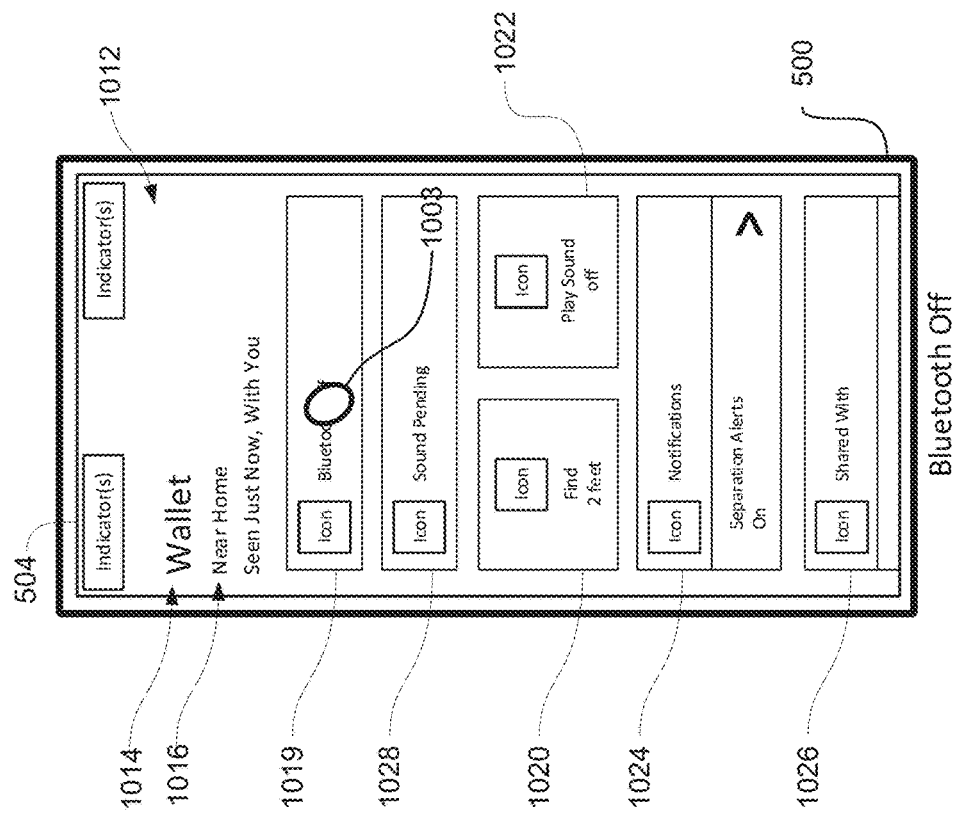
Figure 10E:
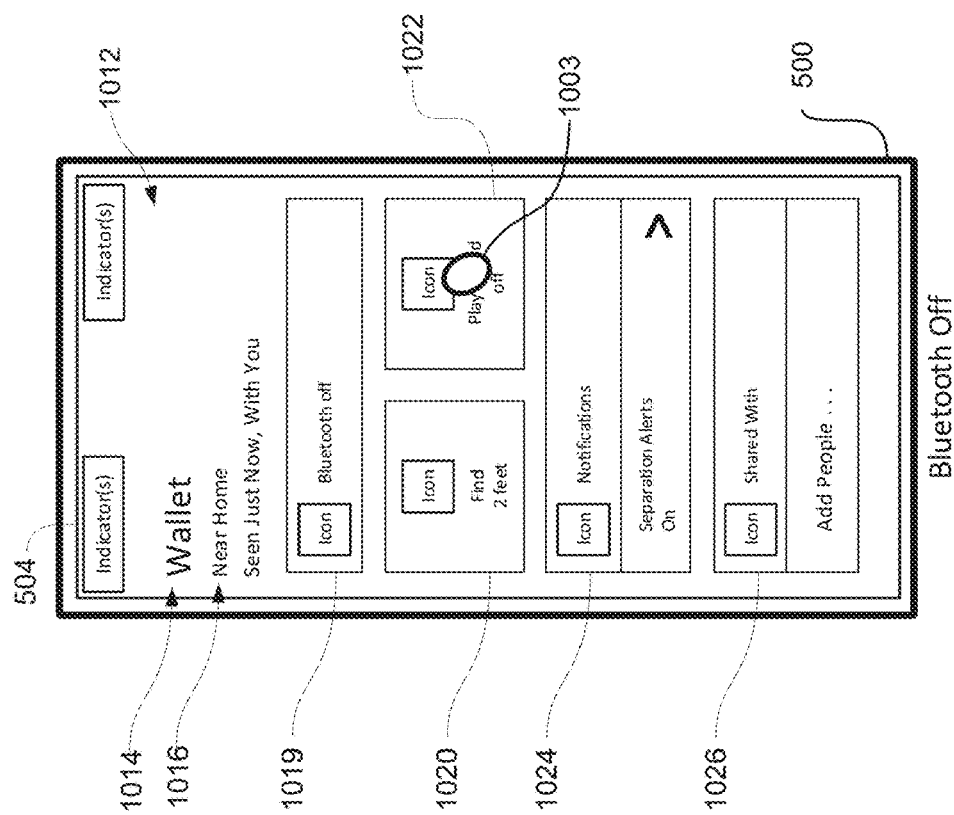

In FIG. 10E, the criteria for displaying module 1018 is no longer satisfied (e.g., the remote locator object is not in the process of completing setup because it has completed setup), and the criteria for module 1019 is satisfied such that module 1019 is displayed in user interface 1012. In some embodiments, module 1019 indicates that the Bluetooth protocol/functionality of device 500 is disabled and the criteria for module 1019 is that the Bluetooth protocol of device 500 is disabled. For example, if Bluetooth is disabled such that Bluetooth devices are unable to communicate with device 500, user interface 1012 includes module 1019. In some embodiments, the "Wallet" remote locator object communicates with device 500 via the Bluetooth protocol (e.g., continuously, periodically, at least at some times, etc.) such that if the Bluetooth protocol is disabled, one or more features of the remote locator object are optionally unavailable. For example, in some embodiments, the remote locator object is not able to provide location information directly to device 500 and the location information of the remote locator object may be delayed or disabled. In such circumstances, device 500 is optionally not able to directly communicate with the remote locator object and/or device 500 is optionally not able to issue commands to the remote locator object directly (optionally device 500 is still able to issue commands via another electronic device that is able to communicate directly with the remote locator object, for example by issuing the command to the other electronic device, which forwards the command to the remote locator object).

For example, in FIG. 10E, a user input 1003 is received selecting selectable option 1022. In some embodiments, because Bluetooth is disabled, in response to receiving user input 1003, device 500 is unable to communicate directly with the remote locator object to issue the command to cause the remote locator object to emit a sound. In some embodiments, in response to receiving user input 1003, because the process to cause the remote locator object to emit the sound is in progress, user interface 1012 displays module 1028 indicating that emission of the sound is pending (e.g., optionally concurrently with module 1019), as shown in FIG. 10F. In some embodiments, module 1028 is displayed when the remote locator object is currently emitting a sound (e.g., optionally instead of when the command to cause the remote locator object to emit a sound is pending). In some embodiments, module 1028 is selectable to cancel the command to cause the remote locator object to emit a sound (e.g., or optionally to cause the remote locator object to stop emitting a sound).

In some embodiments, module 1019 is selectable to change the Bluetooth settings of device 500. For example, in FIG. 10F, while user interface 1012 includes module 1019, a user input 1003 is received selecting module 1019. In some embodiments, in response to receiving user input 1003, device 500 enables the Bluetooth protocol of device 500 such that device 500 is able to connect to Bluetooth devices (e.g., without displaying another user interface and/or without ceasing display of user interface 1012), such as remote locator object 1001, as shown in FIG. 10G. In some embodiments, in response to receiving user input 1003, device 500 optionally displays a user interface for enabling Bluetooth and/or managing one or more connectivity settings (e.g., WiFi, Airplane mode, etc.). In FIG. 10G, because Bluetooth has been enabled (e.g., in response to receiving user input 1003 in FIG. 10F), device 500 is able to establish a wireless connection with remote locator object 1001 (e.g., via Bluetooth) and transmit the command to emit a sound to remote locator object 1001. As shown in FIG. 10G, remote locator object 1001 begins emitting a sound in response to receiving the command from device 500. In FIG. 10G, because Bluetooth is no longer disabled and device 500 is able to transmit the command to emit a sound to remote locator object 1001, user interface 1012 no longer includes module 1018 and module 1028.

FIG. 10H illustrates an embodiment in which airplane mode is enabled on device 500 and the user has marked the respective remote locator object as lost (e.g., via selection of a selectable option for marking the remote locator object as lost in user interface 1012). In some embodiments, marking a respective remote locator object as lost transmits a command to an external server (e.g., optionally a server that maintains and/or operates remote locator objects) that the remote locator object is lost. In some embodiments, when a respective remote locator object is marked as lost, users are able to see that the remote locator object is lost (e.g., for example, as a module on a user interface of the remote locator object, such as module 1036, as will be described below). In some embodiments, when a remote locator object is lost, a user that finds the remote locator object is able to see a message from the owner of the remote locator object and/or contact the owner of the remote locator object (e.g., to provide the owner with location information, to email, to call, and/or to text the owner with location information). In some embodiments, when a respective remote locator object is marked as lost, one or more personally identifiable information associated with the owner of the remote locator object is anonymized to protect the privacy of the owner of the remote locator object (e.g., name, address, contacts, location history, etc.).

In some embodiments, enabling airplane mode on device 500 causes one or more wireless connectivity protocols of device 500 (e.g., WiFi, Bluetooth, NFC, etc.) to be disabled (e.g., optionally causes all of the wireless connectivity protocols to be disabled). In some embodiments, when airplane mode is enabled on device 500, device 500 is unable to directly communicate with the respective remote locator object (e.g., in a manner similar to discussed above with respect to FIGS. 10E-10G). Similarly, when airplane mode is enabled on device 500, device 500 is optionally unable to issue a command to an external server indicating that the remote locator object is lost. Thus, in FIG. 10H, because airplane mode is enabled, device 500 is unable to mark the remote locator as lost (e.g., which optionally includes transmitting appropriate commands to the remote locator object and/or an external server in communication with the remote locator object from device 500). In some embodiments, because airplane mode is enabled, user interface 1012 includes module 1032 that indicates that airplane mode is enabled. In some embodiments, because device 500 is in the process of marking the respective remote locator object as lost (e.g., actively issuing the command to an external server, or waiting until device 500 is able to communicate with the external server), user interface 1012 includes module 1034 that indicates that the respective remote locator object is in the process of being marked as lost (e.g., being configured to lost mode). In some embodiments, module 1034 is selectable to cancel the command to cause the remote locator object to be marked as lost.

In FIG. 10H, while user interface 1012 includes module 1032, a user input 1003 is received selecting module 1032. In some embodiments, in response to receiving user input 1003, device 500 disables airplane mode such that device 500 is able to wirelessly connect to the remote locator object (e.g., if the respective remote locator object is within the effective range of device 500) and/or external servers (e.g., without displaying another user interface and/or without ceasing display of user interface 1012), as shown in FIG. 10I. In some embodiments, in response to receiving user input 1003, device 500 optionally displays a user interface for enabling and/or managing one or more connectivity settings (e.g., WiFi, Airplane mode, Bluetooth, etc.). In FIG. 10I, because airplane mode has been disabled (e.g., in response to receiving user input 1003 in FIG. 10H), device 500 is able to establish a connection with an external server to mark the respective remote locator object as lost. As shown in FIG. 10I, the respective remote locator object has been successfully marked as lost and in response, user interface 1012 includes module 1036 that indicates that the respective remote locator object is operating in lost mode (e.g., and optionally no longer includes module 1032 and module 1034).

FIG. 10J illustrates an embodiment in which the battery of the respective remote locator object is at a low level and the location of the respective locator object is being shared with the user's spouse. In some embodiments, in accordance with a determination that the respective remote locator object has a low battery level, user interface 1012 includes module 1038 indicating that the respective remote locator object has a low battery level. In some embodiments, in accordance with a determination that the location of the respective remote locator object is being shared with another user, user interface 1012 includes module 1040 indicating that the location of the respective remote locator object is being shared with another user. In some embodiments, module 1040 includes an identifier (e.g., the name, the title, etc.) of the person with whom the location of the respective remote locator is shared. In some embodiments, module 1040 is selectable to change one or more sharing settings of the respective remote locator object, such as to add and/or remove people with whom the location of the respective remote locator object is shared and/or to change the duration of the sharing.

In FIG. 10J, a user input 1003 is received selecting module 1038. In some embodiments, in response to receiving user input 1003, device 500 displays user interface 1042, as shown in FIG. 10K. In some embodiments, user interface 1042 includes instructions for changing the battery of the respective remote locator object. For example, in FIG. 10K, user interface 1042 includes a representation 1044 of a remote locator object, which is optionally animated to illustrate the process for disassembling the remote locator object and changing the battery. In some embodiments, user interface 1042 includes textual instructions 1046 of how to disassemble the remote locator object and change the battery. FIG. 10L illustrates representation 1044 animating to illustrate the disassembly of the remote locator object (e.g., twisting and opening to reveal the battery compartment).

Figure 10N:
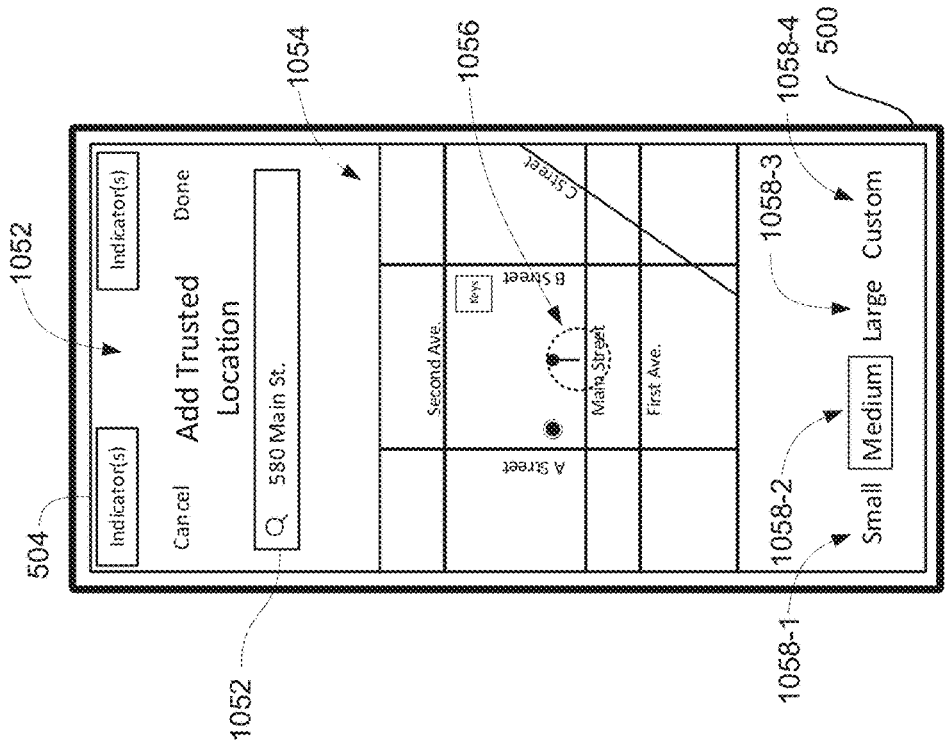
Figure 10M:
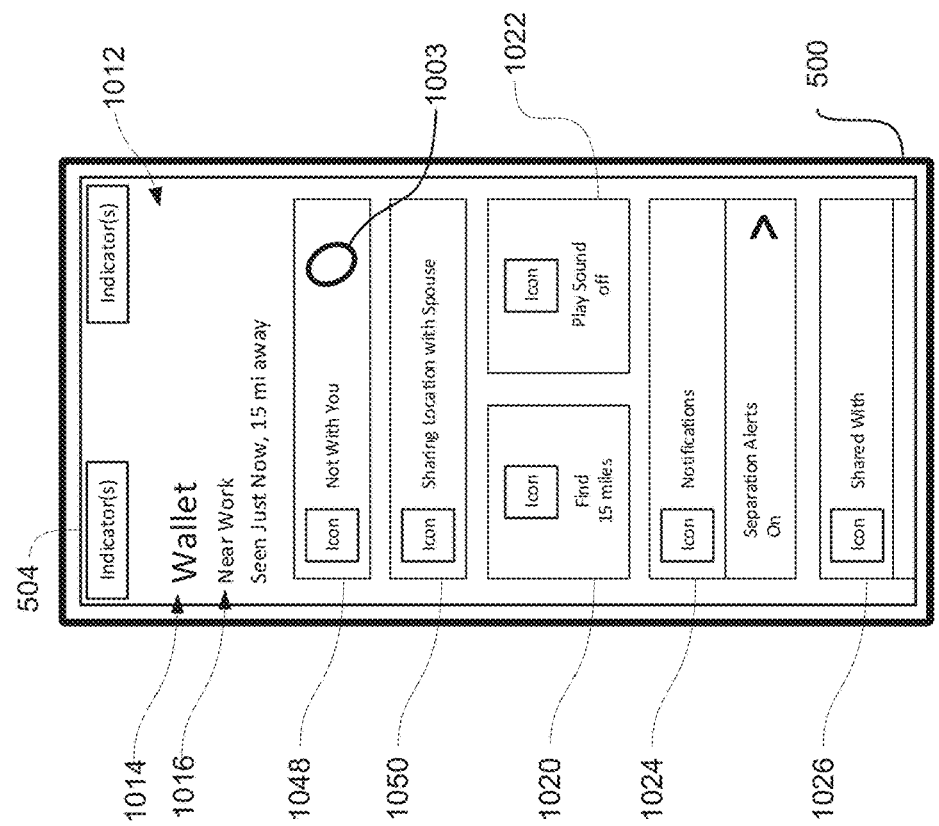

FIG. 10M illustrates an embodiment in which device 500 determines that the respective remote locator object is not with the user (e.g., has been separated from device 500, is at a location that is more than the threshold distance from device 500, such as 50 feet, 100 feet, 500 feet, 1 mile, etc., and/or is farther from the threshold distance from a safe and/or trusted location). In some embodiments, in accordance with a determination that the respective remote locator object is not with the user, user interface 1012 includes module 1048 that indicates that the respective remote locator object is not with the user. In some embodiments, module 1048 is selectable to display the current determined location of the respective remote locator object (e.g., display a map user interface, similar to user interface 1000 described above with respect to FIG. 10A).

In FIG. 10M, user interface 1012 includes module 1050 that indicates that the location of the respective remote locator object is shared with the spouse of the user. In some embodiments, the location of a remote locator object is able to be shared with other users such that other users are able to see the location of the remote locator object (e.g., using their own electronic devices). In some embodiments, the location of a remote locator object can be shared indefinitely or for a preset duration (e.g., for 1 hour, 2 hours, 12 hours, for the rest of the day, for 24 hours, etc.). In some embodiments, user interface 1012 includes module 1050 in accordance with a determination that the remote locator object is shared with another user. As shown in FIG. 10M, module 1050 includes an indication of the user with which the location is shared (e.g., the name of the user, the title of the user, etc.). In some embodiments, module 1050 is selectable to view and/or change one or more sharing settings of the remote locator object. For example, selection of module 1050 optionally causes display of a user interface in which a user is able to share location with a new person (or person with which the location was previously shared), terminate sharing with a currently shared person, and/or change the duration of sharing for currently shared people.

In some embodiments, module 1048 is selectable to mark the current location of the respective remote locator object as a safe and/or trusted location. For example, in FIG. 10M, a user input 1003 is received selecting module 1048. In some embodiments, in response to receiving user input 1003, device 500 displays user interface 1052, as shown in FIG. 10N. In some embodiments, user interface 1052 is a user interface for setting a trusted location for the respective remote locator object. In some embodiments, if a respective remote locator object is separated from the user (e.g., from device 500) by more than a threshold distance (e.g., more than 50 feet, 100 feet, 500 feet, 1 mile, etc.) but is located at or in a trusted location, a notification is not generated at device 500 to alert the user that the remote locator object is separated from the user. Thus, a trusted location is a location within which the remote locator object can be located without alerting the user that the remote locator object may be misplaced. In some embodiments, trusted locations can be fixed or dynamic locations. Examples of trusted locations can be the user's workplace, the user's home, the location of the user's car, etc.

In some embodiments, user interface 1052 includes text entry field 1052 in which a user is able to enter an address and add the trusted location via address entry. In some embodiments, user interface 1052 includes map 1054. In some embodiments, map 1054 includes an indication 1055 of the current location of device 500. In some embodiments, map 1054 includes pin 1056 which is initially located at the current determined location of the remote locator object, which the user is able to interact with and move around the map. In some embodiments, the trusted location can be added by moving pin 1056 to the desired location and setting the location as the trusted location (e.g., by clicking the "Done" affordance). In some embodiments, pin 1056 is fixed to the center of map 1054 and the user is able to set the trusted location by panning the map such that the pin is at the intended location. In some embodiments, pin 1056 is initially set to the currently determined location of the remote locator object.

In some embodiments, user interface 1052 includes radius options 1058-1 to 1058-4 for selecting the radius for the trusted location. For example, the user can select a small (e.g., selectable option 1058-1 for 50 feet, 100 feet, 200 feet, etc.), medium (e.g., selectable option 1058-2 for 100 feet, 200 feet, 500 feet, etc.), or large radius (e.g., selectable option 1058-3, 400 feet, 600 feet, 1000 feet, etc.) around the pin 1056 in which separation notifications are not triggered. In some embodiments, the user can select selectable option 1058-4 to provide a custom radius for the trusted location. In some embodiments, map 1054 displays a visual indication of the radius selected by the user (e.g., shown as a dotted circle around pin 1056). In some embodiments, the user is able to perform a pinch gesture on map 1054 to enlarge or reduce the size of the dotted circle and provide a custom radius. In some embodiments, in response to the user's gesture enlarging or reducing the size of the dotted circle, device 500 automatically moves the radius selection to selectable option 1058-4 corresponding to the custom radius option. In some embodiments, other methods of identifying and/or selecting a geographic location for a trusted location are possible and/or other methods of drawing a boundary for a trusted location. In some embodiments, a trusted location is a non-fixed location. For example, a trusted location can be an electronic device such that a pre-determined radius around the location of the electronic device is considered a trusted location. For example, if a remote locator object is within 10 feet of a user's child's primary electronic device (e.g., the user's child's phone), the remote locator object is considered to be in a trusted location (e.g., even if the remote locator object (and/or the user's child's primary electronic device) is more than the threshold distance from fixed trusted locations).

FIG. 10O illustrates an embodiment in which the location of the respective remote locator object is shared with another user for a limited duration. In FIG. 10O, in accordance with a determination that the location of the respective remote locator object is shared with a user named "Mike", user interface 1012 includes module 1060 indicating that the location of the respective remote locator object is shared with Mike. In some embodiments, if the sharing is of limited duration, module 1060 optionally includes an indication of the remaining duration of the sharing. For example, in FIG. 10O, the remaining duration for sharing location with Mike is two hours and module 1060 indicates that there are 2 hours of sharing remaining. In some embodiments, module 1060 is selectable to view and/or change one or more sharing settings of the remote locator object. For example, selection of module 1060 optionally causes display of a user interface in which a user is able to share location with a new person (or person with which the location was previously shared), terminate sharing with a currently shared person, and/or change the duration of sharing for currently shared people (e.g., similarly to selection of module 1050 descried above).

FIG. 10P illustrates an embodiment in which device 500 is displaying a user interface for a trackable object that is not owned by or otherwise associated with the user of device 500. In some embodiments, a trackable object is "owned" by a user (e.g., associated with the user's account) whose electronic device was first paired with the trackable object (e.g., the first person to pair with and initialize the trackable object) and/or who has been marked as the owner of the trackable object (e.g., the person that has set himself or herself as the owner of the trackable object or otherwise claimed ownership of the trackable object). For example, in FIG. 10P, user interface 1012 is associated with Bob's headphones (e.g., the trackable object is associated and/or paired with an account that is not the account of the user of device 500 and/or is not the currently active account on device 500). In some embodiments, Bob's headphones is a trackable device of which Bob is able to see the location. In some embodiments, because Bob is able to see the location of Bob's headphones, user interface 1012 includes module 1062 that indicates that Bob is able to see the location of Bob's headphones. In some embodiments, user interface 1012 includes the name of the owner of the device and/or the name of the user that can see the location of the trackable object because the user has a trusted relationship with the respective person. For example, the user of device 500 optionally is friends with Bob and/or has Bob as a known contact. In some embodiments, if the user does not have a pre-existing relationship with the owner of the device, user interface 1012 optionally does not include the name of the owner of the device or the name of the user that can see the location of the device. Thus, as described above, module 1062 is displayed in accordance with a determination that a criterion that user interface 1012 is associated with a trackable object that is owned by a user other than the user of device 500 (e.g., device 500 that is displaying user interface 1012 is not the device of the owner of the trackable object) is satisfied.

Figure 10R:
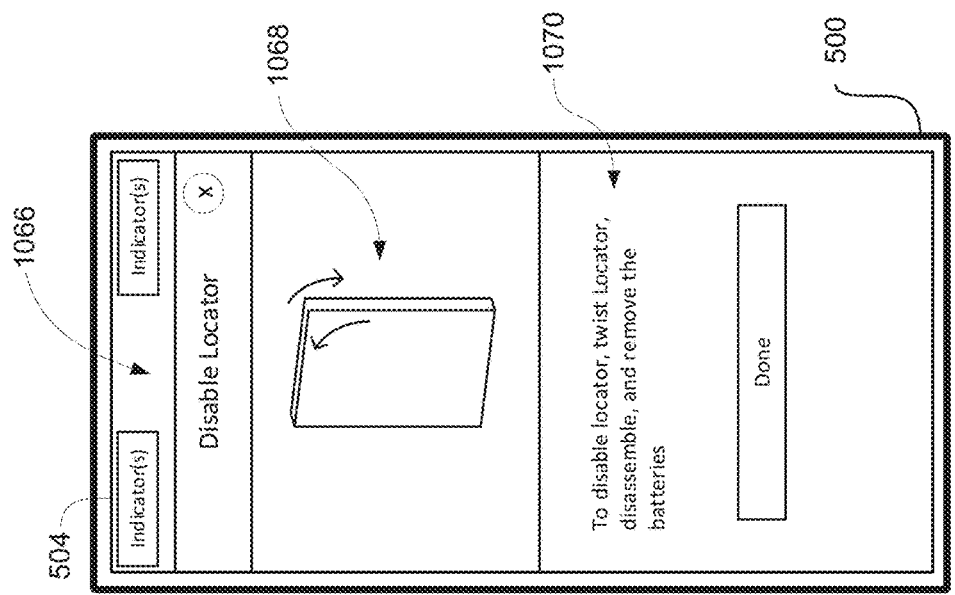
Figure 10Q:
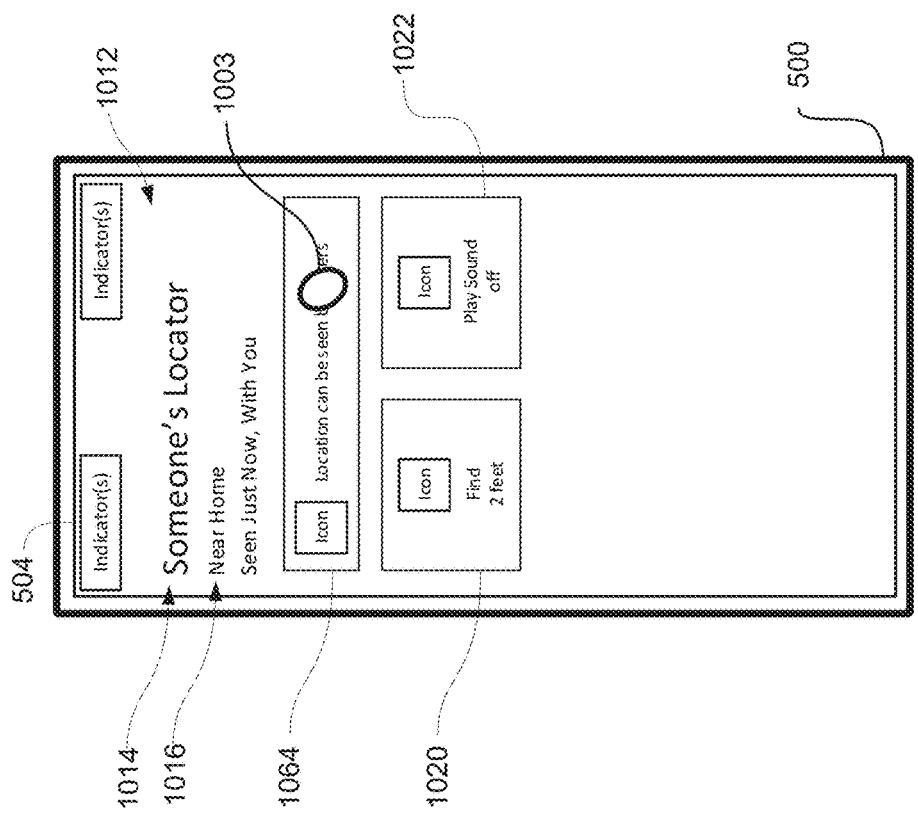
Figure 11A:
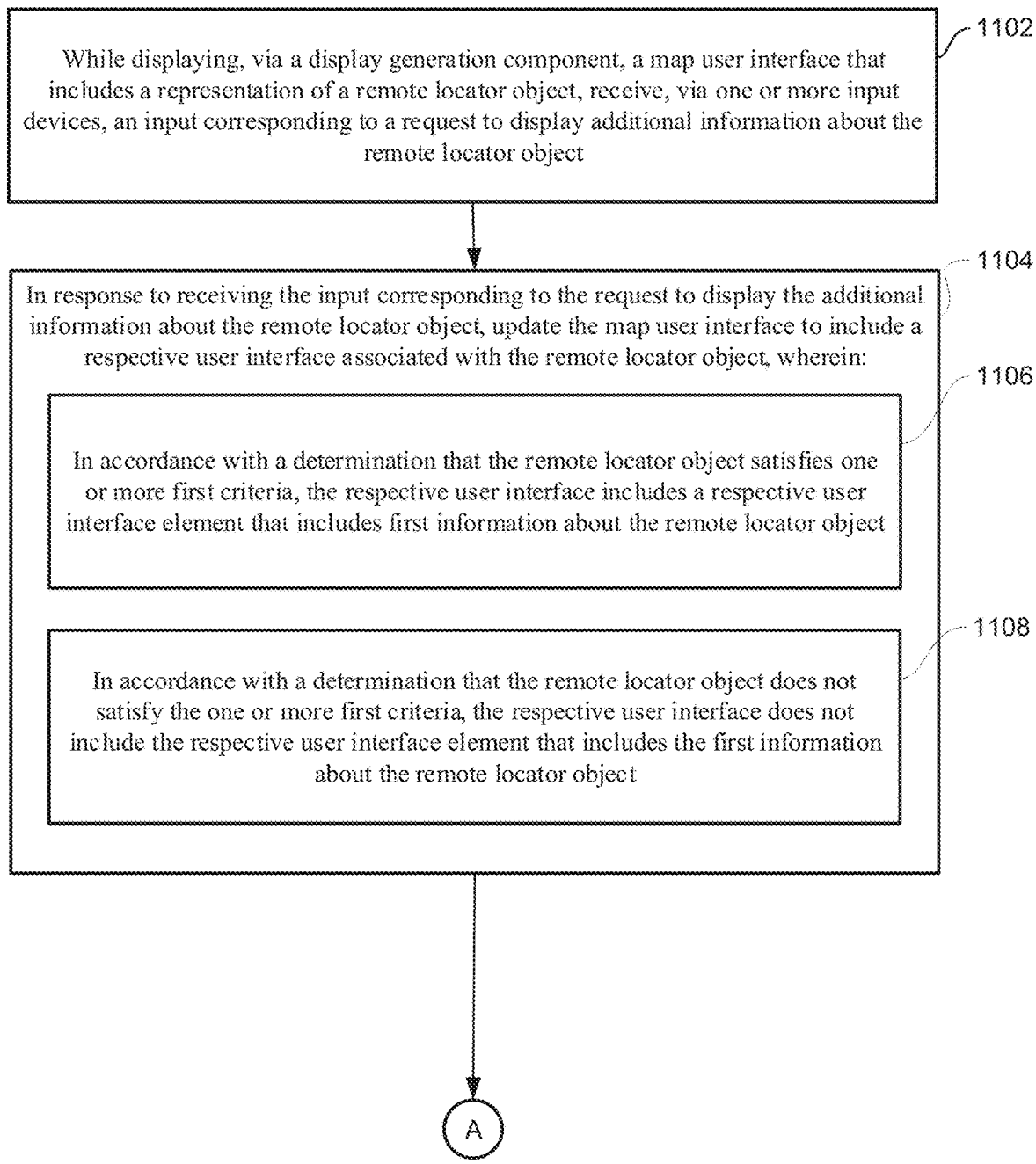
FIGS. 11A-11I are flow diagrams illustrating a method of providing information associated with a remote locator object and/or providing mechanisms for adjusting operation of the remote locator object or the electronic device in accordance with some embodiments of the disclosure.
Figure 11B:
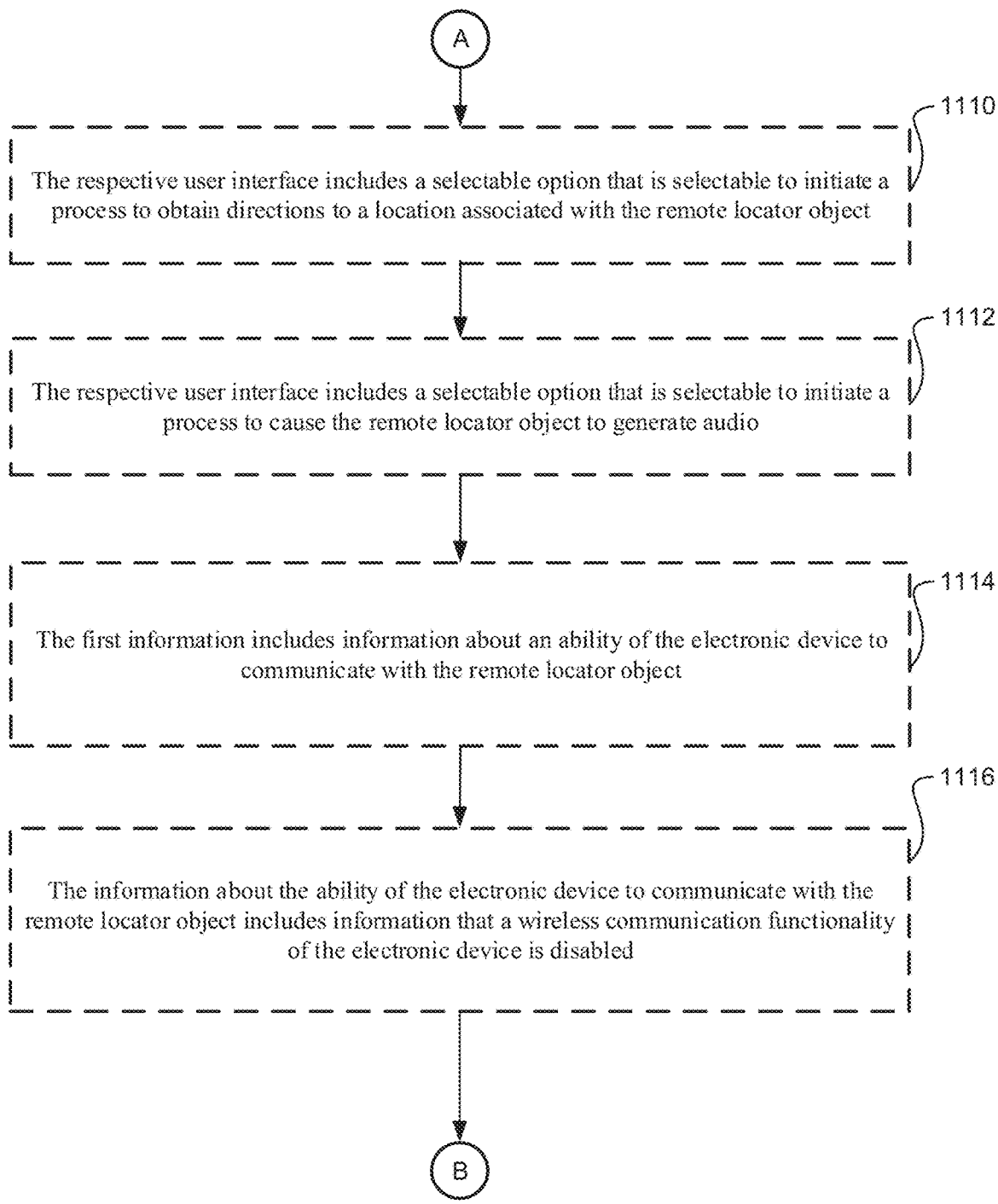
Figure 11C:
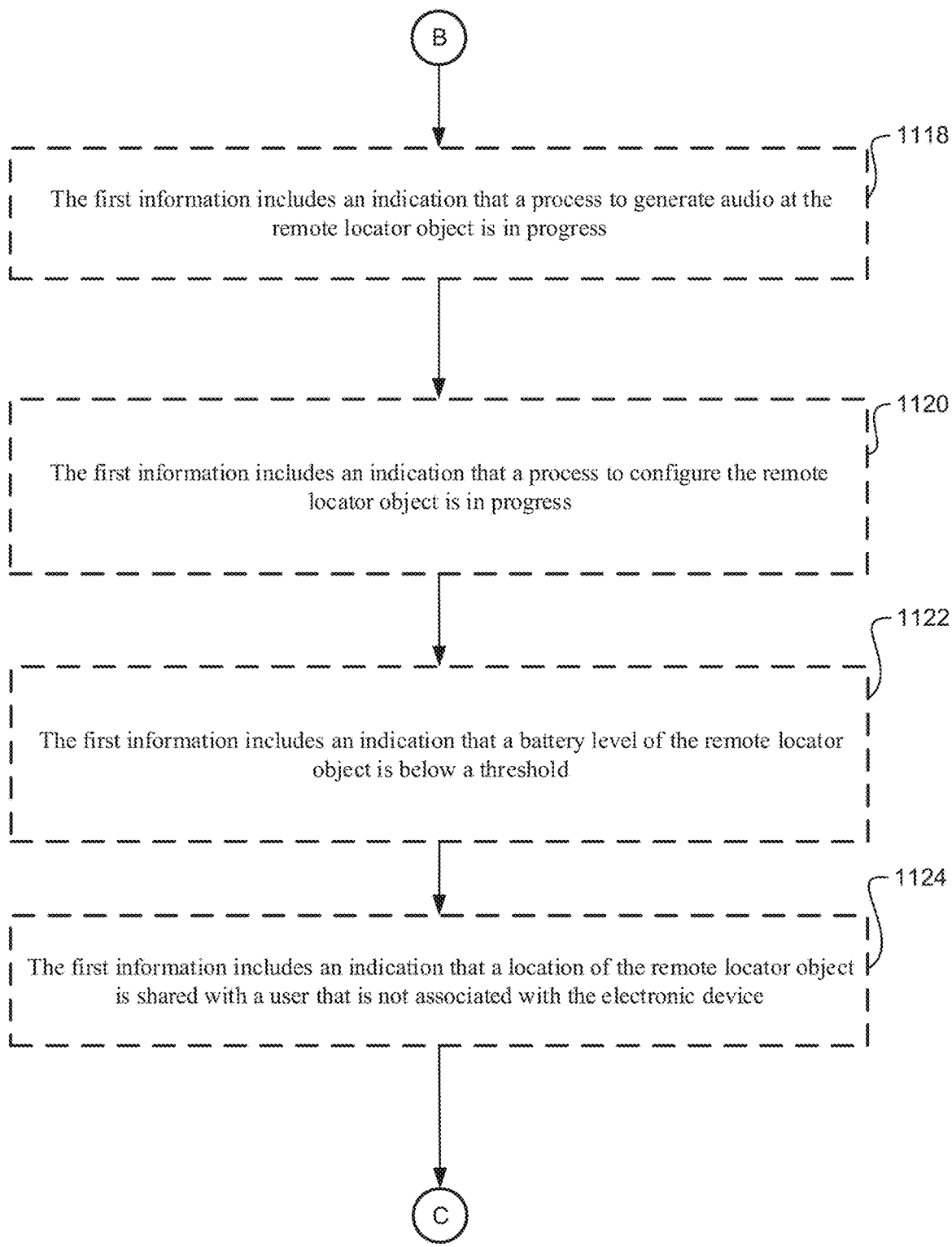
Figure 11D:
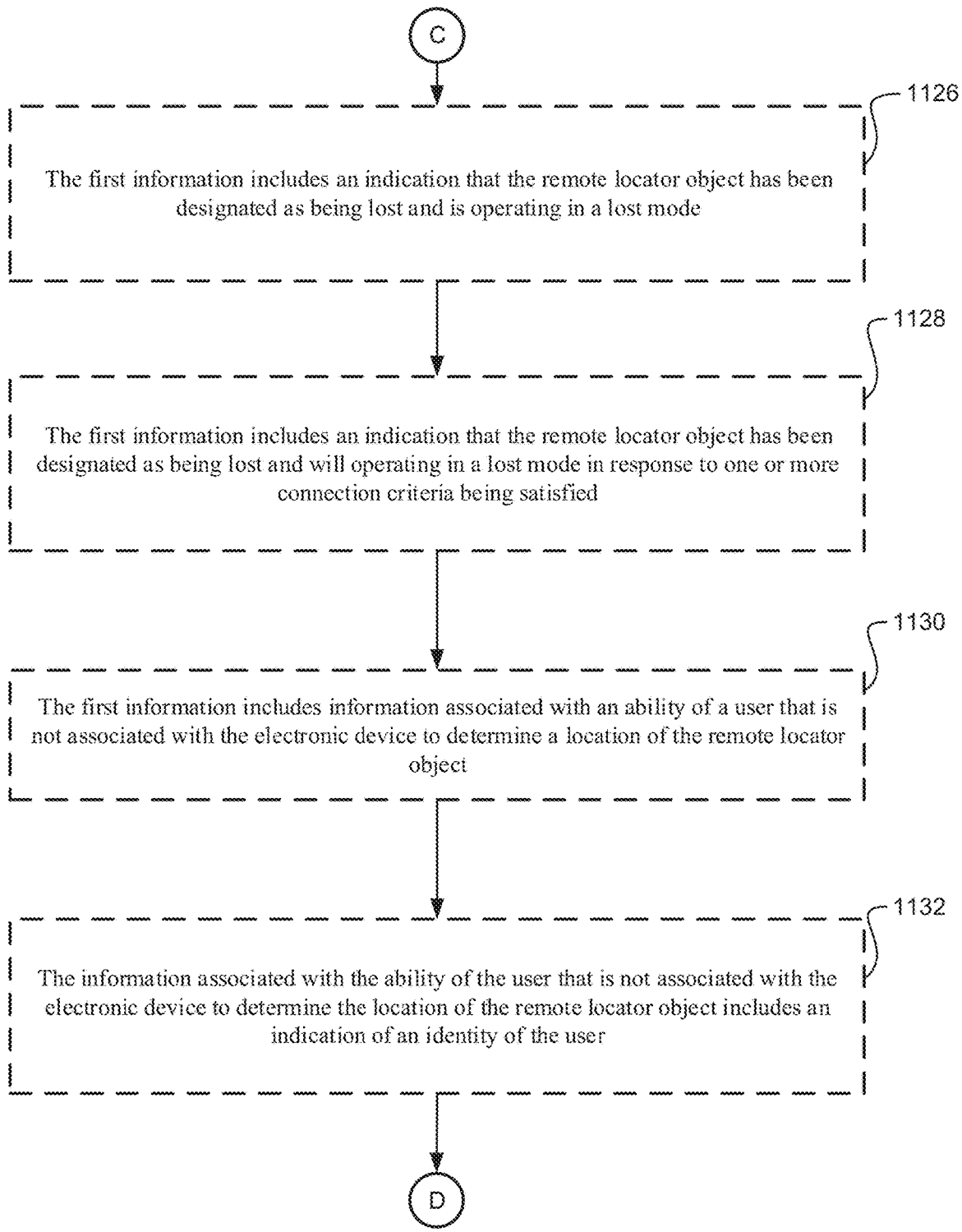
Figure 11E:
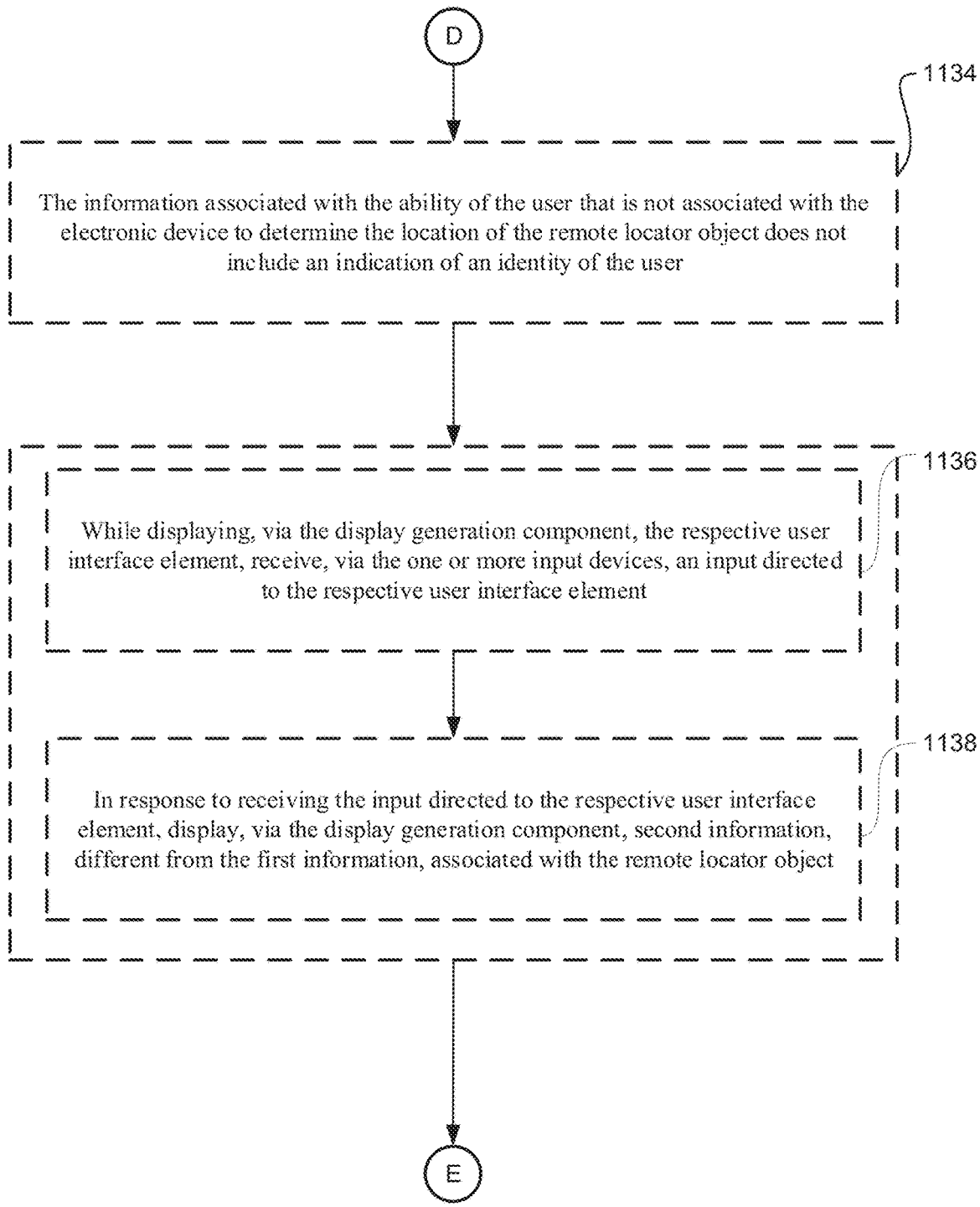
Figure 11F:
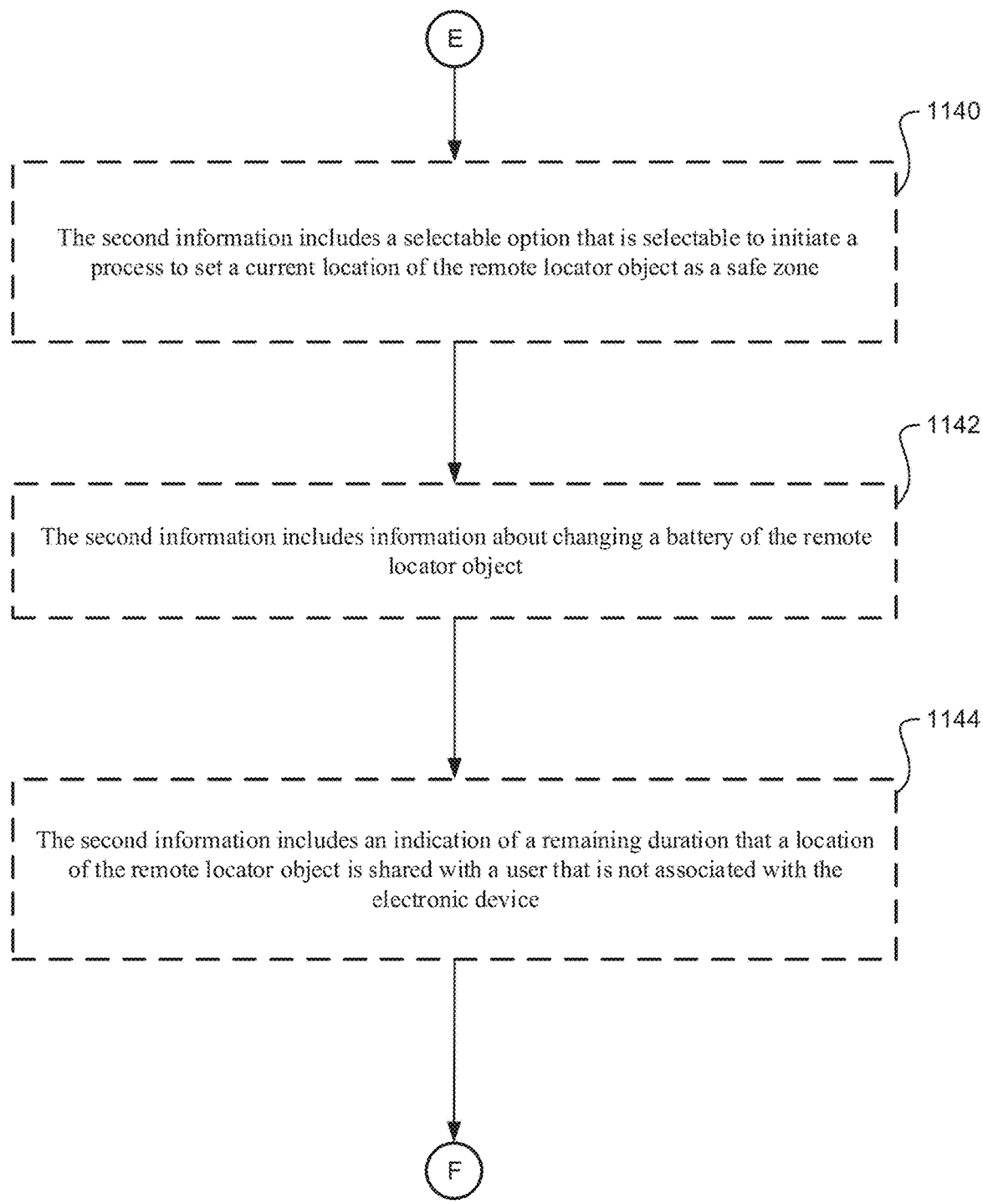
Figure 11G:
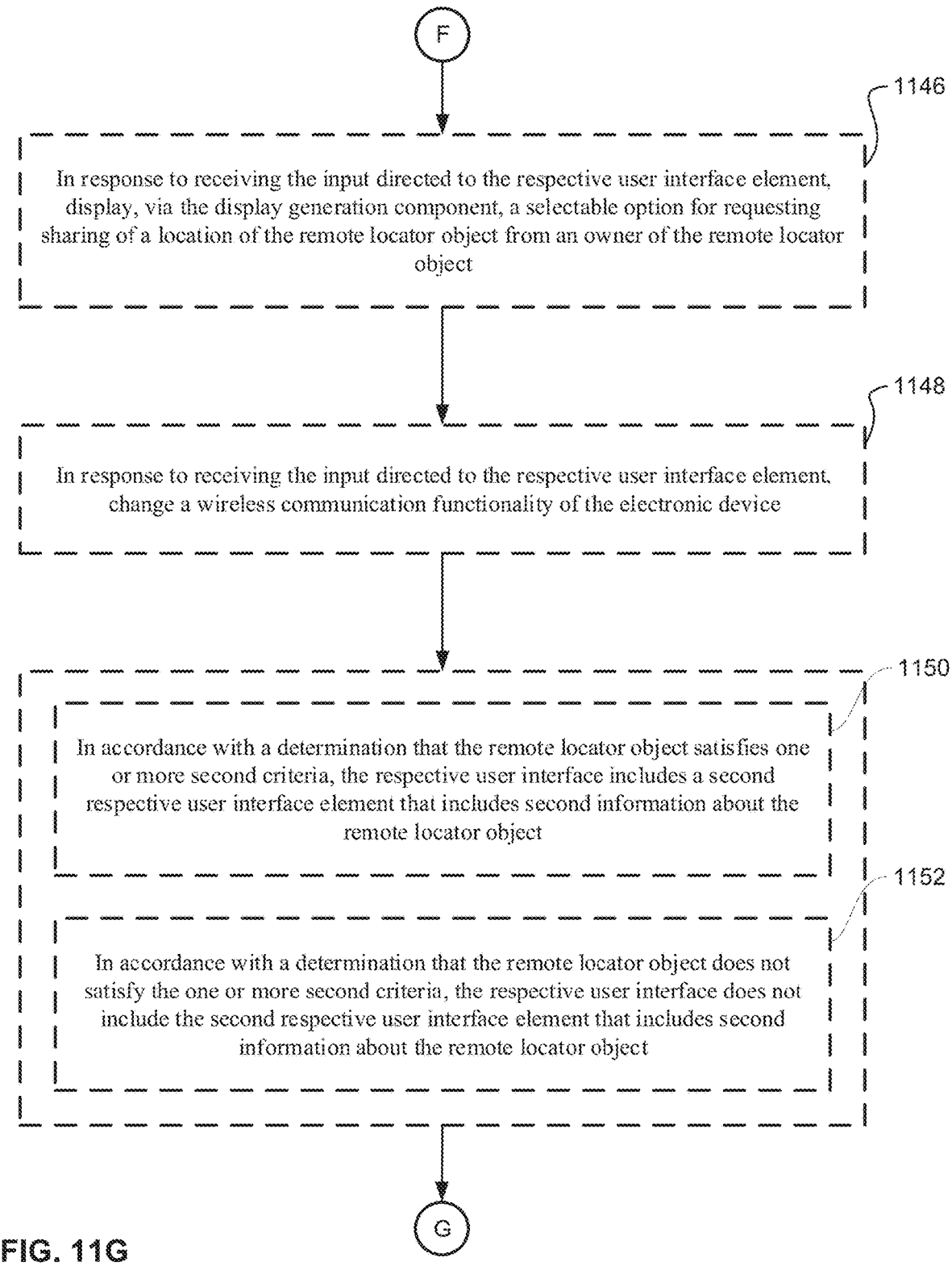
Figure 11H:
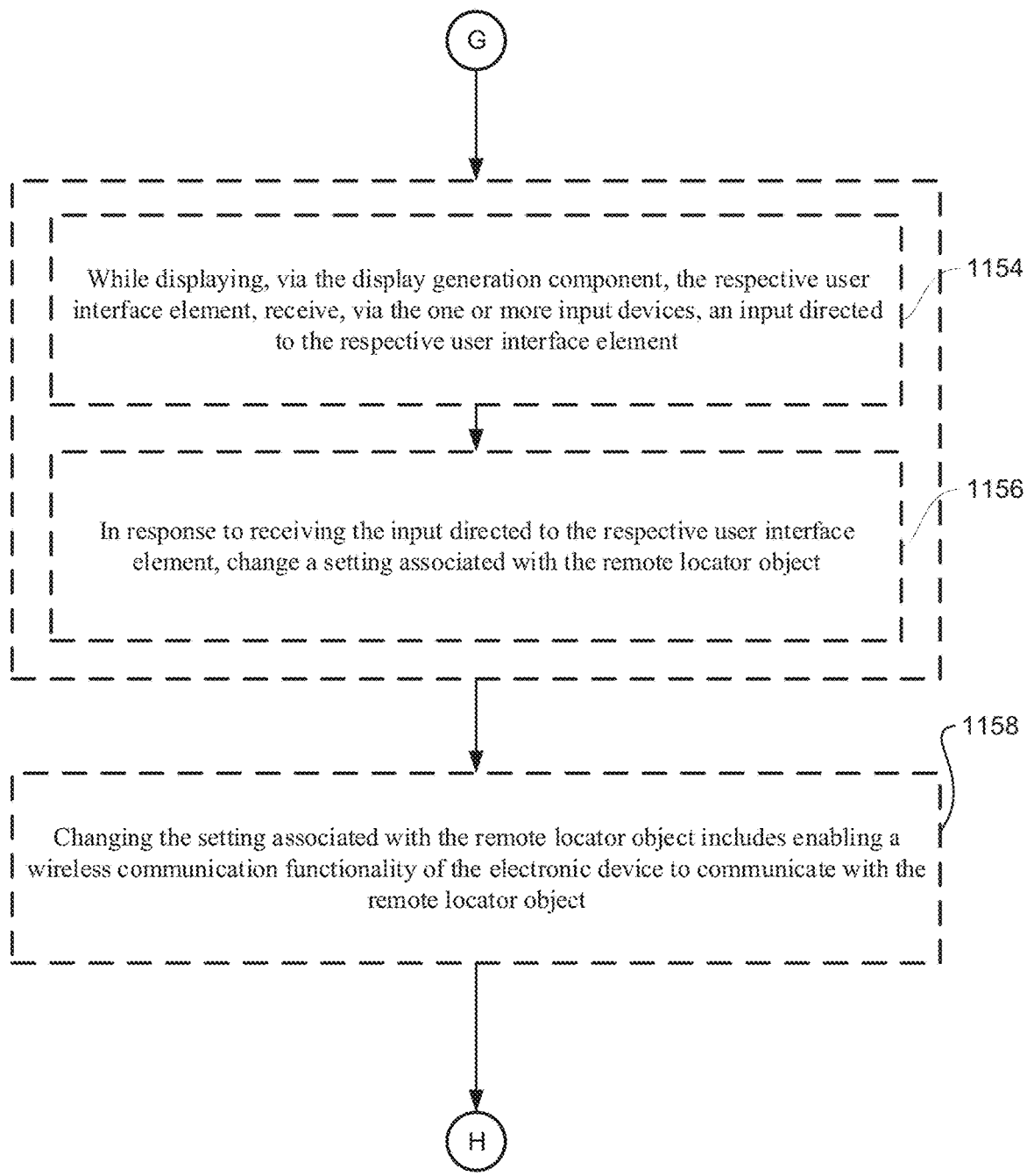
Figure 11I:
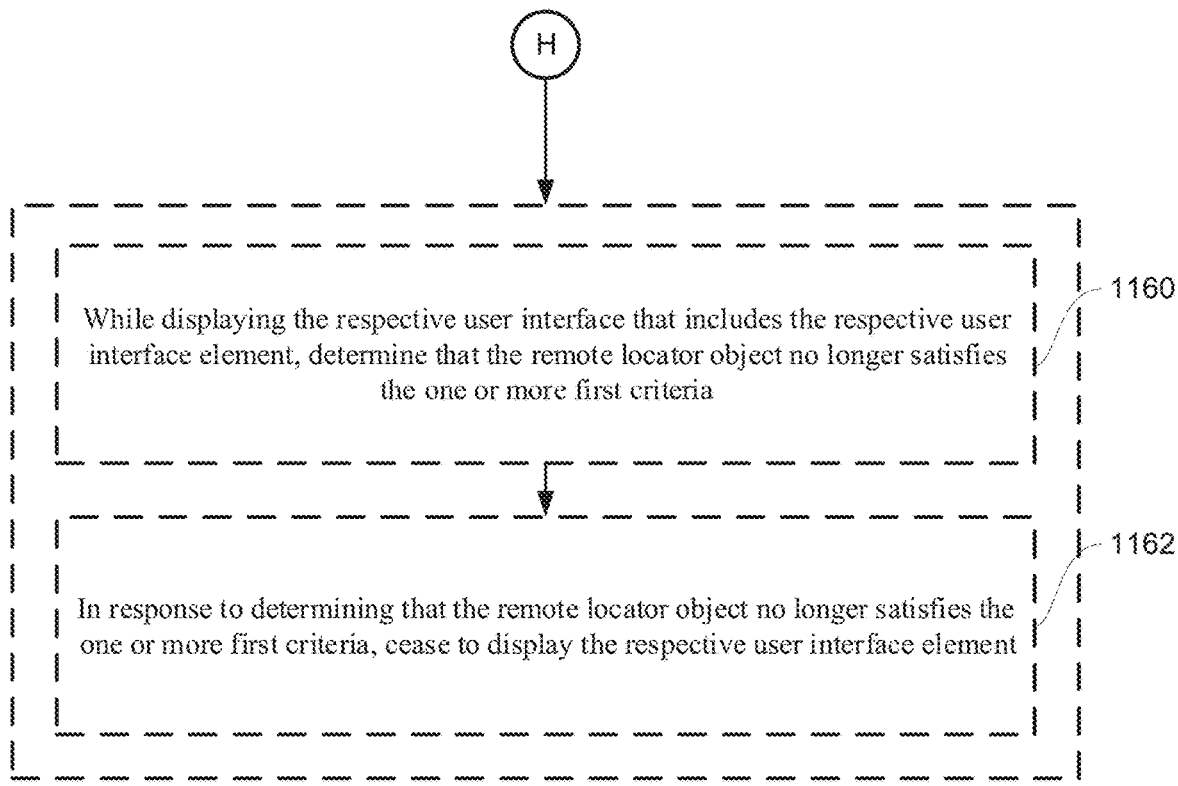

In FIG. 10Q, device 500 is displaying user interface 1012 associated with a trackable object (e.g., a remote locator object) owned by a user that does not have a relationship with the user of device 500. In some embodiments, a respective user does not have a relationship with the user of device 500 if, for example, the respective user is not a contact of the user of device 500, is not a member of the family group that includes the user of device 500, has not previously shared the location of the trackable object and/or any trackable object with the user of device 500, etc.). In some embodiments, because the user does not have an existing relationship with the owner of the respective remote locator object, user interface 1012 indicates that the respective remote locator object is "someone's" locator, and includes module 1064 that indicates that other people can see the location of the remote locator object (e.g., without displaying the name or identifier of that other user). In some embodiments, module 1064 is selectable to display instructions for disabling the respective remote locator object, thus preventing an unknown person from tracking the location of the user of device 500.

For example, in FIG. 10Q, a user input 1003 is received selecting module 1064. In some embodiments, in response to receiving user input 1003, device 500 displays user interface 1066, as shown in FIG. 10R. In some embodiments, user interface 1066 includes instructions for disassembling and disabling the remote locator object. For example, user interface 1066 includes textual instructions 1070 for disassembling and disabling the remote locator object. In some embodiments, user interface 1066 includes representation 1068 that animates to illustrate how to disassemble and disable the remote locator object. For example, in FIG. 10R, representation 1068 animates to illustrate the remote locator object being twisted open and in FIG. 10S, representation 1068 animates to illustrate the remote locator object being opened, revealing the battery, which can be removed to disable the remote locator object.

FIG. 10T illustrates an embodiment in which device 500 is displaying a user interface for a trackable object that is owned by a friend of the user of device 500 (e.g., the trackable object is associated and/or paired with the account of a contact of the user of device 500). In some embodiments, a friend of the user is a user that has been marked as a friend of the user of device 500. In some embodiments, a friend of the user is a user that has marked the user of device 500 as a friend. In some embodiments, user interface 1012 includes module 1072. In some embodiments, module 1072 is the same or similar to module 1062 described above with respect to FIG. 10P (e.g., the text of module 1072 indicates that the location of the respective remote locator object can be seen by the friend of the user of device 500). In some embodiments, module 1072 is selectable to transmit a request to the owner of the remote locator object (e.g., the friend) to share the location of the respective remote locator object with the user of device 500.

It is understood that the user interfaces discussed above can include any number and any combination of the modules above. For example, if the criteria for a first respective module is satisfied, the user interface can include the first respective module and if the criteria for a second respective module is satisfied, the user interface can include the second respective module. In some embodiments, if the criteria for a first respective module is satisfied, and the criteria for other modules are not satisfied, the user interface includes the first respective module and does not include other modules whose criteria are not satisfied. In some embodiments, certain modules are included in the user interface without regard to whether other modules are also included in the user interface. In some embodiments, certain modules interact with other modules such that the fact that a respective module is included in the user interface is a factor (e.g., criterion) in whether another module is included in the user interface (and/or the criteria for a certain module can share at least one criterion with another module). In some embodiments, as discussed above, in response to determining that a respective criteria for a respective module is no longer satisfied, the respective module is automatically removed from the user interface. In some embodiments, the respective module is automatically removed from the user interface when the respective criteria ceases to be satisfied, optionally while the user interface is still being displayed (e.g., the respective module is updated "live"). In some embodiments, the respective module is automatically removed from the user interface when the user interface is refreshed (e.g., after the device navigates away from the user interface and re-displays the user interface, at a future time).

FIGS. 11A-11I are flow diagrams illustrating a method 1100 of providing information associated with a remote locator object and/or providing mechanisms for adjusting operation of the remote locator object or the electronic device in accordance with some embodiments, such as in FIGS. 10A-10T. The method 1100 is optionally performed at an electronic device such as device 100, device 300, device 500 as described above with reference to FIGS. 1A-1B, 2-3, 4A-4B and 5A-5H. Some operations in method 1100 are, optionally combined and/or order of some operations is, optionally, changed.

As described below, the method 1100 provides information associated with a remote locator object and/or provides mechanisms for adjusting operation of the remote locator object or the electronic device. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device in communication with one or more wireless antenna, a display generation component and one or more input devices (e.g., electronic device 500, a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.), displays, via the display generation component, a map user interface that includes a representation of a remote locator object, such as user interface 1000 in FIG. 10A (e.g., a user interface that includes a representation of a map).

In some embodiments, a representation of a remote locator object (e.g., an icon) is displayed in the representation of the map indicating the location of the remote locator object on the map. In some embodiments, the map user interface includes information about the remote locator object. In some embodiments, the map user interface includes information about other devices whose location information are available. In some embodiments, the representation of the map includes a plurality of representations of a plurality of objects (e.g., remote locator objects, electronic devices, etc.) indicating the locations of the plurality of objects on the map. In some embodiments, the map user interface includes a list of one or more objects, including the remote locator object, whose location information are available.

In some embodiments, a display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, while displaying the map user interface that includes the representation of a remote locator object, the electronic device receives (1102), via the one or more input devices, an input corresponding to a request to display additional information about the remote locator object, such as user input 1003 selecting icon 1004 in FIG. 10B (e.g., receiving a selection input, such as a tap, on the representation of the remote locator object). In some embodiments, a selection input on the representation of the remote locator object is interpreted as a request to display additional information about the remote locator object.

In some embodiments, in response to receiving the input corresponding to the request to display the additional information about the remote locator object, the electronic device updates (1104) the map user interface to include a respective user interface associated with the remote locator object, such as user interface 1012 in FIG. 10C (e.g., displaying a user interface that includes information about the respective remote locator object). In some embodiments, the user interface associated with the respective remote locator object includes information such as the identifier (e.g., name) of the remote locator object, its current location, and/or its current status, etc. In some embodiments, the user interface associated with the respective remote locator object includes one or more selectable options for performing operations associated with the respective remote locator object, such as changing one or more settings of the respective remote locator object, changing the name of the remote locator object, etc. In some embodiments, the user interface associated with the respective remote locator is displayed concurrently with the representation of the map (e.g., overlaid on a portion of the representation of the map or displayed below the representation of the map).

In some embodiments, in accordance with a determination that the remote locator object satisfies one or more first criteria, the respective user interface includes a respective user interface element that includes first information about the remote locator object (1106), such as module 1018 in FIG. 10C (e.g., the user interface associated with the respective remote locator object includes one or more user interface elements associated with a current status of the remote locator object).

For example, if the battery for the remote locator object is low, then the user interface includes a user interface element indicating that the battery is low. In another example, if the device is unable to wirelessly communicate with the remote locator object, then the user interface includes a user interface element indicating that the device is unable to wirelessly communicate with the remote locator object and optionally suggests to the user to enable one or more wireless communication protocols (e.g., enable Bluetooth). In some embodiments, the user interface includes multiple user interface elements, each corresponding to a different state of the remote locator object.

In some embodiments, in accordance with a determination that the remote locator object does not satisfy the one or more first criteria, the respective user interface does not include the respective user interface element that includes the first information about the remote locator object (1108), such as if user interface 1012 does not include module 1018 in FIG. 10C (e.g., if the criteria associated with a respective state or condition is not satisfied, then the user interface does not include a user interface element associated with the respective state or condition). For example, if the device has Bluetooth (or another communication profile) enabled and is able to wirelessly communicate with the remote locator object, the user interface does not include an element that indicates that the device is unable to wirelessly communicate with the remote locator object.

The above-described manner of providing information about a remote locator object (e.g., displaying one or more user interface elements associated with different conditions if certain criteria are satisfied) provides a quick and efficient way of providing status information about the remote locator object (e.g., by displaying information about a certain state or condition only if certain criteria are satisfied, but not displaying the information if the criteria are not satisfied, without requiring the user to perform additional inputs to determine whether action is required to resolve an issue), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the respective user interface includes a selectable option that is selectable to initiate a process to obtain directions to a location associated with the remote locator object (1110), such as selectable option 1020 in FIG. 10C (e.g., the user interface associated with the respective remote locator object includes a selectable option to locate the remote locator object).

In some embodiments, in response to selecting the selectable option to locate the remote locator object, the device initiates a finding mode. In some embodiments, if the distance to the remote locator object is above a threshold (e.g., 20 feet, 50 feet, 300 feet, ¼ mile, 1 mile, 3 miles, etc.), the finding mode is a map-based navigation mode and if the distance to the remote locator object is below the threshold, the finding mode is a compass-style navigation mode, similar to described below with respect to method 1300.

The above-described manner of finding a remote locator object (e.g., by providing a selectable option to initiate a process to find the remote locator object in a user interface associated with the remote locator object) provides a quick and efficient way of finding the remote locator object (e.g., by displaying the selectable option in the same user interface for managing the settings of the remote locator object and that includes information about the remote locator object), which simplifies the interaction between the user and the electronic device and enhances the operability of the electronic device and makes the user-device interface more efficient (e.g., without requiring the user to perform additional inputs or navigate to a different user interface to initiate the process to find the remote locator object), which additionally reduces power usage and improves battery life of the electronic device by enabling the user to use the electronic device more quickly and efficiently, while reducing errors in usage.

In some embodiments, the respective user interface includes a selectable option that is selectable to initiate a process to cause the remote locator object to generate audio (1112), such as selectable option 1022 in FIG. 10C (e.g., the user interface associated with the respective remote locator object includes a selectable option to cause the remote locator object to generate an audible tone (e.g., for the purpose of finding the remote locator object)).

In some embodiments, in response to selecting the selectable option to cause the remote locator object to generate an audible tone, the electronic device issues a command to the remote locator object to generate an audible tone. In some embodiments, the remote locator object generates an audible tone until the electronic device receives an input selecting the selectable option to turn off the audible tone. Thus, in some embodiments, the selectable option toggles the audible tone on and off. In some embodiments, the selectable option causes the remote locator object to generate an audible tone for a predetermined amount of time (e.g., 3 seconds, 5 seconds, 10 seconds, 30 seconds, 1 minute, etc.) and automatically stop generating the audible tone after the predetermined amount of time.

The above-described manner of finding a remote locator object (e.g., by providing a selectable option to cause the remote locator object to generate audio) provides a quick and efficient way of finding the remote locator object (e.g., by displaying the selectable option in the same user interface for managing the settings of the remote locator object and that includes information about the remote locator object), which simplifies the interaction between the user and the electronic device and enhances the operability of the electronic device and makes the user-device interface more efficient (e.g., without requiring the user to perform additional inputs or navigate to a different user interface to cause the remote locator object to generate audio), which additionally reduces power usage and improves battery life of the electronic device by enabling the user to use the electronic device more quickly and efficiently, while reducing errors in usage.

In some embodiments, the first information includes information about an ability of the electronic device to communicate with the remote locator object (1114), such as module 1019 in FIG. 10C and module 1032 in FIG. 10H (e.g., the user interface associated with the respective remote locator object includes information about the current status of the tracking devices, such as information associated with the connectivity with the remote locator object, information about the battery level of the remote locator object, information about the location of the remote locator object, information about who is able to see the location of the remote locator object, etc.).

For example, if the electronic device is not able to wirelessly communicate with the remote locator object, the user interface displays an indication that the electronic device is not able to communicate with the remote locator object and optionally displays a selectable option to change a respective setting to enable communication with the remote locator object. For example, the user interface optionally displays an indication that the device is in airplane mode (e.g., in which the wireless communication circuitry of the electronic device is optionally disabled) and is unable to communicate with the remote locator object. In some embodiments, the indication is optionally selectable to cause the electronic device to exit airplane mode. Thus, in some embodiments, the user interface includes one or more indications of the status of the remote locator object that affects the operability of the remote locator object (e.g., the remote locator object's ability to track location and/or the electronic device's ability to receive location information from the remote locator object, etc.).

The above-described manner of displaying information about the current status of the remote locator object (e.g., by displaying indications of the status of the remote locator object in the user interface for managing the settings of the remote locator object) provides a quick and efficient way of providing an indication of the operation of the remote locator object, which simplifies the interaction between the user and the electronic device and enhances the operability of the electronic device and makes the user-device interface more efficient (e.g., without requiring the user to perform additional inputs or navigate to a different user interface to view different types of status information for the remote locator object), which additionally reduces power usage and improves battery life of the electronic device by enabling the user to use the electronic device more quickly and efficiently, while reducing errors in usage.

In some embodiments, the information about the ability of the electronic device to communicate with the remote locator object includes information that a wireless communication functionality of the electronic device is disabled (1116), such as module 1019 in FIG. 10C and module 1032 in FIG. 10H (e.g., the user interface includes an indication of one or more settings associated with the wireless communication circuitry used to wirelessly communicate with the remote locator object).

For example, the user interface includes an indication that airplane mode is enabled such that the electronic device is unable to wirelessly communicate with the remote locator object. In another example, the user interface includes an indication that a communication protocol (e.g., Bluetooth, WiFi, etc.) is disabled such that the electronic device is unable to wirelessly communicate with the remote locator object. In some embodiments, the indications are selectable to change the respective setting of the electronic device to enable the electronic device to wirelessly communicate with the remote locator object. For example, selecting the indication that the device is in airplane mode causes the device to exit airplane mode, and selecting the indication that the Bluetooth circuitry is disabled causes the device to enable the Bluetooth circuitry.

The above-described manner of displaying connectivity information that affects the ability of the device to communicate with the remote locator object (e.g., by displaying indications of the status of one or more wireless communication circuitry that is used to communicate with the remote locator object) provides a quick and efficient way of providing an indication that the device is in a state in which it is unable to communicate with the remote locator object and receive location information from the remote locator object, which simplifies the interaction between the user and the electronic device and enhances the operability of the electronic device and makes the user-device interface more efficient (e.g., without requiring the user to perform additional inputs or navigate to a different user interface to determine whether the settings associated with wireless communication circuitry are set to the correct values), which additionally reduces power usage and improves battery life of the electronic device by enabling the user to use the electronic device more quickly and efficiently, while reducing errors in usage.

In some embodiments, the first information includes an indication that a process to generate audio at the remote locator object is in progress (1118), such as module 1028 in FIG. 10F (e.g., the user interface includes an indication that a command has been sent or is being sent to the remote locator object to generate an audio output). In some embodiments, the indication is displayed while the command is being sent, optionally before receiving an acknowledgement that the remote locator object is generating the audio output. In some embodiments, the indication is updated to indicate that the remote locator object is generating audio, optionally in response to receiving an acknowledgement that the remote locator object has received the command and is generating audio output. In some embodiments, the indication is selectable to display the current initialization status of the remote locator object (e.g., which initialization step is being performed, how many steps are remaining, the estimated time to completion, etc.).

The above-described manner of displaying an indication that the process to initiate audio to be generated the remote locator object is in progress (e.g., by displaying indications that a command has been sent to the remote locator object to generate audio output) provides a quick and efficient way of indicating that the process to generate audio at the remote locator object is in progress, which simplifies the interaction between the user and the electronic device and enhances the operability of the electronic device and makes the user-device interface more efficient (e.g., without requiring the user to perform additional inputs or wait to determine whether the process to cause audio to be generated at the remote locator object is successful), which additionally reduces power usage and improves battery life of the electronic device by enabling the user to use the electronic device more quickly and efficiently, while reducing errors in usage.

In some embodiments, the first information includes an indication that a process to configure the remote locator object is in progress (1120), such as module 1018 in FIG. 10C (e.g., the user interface includes an indication that the remote locator object is still being initialized). For example, the remote locator object is receiving information from the electronic device and/or configuring internal settings to enable its location tracking features. In some embodiments, in response to determining that initialization has completed, the indication that the remote locator object is still being initialized is automatically dismissed. In some embodiments, in response to determining that initialization has completed, the indication is updated to indicate that setup has completed.

The above-described manner of displaying an indication that the remote locator object is initializing provides a quick and efficient way of indicating that the full functionality of the remote locator object is not yet ready, which simplifies the interaction between the user and the electronic device and enhances the operability of the electronic device and makes the user-device interface more efficient (e.g., without requiring the user to perform additional inputs or wait to determine whether initialization has completed), which additionally reduces power usage and improves battery life of the electronic device by enabling the user to use the electronic device more quickly and efficiently, while reducing errors in usage.

In some embodiments, the first information includes an indication that a battery level of the remote locator object is below a threshold (1122), such as module 1038 in FIG. 10J (e.g., the user interface includes an indication of the current battery level of the remote locator object and/or an indication that the battery level of the remote locator object is low (e.g., less than 5%, 10%, 30% battery level)). In some embodiments, the electronic device receives battery level information from the remote locator object. In some embodiments, the indication is selectable to display a tutorial for how to change the batteries of the remote locator object.

The above-described manner of displaying an indication of the battery level the remote locator object provides a quick and efficient way of indicating that the battery of the remote locator object should be changed soon, which simplifies the interaction between the user and the electronic device and enhances the operability of the electronic device and makes the user-device interface more efficient (e.g., by preventing the remote locator object from running out of battery unexpectedly and/or without requiring the user to separately determine the battery level of the remote locator object), which additionally reduces power usage and improves battery life of the electronic device by enabling the user to use the electronic device more quickly and efficiently, while reducing errors in usage.

In some embodiments, the first information includes an indication that a location of the remote locator object is shared with a user that is not associated with the electronic device, such as module 1050 in FIG. 10M and module 1060 in FIG. 10O (e.g., if the location of the remote locator object is being shared with another user, the user interface includes an indication that the location of the remote locator object is being shared with another user).

In some embodiments, the indication indicates the user that is receiving the location information and/or the duration of the sharing. For example, the location of the remote locator object is able to be shared indefinitely (e.g., until the user explicitly ends sharing) or shared for a preset duration (e.g., for 1 hour, for 2 hours, for 12 hours, for the rest of the day, for 24 hours, etc.), and the indication indicates the amount of time remaining (e.g., if the sharing is for a preset duration). In some embodiment, the indication is selectable to change the sharing settings of the remote locator object (e.g., to disable sharing, to extend the duration of the sharing, to see a list of who is receiving location information, etc.).

The above-described manner of displaying an indication that the remote locator object is being shared with another user provides a quick and efficient way of indicating that the location of the remote locator object can be seen by another user, which simplifies the interaction between the user and the electronic device and enhances the operability of the electronic device and makes the user-device interface more efficient (e.g., without requiring the user to perform additional user inputs and/or navigate to another user interface to determine whether the remote locator object is being shared with another user), which additionally reduces power usage and improves battery life of the electronic device by enabling the user to use the electronic device more quickly and efficiently, while reducing errors in usage.

In some embodiments, the first information includes an indication that the remote locator object has been designated as being lost and is operating in a lost mode (1126), such as module 1036 in FIG. 10I (e.g., if the remote locator object has been marked as lost (e.g., by the electronic device of the owner of the remote locator object), the user interface includes an indication that the location of the remote locator object has been marked as lost).

In some embodiments, the indication is selectable to display information about the lost mode, to display the current location of the remote locator object, to display the last known location of the remote locator object, and/or to disable lost mode, etc. In some embodiments, the remote locator object is owned by another user and the indication is selectable to display information for how to contact the owner of the remote locator object. In some embodiments, the owner of the remote locator object is the user whose electronic device is paired with the remote locator object and/or the user that initialized the remote locator object and has been associated with the remote locator object as the owner and who optionally is authorized to change one or more settings of the remote locator object.

The above-described manner of displaying an indication that the remote locator object has been marked as lost provides a quick and efficient way of indicating the current lost status of the remote locator object, which simplifies the interaction between the user and the electronic device and enhances the operability of the electronic device and makes the user-device interface more efficient (e.g., without requiring the user to perform additional user inputs and/or navigate to another user interface to determine whether the remote locator object has successfully been marked as lost), which additionally reduces power usage and improves battery life of the electronic device by enabling the user to use the electronic device more quickly and efficiently, while reducing errors in usage.

In some embodiments, the first information includes an indication that the remote locator object has been designated as being lost and will operate in a lost mode in response to one or more connection criteria being satisfied (1128), such as module 1034 in FIG. 10H (e.g., if the remote locator object has been marked as lost, but the device has not received an acknowledgement that the lost status of the remote locator object has been enabled yet, the user interface includes an indication that the remote locator object is in the process of being marked as lost).

In some embodiments, the indication is displayed in response to receiving a user input to mark the remote locator object as lost. For example, the user interface optionally includes a selectable option to mark the remote locator object as lost. In some embodiments, the remote locator object has been marked as lost, but has not yet enabled lost mode if, for example, the electronic device is in airplane mode and is unable to wirelessly transmit the request to mark the object as lost to a server associated with the remote locator object and/or to the remote locator object. In some embodiments, the indication is selectable to display information about lost mode and/or to initiate a process to terminate the request to mark the remote locator object as lost.

The above-described manner of displaying an indication that the remote locator object is in the process of being marked as lost provides a quick and efficient way of acknowledging the request to mark the remote locator object as lost, which simplifies the interaction between the user and the electronic device and enhances the operability of the electronic device and makes the user-device interface more efficient (e.g., without requiring the user to perform additional user inputs, navigate to another user interface, and/or wait to determine whether the remote locator object has successfully been marked as lost), which additionally reduces power usage and improves battery life of the electronic device by enabling the user to use the electronic device more quickly and efficiently, while reducing errors in usage.

In some embodiments, the first information includes information associated with an ability of a user that is not associated with the electronic device to determine a location of the remote locator object (1130), such as module 1062 in FIG. 10P and module 1064 in FIG. 10Q (e.g., if the remote locator object is being shared with another user or if the remote locator object is owned by a user other than the user of the electronic device such that the other user is able to see the location of the remote locator object, the user interface includes an indication that the location remote locator object can be seen by another user).

In some embodiments, the indication that the location of the remote locator object can be seen by another user includes an indication of the name of the other user. For example, if the user owns the remote locator object and shared the location of the remote locator object with a contact, the indication indicates the contact with whom the remote locator object is shared. In some embodiments, if the remote locator object is owned by a user other than the user of the device, the indication does not indicate the name of the user that is able to see the location of the remote locator object. In some embodiments, the indication does indicate the name of the user that is able to see the location of the remote locator object. For example, if the remote locator object is owned by a contact of the user and/or is sharing the remote locator object with the user, then the indication indicates the name of the owner of the remote locator object. In some embodiments, if the remote locator object is owned by a user that is unknown to the user and/or being shared with a user that is unknown to the user (e.g., not in the contact list of the device), then the indication does not include the name of the owner of the device or the person with whom the remote locator object is shared. In some embodiments, the indicator is selectable to display more information about the sharing feature, to display more information about who can see the location of the object, and/or to display a tutorial of how to disable the remote locator object (e.g., to terminate location tracking).

The above-described manner of displaying an indication that a user other than the user of the device is able to see the location of a remote locator object provides a quick and efficient way of notifying the user that the location of the user may be viewable by someone else, which provides privacy and security benefits to the user by alerting the user of potentially unknown tracking, and which simplifies the interaction between the user and the electronic device and enhances the operability of the electronic device and makes the user-device interface more efficient (e.g., without requiring the user to perform additional user inputs, navigate to another user interface to determine whether another user is able to see the location of the remote locator object), and which additionally reduces power usage and improves battery life of the electronic device by enabling the user to use the electronic device more quickly and efficiently, while reducing errors in usage.

In some embodiments, the information associated with the ability of the user that is not associated with the electronic device to determine the location of the remote locator object includes an indication of an identity of the user (1132), such as module 1062 in FIG. 10P indicating that a user named "Bob" can see the location of the remote locator object (e.g., the indication includes the name of the person that is able to view the location of the remote locator object). For example, if the remote locator object is owned by a contact of the user (optionally who has shared the remote locator object with the user) and/or is shared with a contact of the user (e.g., optionally a mutual contact), then the indication indicates the name of the owner of the remote locator object and/or the person with whom the remote locator object is shared. In some embodiments, if the remote locator object is owned by the user, the indication indicates the name of the person with whom the remote locator object is shared. In this way, providing the name of the person that can see the remote locator object's location allows the user to determine whether the tracking is unintended, unexpected, or acceptable.

The above-described manner of displaying the name of the person that is able to see the location of a remote locator object provides a quick and efficient way of notifying the user of the person that is able to view the location of the user and/or the remote locator object, which provides privacy and security benefits to the user by alerting the user of potentially unknown tracking and which simplifies the interaction between the user and the electronic device and enhances the operability of the electronic device and makes the user-device interface more efficient (e.g., without requiring the user to perform additional user inputs or navigate to another user interface to determine who owns the remote locator object or is otherwise able to see the location of the remote locator object), and which additionally reduces power usage and improves battery life of the electronic device by enabling the user to use the electronic device more quickly and efficiently, while reducing errors in usage.

In some embodiments, the information associated with the ability of the user that is not associated with the electronic device to determine the location of the remote locator object does not include an indication of an identity of the user (1134), such as module 1064 in FIG. 10Q not indicating the name of the user that can see the location of the remote locator object (e.g., the indication optionally does not include the name of the person that is able to view the location of the remote locator object and indicates that people other than the user are able to view the location of the remote locator object).

For example, if the remote locator object is owned by a user that is unknown to the user and/or being shared with a user that is unknown to the user (e.g., not in the contact list of the device), then the indication does not include the name of the owner of the device or the person with whom the remote locator object is shared. In this way, the privacy of the owner of the remote locator object is protected, for example, if the user finds the remote locator object amongst other objects (e.g., in the same bag), the user is not able to associate the other objects with the name of the owner.

The above-described manner of indicating that people other than the user are able to see the location of a remote locator object while concealing the name(s) of those people provides a quick and efficient way of notifying the user of the location of the remote locator object may be trackable by others, which further provides privacy and security benefits to the user by alerting the user of potentially unknown tracking and which simplifies the interaction between the user and the electronic device and enhances the operability of the electronic device and makes the user-device interface more efficient (e.g., without requiring the user to perform additional user inputs or navigate to another user interface to determine whether the remote locator object is enabled and able to provide location information to its owner and/or other people), and which additionally reduces power usage and improves battery life of the electronic device by enabling the user to use the electronic device more quickly and efficiently, while reducing errors in usage.

In some embodiments, while displaying, via the display generation component, the respective user interface element, the electronic device receives (1136), via the one or more input devices, an input directed to the respective user interface element, such as user input 1003 in FIG. 10J (e.g., receiving an input (e.g., tap input) selecting the indications).

In some embodiments, in response to receiving the input directed to the respective user interface element, the electronic device displays (1138), via the display generation component, second information, different from the first information, associated with the remote locator object, such as information about how to change the batteries in FIG. 10K (e.g., updating the user interface to display information associated with the indications). For example, the user interface is replaced with another user interface that includes information about the respective indication, such as a tutorial user interface or a settings user interface, or the user interface is updated to include information about the respective indications (e.g., as a pop-up or embedded in the user interface). For example, in response to the user selecting an indication that the remote locator object is shared with another user, the device optionally displays information about the remaining duration of the sharing, the person or people with whom the remote locator object is shared, etc.

The above-described manner of displaying information associated with the displayed indication provides a quick and efficient way of providing additional information to the user associated with the condition that caused the indication to be displayed, which simplifies the interaction between the user and the electronic device and enhances the operability of the electronic device and makes the user-device interface more efficient (e.g., without requiring the user to perform additional user inputs or navigate to another user interface to determine what caused the indication to be displayed and how to properly respond to the indication), which additionally reduces power usage and improves battery life of the electronic device by enabling the user to use the electronic device more quickly and efficiently, while reducing errors in usage.

In some embodiments, the second information includes a selectable option that is selectable to initiate a process to set a current location of the remote locator object as a safe zone (1140), such as in FIG. 10N (e.g., a respective indication displayed in the user interface is selectable to set the current location of the remote locator object and/or the current location of the device as a trusted location).

For example, the user interface optionally includes an indication that the remote locator object (which is optionally owned by the user of the device) is separated from the user (e.g., the location of the remote locator object is determined to be farther than a threshold distance from the user's personal electronic device, such as 100 feet, 500 feet, 1 mile, 5 miles, 10 miles, etc.), and the indication is selectable to set the determined current location of the remote locator object as a trusted location. In some embodiments, a trusted location for a remote locator object is a location (e.g., a geographic area) within which the remote locator object does not cause separation alerts to be generated. In some embodiments, a separation alert is a notification and/or an alert that is generated at the electronic device of the owner of the remote locator object in accordance with a determination that the remote locator object has become physically separated from the electronic device of the owner (e.g., optionally by a threshold distance, such as 50 feet, 200 feet, 500 feet, ½ mile, 1 mile, etc., optionally for a threshold amount of time, such as 10 minutes, 30 minutes, 1 hour, etc.). In some embodiments, if the remote locator object has been determined to be physically separated from the electronic device, but is determined to be within a safe zone, a separation alert is not generated. For example, a user is able to set the location of the user's home as a trusted location, the location of the user's work, etc. In some embodiments, a trusted location is a fixed location or a moveable location. For example, the location of the user's spouse is able to be set as a trusted location such that if the user's remote locator object is with the user's spouse, the remote locator object does not generate a separation alert and/or does not cause display of an indication that the remote locator object is separated from the user. In some embodiments, a user is able to set the radius of the trusted location (e.g., a radius around the current determined location of the remote locator object).

The above-described manner of setting the location of the remote locator object as a trusted location provides a quick and efficient way of preventing the current location of the remote locator object from generating further alerts, which simplifies the interaction between the user and the electronic device and enhances the operability of the electronic device and makes the user-device interface more efficient (e.g., without requiring the user to perform additional user inputs or navigate to another user interface to add the current location of the remote locator object as a trusted location), which additionally reduces power usage and improves battery life of the electronic device by enabling the user to use the electronic device more quickly and efficiently, while reducing errors in usage.

In some embodiments, the second information includes information about changing a battery of the remote locator object (1142), such as in FIG. 10K (e.g., in response to receiving a selection of an indication of the current battery level of the remote locator object and/or an indication that the current battery level of the remote locator object is low, the electronic device displays a tutorial for how to change the battery of the remote locator object). In some embodiments, the tutorial includes an animation of how to disassemble the remote locator object, how to remove the battery, how to insert a new battery, and/or the type of battery to use.

The above-described manner of displaying information for how to change the battery of the remote locator object provides a quick and efficient way of guiding the user to change the battery, which simplifies the interaction between the user and the electronic device and enhances the operability of the electronic device and makes the user-device interface more efficient (e.g., without requiring the user to perform additional user inputs or perform independent research to determine how to change the battery of the remote locator object), which additionally reduces power usage and improves battery life of the electronic device by enabling the user to use the electronic device more quickly and efficiently, while reducing errors in usage.

In some embodiments, the second information includes an indication of a remaining duration that a location of the remote locator object is shared with a user that is not associated with the electronic device (1144), such as in response to selection of module 1060 in FIG. 10O (e.g., in response to receiving a user input selecting an indication that the location of the remote locator object is temporarily being shared with another user, the electronic device displays a remaining duration of the sharing with the other user).

For example, if the user shared the location of the remote locator object for a preset amount of time (e.g., 2 hours, 6 hours, the rest of the day, etc.), then the user interface includes an indication of that sharing and in response to a selection of the indication, the device displays an indication of the amount of time remaining (e.g., 2 hours remaining, 1 hour remaining, etc.). In some embodiments, the indication that the location of the remote locator object is being shared with another user itself includes an indication of the amount of time remaining in the sharing. In some embodiments, in response to selecting the indication, the device provides one or more options for changing the sharing setting, such as changing the sharing to an indefinite duration, extending the duration, shortening the duration, and/or ending the sharing.

The above-described manner of displaying the remaining duration of the sharing of the remote locator object with another user provides a quick and efficient way of indicating when sharing of the remote locator object will end, which simplifies the interaction between the user and the electronic device and enhances the operability of the electronic device and makes the user-device interface more efficient (e.g., without requiring the user to perform additional user inputs or navigate to another user interface to determine whether the sharing is indefinite or temporary and how much time is remaining), which additionally reduces power usage and improves battery life of the electronic device by enabling the user to use the electronic device more quickly and efficiently, while reducing errors in usage.

In some embodiments, in response to receiving the input directed to the respective user interface element, the electronic device displays (1146), via the display generation component, a selectable option for requesting sharing of a location of the remote locator object from an owner of the remote locator object, such as module 1072 in FIG. 10T (e.g., if the remote locator object is owned by a user other than the user of the electronic device, the user interface includes an indication that the remote locator object is owned by a user other than the user of the device (e.g., an indication that a location of the remote locator object is viewable by the owner of the device)).

In some embodiments, the indication is selectable to display a selectable option that is selectable to request that the location of the remote locator object be shared with the user of the electronic device. In some embodiments, the request is transmitted to the owner of the remote locator object. In some embodiments, if one or more requests for sharing are pending for a respective remote locator object, the user interface includes an indication that one or more sharing requests are pending. In some embodiments, the indication that one or more sharing requests are pending includes an indication of the person that is requesting the sharing and is optionally selectable to enable sharing with the respective person (optionally for a preset duration of time, or indefinitely) or to dismiss the sharing request (e.g., optionally deny the request).

The above-described manner of displaying the remaining duration of the sharing of the remote locator object with another user provides a quick and efficient way of indicating when sharing of the remote locator object will end, which simplifies the interaction between the user and the electronic device and enhances the operability of the electronic device and makes the user-device interface more efficient (e.g., without requiring the user to perform additional user inputs or navigate to another user interface to request sharing from the owner of the device), which additionally reduces power usage and improves battery life of the electronic device by enabling the user to use the electronic device more quickly and efficiently, while reducing errors in usage.

In some embodiments, in response to receiving the input directed to the respective user interface element, the electronic device changes (1148) a wireless communication functionality of the electronic device, such as device 500 enabling Bluetooth functionality in FIG. 10G in response to receive user input 1003 in FIG. 10F (e.g., if the user interface includes an indication that a wireless communication protocol used to communicate with the remote locator object (e.g., Bluetooth, WiFi, etc.) is disabled, in response to receiving a selection of the indication, the device enables the respective wireless communication protocol). In some embodiments, in response to enabling the respective wireless communication protocol, the indication is removed from the user interface (e.g., no longer displayed). In some embodiments, the indication is updated to indicate that the respective wireless communication protocol has been enabled.

The above-described manner of enabling a wireless communication functionality (e.g., in response to receiving an input selecting an indication that the respective wireless communication functionality is disabled) provides a quick and efficient way of enabling communication with the remote locator object (e.g., by determining that the device is unable to communicate with the remote locator object, determining that the reason that the device is unable to communicate with the remote locator object is that a wireless communication protocol is disabled, and providing an option to enable the respective wireless communication protocol), which simplifies the interaction between the user and the electronic device and enhances the operability of the electronic device and makes the user-device interface more efficient (e.g., without requiring the user to perform additional user inputs to determine that the wireless communication functionality is disabled that is preventing the electronic device from communicating with the remote locator object and then perform additional inputs to enable the wireless communication functionality), which additionally reduces power usage and improves battery life of the electronic device by enabling the user to use the electronic device more quickly and efficiently, while reducing errors in usage.

In some embodiments, in accordance with a determination that the remote locator object satisfies one or more second criteria, the respective user interface includes a second respective user interface element that includes second information about the remote locator object (1150), such as user interface 1012 including module 1018 and module 1028 in FIG. 10F (e.g., different indications are associated with different criteria that cause the respective indication to be displayed in the user interface).

Thus, in some embodiments, if the criteria for a first respective indication are satisfied, the user interface includes the first respective indication and if the criteria for a second respective indication are satisfied, the user interface includes the second respective indication (e.g., in addition to the first respective indication). In some embodiments, multiple indications are displayed in the user interface if their respective criteria are satisfied. For example, the user interface optionally includes both an indication that a wireless communication protocol is disabled and an indication that the location of the remote locator object is being shared with another user (e.g., if the criteria for displaying the indication that a wireless communication protocol is disabled are satisfied and the criteria for displaying an indication that the remote locator object is being shared with another user are satisfied)
.

In some embodiments, in accordance with a determination that the remote locator object does not satisfy the one or more second criteria, the respective user interface does not include the second respective user interface element that includes second information about the remote locator object (1152), such as in FIG. 10E (e.g., if the conditions associated with a respective indication are not satisfied, do not include the respective indication in the user interface).

The above-described manner of displaying one or more indications (e.g., in response to determining that the respective criteria for a respective indication are satisfied) provides a quick and efficient way of providing information to the user (e.g., by displaying multiple indications, without being limited to displaying only one indication at a time), which simplifies the interaction between the user and the electronic device and enhances the operability of the electronic device and makes the user-device interface more efficient (e.g., without requiring the user to perform additional user inputs to view a plurality of status information), which additionally reduces power usage and improves battery life of the electronic device by enabling the user to use the electronic device more quickly and efficiently, while reducing errors in usage.

In some embodiments, while displaying, via the display generation component, the respective user interface element, the electronic device receives (1154), via the one or more input devices, an input directed to the respective user interface element, such as in FIG. 10F (e.g., while displaying an indication in the user interface, receiving a user input selecting the indication).

In some embodiments, in response to receiving the input directed to the respective user interface element, the electronic device changes (1156) a setting associated with the remote locator object, such as in FIG. 10G (e.g., changing one or more settings of the electronic device and/or one or more settings of the remote locator object).

In some embodiments, the indication is associated with a respective setting of the electronic device or the remote locator object and selecting the indication initiates a process to change the respective setting. For example, if the indication indicates that a wireless communication protocol is disabled, selecting the indication initiates a process to enable the wireless communication protocol. In some embodiments, if the indication indicates that the location of the remote locator object is shared with another user, selecting the indication initiates a process to change the sharing settings of the remote locator object (e.g., disable sharing, enable more sharing, change the sharing duration, etc.

The above-described manner of changing a setting associated with the remote locator object (e.g., in response to selection of an indication associated with the setting) provides a quick and efficient way of changing a setting relevant to the functionality of the remote locator object, which simplifies the interaction between the user and the electronic device and enhances the operability of the electronic device and makes the user-device interface more efficient (e.g., without requiring the user to perform additional user inputs to navigate to a different user interface to change the relevant settings associated with the displayed indication), which additionally reduces power usage and improves battery life of the electronic device by enabling the user to use the electronic device more quickly and efficiently, while reducing errors in usage.

In some embodiments, changing the setting associated with the remote locator object includes enabling a wireless communication functionality of the electronic device to communicate with the remote locator object (1158), such as in FIG. 10G (e.g., the user interface includes an indication associated with a wireless communication protocol that is used to communicate with the remote locator object (e.g., Bluetooth, WiFi, etc.), and selecting the indication initiates a process to change a setting associated with the respective wireless communication protocol, such as to enable or disable the respective wireless communication protocol).

The above-described manner of changing a setting associated with a wireless communication protocol (e.g., in response to selection of an indication associated with the setting) provides a quick and efficient way of enabling communication with the remote locator object by enabling the setting associated with the wireless communication protocol, which simplifies the interaction between the user and the electronic device and enhances the operability of the electronic device and makes the user-device interface more efficient (e.g., without requiring the user to perform additional user inputs to navigate to a different user interface to change the settings associated with the wireless communication protocol), which additionally reduces power usage and improves battery life of the electronic device by enabling the user to use the electronic device more quickly and efficiently, while reducing errors in usage.

In some embodiments, while displaying the respective user interface that includes the respective user interface element, the electronic device determines (1160) that the remote locator object no longer satisfies the one or more first criteria, such as in FIG. 10G (e.g., while displaying a respective indication that is displayed in response to determining that first criteria are satisfied, determining that the first criteria are no longer satisfied). For example, if an indication indicates that a wireless communication protocol is disabled, if the device determines that the wireless communication protocol has been enabled, for example, via a settings user interface other than the respective user interface.

In some embodiments, in response to determining that the remote locator object no longer satisfies the one or more first criteria, the electronic device ceases (1162) to display the respective user interface element, such as in FIG. 10G (e.g., in response to determining that the first criteria are no longer satisfied, automatically (e.g., without receiving a user input for doing so) ceasing display of the respective indication associated with the first criteria (e.g., optionally with an animation of the respective indication being removed)).

For example, in response to determining that the wireless communication protocol has been enabled, the device ceases display of the indication that the wireless communication protocol is disabled. In some embodiments, if an indication indicates that the location of the remote locator object is shared with another user for a duration of time, after the duration of time has elapsed, the indication automatically ceases to be displayed. In some embodiments, if the indication indicates that the battery level of the remote locator object is low, then in response to a determination that the battery level of the remote locator object is not low (e.g., due to the user replacing the battery), the indication automatically ceases to be displayed. In some embodiments, the indication is automatically ceased to be displayed even if the condition that caused display of the indication is resolved in a manner independent of the indication (e.g., via a process other than selection of the indication). In some embodiments, the indication remains displayed until the device navigates away from the user interface and navigates back to the user interface (e.g., refreshes display of the user interface). In such embodiments, in response to navigating back to the user interface, the information included in the user interface is refreshed such that if the criteria associated with a respective indication has ceased to be met, the user interface no longer includes the respective indication. In some embodiments, if the criteria associated with a respective indication ceased to be met while the device is not displaying the user interface, then at a future time when device 500 displays the user interface, the user interface optionally does not include the respective indication. Thus, in some embodiments, when the device displays the user interface (e.g., when the device begins to display the user interface from not displaying the user interface, or optionally while the device is displaying the user interface), the device optionally determines whether the criteria associated with the one or more indications are met and either includes or does not include the indications accordingly.

The above-described manner of ceasing display of a respective indication (e.g., automatically, in response to a determination that the criteria that caused display of the respective indications are no longer satisfied) provides a quick and efficient way of providing the most updated information about the remote locator object (e.g., by automatically displaying relevant indications and removing indications that are no longer relevant), which simplifies the interaction between the user and the electronic device and enhances the operability of the electronic device and makes the user-device interface more efficient (e.g., without requiring the user to perform additional user inputs to determine whether an indication is still applicable or valid), which additionally reduces power usage and improves battery life of the electronic device by enabling the user to use the electronic device more quickly and efficiently, while reducing errors in usage.

It should be understood that the particular order in which the operations in FIGS. 11A-11I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, and 1300) are also applicable in an analogous manner to method 1100 described above with respect to FIGS. 11A-11I. For example, providing information associated with a remote locator object described above with reference to method 1100 optionally has one or more of the characteristics of providing user interfaces for defining identifiers for remote locator objects, locating a remote locator object, displaying notifications associated with a trackable device, etc., described herein with reference to other methods described herein (e.g., methods 700, 900, and 1300). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 11A-11I are, optionally, implemented by components depicted in FIGS. 1A-1B. For example, displaying operations 1138, 1146 and receiving operations 1102, 1136, and 1154 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Displaying Notifications Associated with a Trackable Device

Users interact with electronic devices in many different manners. In some embodiments, an electronic device is able to track the location of a trackable device (e.g., a remote locator object, a trackable phone, a trackable tablet, a trackable headphone, a trackable media player, etc.). The embodiments described below provide ways in which an electronic device displays notifications indicating that a trackable device may be unexpectedly tracking the location of the electronic device associated with a user, thus enhancing the user's interactions with the electronic device.

Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 12A-12G illustrate exemplary ways in which an electronic device 500 displays notifications associated with a trackable device in accordance with some embodiments of the disclosure. The embodiments in these figures are used to illustrate the processes described below, including the processes described with reference to FIGS. 13A-13F.

In some embodiments, an electronic device (e.g., electronic device 500) optionally determines that a trackable object (such as the remote locator objects described above with respect to methods 700, 900, and 1100) is unexpectedly following the location of the electronic device. In some embodiments, a trackable object is "unexpectedly" following the location of the electronic device if the trackable object has not been explicitly approved by the user of electronic device to follow the location of the electronic device and/or if the trackable object is associated with a user that does not have a pre-existing relationship with the user (e.g., is not a family member of the user, and/or is not an existing contact of the user, etc.). In some embodiments, if a trackable object (e.g., either known or unknown to the user) appears to be following the location of the device unexpectedly, the electronic device optionally determines that an alert should be presented indicating that a trackable object is or has been following the location of the user and that the owner of the trackable object (e.g., a user whose account is associated with or paired with the trackable object) is able to access the location of the trackable object. Providing unauthorized tracking alerts provides privacy and security benefits to the user of the electronic device. In some embodiments, whether and when to present an alert requires a balance to reduce false positives and false negatives. In addition, how often to present an alert can affect the efficacy of the alert itself. For example, presenting too many alerts too often can cause a user to disable alerts altogether, or ignore alerts when they are presented, thus reducing or eliminating the benefits of the alerts. The embodiments below describe example situations in which the electronic device determines that an alert should be presented, and situations in which an alert is not presented.

Figure 12A:
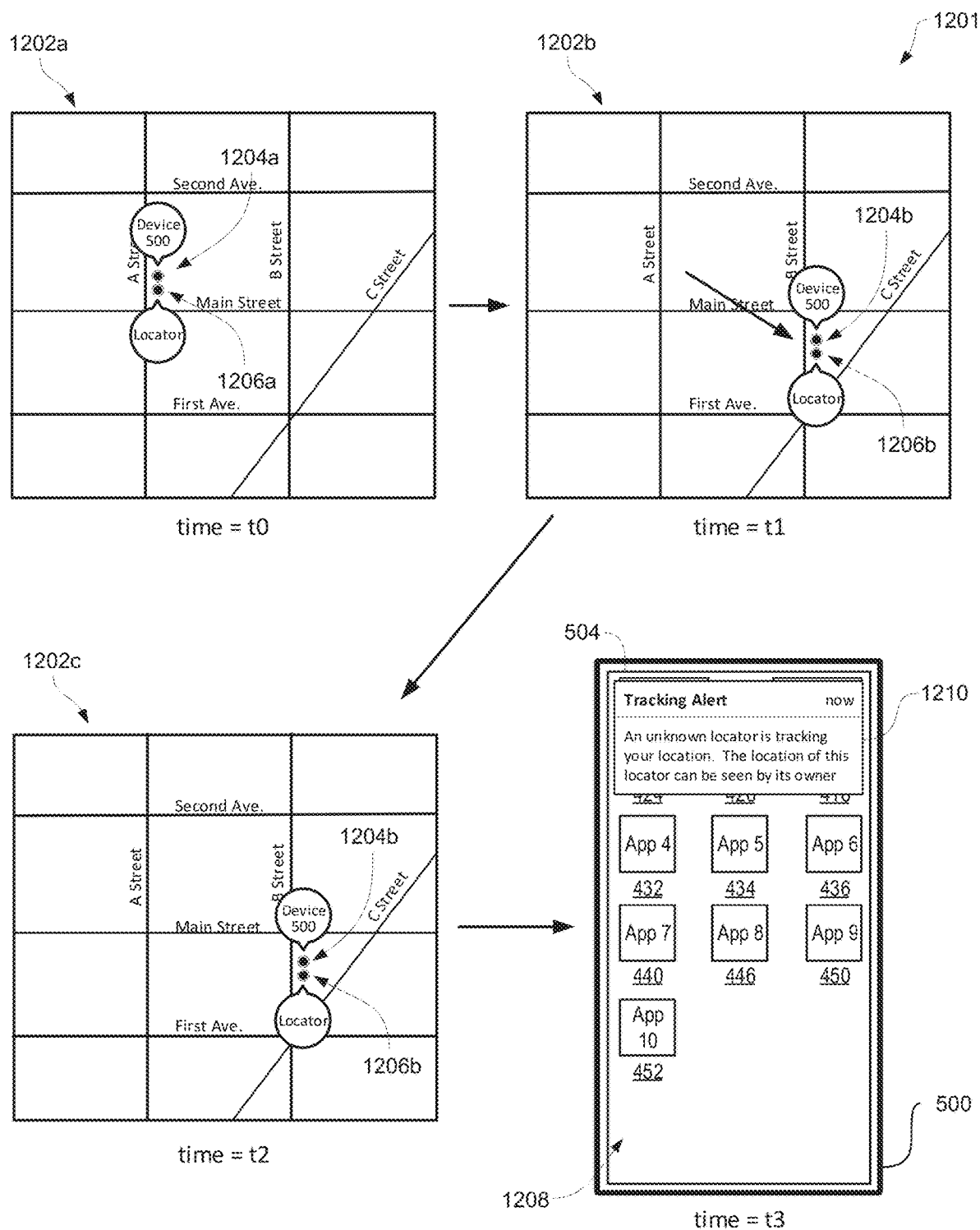
FIGS. 12A-12G illustrate exemplary ways in which an electronic device displays notifications associated with a trackable device in accordance with some embodiments of the disclosure.

FIG. 12A illustrates scenario 1201 in which electronic device 500 presents an unauthorized tracking alert. In FIG. 12A, at time t0 (represented by map 1202a), the electronic device (e.g., device 500) is located at geographic position 1204a and a trackable object is located at geographic position 1206a. In some embodiments, geographic position 1204a and geographic position 1206a are within a threshold distance from each other (e.g., within 1 foot, 3 feet, 10 feet, 50 feet, 100 feet, etc.). In some embodiments, device 500 determines at time t0 that the trackable object is within the threshold distance of device 500. In some embodiments, device 500 determines that the trackable object is within the threshold distance of device 500 by wirelessly polling the environment around device 500 to determine whether trackable objects are in the environment around device 500, or any other suitable method of wirelessly discovering the existence of and/or location of electronic devices. In some embodiments, in response to wirelessly polling the trackable object, device 500 receives a unique identifier (e.g., serial number, identifier, etc.) of the trackable object. In some embodiments, device 500 uses the unique identifier received from the trackable object during this process to determine whether the trackable object that is detected to be near device 500 is the same trackable object (e.g., the same trackable object that was previously observed and/or detected). In some embodiments, a first criterion for determining whether to provide an alert that a trackable object is tracking the location of a device is that the trackable object is within the threshold distance of device 500. Thus, as shown in FIG. 12A, at time t0, the first criterion is satisfied.

In FIG. 12A, at time t1 (represented by map 1202b), which is a time after time t0, device 500 and the trackable object have both moved to a new geographic location: device 500 to geographic location 1204b and the trackable object to geographic location 1206b. In some embodiments, geographic location 1204b and geographic location 1206b are within a threshold distance from each other (e.g., within 1 foot, 3 feet, 10 feet, 50 feet, 100 feet, etc.). In some embodiments, a second criterion for determining whether to provide an alert that a trackable object is tracking the location of a device is that the trackable object is within a threshold distance of device 500 after the electronic device has moved (and/or remains within the threshold distance of device 500 while device 500 is moving) by more than a threshold amount (e.g., 20 feet, 50 feet, 100 feet, 500 feet, ½ mile, etc.). In some embodiments, the threshold amount that device 500 has to move to satisfy the second criterion is more than the threshold distance requirement for the distance between device 500 and the trackable object (e.g., device 500 has to move by more than the distance between device 500 and the trackable object that satisfies the first criteria).

In some embodiments, the threshold distance requirement for the distance between device 500 and the trackable object after device 500 has moved is different from the threshold distance requirement from before the movement of device 500 (e.g., more or less). In some embodiments, the threshold distance requirement for the distance between the electronic device and the trackable object after the electronic device has moved is the same as the threshold distance requirement from before the electronic device has moved. Thus, as shown in FIG. 12A, at time t1, the second criterion is satisfied. In some embodiments, the second criterion ensures that the locator object is truly following the electronic device, rather than simply having been placed at a static location near the electronic device (which will be described in more detail below with respect to FIG. 12B).

In FIG. 12A, at time t2 (represented by map 1202c), which is a time after time t1, both device 500 and the trackable object have remained at their previous locations (e.g., geographic location 1204b and 1206, respectively, the locations at time t1, or within a threshold distance from the locations at t1, such as 10 feet, 50 feet, 100 feet, 200 feet, 500 feet, etc.) for more than a threshold amount of time (e.g., 1 minute, 5 minutes, 30 minutes, 60 minutes, etc.). For example, in FIG. 12A, time t2 is optionally 1 hour after time t1. In some embodiments, a third criterion for determining whether to provide an alert that a trackable object is tracking the location of a device is that the trackable object remains within the threshold distance of the electronic device (e.g., after device 500 has moved by more than a threshold amount) for at least the threshold amount of time during which device 500 moves by less than a threshold distance (e.g., less than 10 feet, 30 feet, 50 feet, 100 feet, 500 feet, etc.). In some embodiments, device 500 determines that the trackable object remains within the threshold distance of device 500 by continuously or periodically polling the trackable object to determine whether the trackable object remains within the threshold distance of device 500. In some embodiments, device 500 polls the trackable object every 30 minutes, every hour, every two hours, every four hours, every six hours, etc. As discussed above, device 500 determines that it is the same trackable object that has been tracking device 500 by determining that the identifier of the trackable object (which is optionally received in response to polling and/or querying the trackable object) is the same identifier that was received during previous polling and/or querying steps. Thus, as shown in FIG. 12A, at time t2, the third criterion is satisfied. As will be described below, after the third criterion is satisfied, device 500 is optionally able to move by more than the threshold distance without causing the third criterion to no longer be satisfied. In some embodiments, the third criterion ensures that the trackable object is truly following the electronic device, rather than simply moving along the same path as the electronic device (which will be described in more detail below with respect to FIG. 12C).

In some embodiments, after the third criterion is satisfied, device 500 optionally does not display a notification until a threshold amount of time has elapsed (e.g., 2 hours, 4 hours, 6 hours, 12 hours, 24 hours, etc.) while the trackable object remains within a threshold distance of device 500 (e.g., 10 feet, 50 feet, 100 feet, 200 feet, 500 feet, etc., optionally the same or different than the other threshold distances), optionally without regard to whether device 500 moves by more than the threshold amount described above. Thus, in some embodiments, a fourth criterion for determining whether to provide an alert that a trackable object is tracking the location of a device is that the trackable object remains within the threshold distance of device 500 for at least the threshold amount of time (e.g., 1 hour, 2 hours, 4 hours, 6 hours, 12 hours, 24 hours, etc.). In some embodiments, the fourth criterion ensures that the trackable object is truly following device 500 and reduces the frequency of providing alerts to the user (e.g., to avoid producing too many alerts).

Thus, in FIG. 12A, at time t3, which is a time after time t2, in accordance with and/or in response to a determination that the one or more criteria are satisfied (e.g., one or more of all of the first, second, third, and fourth criteria described above), device 500 displays notification 1210 on user interface 1208 (e.g., overlaid on top of the user interface that was displayed before notification 1210 was displayed) that indicates that an unknown locator object is tracking the location of device 500 and that the owner of the unknown locator object (e.g., the user whose account is associated with the unknown locator object) is able to see the location of the unknown locator. In some embodiments, as discussed above, the one or more criteria are satisfied if the unknown locator is within a first threshold distance of device 500, remains within a second threshold distance from device 500 while device 500 moves for more than a threshold distance, and remains within the second threshold distance from device 500 while device 500 does not move (optionally for at least a threshold amount of time, such as 5 minutes, 10 minutes, 30 minutes, 1 hour, 2 hours, etc.).

It is understood that any of the above described criterion can be optional and/or the order of the criterion can be changed. For example, the electronic device displays notification 1210 in response to the third criterion having been satisfied (e.g., after the first and second criterion are satisfied), without requiring the fourth criterion to be satisfied (e.g., the fourth criterion is optional and notification 1210 is displayed when and/or in response to the third criterion being satisfied, without waiting for the fourth criterion to be satisfied).

In some embodiments, the one or more criteria for determining whether to provide an alert that a trackable object is tracking the location of device 500 includes additional criterion not discussed above. For example, in some embodiments, the one or more criteria includes a criterion that the trackable object is separated from its owner (e.g., more than a threshold distance from the owner's device, such as more than 20 feet, 50 feet, 100 feet, 500 feet, etc.). In some embodiments, the one or more criteria do not include a criterion that the trackable object is separated from its owner (e.g., the one or more criteria can be satisfied even if the trackable object is not separated from its owner). In some embodiments, the one or more criteria optionally include a criterion that the trackable object is not owned by a contact of the user and/or not owned by a family member of the user of device 500 (e.g., not owned by a user that is in the user's family group).

Figure 12B:
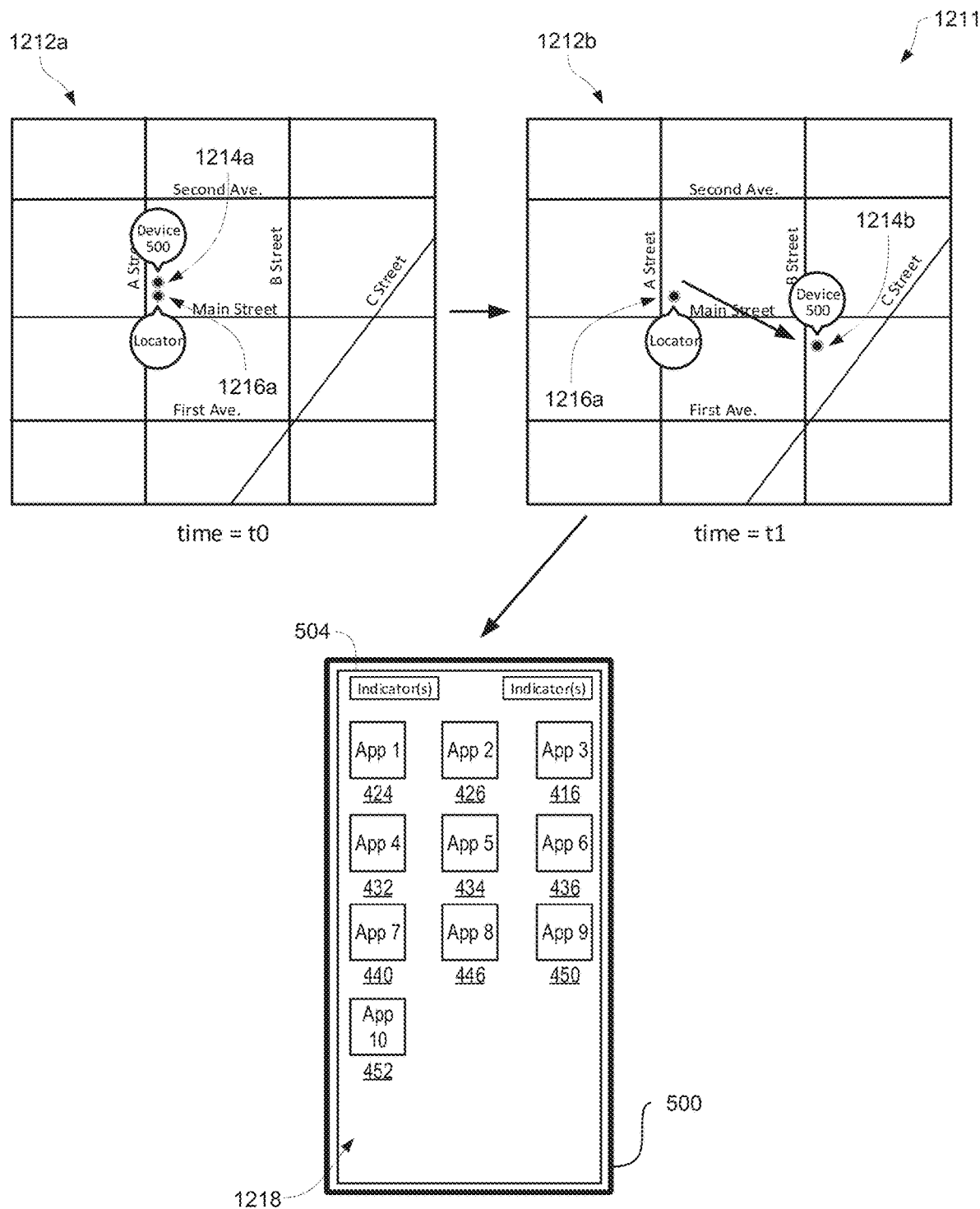

FIG. 12B illustrates scenario 1211 in which electronic device 500 does not present an unauthorized tracking alert. In FIG. 12B, at time t0 (represented by map 1212*a*), the electronic device (e.g., device 500) is located at geographic position 1214*a* and a trackable object is located at geographic position 1216*a*. In some embodiments, geographic position 1214*a* and geographic position 1216*a* are within a threshold distance of each other (e.g., within 1 foot, 3 feet, 10 feet, 50 feet, 100 feet, etc.). Thus, at time t0, the first criterion previously described is satisfied.

In FIG. 12B, at time t1 (represented by map 1212*b*), which is a time after time t0, device 500 has moved to geographic location 1214*b* while the trackable object remained at geographic location 1216*a* (or optionally moves to a different geographic location that is farther than a threshold distance from device 500). In some embodiments, geographic location 1214*b* is farther than a threshold distance from geographic location 1216*a* (e.g., more than 1 foot, 3 feet, 10 feet, 50 feet, 100 feet, etc.). Thus, because device 500 is more than the threshold distance from the trackable object, the second criterion previously described is not satisfied. In some embodiments, in accordance with and/or in response to a determination that the second criteria is not satisfied, device 500 does not display a notification (e.g., such as notification 1210 described above with respect to FIG. 12A) that indicates that an unknown locator is tracking the location of device 500. In some embodiments, as discussed above, the one or more criteria are not satisfied if the unknown locator does not remain within the second threshold distance from device 500 while device 500 moves for more than a threshold distance.

As shown above, the second criterion provides the benefit of reducing false positives, for example, if an unknown trackable object is placed at a stationary location that happens to be within a threshold distance of device 500 or if an unknown trackable object is in the possession of the owner of the object and is not following the user.

Figure 12C:
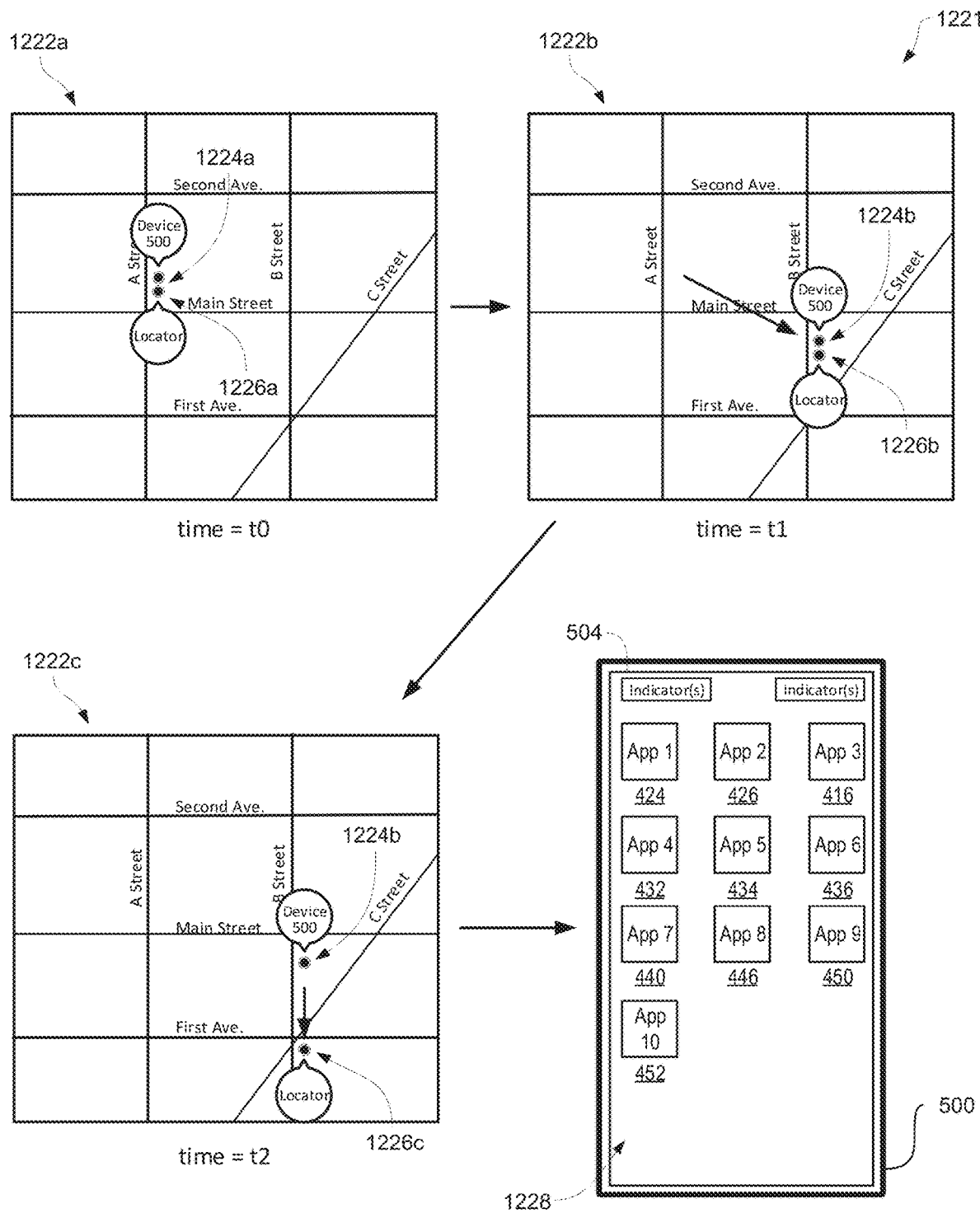

FIG. 12C illustrates scenario 1221 in which electronic device 500 does not present an unauthorized tracking alert. In FIG. 12C, at time t0 (represented by map 1222*a*), the electronic device (e.g., device 500) is located at geographic position 1224*a* and a trackable object is located at geographic position 1226*a*. In some embodiments, geographic position 1224*a* and geographic position 1226*a* are within a threshold distance of each other (e.g., within 1 foot, 3 feet, 10 feet, 50 feet, 100 feet, etc.). Thus, at time t0, the first criterion previously described is satisfied.

In FIG. 12C, at time t1 (represented by map 1222*b*), which is a time after time t0, the electronic device and the trackable object have both moved to a new geographic location: the electronic device to geographic location 1224b and the trackable object to geographic location 1226b. In some embodiments, geographic location 1224b and geographic location 1226b are within a threshold distance from each other (e.g., within 1 foot, 3 feet, 10 feet, 50 feet, 100 feet, etc.). Thus, at time t1, the second criterion is satisfied.

In FIG. 12C, at time t2 (represented by map 1222c), which is a time after time t1, device 500 remained at its previous location (e.g., geographic location 1224b) while the trackable object moved to a new geographic location 1226c that is more than a threshold distance from geographic location 1224b. Thus, at time t2, the trackable object is no longer within the threshold distance from device 500 and did not remain at its previous location (e.g., or within a threshold distance from its previous location) for more than the threshold amount of time. Thus, at time t2, the third criterion previously described is not satisfied. In some embodiments, in accordance with and/or in response to a determination that the third criteria is not satisfied, device 500 does not display a notification (e.g., such as notification 1210 described above with respect to FIG. 12A) that indicates that an unknown locator is tracking the location of device 500. In some embodiments, as discussed above, the one or more criteria are not satisfied if the unknown locator does not remain within the second threshold distance of device 500 while device 500 does not move (optionally for at least a threshold amount of time, such as 5 minutes, 10 minutes, 30 minutes, 1 hour, 2 hours, etc.).

As shown above, the third criterion provides the benefit of reducing false positives, for example, if device 500 and an unknown trackable object are both traveling on a common transport (e.g., taxi, bus, subway, etc.) and the unknown trackable object happens to be within a threshold distance of device 500 (e.g., in which case, when the user exits the common transport, the unknown trackable object may continue onwards).

In some embodiments, device 500 generates a notification (e.g., such as notification 1210 described above with respect to FIG. 12A) before the one or more criteria have been fully satisfied. For example, if the first and second criteria are satisfied and while waiting for the third criteria to become satisfied (e.g., due to the time duration requirement), device 500 detects that one or more early notification criteria are satisfied, which causes device 500 to generate a notification (e.g., such as notification 1210 described above with respect to FIG. 12A), even though not all of the criterion of the one or more criteria have been satisfied.

In some embodiments, the one or more early notification criteria are satisfied if device 500 determines that the owner of the trackable object has initiated a process to find the trackable object (e.g., in a manner similar to that described above with respect to method 900). In some embodiments, because the owner of the trackable object has initiated a process to find the trackable object, the owner of the trackable object is actively collecting and/or looking at the location of the trackable object, which potentially provides the owner with the location of device 500 (e.g., and thus the location of the user). Thus, in some embodiments, device 500 provides an early notification (e.g., similar to notification 1210) to the user (e.g., earlier than otherwise would be provided, and before the normally required criteria are satisfied) in response to detecting that the owner of the trackable object has initiated a process to find the trackable object.

In some embodiments, the one or more early notification criteria are additionally or alternatively satisfied if device 500 determines that device 500 is approaching one or more of the user's safe and/or trusted locations (e.g., approaches within a threshold distance of the safe and/or trusted location, such as 200 feet, 500 feet, ¼ mile, ½ mile, 1 mile, etc.). In some embodiments, a user's safe and/or trusted locations are locations previously indicated by the user as a safe and/or trusted location (e.g., the user's home, the user's place of work, etc.), as described previously. For example, if device 500 moves to a location that is within the threshold distance to the user's home (which optionally has been set as a safe location) while the trackable object is within a threshold distance from device 500, device 500 optionally provides an early notification (e.g., similar to notification 1210) to the user (e.g., earlier than otherwise would be provided, and before the normally required criteria are satisfied).

In some embodiments, the one or more early notification criteria are additionally or alternatively satisfied if device 500 determines that the trackable object will (e.g., is about to) change its unique identifier (e.g., or is within a threshold time before when the trackable object will change its unique identifier). In some embodiments, because device 500 optionally uses the unique identifier of the trackable object to determine whether a respective trackable object that is potentially tracking the user's device is the same trackable object and not a different trackable object (e.g., in which case, the test(s) for determining whether to generate an alert resets for the new trackable object), if a trackable object changes its unique identifier, device 500 is optionally unable to determine whether the trackable object in question is a different trackable object or the same trackable object. Thus, before the trackable object changes its unique identifier (e.g., at the time that the unique identifier is changed, 5 minutes before, 10 minutes before, 30 minutes before, an hour before, etc.), device 500 provides an early notification (e.g., similar to notification 1210) to the user (e.g., earlier than otherwise would be provided, and before the normally required criteria are satisfied). In some embodiments, trackable objects change their unique identifiers at a predetermined interval and/or at a predetermined time. Thus, in some embodiments, device 500 generates an early notification to the user at or before the predetermined time and/or interval (e.g., every 3 hours, every 6 hours, every 12 hours, every 24 hours, every week, etc.). In some embodiments, device 500 is able to determine when the trackable object will change its unique identifier by querying the trackable object and/or querying an external server to determine the schedule associated with the trackable object for refreshing the unique identifier.

In some embodiments, the early notification is generated only if certain criterion of the one or more criteria are satisfied when the early notification criteria is satisfied. For example, in some embodiments, the early notification criteria includes a requirement that the trackable object be within the threshold distance of the electronic device (e.g., the first criterion of the one or more criteria). In some embodiments, the early notification criteria additionally or alternatively includes a requirement that the trackable object is within a threshold distance of the electronic device after the electronic device has moved (or while the electronic device is moving) by more than a threshold amount (e.g., the second criterion of the one or more criteria). In some embodiments, the early notification criteria does not include the second criterion of the one or more criteria (e.g., the second criterion need not be satisfied for the early notification criteria to be satisfied).

In some embodiments, criteria for generating an alert (e.g., the early notification criteria and/or the non-early notification criteria) includes a notification limiting and/or notification throttling feature. In some embodiments, even if all other criterion of the respective criteria are satisfied, device 500 only displays a predetermined maximum number of notifications (e.g., 1 notification, 3 notifications, 5 notifications, 10 notifications, etc.) for a predetermined period of time (e.g., every 1 hour, 3 hours, 6 hours, 12 hours, 24 hours, 48 hours, etc.). For example, the electronic device optionally displays a maximum of one tracking notification for each 24 hour period (e.g., in response to the first time the respective criteria are satisfied during the 24 hour period), even if the respective criteria are satisfied more than once during the 24 hour period. In some embodiments, device 500 will display notifications in response to the one or more criteria being satisfied until device 500 reaches the predetermined maximum number of notifications. In some embodiments, after reaching the predetermined maximum number of notifications, device 500 optionally will not display any further unauthorized tracking notifications until the predetermined period of time elapses. In some embodiments, the notification limiting and/or notification throttling feature is unique to a respective trackable object. For example, even if the maximum number of notifications has been reached for a first trackable object, device 500 optionally is able to display unauthorized tracking notifications for a second trackable object (e.g., if the respective criteria for the second trackable object are satisfied). In some embodiments, the notification limiting and/or notification throttling feature applies for all unauthorized tracking notifications, and applies to all trackable objects (e.g., is not unique to a respective trackable object). In some embodiments, implementing a notification limiting and/or notification throttling feature reduces the number of potentially repetitive notifications that are presented to the user, reduces the risk that the user will disable or ignore notification, and/or increases the likelihood that the user will engage with the notifications when they are presented.

Figure 12E:
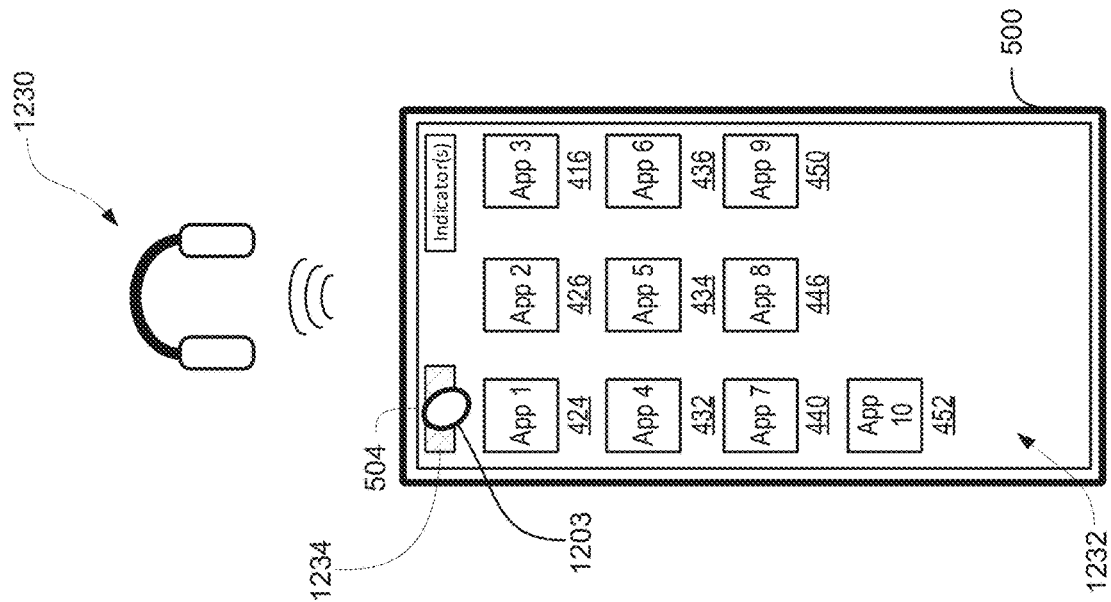
Figure 12D:
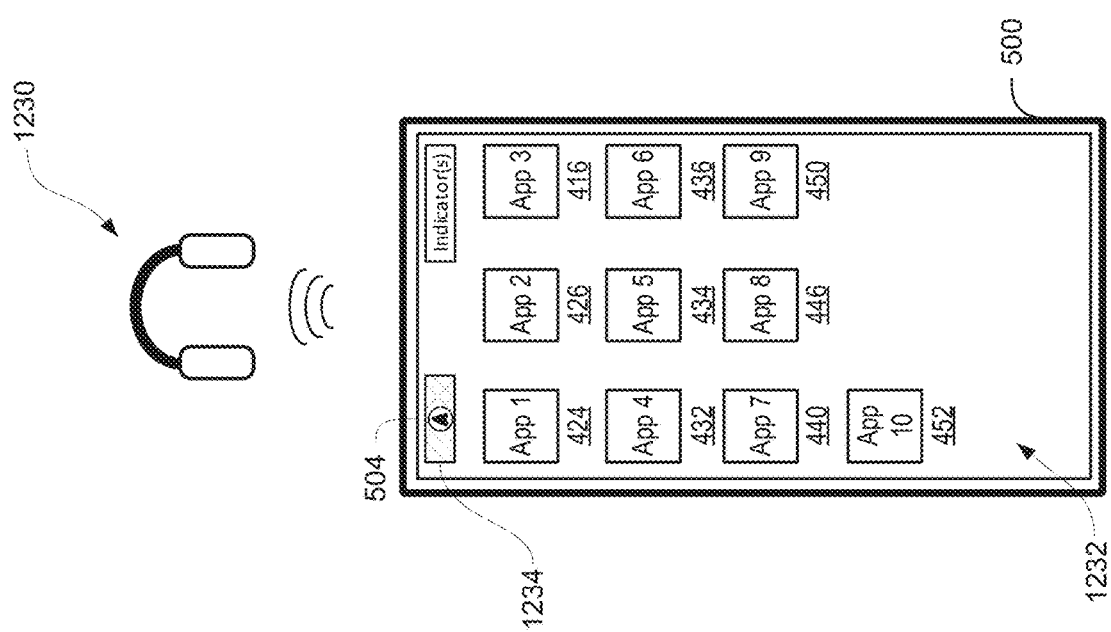
Figure 12G:
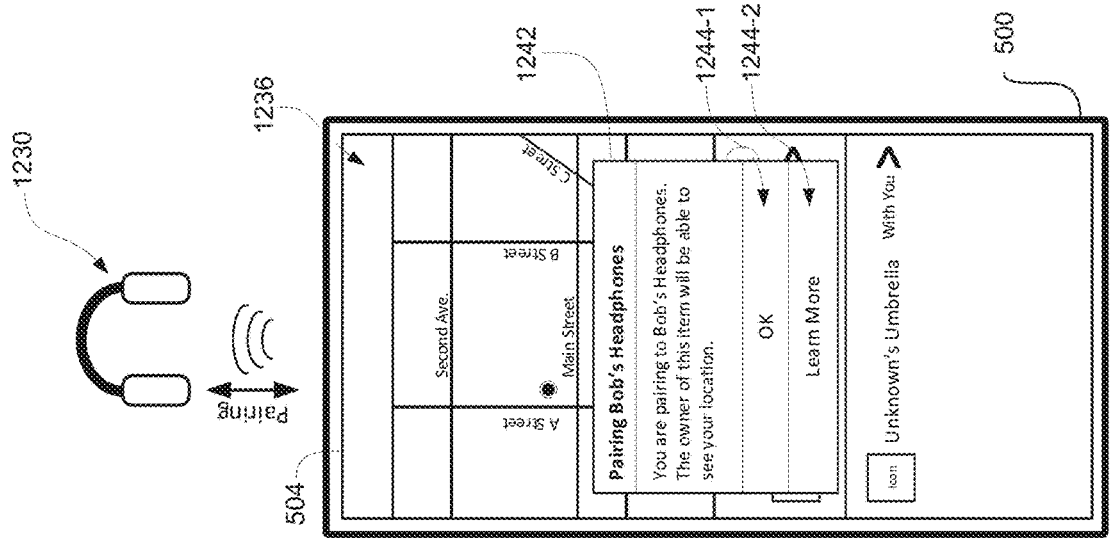
Figure 12F:
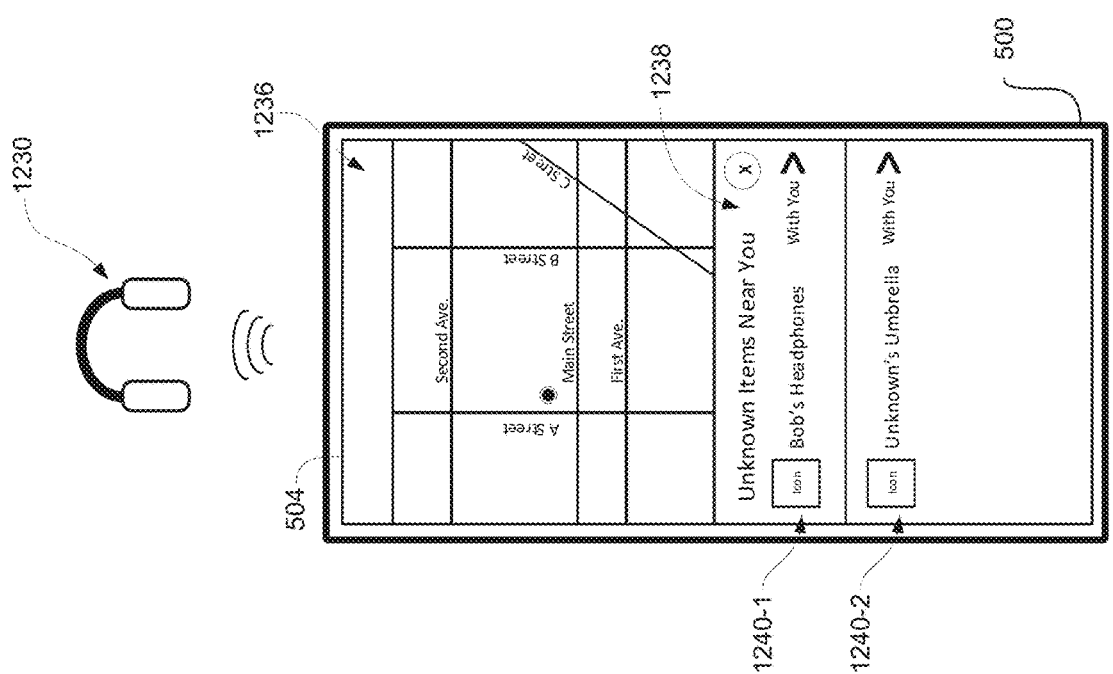
Figure 13A:
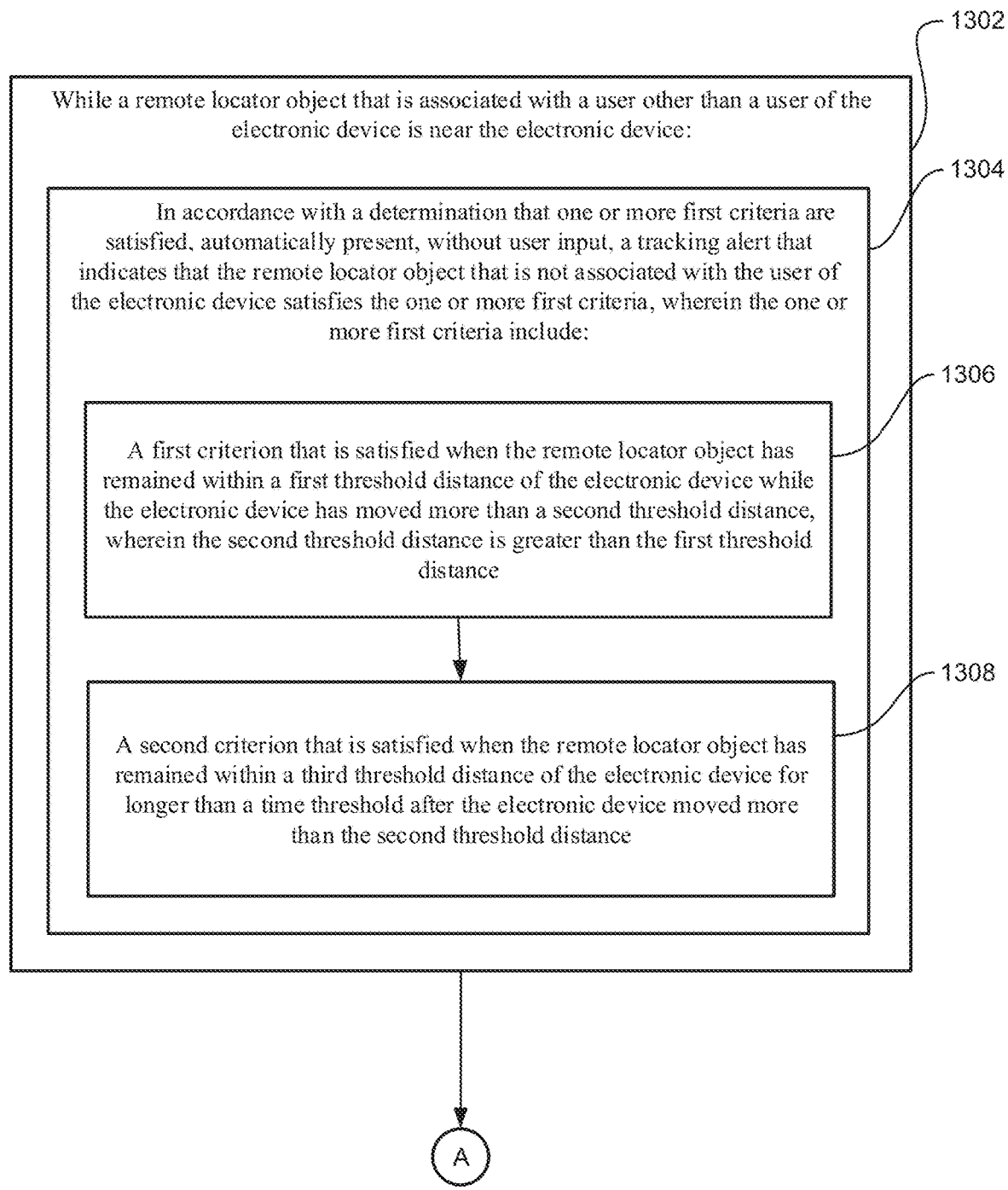
FIGS. 13A-13F are flow diagrams illustrating a method of displaying notifications associated with a trackable device in accordance with some embodiments of the disclosure.
Figure 13B:
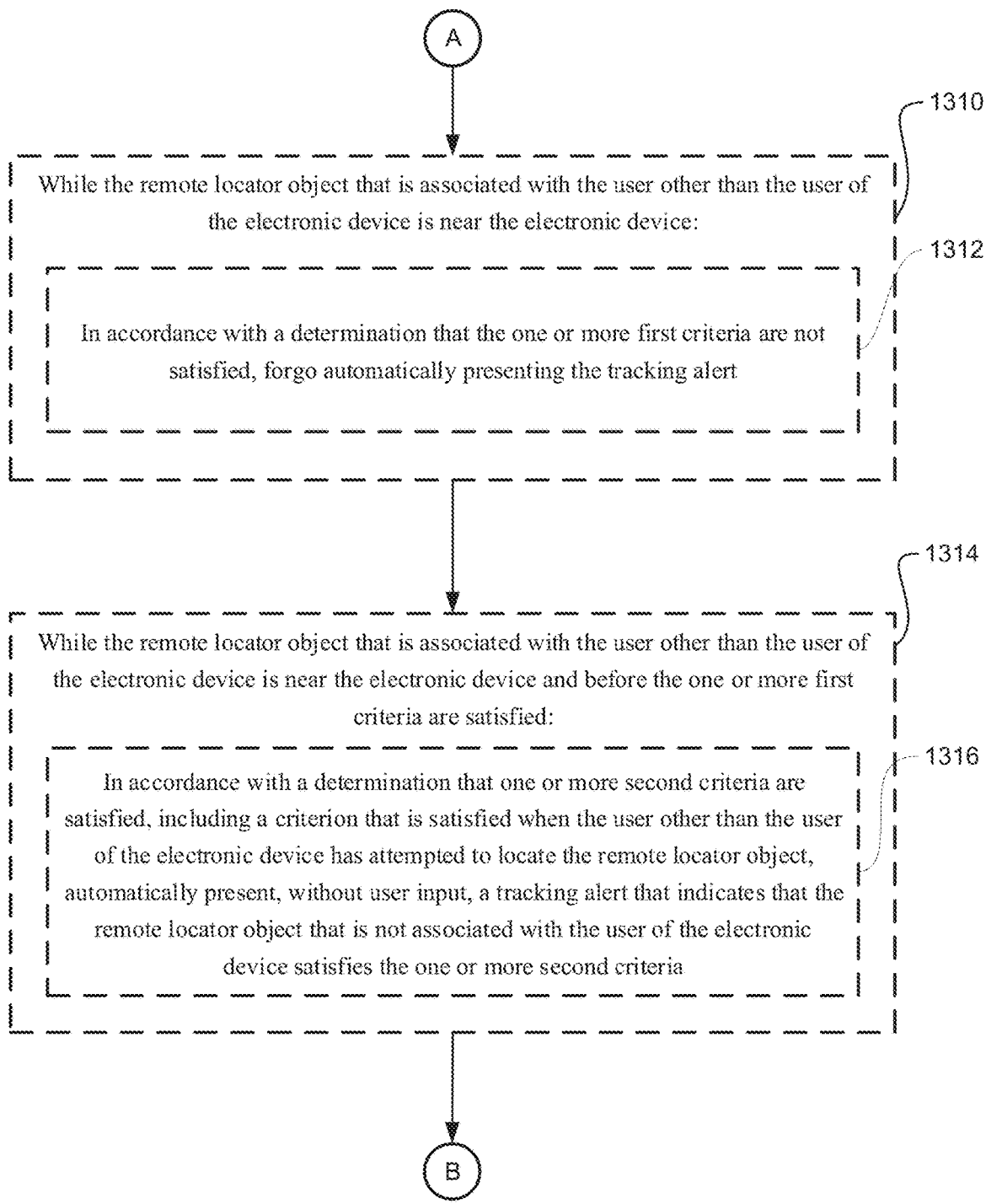
Figure 13C:
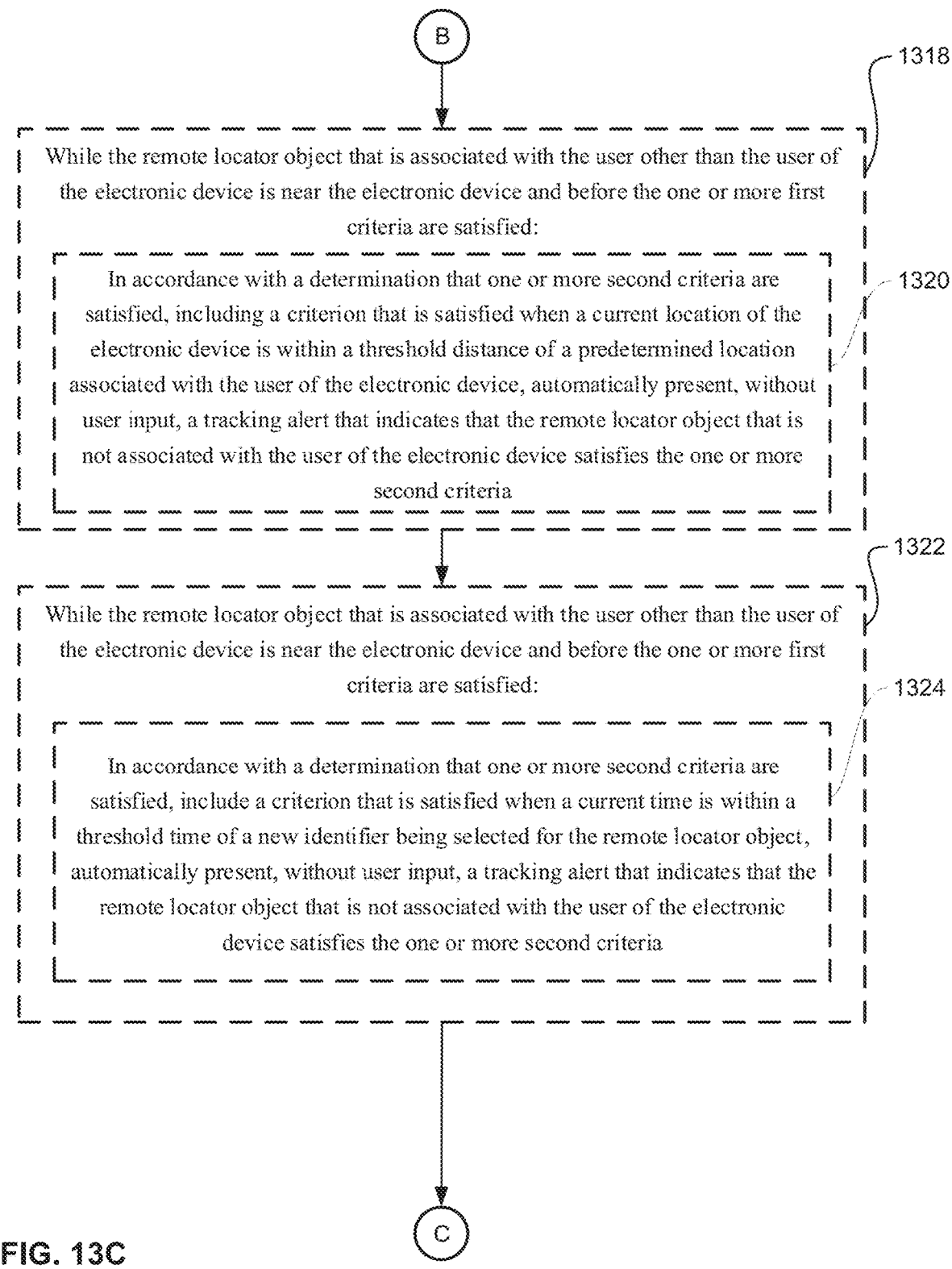
Figure 13D:
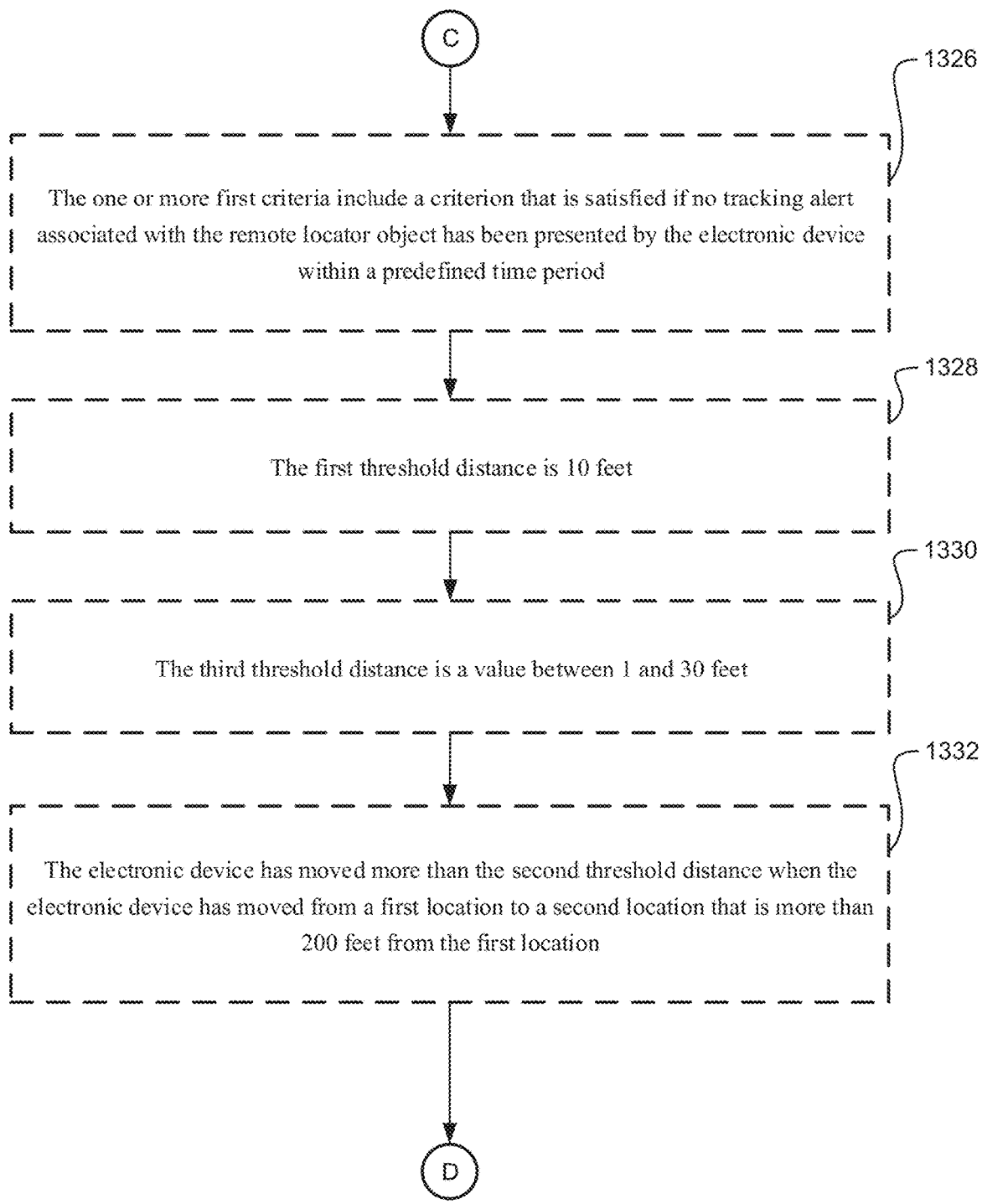
Figure 13E:
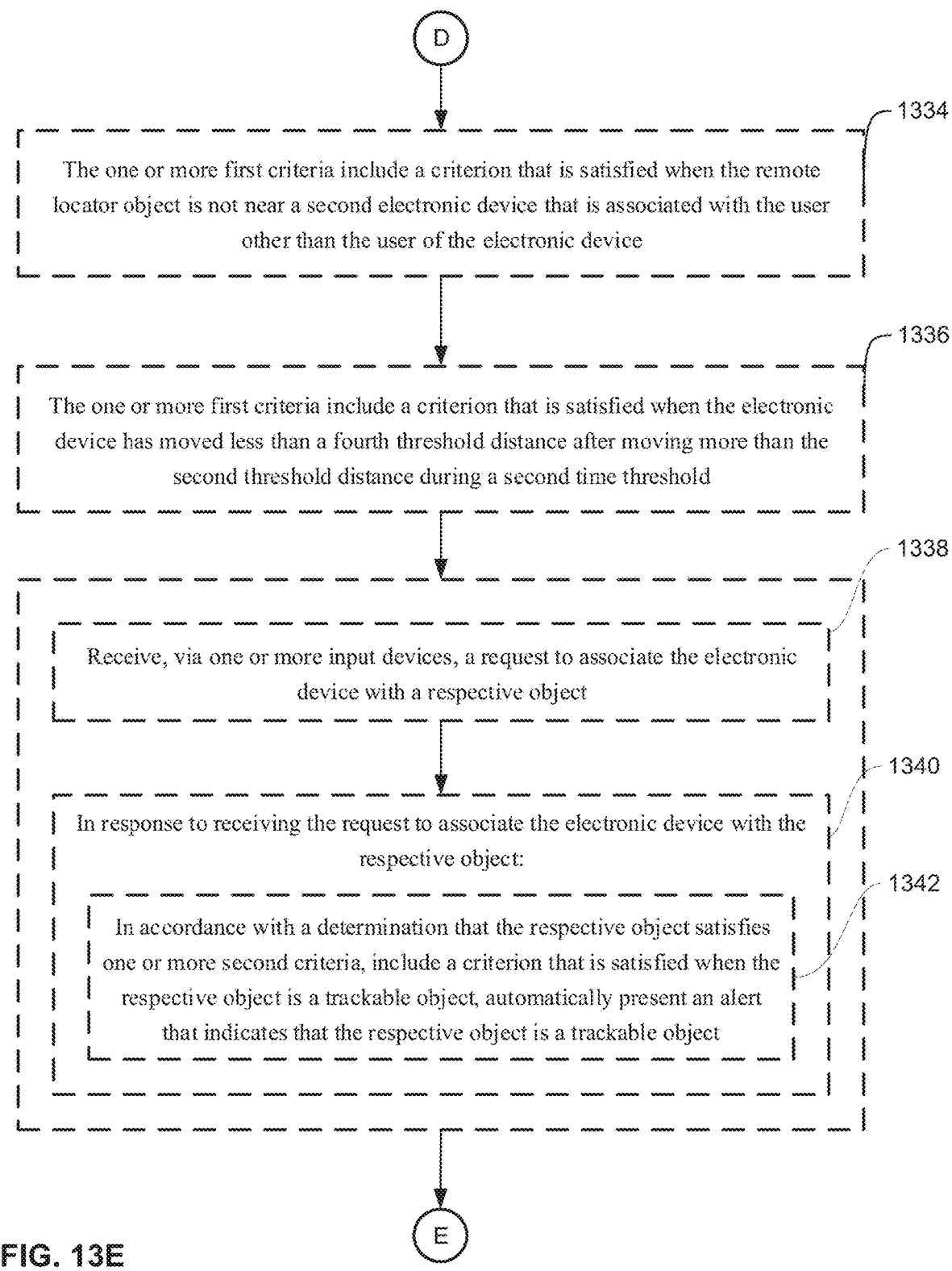
Figure 13F:
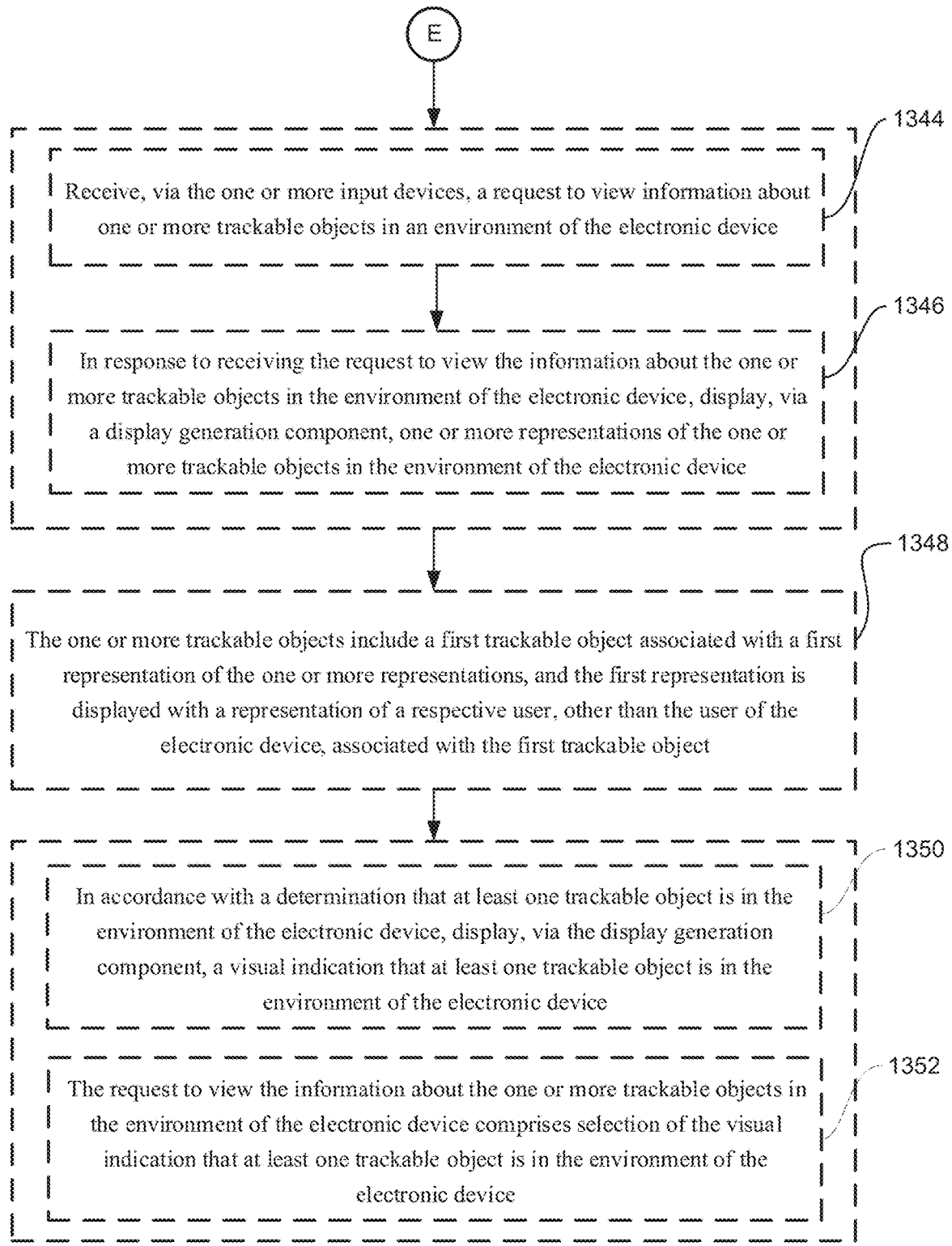

FIGS. 12D-12F illustrate an embodiment in which device 500 displays an indication that a trackable object is near device 500. In FIG. 12D, device 500 is displaying user interface 1232 (e.g., a home screen user interface, similar to user interface 400 described above with respect to FIG. 4A). In some embodiments, device 500 detects that a trackable object 1230 is near device 500. In some embodiments, trackable object 1230 is near device 500 if trackable object 1230 is within a threshold distance of device 500 (e.g., within 2 feet, 5 feet, 10 feet, 20 feet, 50 feet, etc.). In some embodiments, trackable object 1230 is near device 500 if trackable object 1230 is within an effective range of a wireless communication protocol (e.g., Bluetooth, Zigbee, NFC, etc.), such that device 500 is able to wirelessly communicate with trackable object 1230.

In some embodiments, trackable object 1230 is any electronic device that is able to determine and/or report its geographic location to another electronic device (e.g., optionally the owner of trackable object 1230). In some embodiments, trackable object 1230 is able to determine its geographic location via one or more location identification circuitry, such as GPS circuitry. In some embodiments, trackable object 1230 is able to determine its geographic location by communicating with another electronic device (e.g., such as device 500) and receiving location information from the other electronic device (e.g., the other electronic device is able to determine its own location via one or more location identification circuitry). In FIG. 12D, trackable object 1230 is a pair of wireless headphones.

In some embodiments, in response to and/or in accordance with a determination that trackable object 1230 is near device 500 (optionally additionally in accordance with a determination that trackable object 1230 is not paired with device 500), device 500 displays indication 1234. In some embodiments, indication 1234 is displayed at or near a respective edge and/or corner of touch screen 504 (e.g., near the top edge, near the left edge, near the top-left corner, etc.). In some embodiments, indication 1234 replaces one or more system indications that were previously displayed at the respective location of indication 1234. In some embodiments, indication 1234 indicates that device 500 has detected that a trackable device is near device 500.

In FIG. 12E, a user input 1203 (e.g., a tap input) is received selecting indication 1234. In some embodiments, in response to receiving user input 1203, device 500 displays user interface 1236, as shown in FIG. 12F. In some embodiments, user interface 1236 is a user interface for displaying (e.g., locations of) a plurality of trackable objects, similar to user interface 636 described above with respect to FIG. 6L. In some embodiments, user interface 1236 includes list 1238 that includes one or more entries of trackable items that are unknown to device 500. In some embodiments, a device is unknown to device 500 if device 500 does not have a current relationship with the respective device. For example, if the respective trackable device and/or trackable object is not paired with device 500 and/or if the respective trackable device and/or trackable object is not a device registered to the same user as the user of device 500, then the respective trackable device and/or trackable object is unknown to device 500. In some embodiments, additionally or alternatively, a respective trackable device and/or trackable object is unknown if the respective trackable device and/or trackable object is owned by another user (e.g., has been paired to another user's device and/or associated with the account of another user). In some embodiments, a respective trackable device and/or trackable object is optionally unknown even if it is owned by a contact of the user (e.g., owned by someone that the user knows).

In FIG. 12F, list 1238 includes entry 1240-1 corresponding to Bob's headphones (e.g., trackable object 1230), and entry 1230-2 corresponding to an unknown user's umbrella. In some embodiments, entry 1240-1 includes an indication of the owner's name because the owner is a contact of the user (and/or because the user of device 500 is a contact of the owner). In some embodiments, entry 1240-2 does not include an indication of the owner's name because the owner is not a contact of the user (and/or because the user of device 500 is not a contact of the owner). As shown in FIG. 12F, list 1238 does not include entries for trackable objects that are known to the user and optionally only displays entries for trackable objects that are unknown to the user (e.g., optionally because user interface 1236 was displayed in response to a user input selecting indication 1234 in FIG. 12E, as opposed to user interface 636 described above with respect to FIG. 6L, which includes entries for known trackable objects). In some embodiments, entry 1240-1 and entry 1240-2 are selectable to display a user interface associated with the respective trackable object (e.g., to view information about and/or perform one or more functions associated with the respective trackable object, similar to the process described above with respect to method 1100). Thus, in some embodiments, device 500 is able to provide an indication that trackable objects are in the vicinity of device 500 and allow the user to see a list of the trackable objects to determine whether to take appropriate action.

In FIG. 12G, device 500 initiates a process to pair with trackable object 1230. For example, device 500 received a sequence of user inputs to pair with and/or connect to trackable object 1230 (e.g., via a Bluetooth wireless protocol). In some embodiments, in accordance with a determination that trackable object 1230 is trackable and optionally in accordance with a determination that trackable object 1230 is trackable by a user other than the user of device 500 (e.g., trackable object 1230 is owned by a user other than the user of device 500), device 500 displays popup user interface element 1242 (e.g., optionally overlaid on at least a portion of the user interface that was displayed when popup user interface element 1232 was displayed), as shown in FIG. 12G. In some embodiments, popup 1242 indicates that the device with which device 500 is pairing is a trackable object and that the owner of the trackable object will be able to see the location of the trackable object. In some embodiments, popup 1242 includes selectable option 1244-1 that is selectable to continue the pairing process and selectable option 1244-2 that is selectable to display more information about trackable objects, about trackable object 1230 (e.g., which optionally provides the user with an option to cancel the pairing process, or automatically pauses the pairing process until and/or unless the user performs an additional input to continue the pairing process), etc. In some embodiments, popup 1242 includes a selectable option to cancel the pairing process. In some embodiments, device 500 optionally displays a notification instead of popup 1242. In some embodiments, device 500 optionally displays a banner instead of popup 1242. In some embodiments, providing an indication to the user that the trackable object with which the user is pairing is trackable informs the user that the trackable object, which the user may not know is a trackable object, is trackable such that the owner is able to see the location of the object.

FIGS. 13A-13F are flow diagrams illustrating a method 1300 of displaying notifications associated with a trackable device in accordance with some embodiments, such as in FIGS. 12A-12G. The method 1300 is optionally performed at an electronic device such as device 100, device 300, device 500 as described above with reference to FIGS. 1A-1B, 2-3, 4A-4B and 5A-5H. Some operations in method 1300 are, optionally combined and/or order of some operations is, optionally, changed.

As described below, the method 1300 provide ways of displaying notifications associated with a trackable device. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device in communication with one or more wireless antenna, a display generation component and one or more input devices (e.g., electronic device 500, a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.) is near a remote locator object that is associated with a user other than a user of the electronic device (e.g., within 6 inches, 1 feet, 3 feet, 10 feet, etc. of the user and/or the electronic device), such as in FIG. 12A at time t0 when device 500 is within the threshold distance from the remote locator object.

In some embodiments, while the remote locator object that is associated with the user other than the user of the electronic device is near the electronic device (1302), such as in FIG. 12A, in accordance with a determination that one or more first criteria are satisfied, automatically presents (1304), without user input, a tracking alert that indicates that the remote locator object that is not associated with the user of the electronic device satisfies the one or more first criteria, such as notification 1210 in FIG. 12A (e.g., generating an alert that indicates that the remote locator object is tracking or otherwise following the location of the electronic device). In some embodiments, generating the alert includes displaying a visual notification, generating an audible notification, generating a tactile output, etc.

In some embodiments, the one or more first criteria include (e.g., the one or more criteria includes criterion and/or factors that indicate that an unknown or unexpected remote locator object is tracking or otherwise following the location of the user and/or the electronic device) a first criterion that is satisfied when the remote locator object has remained within a first threshold distance of the electronic device while the electronic device has moved more than a second threshold distance, wherein the second threshold distance is greater than the first threshold distance (1306), such as in FIG. 12A at time t1 when device 500 moved by more than a second threshold distance while remaining within the first threshold distance from the remote locator object (e.g., more than twice the first threshold distance, more than five times the first threshold distance, more than ten times the first threshold distance) (e.g., the remote locator object remains within a threshold distance from the electronic device (e.g., 6 inches, 1 feet, 3 feet, 10 feet, etc.) while the electronic device moves or otherwise changes location by a threshold amount (e.g., the device moves by 3 feet, 50 feet, 500 feet, half a mile, 1 mile, 5 miles, etc.)) and a second criterion that is satisfied when the remote locator object has remained within a third threshold distance of the electronic device for longer than a time threshold after the electronic device moved more than the second threshold distance (1308), such as in FIG. 12A at time t2 when device 500 remains within the third threshold distance from the remote locator object for longer than the time threshold (e.g., after the first criterion is satisfied, the remote locator object remains within a threshold distance of the electronic device for longer than a time threshold, such as 10 minutes, 30 minutes, 1 hour, 4 hours, 8 hours, 12 hours, etc.).

In some embodiments, the first criteria includes a criterion that is satisfied if the electronic device detects a remote locator object is not recognized by the electronic device. For example, the remote locator object is not currently paired with the electronic device or has not been paired with the electronic device in the past. In some embodiments, the first criteria includes a criterion that is satisfied if a remote locator object is not expected to be following the location of the user and/or electronic device (e.g., even if the device has previously paired with the remote locator object or has previously allowed tracking by the remote locator object). For example, if the device has previously approved of tracking by a respective remote locator object such that the electronic device has a previous relationship with the respective remote locator object (e.g., the remote locator object is not necessarily unknown to the device), but has not yet approved of the current instance of tracking by the respective remote locator object (e.g., the time window for a previous approval has elapsed). In some embodiments, the first criteria includes a criterion that is satisfied if a remote locator object is paired with another electronic device or is associated with a user other than the user of the electronic device (e.g., associated with another user account, another user profile, etc.). In some embodiments, the first criteria includes one or more tracking criterion that suggests that the remote locator object is tracking or otherwise following the location of the user and/or electronic device, such as the first criterion and second criterion described in further detail below. In some embodiments, the electronic device detects the presence of a remote locator object via Bluetooth, WiFi, NFC, WiFi Direct, an ad-hoc wireless network, or any other suitable wireless communication protocol.

In some embodiments, the first criterion is satisfied if the remote locator object remains within the first threshold distance while the device is in motion for the second threshold distance (e.g., the remote locator object changes distance from the device but remains within threshold distance from the device). In some embodiments, the first criterion is satisfied if the remote locator object remains at the same distance from the first threshold distance while the device is in motion for the second threshold distance (e.g., the remote locator object remains at the same distance from the device during the entirety of the movement).

In some embodiments, the third threshold distance is the same as the first threshold distance. In some embodiments, the third threshold distance is more or less than the first threshold distance. Thus, in some embodiments, the one or more first criteria includes a two-part test for triggering a tracking alert to notify the user that a remote locator object may be tracking the user's location. In some embodiments, the first part of the test determines whether the remote locator object is actually physically following the user and the second part of the test determines, after determining that the remote locator object is actually physically following the user, that the remote locator object remains following the user for a long enough time period. In some embodiments, the first part of the test determines whether the remote locator object remains with the user for a long enough time period and the second part of the test determines, after determining that the remote locator object remains with the user for a long enough time period, whether the remote locator is actually physically following the user. In some embodiments, the electronic device periodically polls the remote locator object to determine whether the remote locator object is still within the first threshold distance of the electronic device. In some embodiments, the second criteria is satisfied if the remote locator object is still within the first threshold distance of the electronic device for a threshold number of polls (e.g., 2 polls, 4 polls, 10 polls, etc.). For example, the electronic device polls the remote locator object (optionally polls for any object near the electronic device) every 2 hours and if the same remote locator object is found to be within the first threshold distance of the electronic device after four polls (e.g., after 8 hours), then the second criteria is satisfied.

In some embodiments, a display generation component is a display integrated with the electronic device (optionally a touch screen display), external display such as a monitor, projector, television, or a hardware component (optionally integrated or external) for projecting a user interface or causing a user interface to be visible to one or more users, etc.

The above-described manner of generating an alert that a remote locator object is tracking the location of the electronic device (e.g., in accordance with a determination that the remote locator object is following the electronic device for a threshold distance and for a threshold amount of time) provides a quick and efficient way of alerting the user of a potential unauthorized tracking (e.g., without requiring the user to determine whether a remote locator object has been tracking the location of the device for far enough and long enough), which further provides privacy and security benefits to the user by alerting the user of potential unauthorized tracking, and simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while the remote locator object that is associated with the user other than the user of the electronic device is near the electronic device (1310) (e.g., within 6 inches, 1 feet, 3 feet, 10 feet, etc. of the user and/or the electronic device), in accordance with a determination that the one or more first criteria are not satisfied, the electronic device forgoes (1312) automatically presenting the tracking alert, such as in FIG. 12B and FIG. 12C (e.g., if the one or more first criteria are not satisfied, do not generate the alert that indicates that the remote locator object is tracking the location of the electronic device).

The above-described manner of generating an alert that a remote locator object is tracking the location of the electronic device (e.g., in accordance with a determination that the remote locator object is following the electronic device for a threshold distance and for a threshold amount of time, but not generating an alert if the remote locator object is not determined to be following the device for a threshold distance and for a threshold amount of time) provides a quick and efficient way of alerting the user of a potential unauthorized tracking (e.g., by reducing the possibility of false positives and/or reducing the frequency of generating notifications, which could cause the user to ignore and/or disable unauthorized tracking notifications), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while the remote locator object that is associated with the user other than the user of the electronic device is near the electronic device (e.g., within 6 inches, 1 feet, 3 feet, 10 feet, etc. of the user and/or the electronic device) and before the one or more first criteria are satisfied (1314) (e.g., before the first criteria are satisfied that would cause generation of an alert), in accordance with a determination that one or more second criteria are satisfied, including a criterion that is satisfied when the user other than the user of the electronic device has attempted to locate the remote locator object, the electronic device automatically presents (1316), without user input, a tracking alert that indicates that the remote locator object that is not associated with the user of the electronic device satisfies the one or more second criteria, such as if device 500 determines that the owner of the electronic device initiated a process to find the remote locator object at time t1 in FIG. 12A (e.g., if one or more second criteria are satisfied, generate an alert that indicates that the remote locator object is tracking or otherwise following the location of the electronic device).

In some embodiments, generating the alert includes displaying a visual notification, generating an audible notification, generating a tactile output, etc. Thus, in some embodiments, an alert is generated even though the one or more first criteria are satisfied. In some embodiments, because the first criteria are not satisfied, the confidence level that the unknown remote locator object is lower than if the first criteria were satisfied. In some embodiments, the one or more second criteria are satisfied before the one or more first criteria would otherwise be satisfied and thus, when the one or more second criteria are satisfied, an early warning alert is generated. For example, the one or more second criteria include a criterion that is satisfied when the electronic device approaches within a threshold distance to a trusted location, such as home or work (e.g., within 100 feet, within 500 feet, within 1 mile, within 3 miles, etc.). In some embodiments, the one or more second criteria includes a criterion that is satisfied when the remote locator object receives a request to provide its current location information to the owner of the remote locator object, other than the user of the electronic device. In some embodiments, the owner of the remote locator object is the user whose electronic device is paired with the remote locator object and/or the user that initialized the remote locator object and has been associated with the remote locator object as the owner and who optionally is authorized to change one or more settings of the remote locator object.

The above-described manner of generating an alert that a remote locator object is tracking the location of the electronic device (e.g., before the first criteria is satisfied, in accordance with a determination that the owner of the unknown remote locator object is requesting the location of the unknown remote locator object) provides a quick and efficient way of generating an early warning alert of a potential unauthorized tracking (e.g., by detecting that the owner of the remote locator object is attempting to gather the remote locator object's location, potentially revealing the user's current location, and generating an early warning alert), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while the remote locator object that is associated with the user other than the user of the electronic device is near the electronic device (e.g., within 6 inches, 1 feet, 3 feet, 10 feet, etc. of the user and/or device) and before the one or more first criteria are satisfied (1318) (e.g., before the first criteria are satisfied that would cause generation of an alert), in accordance with a determination that one or more second criteria are satisfied, including a criterion that is satisfied when a current location of the electronic device is within a threshold distance of a predetermined location associated with the user of the electronic device (e.g., within 100 feet, 300 feet, 500 feet, ½ mile, 1 mile, 5 miles, etc. of a trusted location (e.g., a safe zone)), the electronic device automatically presents (1320), without user input, a tracking alert that indicates that the remote locator object that is not associated with the user of the electronic device satisfies the one or more second criteria, such as if device 500 determines that device 500 is approaching the user's home at time t1 in FIG. 12A (e.g., generating an early warning alert that indicates that an unknown remote locator object is potentially tracking the user's location).

In some embodiments, a trusted location is associated with the electronic device and/or the user, such as a location defined by the user and/or the user's contacts as the user's home, the user's work, the user's school, the user's family member's schools, the user's contact's trusted locations, etc. In some embodiments, the trusted location is a location within which a remote locator object (e.g., the user's remote locator object, which is optionally not the unknown remote locator object that is being determined as following the user) would not cause generation of an alert that the remote locator object has been separated from the user. In some embodiments, generating an early warning alert reduces the possibility that the owner of the unknown remote locator object is able to determine the location of the user's trusted location, such as the user's home.

The above-described manner of generating an early warning alert that a remote locator object is tracking the location of the electronic device (e.g., before the first criteria is satisfied, in accordance with a determination that the device is within a threshold distance of a predefined location associated with the user of the electronic device) provides a quick and efficient way of generating an early warning alert of a potential unauthorized tracking (e.g., by detecting that the user is approaching a trusted location and the owner of the unknown remote locator object may be able to determine the location of the user's trusted location via the remote locator object, and generating an early warning alert), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, while the remote locator object that is associated with the user other than the user of the electronic device is near the electronic device (e.g., within 6 inches, 1 feet, 3 feet, 10 feet, etc. of the user and/or device) and before the one or more first criteria are satisfied (1322) (e.g., before the first criteria are satisfied that would cause generation of an alert), in accordance with a determination that one or more second criteria are satisfied, including a criterion that is satisfied when a current time is within a threshold time of a new identifier being selected for the remote locator object, the electronic device automatically presents (1324), without user input, a tracking alert that indicates that the remote locator object that is not associated with the user of the electronic device satisfies the one or more second criteria, such as if device 500 in FIG. 12A determines at time t1 that the remote locator object will change its unique identifier within a threshold amount of time (e.g., generate an early warning alert if the current time is within 1 minute, 5 minutes, 30 minutes, 1 hour, 3 hours, etc. of when the unknown remote locator object resets its unique identifier to a new unique identifier).

In some embodiments, remote locator objects reset their unique identifiers at a predetermined interval, such as every six hours, once a day, once a week, once a month, etc. Thus, in some embodiments, when a remote locator object resets its unique identifier, the remote locator object optionally appears as if it is a different remote locator object than the one that has been tracking the user's location. In such a situation, it may be desirable to generate an early warning alert before a remote locator object resets its unique identifier so that it does not appear, to the device, as if the remote locator object has stopped following the user and a new, different remote locator object has begun following the user.

In some embodiments, resetting the unique identifier of a remote locator object to a new unique identifier prevents an unauthorized user from tracking the remote locator object because, for example, after the unique identifier is reset, a remote locator object with a new unique identifier is not able to be matched to information associated with the previous unique identifier, thus providing a security and privacy benefit to the owner of the remote locator object.

The above-described manner of generating an early warning alert that a remote locator object is tracking the location of the electronic device (e.g., before the first criteria is satisfied, in accordance with a determination that the remote locator object will reset its unique identifier soon) provides a quick and efficient way of generating an early warning alert of a potential unauthorized tracking (e.g., by detecting that the remote locator object may resets its identifier soon such that the electronic device will be unable to determine whether it is the same remote locator object that's tracking the user, and generating an early warning alert), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the one or more first criteria include a criterion that is satisfied if no tracking alert associated with the remote locator object has been presented by the electronic device within a predefined time period (1326), such as if device 500 presents one alert every 12 hours in FIG. 12A (e.g., the first criteria includes a criterion that a tracking alert has not yet been generated within a predefined time period).

For example, for each unknown remote locator object, a tracking alert is generated once every predetermined interval of time, such as once every six hours, once every 12 hours, once a day, etc. In some embodiments, managing the frequency of tracking alerts prevents too many alerts from being generated (e.g., even if multiple conditions have occurred that would otherwise be sufficient to cause generation of a tracking alert) such that a user may be tempted to ignore tracking alerts or disable tracking alerts altogether. In some embodiments, the predefined time period is the amount of time that a remote locator object maintains its unique identifier without resetting to a new unique identifier. For example, only one tracking alert is generated for a particular unique identifier. In some embodiments, when a remote locator object resets its unique identifier to a new unique identifier, the electronic device restarts the process of determining whether the remote locator object satisfies the first criteria (e.g., the device discards the data associated with the previous unique identifier and generates new data for the new unique identifier).

The above-described manner of managing the frequency of tracking alerts that a remote locator object is tracking the location of the electronic device (e.g., by generating one alert for a particular interval of time) provides a quick and efficient way of limiting the number of tracking alerts that are generated, which simplifies the interaction between the user and the electronic device and enhances the operability of the electronic device and makes the user-device interface more efficient (e.g., by limiting the frequency of tracking alerts, which reduces the chances that a user will ignore or disable alerts, thus increasing the efficacy of each tracking alert), which additionally reduces power usage and improves battery life of the electronic device by enabling the user to use the electronic device more quickly and efficiently, while reducing errors in usage.

In some embodiments, the first threshold distance is 10 feet (1328), such as if geographic location 1204*b* is within the first threshold distance from geographic location 1206*b* in FIG. 12A (e.g., the first criterion is satisfied when the unknown remote locator object remains within 10 feet of the electronic device while the electronic device is moving, by at least the second threshold distance). In some embodiments, the first criterion is satisfied when the unknown remote locator object remains within 10 feet of the electronic device during the entirety of the time when the electronic device is moving by more than the second threshold distance. In some embodiments, the first criterion is satisfied when the unknown remote locator object is within 10 feet of the electronic device after the electronic device has moved by more than the second threshold distance (e.g., optionally without regard to whether the unknown remote locator object becomes farther than 10 feet of the electronic device while the electronic device is moving. In some embodiments, the first threshold distance is other distances such as 1 foot, 3 feet, 5 feet, 20 feet, 50 feet, 100 feet, etc.

The above-described manner of generating an alert that a remote locator object is tracking the location of the electronic device (e.g., in accordance with a determination that the remote locator object is within 10 feet of the electronic device) provides a quick and efficient way of alerting the user of a potential unauthorized tracking (e.g., by requiring that the remote locator object be within 10 feet to be considered to be tracking the location of the device, which reduces the possibility of false positives and/or reducing the frequency of generating notifications, which could cause the user to ignore and/or disable unauthorized tracking notifications), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the third threshold distance is a value between 1 and 30 feet (1330), such as if geographic location 1204*c* is within the third threshold distance from geographic location 1206*c* in FIG. 12A (e.g., the second criterion is satisfied when the unknown remote locator object remains within 10 feet of the electronic device for the threshold amount of time after the first criterion is satisfied). In some embodiments, the second criterion is satisfied when the unknown remote locator object remains within 10 feet of the electronic device during the entirety of the threshold amount of time. In some embodiments, the second criterion is satisfied when the unknown remote locator object is within 10 feet of the electronic device at the beginning and end of the threshold amount of time (e.g., optionally without regard to whether the unknown remote locator object becomes farther than 10 feet of the electronic device at some point during the threshold time window. In some embodiments, the third threshold distance is other distances such as 1 foot, 3 feet, 5 feet, 20 feet, 50 feet, 100 feet, etc.

The above-described manner of generating an alert that a remote locator object is tracking the location of the electronic device (e.g., in accordance with a determination that the remote locator object is within 10 feet of the electronic device for at least a threshold amount of time) provides a quick and efficient way of alerting the user of a potential unauthorized tracking (e.g., by requiring that the remote locator object be within 10 feet of the device for a threshold amount of time to be considered to be tracking the location of the device, which reduces the possibility of false positives and/or reducing the frequency of generating notifications, which could cause the user to ignore and/or disable unauthorized tracking notifications), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the electronic device has moved more than the second threshold distance when the electronic device has moved from a first location to a second location that is more than 200 feet from the first location (1332), such as if geographic location 1204b is more than 200 feet from geographic location 1204a in FIG. 12A (e.g., the first criterion is satisfied if the remote locator object remains within the first threshold distance while the electronic device is moving more than 500 feet).

In some embodiments, requiring that the electronic device move at least 500 feet ensures that the remote locator object is truly following the electronic device, rather than the remote locator object having been left at a static location and the electronic device happening to be near that static location. Thus, if the electronic device moves more than 500 feet and the remote locator object remains within the first threshold distance from the electronic device, then it can be determined that the remote locator object is following the electronic device because the remote locator object must have also moved by 500 feet. In some embodiments, the second threshold distance is other distances such as 200 feet, 400 feet, 800 feet, ¼ mile, ½ mile, 1 mile, etc.

The above-described manner of generating an alert that a remote locator object is tracking the location of the electronic device (e.g., in accordance with a determination that the remote locator object is within a threshold distance of the electronic device while the electronic device moves by at least 500 feet) provides a quick and efficient way of alerting the user of a potential unauthorized tracking (e.g., by reducing the possibility of false positives and/or reducing the frequency of generating notifications, which could cause the user to ignore and/or disable unauthorized tracking notifications), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the one or more first criteria include a criterion that is satisfied when the remote locator object is not near a second electronic device that is associated with the user other than the user of the electronic device (1334), such as if the remote locator object in FIG. 12A is not separated from the owner of the remote locator object's device (e.g., the unknown remote locator object is considered to be tracking the user only if the unknown remote locator object is separated from its owner's device).

In some embodiments, the unknown remote locator object is separated from its owner's device if it is more than a threshold distance from the owner's device (e.g., 5 feet, 10 feet, 50 feet, 300 feet, 500 feet, etc.) or if the remote locator object is farther than the effective distance to establish wireless communication with the owner's device (e.g., out of Bluetooth range, not connected to the same WiFi network, etc.). In some embodiments, the first criteria requires that the unknown remote locator object be separated from its owner's device while the electronic device is moving more than the second threshold distance and during the time threshold after the electronic device has moved more than the second threshold distance.

The above-described manner of generating an alert that a remote locator object is tracking the location of the electronic device (e.g., in accordance with a determination that the remote locator object is separated from its owner's device) provides a quick and efficient way of alerting the user of a potential unauthorized tracking (e.g., by requiring that the unknown remote locator object be separated from its owner for the remote locator object to be considered to be following the user, thus reducing the possibility of false positives and/or reducing the frequency of generating notifications, which could cause the user to ignore and/or disable unauthorized tracking notifications), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the one or more first criteria include a criterion that is satisfied when the electronic device has moved less than a fourth threshold distance after moving more than the second threshold distance during a second time threshold (1336), such as device 500 not moving by more than the fourth threshold distance from time t1 to time t2 in FIG. 12A (e.g., after moving by more than the second threshold distance, the electronic device does not more by more than a fourth threshold distance for a second threshold amount of time).

In some embodiments, the fourth threshold distance is 5 feet, 10 feet, 50 feet, 100 feet, etc. In some embodiments, the second threshold amount of time is 1 minute, 5 minutes, 10 minutes, 30 minutes, 1 hour, etc. In some embodiments, first criteria includes a requirement that the electronic device does not return to the original location when the electronic device initially detected that the unknown remote locator object is potentially tracking the electronic device (e.g., or does not return to within the second threshold distance from the original location). Thus, in some embodiments, requiring that the device move by less than the fourth threshold distance during a second time threshold ensures that the remote locator object is still following the electronic device after reaching a stationary position, thus avoiding a false positive determination if the remote locator object is left on a mobile location that the user is also at. For example, if the remote locator object was left in the back seat of a taxicab that the user happens to be traveling in, the above-described requirement prevents an unauthorized tracking determination while the user is on the taxicab (e.g., due to the criterion not being satisfied until the user exits the taxicab, which optionally would cause the remote locator object to no longer be within the threshold distance of the electronic device).

The above-described manner of generating an alert that a remote locator object is tracking the location of the electronic device (e.g., in accordance with a determination that the remote locator object has moved by less than a threshold distance during a second threshold time period) provides a quick and efficient way of alerting the user of a potential unauthorized tracking (e.g., by requiring that the device remain relatively stationary for a second threshold amount of time while the remote locator object remains within the threshold distance from the device for the remote locator object to be considered to be following the user, thus reducing the possibility of false positives and/or reducing the frequency of generating notifications, which could cause the user to ignore and/or disable unauthorized tracking notifications), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the electronic device receives (1338), via the one or more input devices, a request to associate the electronic device with a respective object, such as in FIG. 12G (e.g., a request to pair the electronic device with another electronic device (e.g., a respective object)). In some embodiments, pairing the electronic device with the respective object includes establishing a wired or wireless communication relationship (e.g., Bluetooth, NFC, etc.) with the respective object.

In some embodiments, in response to receiving the request to associate the electronic device with the respective object (1340), in accordance with a determination that the respective object satisfies one or more second criteria, including a criterion that is satisfied when the respective object is a trackable object, the electronic device automatically presents (1342) an alert that indicates that the respective object is a trackable object, such as popup 1242 in FIG. 12G (e.g., if the respective object that the electronic device is attempting to pair with is an object that supports location tracking and/or has location tracking enabled, displaying an alert to notify the user that the object's location may be tracked by the user or someone other than the user).

For example, if the respective object supports location tracking and belongs to another user such that the other user is able to track the location of the respective object, then the electronic device generates an alert that the other user may be able to track the location of the object. For example, a pair of headphones may support location tracking and if the user borrows the headphones from a friend (e.g., the headphones are associated with an electronic device associated with the friend and/or the friend is marked as the owner of the headphones), then in response to pairing with the headphones, the device generates an alert to indicate that the friend may be able to track the location of the headphones. In some embodiments, the alert is presented only if the object has been configured to provide location information to the owner of the device. In some embodiments, the alert is presented even if the object has not been configured to provide location information to the owner.

The above-described manner of generating an alert when attempting to pair with an object (e.g., in accordance with a determination that the object is trackable and/or tracked by a user other than the user of the device) provides a quick and efficient way of alerting the user of a potential unexpected and/or unknown tracking, which simplifies the interaction between the user and the electronic device and enhances the operability of the electronic device and makes the user-device interface more efficient (e.g., by alerting the user that the object may be tracked by another user, which ensures that the security and/or privacy of the user is protected), which additionally reduces power usage and improves battery life of the electronic device by enabling the user to use the electronic device more quickly and efficiently, while reducing errors in usage.

In some embodiments, the electronic device receives (1344), via the one or more input devices, a request to view information about one or more trackable objects in an environment of the electronic device, such as user input 1003 in FIG. 12E (e.g., a user input selecting a selectable option for displaying the trackable items that are near or within a threshold distance of the device (e.g., 2 feet, 5 feet, 10 feet, 50 feet, etc.)).

In some embodiments, in response to receiving the request to view the information about the one or more trackable objects in the environment of the electronic device, the electronic device displays (1346), via the display generation component, one or more representations of the one or more trackable objects in the environment of the electronic device, such as in FIG. 12F (e.g., displaying representations of the objects that are trackable that are within the threshold distance of the device).

In some embodiments, the displayed objects are those that are not currently paired with the electronic device (e.g., objects that are paired with the device are optionally not displayed). In some embodiments, the displayed objects are those that have not been shared with the user of the electronic device (e.g., objects that have been shared with the user are optionally not displayed). In some embodiments, the displayed objects are trackable objects that the user and/or the electronic does not know about (e.g., does not have a history with, have not previously paired with, are owned by people who are not contacts of the user, etc.). In some embodiments, the representations are displayed in a representation of the map. In some embodiments, the representations are displayed in a scrollable list. In some embodiments, the representations are selectable to display a user interface associated with the corresponding trackable object (e.g., to view information about the object and/or perform one or more operations with respect to the trackable object).

The above-described manner of displaying a list of the trackable objects near the device (e.g., in response to a user input requesting display of the list of trackable objects) provides a quick and efficient way of displaying the objects near the user whose locations may be tracked, which simplifies the interaction between the user and the electronic device and enhances the operability of the electronic device and makes the user-device interface more efficient (e.g., by alerting the user to the objects near the user whose locations may be tracked, potentially by someone other than the user, which ensures that the security and/or privacy of the user is protected), which additionally reduces power usage and improves battery life of the electronic device by enabling the user to use the electronic device more quickly and efficiently, while reducing errors in usage.

In some embodiments, the one or more trackable objects include a first trackable object associated with a first representation of the one or more representations, and the first representation is displayed with a representation of a respective user, other than the user of the electronic device, associated with the first trackable object (1348), such as in FIG. 12F (e.g., a respective representation of a trackable object optionally includes an indication of the name of the owner of the trackable object).

For example, trackable headphones that are owned and/or tracked by Bob are optionally referred to as "Bob's headphones". In some embodiments, the respective representation displays the name of the owner only if the owner is a contact of the user. In some embodiments, the respective representation displays the name of the owner only if the respective object is paired with or has previously been paired with the electronic device. In some embodiments, the respective representation displays the name of the owner only if the owner has shared the location of the object with the user of the device. In this way, the user is able to determine the person that is potentially tracking the location of the object and optionally use this information to determine whether to unpair from the object, disable the object, move away from the object, or otherwise cause the object to be unable to track the user. In some embodiments, the respective representation does not display the name of the owner if the owner is not a contact of the user.

The above-described manner of displaying a representation of a trackable object (e.g., with the name of the owner of the object that may be tracking the object) provides a quick and efficient way of indicating the person who may be tracking the trackable object, which simplifies the interaction between the user and the electronic device and enhances the operability of the electronic device and makes the user-device interface more efficient (e.g., by alerting the user to the person that may be tracking the user, which ensures that the security and/or privacy of the user is protected), which additionally reduces power usage and improves battery life of the electronic device by enabling the user to use the electronic device more quickly and efficiently, while reducing errors in usage.

In some embodiments, in accordance with a determination that at least one trackable object is in the environment of the electronic device, the electronic device displays (1350), via the display generation component, a visual indication that at least one trackable object is in the environment of the electronic device, such as indication 1234 in FIG. 12D (e.g., displaying a visual indication that an object near the electronic device (e.g., within 2 feet, 5 feet, 10 feet, 50 feet, etc.), is trackable and optionally is configured to provide location information to a user other than the user of the electronic device). In some embodiments, the visual indication is displayed at or near the top of the user interface.

In some embodiments, the request to view the information about the one or more trackable objects in the environment of the electronic device comprises selection of the visual indication that at least one trackable object is in the environment of the electronic device (1352), such as user input 1203 in FIG. 12E (e.g., the visual indication is selectable to cause display of a user interface that includes a list of trackable objects that are in the vicinity of the electronic device).

In some embodiments, the visual indication is displayed after the trackable object has been determined to be near the electronic device for a threshold amount of time (e.g., 5 minutes, 10 minutes, 30 minutes, 60 minutes, etc.). In some embodiments, the visual indication is displayed at allocation in the user interface associated with one or more status indicators. For example, the visual indication is displayed at a location that also includes indication of the battery level of the device, the wireless connectivity status, the date and/or time, etc. In some embodiments, the visual indication replaces one or more status indicators.

The above-described manner of displaying a representation of a trackable object (e.g., by displaying a visual indication that objects around the user may be trackable, which is selectable to display a list of the objects around the user that may be trackable) provides a quick and efficient way of indicating the person who may be tracking the trackable object, which simplifies the interaction between the user and the electronic device and enhances the operability of the electronic device and makes the user-device interface more efficient (e.g., by displaying the objects near the user that may be trackable, which ensures that the security and/or privacy of the user is protected), which additionally reduces power usage and improves battery life of the electronic device by enabling the user to use the electronic device more quickly and efficiently, while reducing errors in usage.

It should be understood that the particular order in which the operations in FIGS. 13A-13F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, and 1100) are also applicable in an analogous manner to method 1300 described above with respect to FIGS. 13A-13F. For example, displaying notifications associated with a trackable device described above with reference to method 1300 optionally has one or more of the characteristics of providing user interfaces for defining identifiers for remote locator objects, locating a remote locator object, providing information associated with a remote locator object, etc., described herein with reference to other methods described herein (e.g., methods 700, 900, and 1100). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 13A-13F are, optionally, implemented by components depicted in FIGS. 1A-1B. For example, displaying operations 1346 and 1350 and receiving operations 1338 and 1344 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 14A:
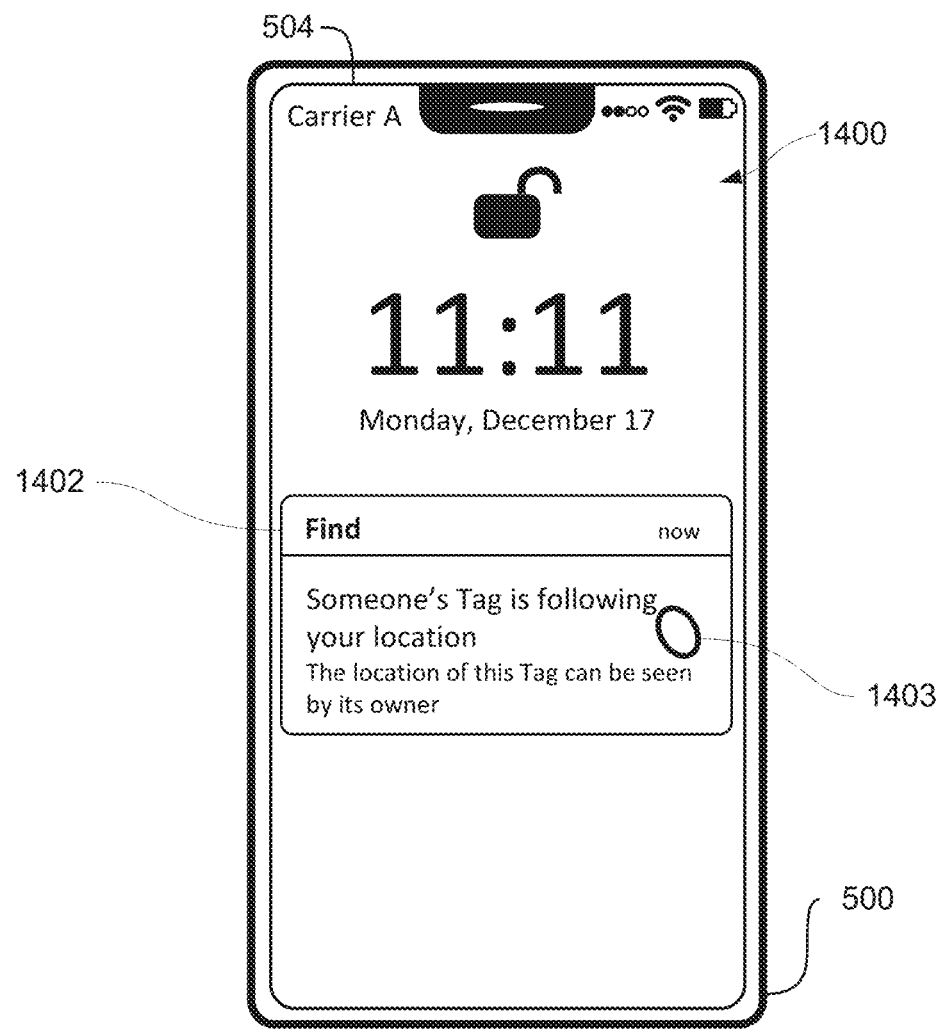
FIGS. 14A-14R illustrate an electronic device displaying notifications of tracking by an unknown remote locator object.
Figure 14B:
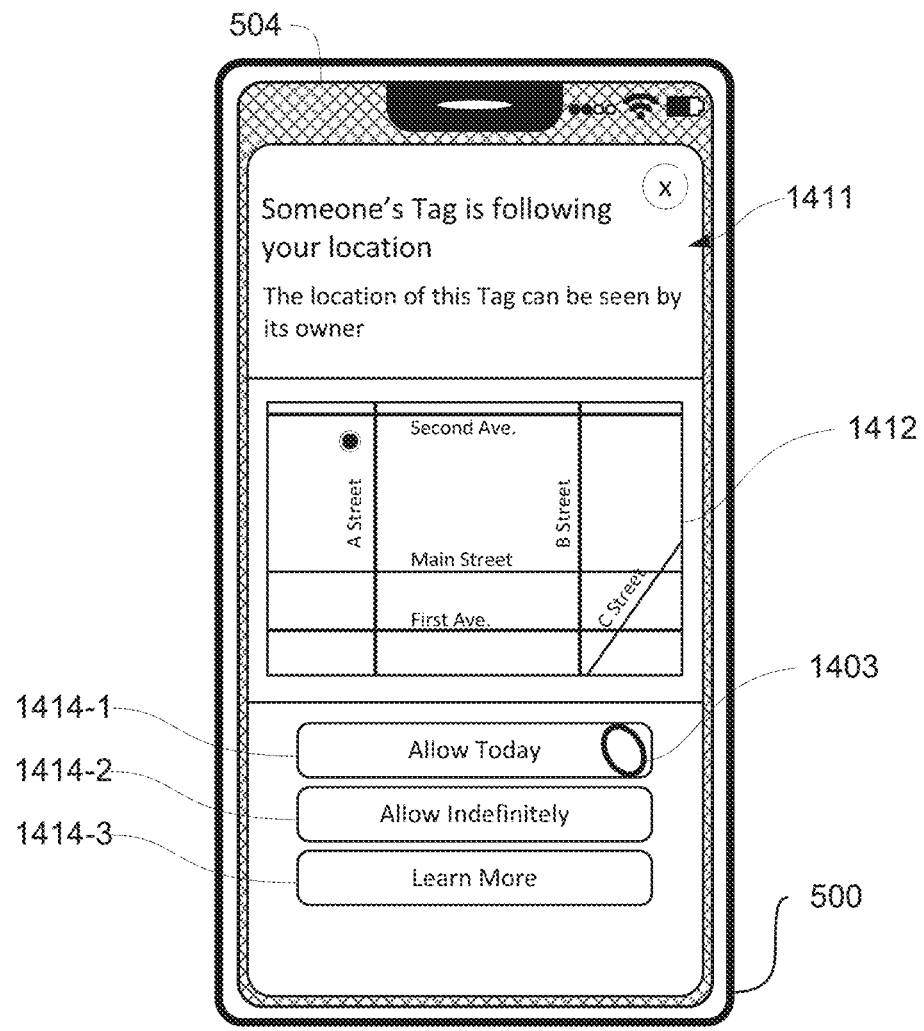
Figure 14C:
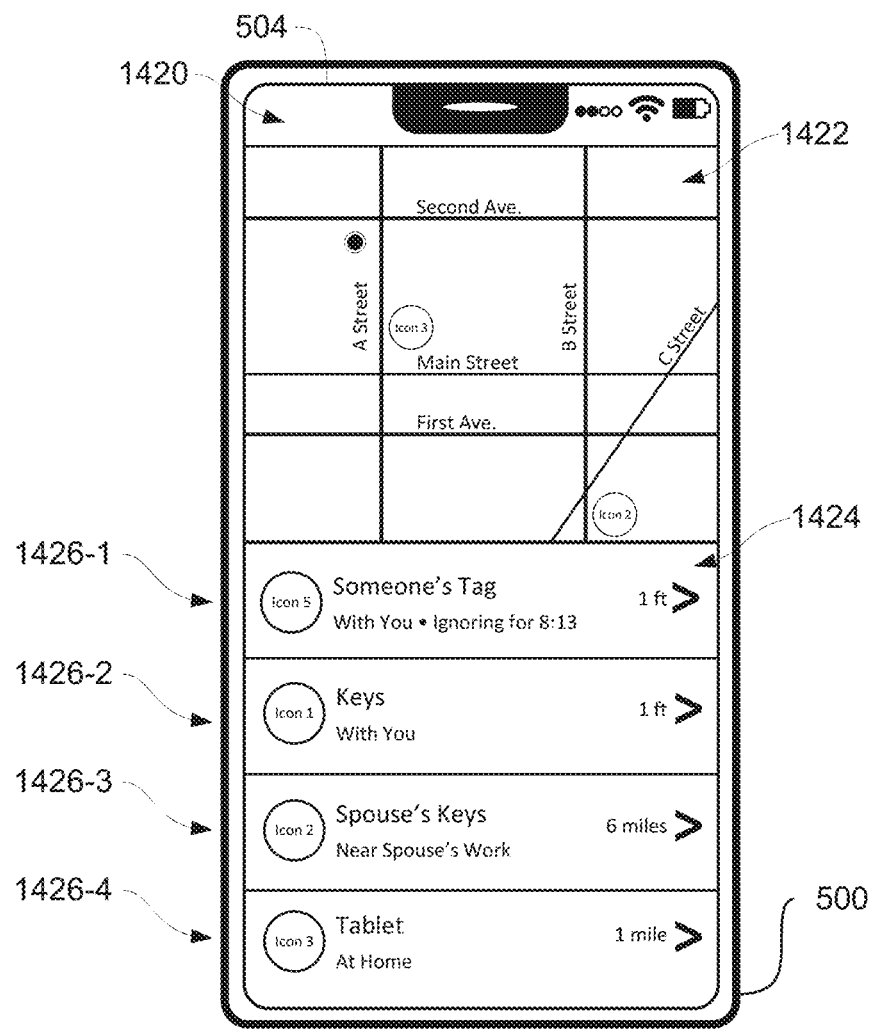
Figure 14D:
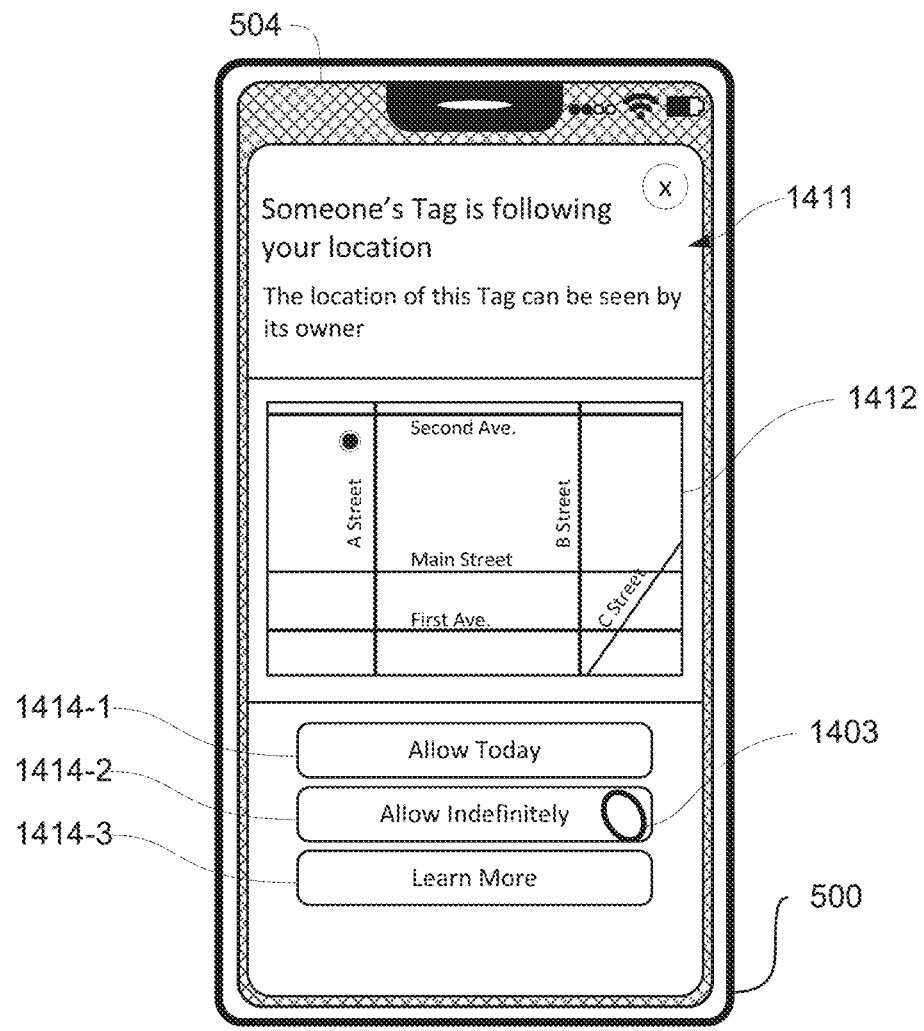
Figure 14E:
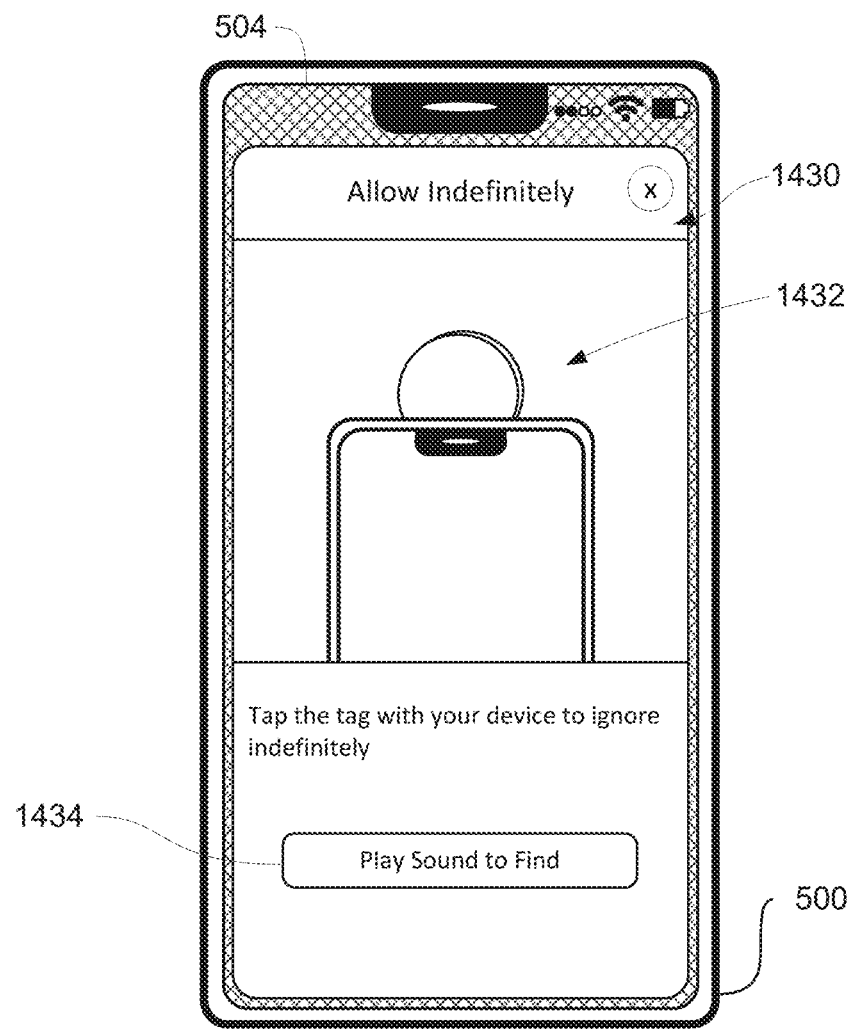
Figure 14F:
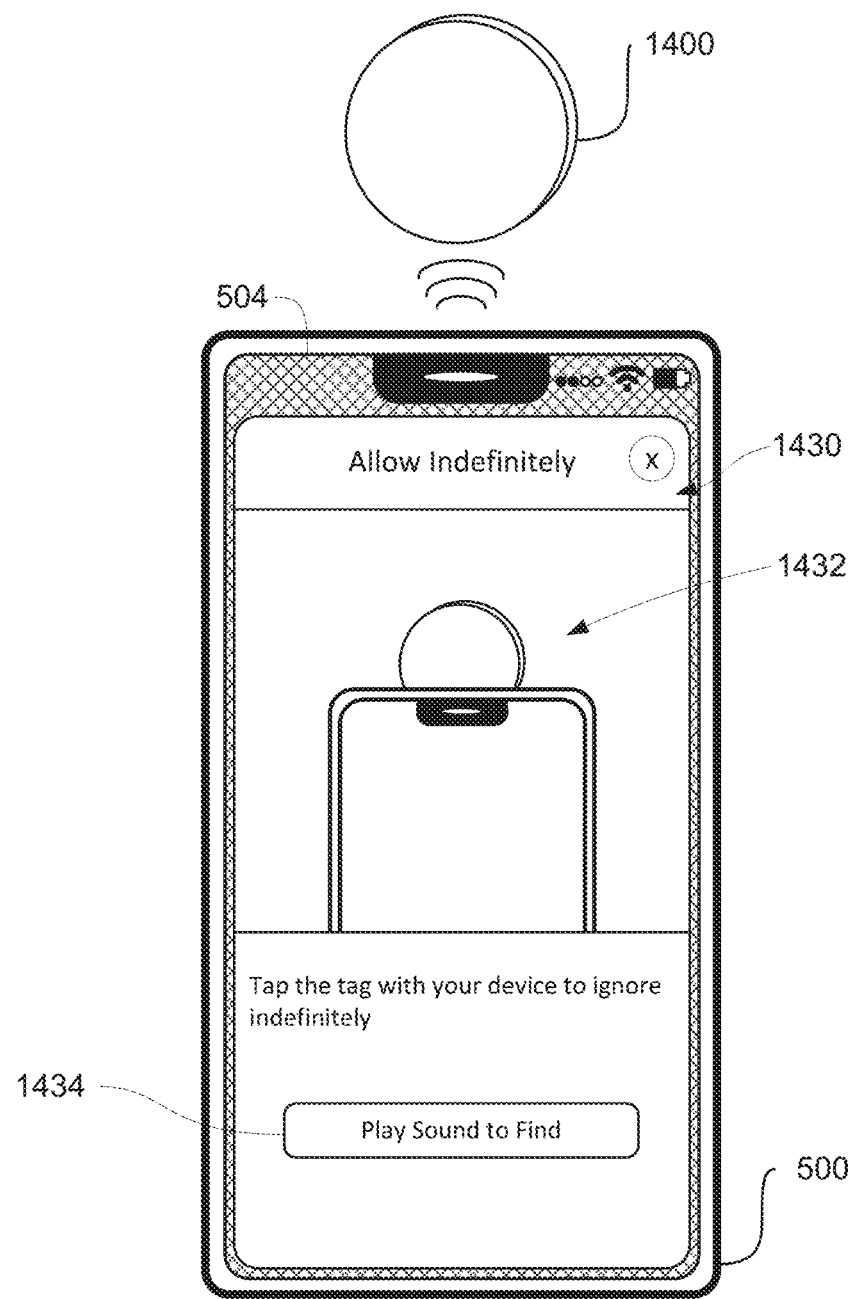
Figure 14G:
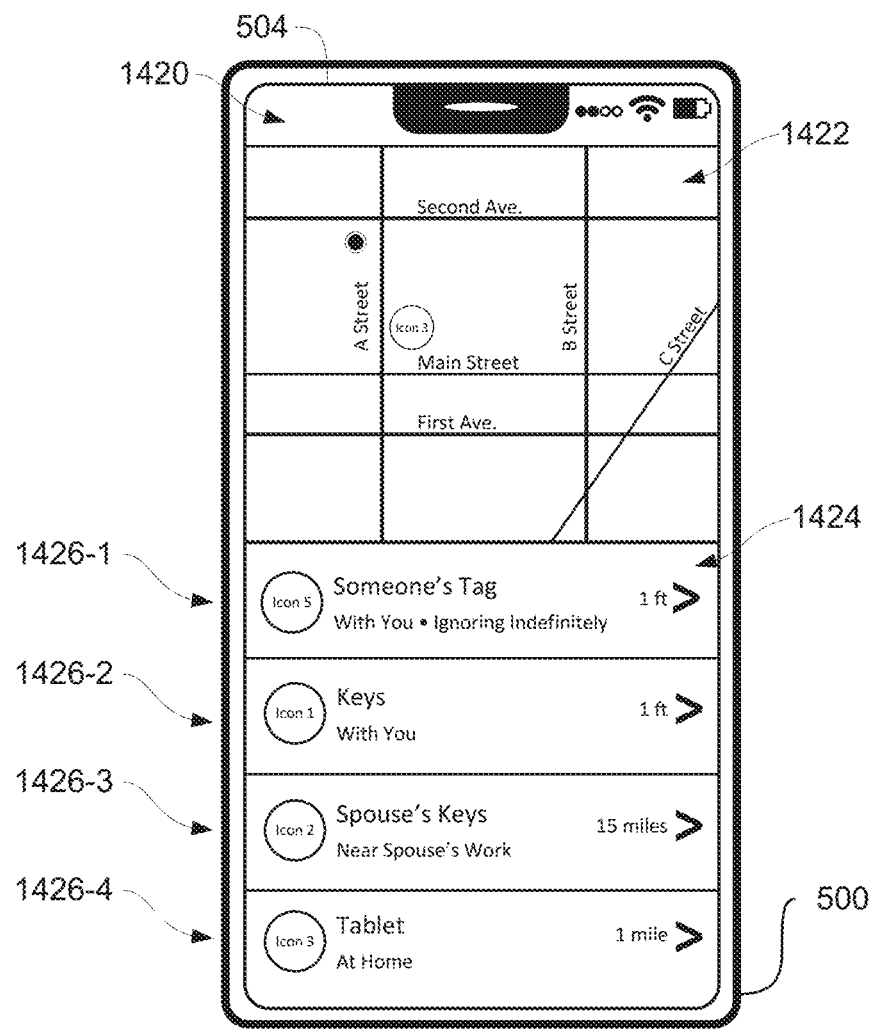
Figure 14H:
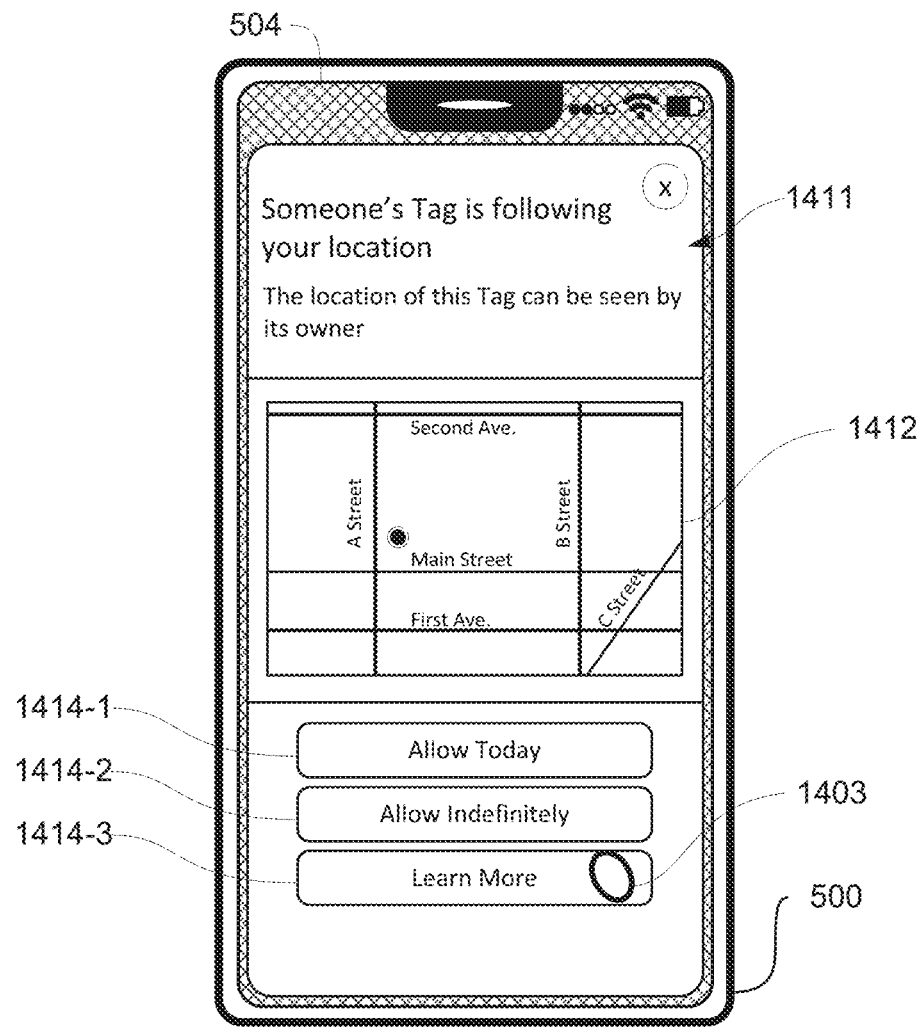
Figure 14I:
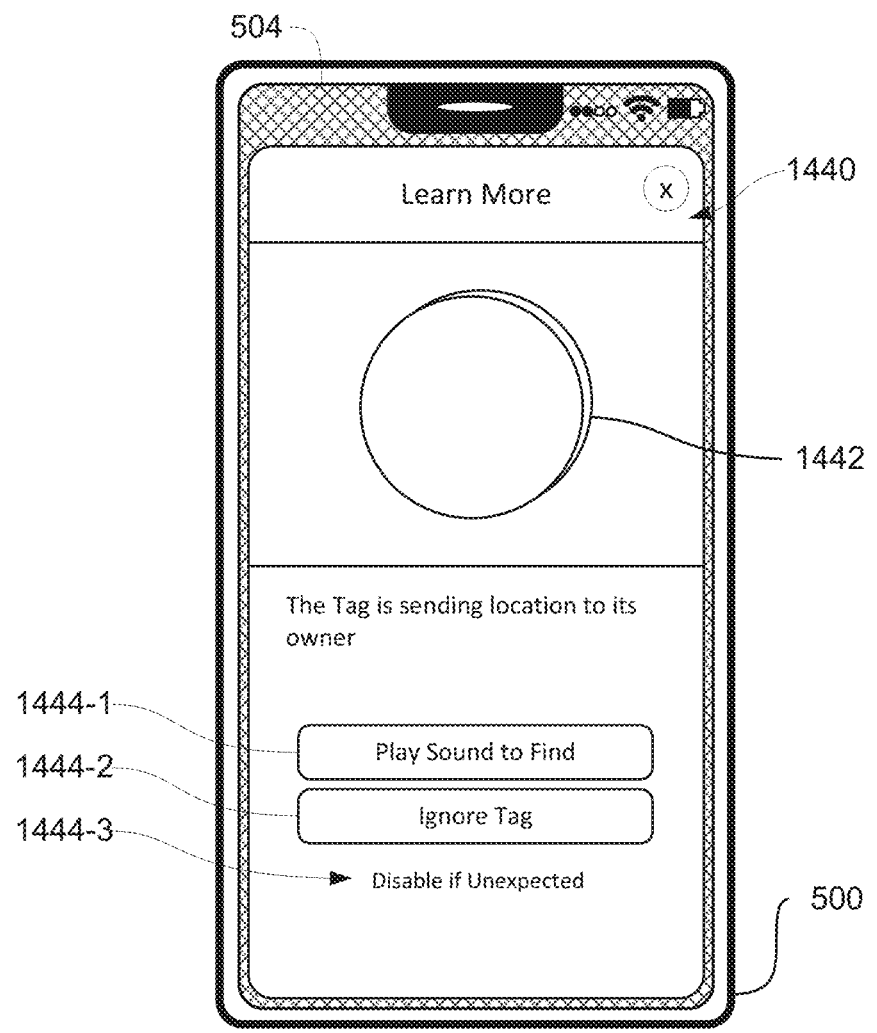
Figure 14J:
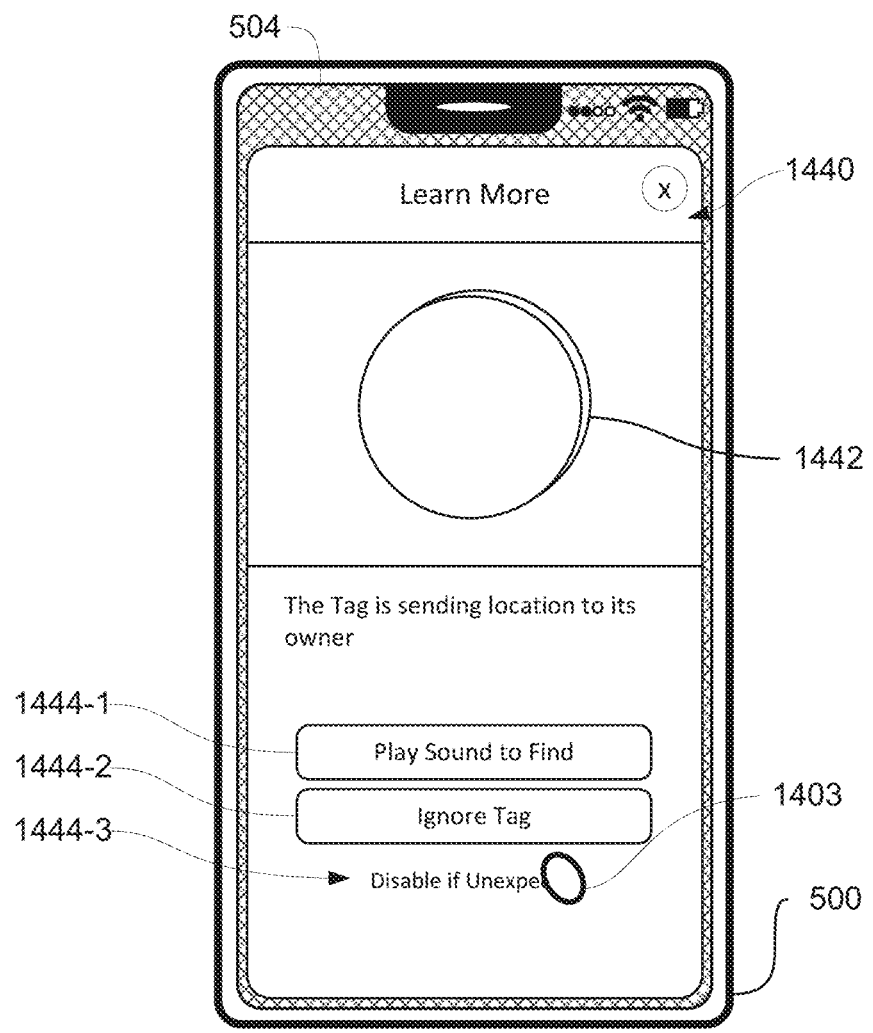
Figure 14K:
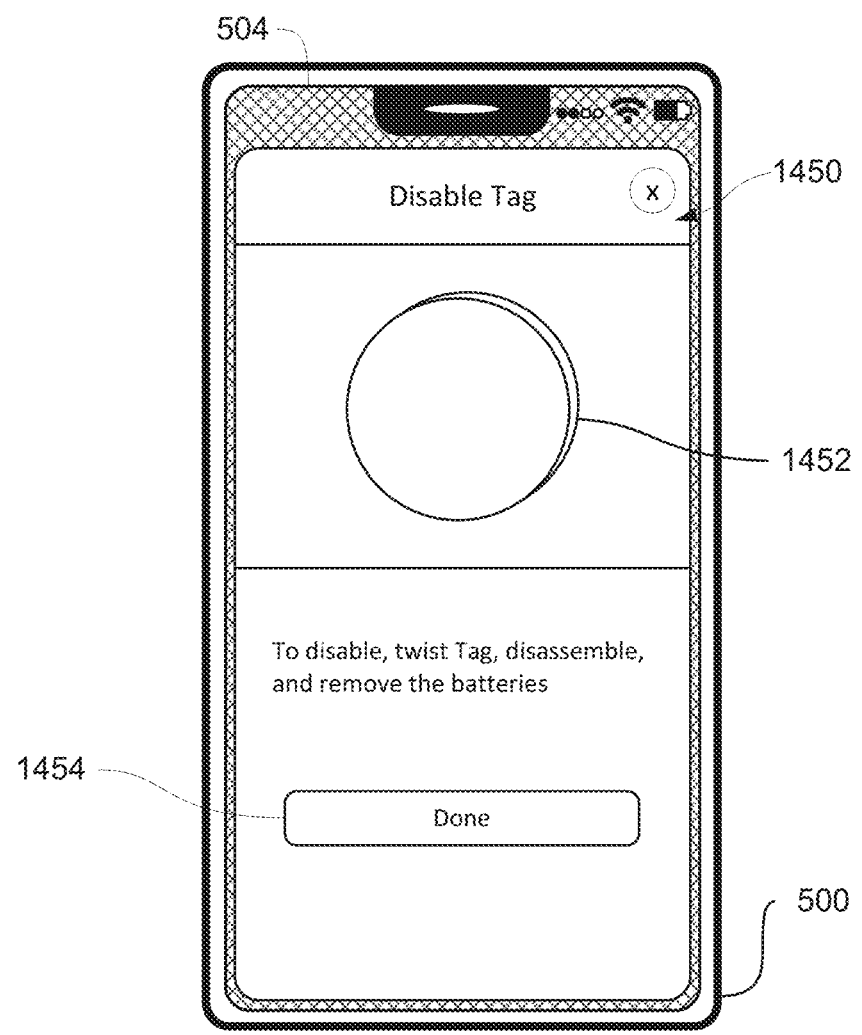
Figure 14L:
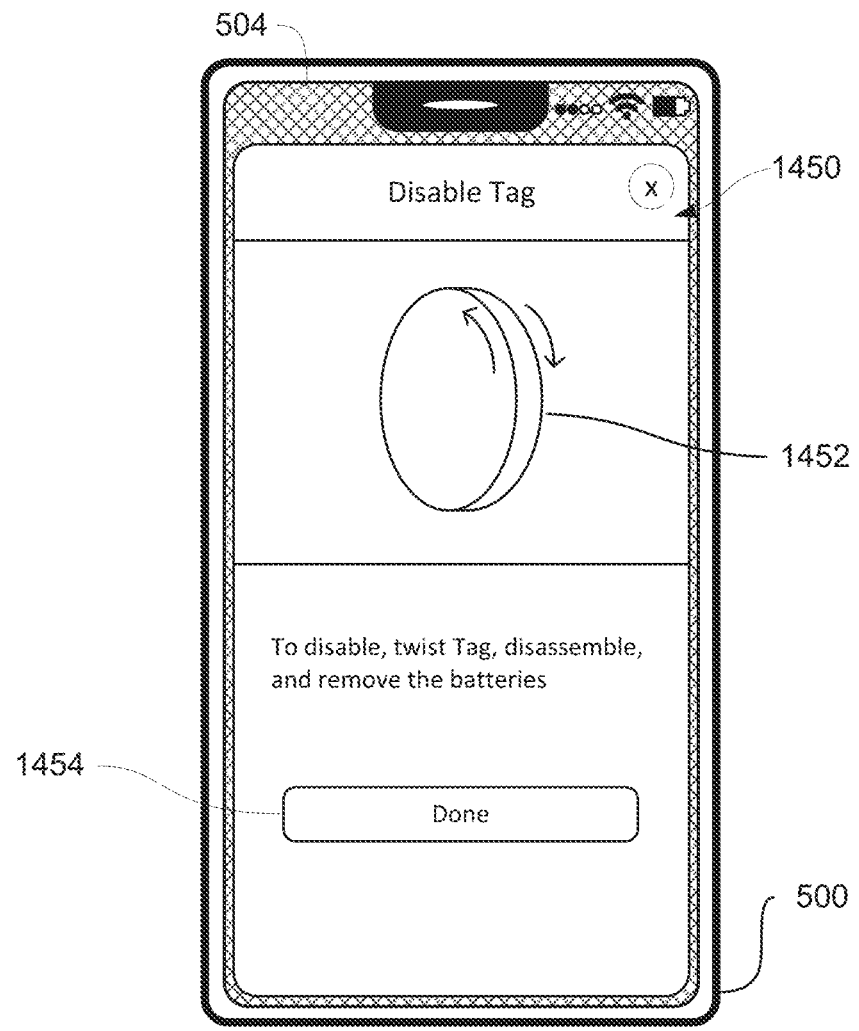
Figure 14M:
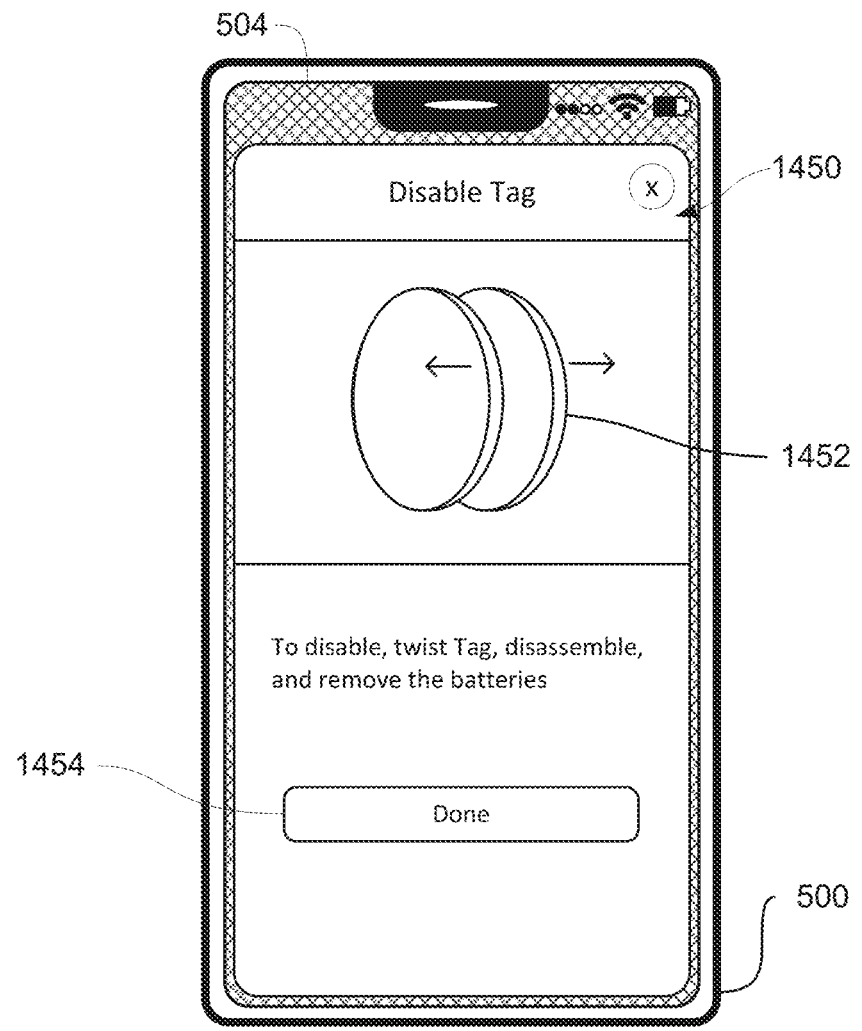
Figure 14N:
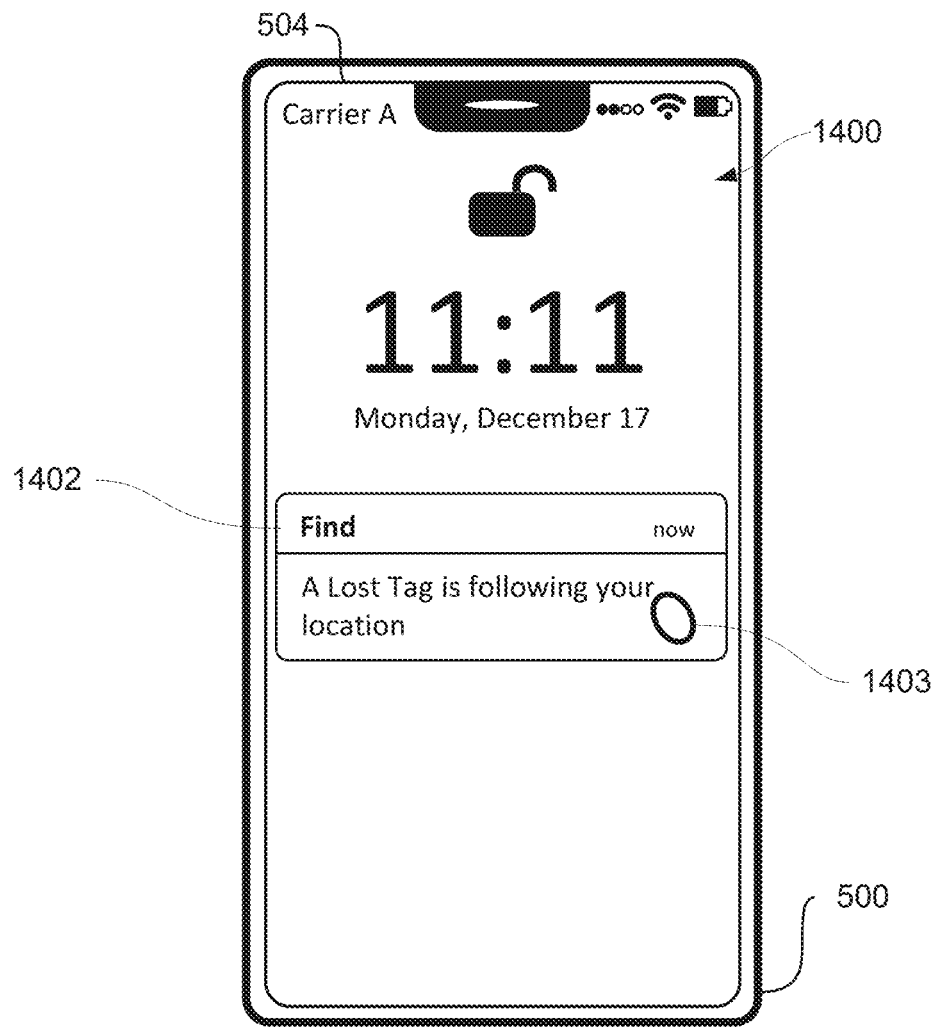
Figure 14O:
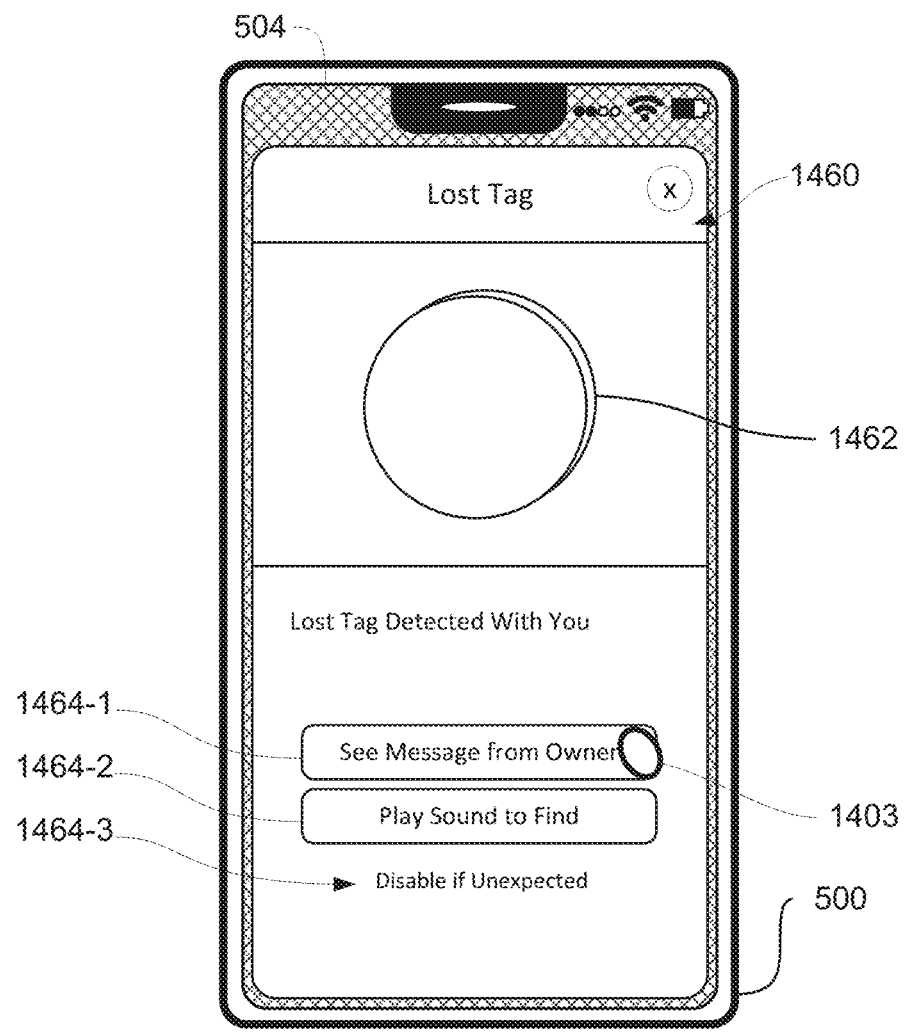
Figure 14P:
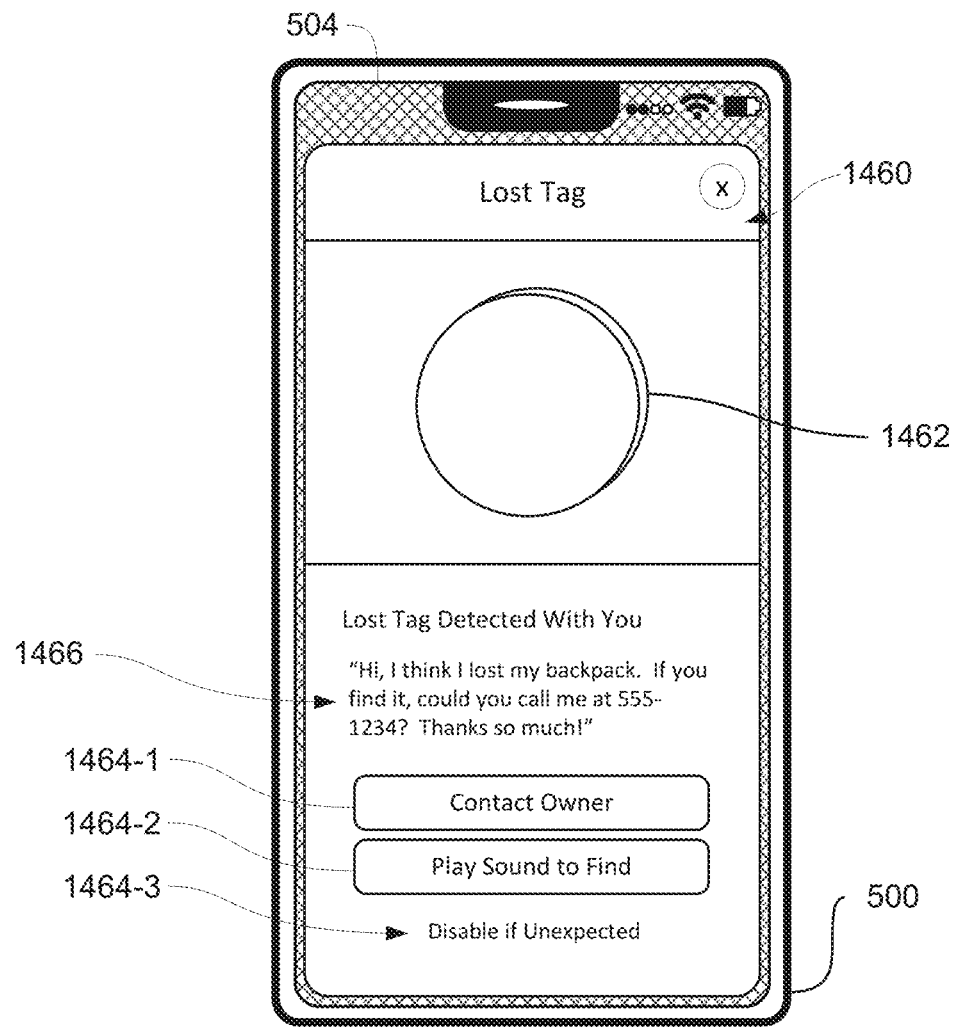
Figure 14Q:
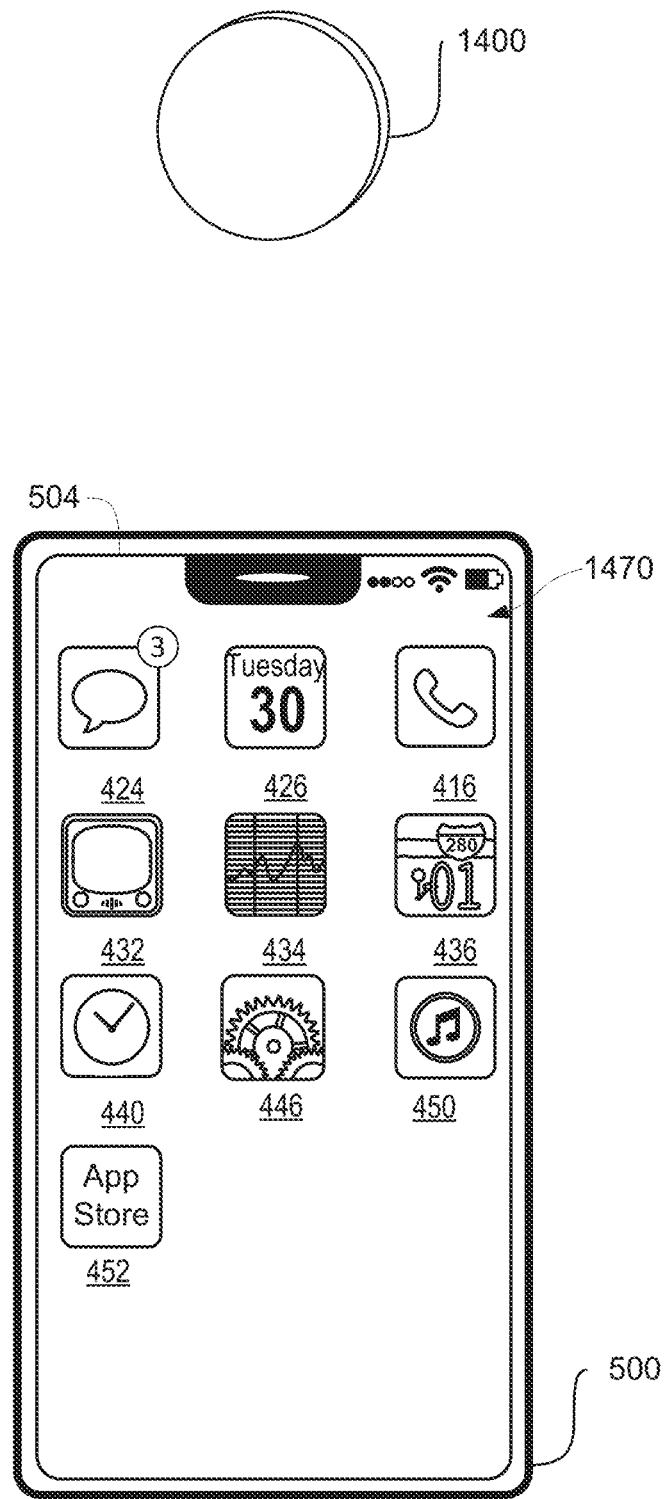
Figure 14R:
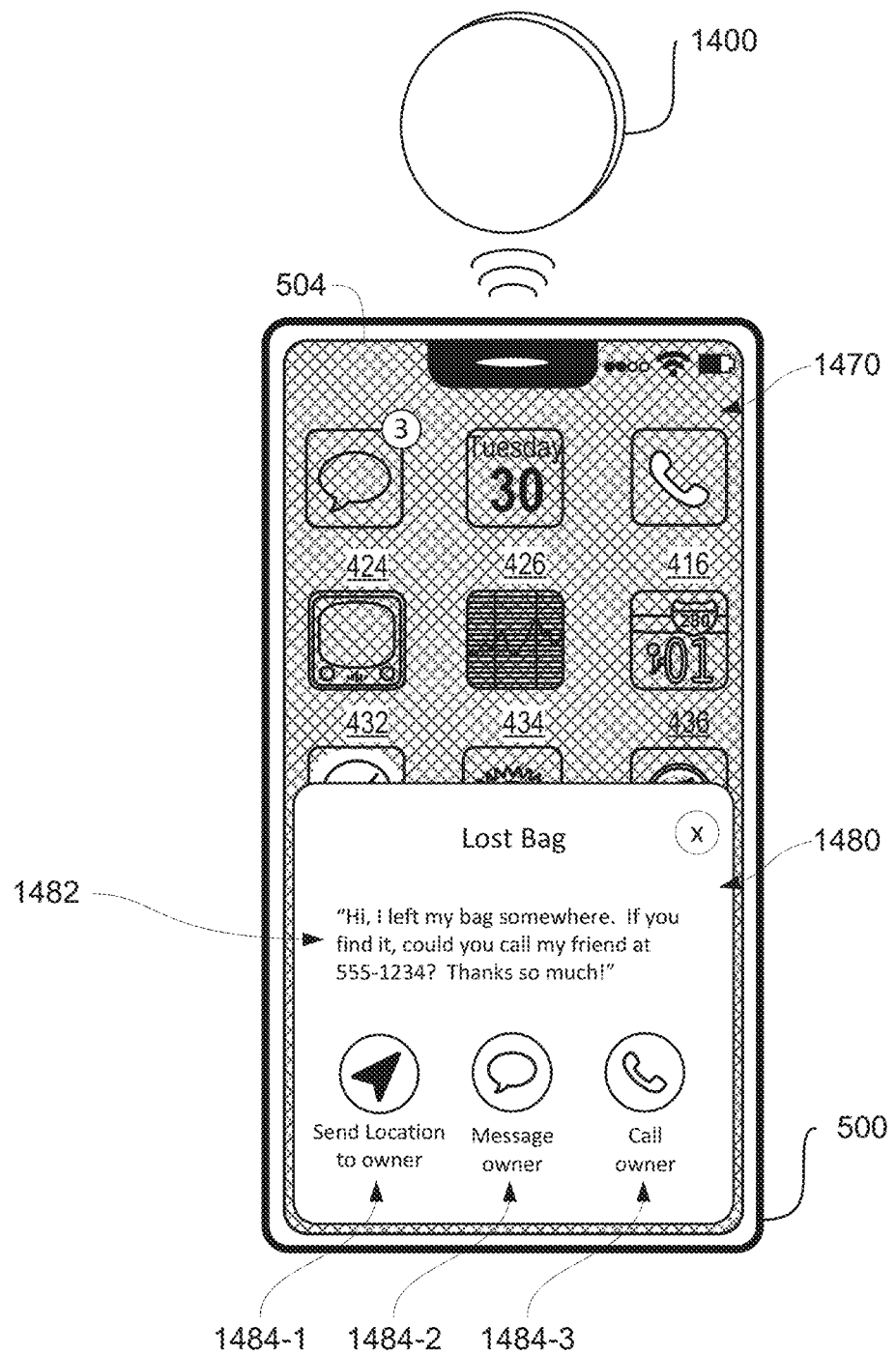
Figure 15A:
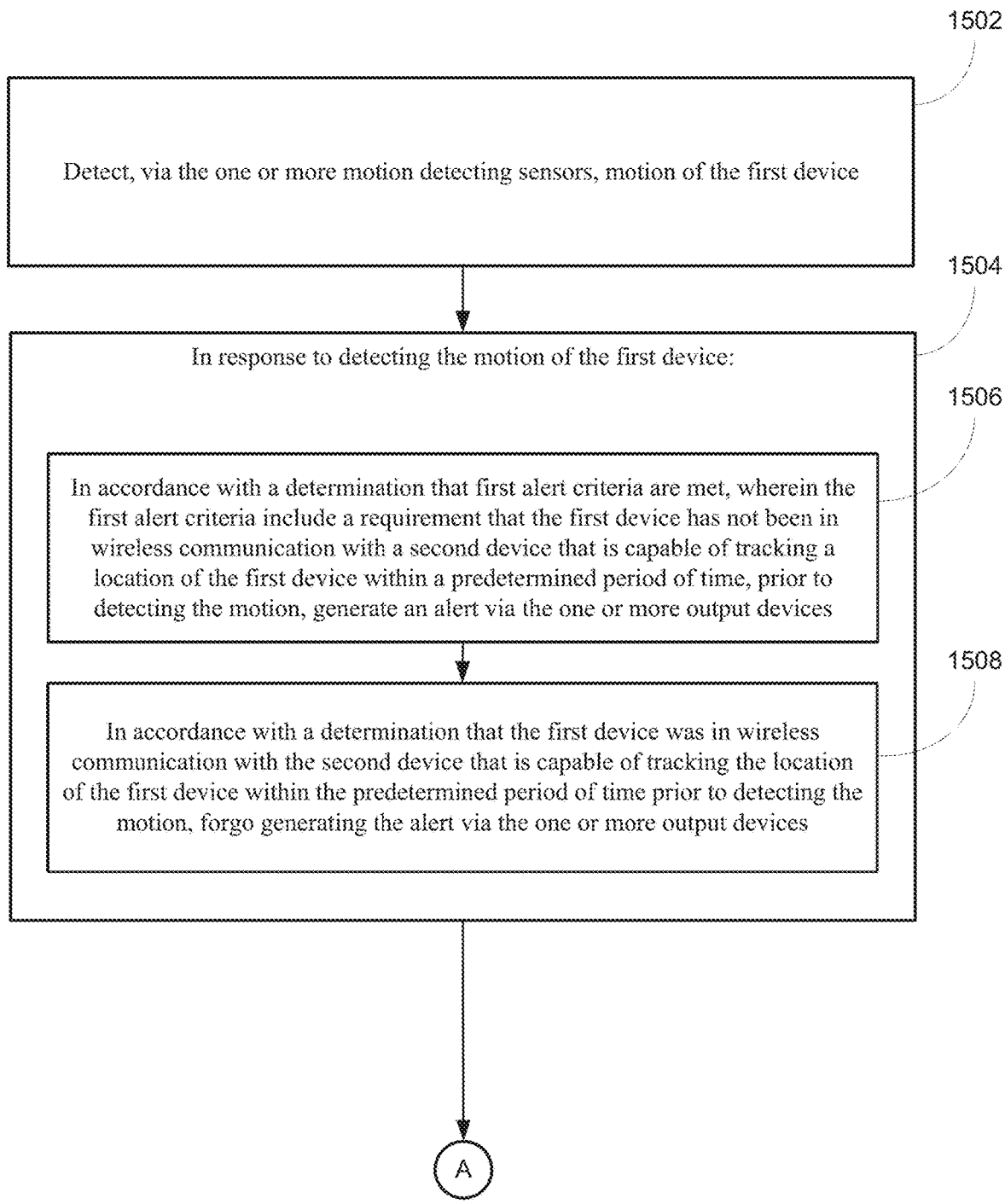
FIGS. 15A-15E are flow diagrams illustrating a method of generating alerts in accordance with some embodiments.
Figure 15B:
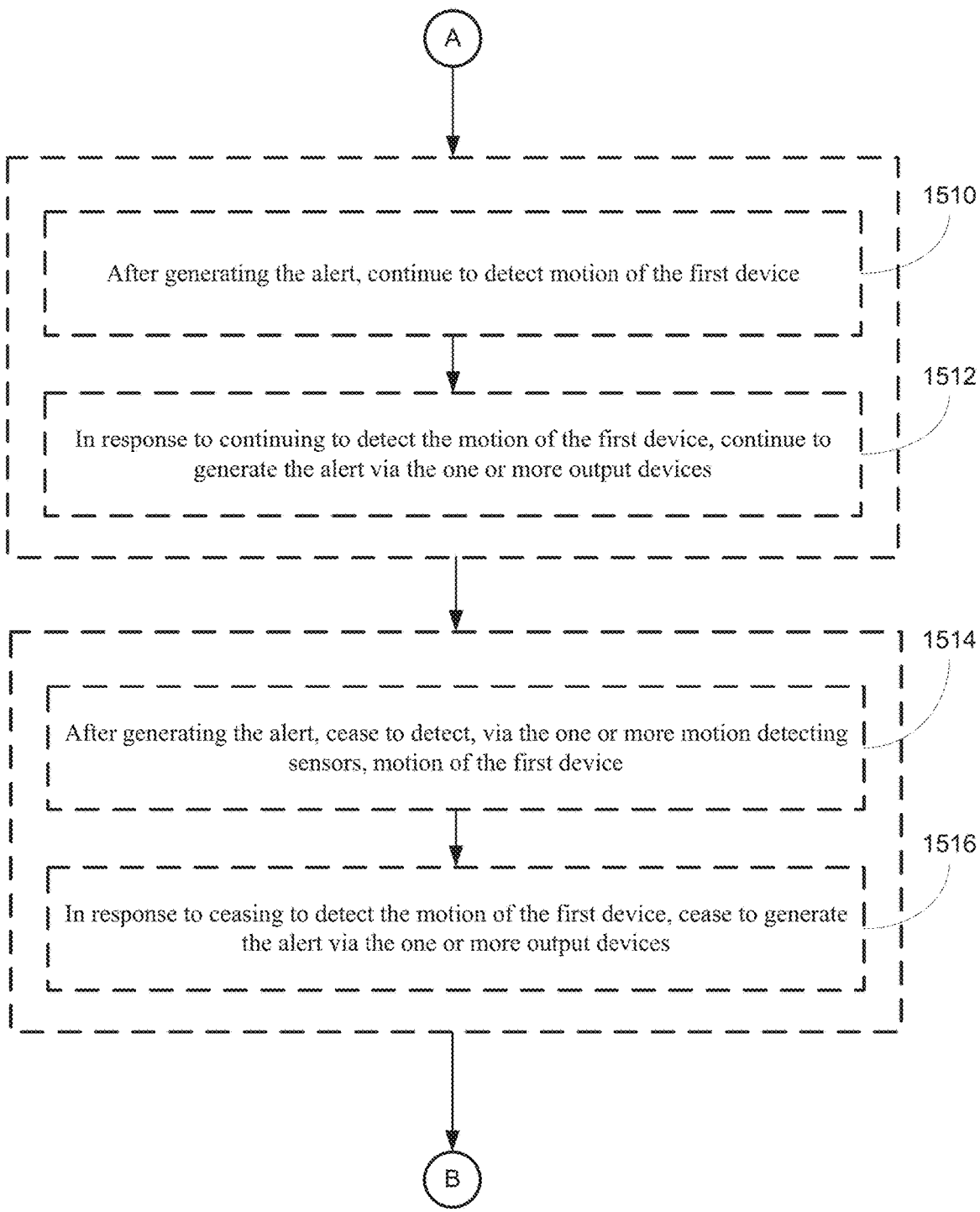
Figure 15C:
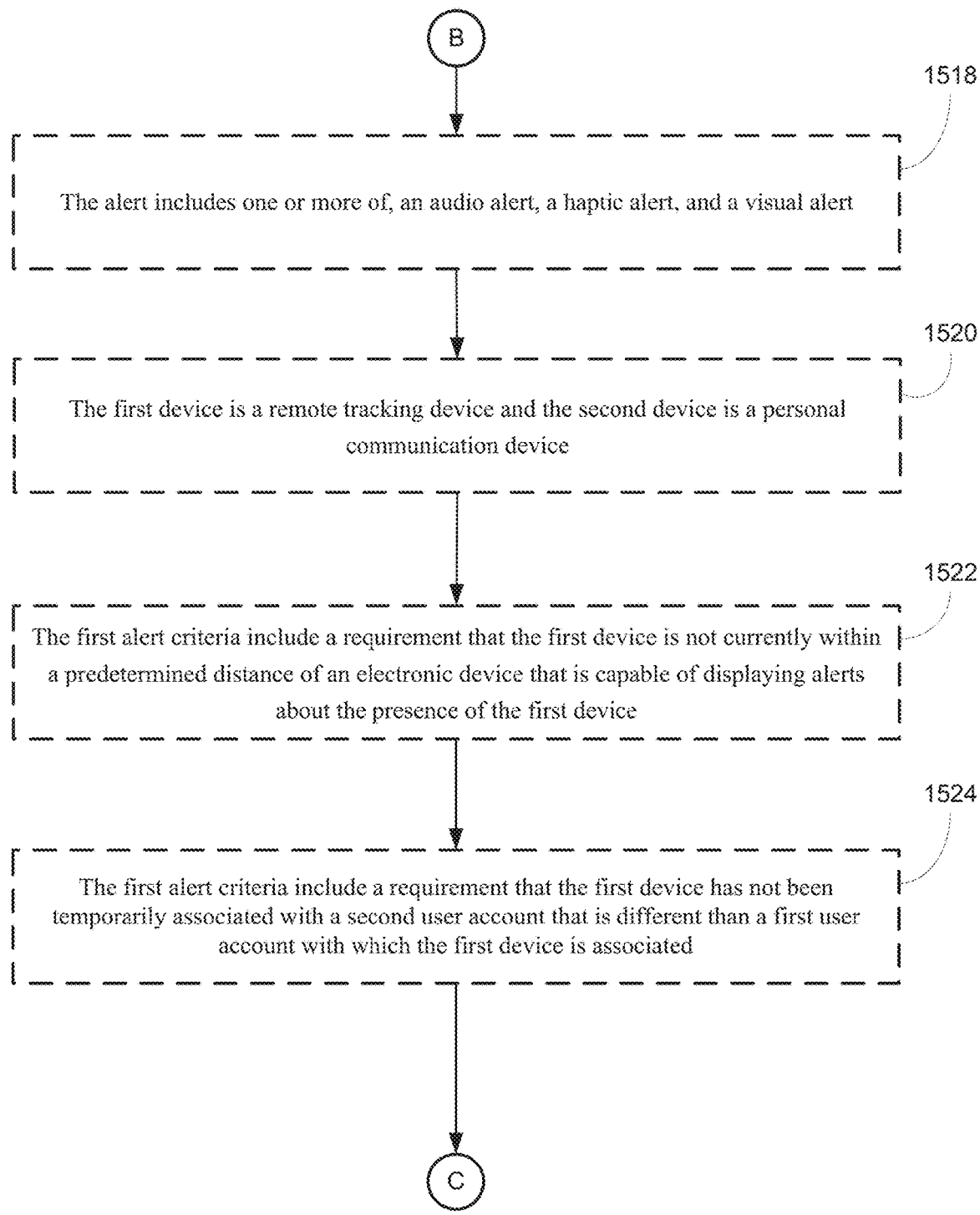
Figure 15D:
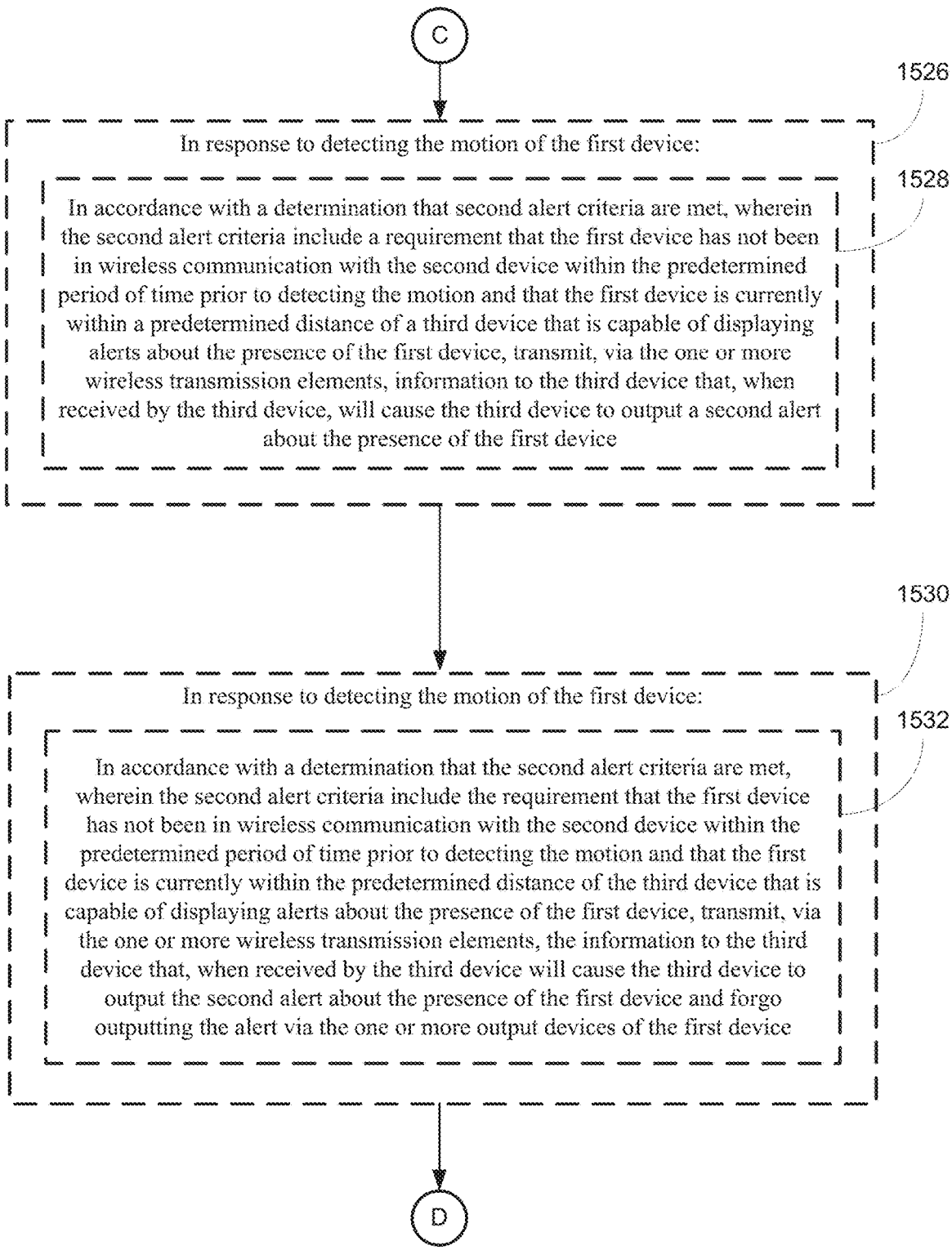
Figure 15E:
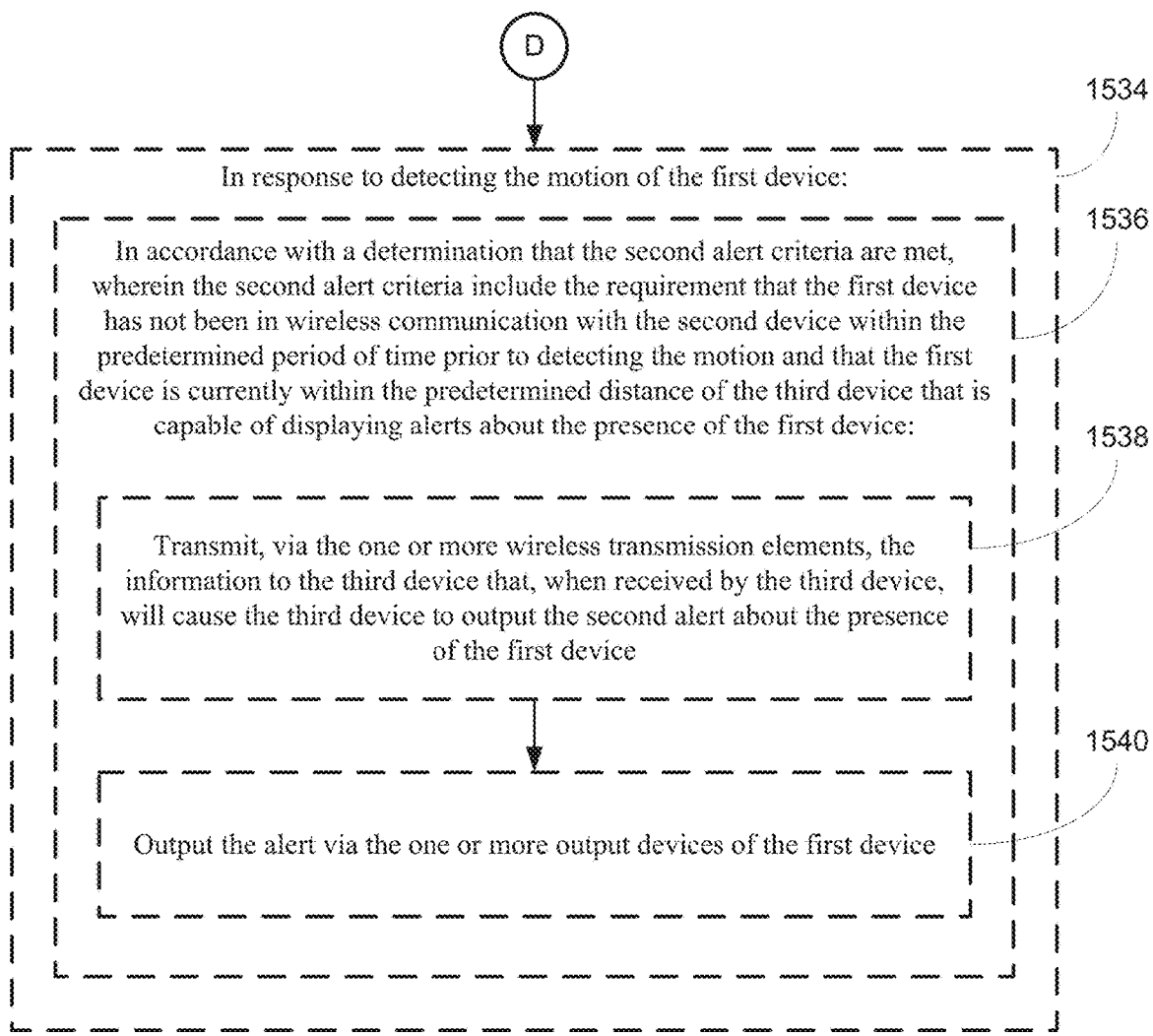

FIGS. 14A-14R illustrate an electronic device 500 displaying notifications of tracking by an unknown remote locator object. FIG. 14A illustrates an exemplary device 500 that includes touch screen 504. As shown in FIG. 14A, the electronic device 500 presents a lock screen user interface 1400 (e.g., a wake screen user interface). In some embodiments, lock screen user interface 1400 is the user interface that is displayed when electronic device 500 is awoken (e.g., from a sleep or locked state). In some embodiments, lock screen user interface 1400 includes notification 1402. In some embodiments, notification 1402 notifies the user that an unknown remote locator object (e.g., optionally a "tag") is tracking (e.g., following) the user's location. In some embodiments, notification 1402 hides the owner of the remote locator object's personal information, such as the label of the object and the owner's name. In some embodiments, notification 1402 indicates to the user that the owner of the unknown remote locator object is able to see the location of the remote locator object.

In some embodiments, notification 1402 is displayed when electronic device 500 (e.g., or a server) determines that the remote locator object's location has been following the user's location. In some embodiments, the remote locator object is determined to be following the user's location if the position of the remote locator object is the same as (or within a threshold distance of, such as 5 feet, 10 feet, 20 feet) the user's location for a threshold amount of time (e.g., 30 minutes, 1 hour, 2 hours). In some embodiments, the remote locator object is determined to be following the user's location if the position of the remote locator object is the same as the user's position after moving for a threshold distance (e.g., 1 mile, 2 miles, 3 miles). In some embodiments, the remote locator object is determined to be following the user's location if the position of the remote locator object is within a threshold distance from the user (e.g., 2 feet, 3 feet, 4 feet, 10 feet). In some embodiments, a respective remote locator object is determined to be unknown if the respective remote locator object is not associated with the user/user account of device 500 and is not being shared with the user/user account of device 500 (e.g., is associated with another user account). In some embodiments, a remote locator object that has previously been shared with the user but is not currently shared with the user is also considered to be an unknown remote locator object that would trigger tracking alerts. In some embodiments, any combination of the above can be factors or requirements for determining whether the remote locator object is following the user.

It is understood that although notification 1402 is illustrated as displayed on lock screen user interface 1400, notification 1402 can be displayed on other user interfaces (e.g., in all situations in which other notifications can be displayed).

In FIG. 14A, user input 1403 is received selecting notification 1402. In some embodiments, in response to the user input, electronic device 500 displays user interface 1411, as shown in FIG. 14B. In some embodiments, user interface 1411 is a card user interface that is overlaid over another user interface (e.g., such as a home screen user interface). In some embodiments, user interface 1411 includes map 1412 that indicates the current location of the user (e.g., and thus, of the remote locator object that is tracking the user). In some embodiments, user interface 1411 includes selectable options 1414-1 to 1414-3 for performing functions with respect to the remote locator object that is tracking the user. In some embodiments, selectable option 1414-1 is selectable to allow the unknown remote locator object to track the user for the rest of the day (e.g., and thus suppress future tracking alerts for the respective unknown remote locator object for the rest of the day). In some embodiments, selectable option 1414-2 is selectable to allow the unknown remote locator object to track the user indefinitely (e.g., and thus suppress all future tracking alerts for the respective unknown remote locator object). In some embodiments, selectable option 1414-3 is selectable to provide more information regarding the remote locator object.

In FIG. 14B, user input 1403 is received selecting selectable option 1414-1. In some embodiments, in response to the user input, device 500 initiates a process for allowing the unknown remote locator to track the user's location for the rest of the day. In some embodiments, when the unknown remote locator is allowed to track the user's location, tracking alerts (e.g., such as notification 1402) are no longer displayed on device 500 for the remainder of the current day. In some embodiments, after tracking by the unknown remote locator object is allowed, the unknown remote locator object is added to the user's application for tracking and finding items and is optionally displayed on user interface 1420 as an item that device 500 is tracking, such as in FIG. 14C. In some embodiments, user interface 1420 is similar to user interface 670. In some embodiments, user interface 1420 lists item 1426-1 corresponding to the unknown remote locator object. In some embodiments, item 1426-1 indicates the length of time for which tracking alerts are suppressed (e.g., for another 8 hours and 13 minutes). In some embodiments, item 1426-1 does not reveal the name of the owner or the label of the remote locator object to preserve the privacy of the owner of (e.g., user account associated with) the remote locator object. In some embodiments, while tracking by the unknown remote locator object is allowed, the user is able to receive separation alerts if the unknown remote locator object separates from the user's location by more than a threshold distance (e.g., 10 feet, 30 feet, 100 feet), similar to separation alert 802 described above with respect to FIGS. 8A-8P.

In FIG. 14D, user input 1403 is received selecting selectable option 1414-2 in user interface 1411. In some embodiments, in response to the user input, device 500 displays user interface 1430, as shown in FIG. 14E. In some embodiments, to allow tracking indefinitely, device 500 requires the user to bring device 500 within a threshold distance (e.g., 1 inch, 3 inches, 5 inches) from the unknown remote locator object. In some embodiments, this ensures that the user has found the unknown remote locator object and/or that the user knows exactly what item is tracking the user's location (e.g., and to not mistakenly approve the incorrect object). In some embodiments, user interface 1430 instructs the user to tap the unknown remote locator object using device 500 (e.g., bring device 500 within the threshold distance to the unknown remote locator object). In some embodiments, user interface 1430 includes an illustration 1432 of tapping the remote locator object with device 500 (e.g., a still image, a short video, an animation, etc.). In some embodiments, user interface 1430 includes selectable option 1434 that is selectable to cause the unknown remote locator object to emit an audible sound.

In FIG. 14F, the user brings device 500 within the above threshold distance to unknown remote locator object 1400. In some embodiments, in response to bringing device 500 within the threshold distance to unknown remote locator object 1400, communication is established between device 500 and unknown remote locator object 1400. In some embodiments, device 500 confirms that unknown remote locator object 1400 is the unknown remote locator object that is tracking the user's location. In some embodiments, in response to bringing device 500 within the threshold distance to unknown remote locator object 1400, device 500 initiates a process for allowing the unknown remote locator object to track the user's location for the rest of the day (e.g., or optionally until the user removes the authorization). In some embodiments, after the unknown remote locator object is allowed, the unknown remote locator object is added to user interface 1420, as shown in FIG. 14G (e.g., similarly to described above with respect to FIG. 14C). In some embodiments, item 1426-1 is displayed with an indicator that the remote locator object is ignored indefinitely. In some embodiments, item 1426-1 is selectable to change the user's permission settings (e.g., such as to set a time limit on ignoring the object or to remove the authorization).

In FIG. 14H, user input 1403 is received selecting selectable option 1414-3 in user interface 1411. In some embodiments, in response to the user input, device 500 displays user interface 1440, as shown in FIG. 14I. In some embodiments, user interface 1440 displays a representation 1442 of the remote locator object that is tracking the user. In some embodiments, representation 1442 is an icon of the remote locator object. In some embodiments, representation 1442 is an interactable model of the remote locator object. For example, in some embodiments, a user input on representation 1442 optionally causes representation 1442 to spin or rotate in accordance with the user input. In some embodiments, representation 1442 spins, rotates or otherwise animates on its own (e.g., without user involvement).

In some embodiments, user interface 1440 includes selectable options 1444-1, 1444-2 and 1444-3. In some embodiments, selectable option 1444-1 is selectable to cause the remote locator object to emit an audible sound to enable the user to find the remote locator object. In some embodiments, selectable option 1444-2 is selectable to allow the user to ignore the remote locator object (e.g., in a similar process as described above with respect to FIGS. 14B-14G). In some embodiments, selectable option 1444-3 is selectable to display instructions for disabling the remote locator object. For example, in FIG. 14J, a user input 1403 is received selecting selectable option 1444-3. In some embodiments, in response to the user input, device 500 displays user interface 1450. In some embodiments, user interface 1450 displays a representation 1452 of the remote locator object. In some embodiments, representation 1452 is an animation that illustrates steps for disassembling and disabling the remote locator object (e.g., optionally removing the batteries in remote locator object), as shown in FIGS. 14K-14M. Selection of selectable option 1454 causes device 500 to cease displaying user interface 1450 without allowing the remote locator object to track the location of the user.

In some embodiments, generating an alert when motion is detected by a first device that is not in communication with a device that is configured to track the location of the first device enables a person who is unaware that the first device is near them to easily identify the first device. Continuing to generate the alert while the first device is being moved enables the person to identify the presence of the first device, locate the first device and then remove, disable, and/or dispose of the first device to prevent unauthorized tracking by the first device.

The first device could be a standalone remote locator object or a remote locator object embedded in another object such as a pair of headphones, a suitcase, a bicycle, or the like.

The alert can be disabled by bringing a respective device that is capable of communicating with the first device within range (e.g., short range wireless communication range) of the first device (e.g., to display a visual/interactive unauthorized tracking alert). In response to the first device being within range of the respective device, the respective device will display an alert and selection of the alert or a portion of the alert will initiate a process to disable the motion based alert generated by the first device.

FIGS. 15A-15E are flow diagrams illustrating a method 1500 of generating alerts in accordance with some embodiments. For example, in some embodiments, a method 1500 is performed at a first device (e.g., a remote locator object, as described with reference to methods 700, 900, 1100 and/or 1300) with one or more motion detecting sensors (e.g., a gyroscope, accelerometer, magnetometer and/or inertial measurement unit) and one or more wireless transmission elements (e.g., wireless antenna), and one or more output devices (e.g., a speaker, a tactile output device, a display). In some embodiments, the method includes detecting (1502), via the one or more motion detecting sensors, motion of the first device, (e.g., the first device is associated with a user account), and in response to detecting the motion of the first device (1504): in accordance with a determination that first alert criteria are met, wherein the first alert criteria include a requirement that the first device has not been in wireless communication with a second device that is capable of tracking a location of the first device (e.g., because the second device is associated with a same user account as the first device or because the second device is associated with a different user account that has accepted an explicit invitation to track the location of the first device, such as device 500 in method 700, device 500 in method 900, and/or device 500 in method 1100) within a predetermined period of time (e.g., a predetermined period of time selected from 6 to 100 hours, such as 6, 12, 18, 24, 36, 48, 72, 96, etc. hours), prior to detecting the motion (e.g., movement of the first device above a motion threshold, such as motion above an acceleration threshold, motion about a velocity threshold, and/or motion above a position/distance threshold), generating (1506) an alert via the one or more output devices (e.g., an alert generated by the speakers/etc. of the first device). In some embodiments, the alert generated by the first device is in addition to and/or independent of unauthorized tracking alerts generated by a second device based on the presence of the first device, such as described with reference to method 1300 and/or FIGS. 14A-14R. Further, a period of time criterion used by the second device to generate alerts according to method 1300 and/or FIGS. 14A-14R is optionally independent of (e.g., different from) the predetermined period of time used by the first device to generate the alert via the one or more output devices. In some embodiments, in accordance with a determination that the first device was in wireless communication with the second device that is capable of tracking the location of the first device (e.g., associated with the same user account as the first device) within the predetermined period of time prior to detecting the motion, forgoing (1508) generating the alert via the one or more output devices.

In some embodiments, the method includes after generating the alert, continuing (1510) to detect motion of the first device (e.g., motion above the motion threshold, motion above or below the motion threshold, etc.), and in response to continuing to detect motion of the first device (e.g., continuing to detect movement of the first device above the motion threshold), continuing (1512) to generate the alert via the one or more output devices.

In some embodiments, the method includes after generating the alert, ceasing (1514) to detect, via the one or more motion sensors, motion of the first device (e.g., detecting movement of the first device that is below the motion threshold for at least a threshold amount of time), and in response to ceasing to detect motion of the first device, ceasing (1516) to generate the alert via the one or more output devices.

In some embodiments, the alert includes one or more of, an audio alert, a haptic alert, and a visual alert (e.g., one, two or three of an audio alert, a haptic alert, or a visual alert) (1518).

In some embodiments, the first device is a remote tracking device (e.g., a low energy device that does not have a display and has a battery life of more than 6 months under typical usage conditions, such as the remote locator objects described with reference to methods 700, 900, 1100 and/or 1300 and/or FIGS. 14A-14R) and the second device is a personal communication device (1520) (e.g., a smartphone, watch, headset, tablet, or computer, such as device 500).

In some embodiments, the first alert criteria include a requirement that the first device is not currently within a predetermined distance (e.g., a short range communication distance) of an electronic device that is capable of displaying alerts about the presence of the first device (1522) (e.g., alerts indicating separation of the first device from the electronic device and/or alerts that the first device is tracking the location of the electronic device, such as device 500 described with reference to method 1300 and/or FIGS. 14A-14R).

In some embodiments, the first alert criteria include a requirement that the first device has not been temporarily associated with a second user account that is different than a first user account with which the first device is associated (1524) (e.g., the device has not been officially "borrowed" by another user that has accepted an explicit invitation to track the location of the first device, such as borrowing as described with reference to method 1300 and/or FIGS. 14A-14R).

In some embodiments, the method includes in response to detecting motion of the first device (1526): in accordance with a determination that second alert criteria are met (e.g., different from the first alert criteria, such as the unauthorized tracking criteria of method 1300), wherein the second alert criteria include a requirement that the first device has not been in wireless communication with a second device (e.g., a second device that is capable of tracking a location of the first device (e.g., because the second device is associated with a same user account as the first device or because the second device is associated with a different user account that has accepted an explicit invitation to track the location of the first device, such as device 500 in method 700, device 500 in method 900, and/or device 500 in method 1100 and/or FIGS. 14A-14R) within a predetermined period of time (e.g., a predetermined period of time selected from 6 to 100 hours, such as 6, 12, 18, 24, 36, 48, 72, 96, etc. hours) prior to detecting the motion and that the first device is currently within a predetermined distance (e.g., a short range communication distance) of a third device that is capable of displaying alerts about the presence of the first device (e.g., a personal communication device (e.g., a smartphone, watch, headset, tablet, or computer capable of generating alerts indicating separation of the first device from the third device and/or alerts that the first device is tracking the location of the third device, such as device 500 described with reference to method 1300 and/or FIGS. 14A-14R)), transmitting (1528), via the one or more wireless transmission elements, information to the third device that, when received by the third device, will cause the third device to output a second alert about the presence of the first device (e.g., an alert indicating that the first device is tracking the location of the third device, such as device 500 described with reference to method 1300 and/or FIGS. 14A-14R).

In some embodiments, the method includes in response to detecting motion of the first device (1530): in accordance with a determination that the second alert criteria are met, wherein the second alert criteria include a requirement that the first device has not been in wireless communication with a second device within a predetermined period of time prior to detecting the motion and that the first device is currently within a predetermined distance (e.g., a short range communication distance) of a third device that is capable of displaying alerts about the presence of the first device, transmitting (1532), via the one or more wireless transmission elements, information to the third device that, when received by the third device will cause the third device to output a second alert about the presence of the first device and forgoing outputting the alert via the one or more output devices of the first device.

In some embodiments, the method includes in response to detecting motion of the first device (1534): in accordance with a determination that second alert criteria are met, wherein the second alert criteria include a requirement that the first device has not been in wireless communication with a second device within a predetermined period of time prior to detecting the motion and that the first device is currently within a predetermined distance (e.g., a short-range communication distance) of a third device that is capable of displaying alerts about the presence of the first device (1536): transmitting (1538), via the one or more wireless transmission elements, information to the third device that, when received by the third device, will cause the third device to output a second alert about the presence of the first device, and outputting (1540) the alert via the one or more output devices of the first device.

As described above, one aspect of the present technology is the gathering and use of data available from specific and legitimate sources to improve the ability for users to track and locate items that may be of interest to them. The present disclosure contemplates that in some instances, this gathered data may include personal information data that uniquely identifies or can be used to identify a specific person. Such personal information data can include location-based data, online identifiers, demographic data, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. Further, other uses for personal information data that benefit the user are also contemplated by the present disclosure. In some embodiments, the personal information data can be used to identify the location of remote locator objects and/or identify the location of the user. Accordingly, use of such personal information data enables users to identify, find, and otherwise interact with remote locator objects.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Further, such collection/sharing should occur only after receiving the consent of the users or other legitimate basis specified in applicable law. Personal information from users should be collected for legitimate uses only. Such information regarding the use of personal data should be prominent and easily accessible by users, and should be updated as the collection and/or use of data changes. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. For example, users can opt not to collect location information from remote locator objects. In another example, users can select to limit the length that location data is maintained or entirely block the storage of location data. In addition to providing "opt in" and "opt out" options, the present disclosure contemplates providing notifications relating to the access or use of personal information. For instance, a user may be notified upon accessing an application that their personal information data will be accessed and then reminded again just before personal information data is accessed by the application. That is, the present disclosure contemplates that hardware and/or software elements can be provided to prevent or block access to such personal information data.

Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Moreover, it is the intent of the present disclosure that personal information data should be managed and handled in a way to minimize risks of unintentional or unauthorized access or use.

Therefore, although the present disclosure broadly covers use of personal information data to implement one or more various disclosed embodiments, the present disclosure also contemplates that the various embodiments can also be implemented without the need for accessing such personal information data. For example, location data and notifications can be delivered to users based on aggregated non-personal information data or a bare minimum amount of personal information. That is, the various embodiments of the present technology are not rendered inoperable due to the lack of all or a portion of such personal information data.

Personally identifiable information data should be managed and handled so as to minimize risks of unintentional or unauthorized access or use, and the nature of authorized use should be clearly indicated to users. It is well understood that the use of personally identifiable information should follow privacy policies and practices that are generally recognized as meeting or exceeding industry or governmental requirements for maintaining the privacy of users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with one or more wireless antenna, a display generation component and one or more input devices:
while a remote locator object that is associated with a user other than a user of the electronic device is near the electronic device:
in accordance with a determination that first criteria are satisfied, automatically presenting, without user input, a tracking alert that indicates that the remote locator object that is not associated with the user of the electronic device satisfies the first criteria, wherein the first criteria include:
a first criterion that is satisfied when the remote locator object is within a first threshold distance of the electronic device at a first location and when the electronic device and the remote locator object have moved such that the remote locator object has remained within the first threshold distance of the electronic device while the electronic device has moved more than a second threshold distance from the first location to a second location, different from the first location, wherein the second threshold distance is greater than the first threshold distance, and
a second criterion that is satisfied when, after the electronic device has moved more than the second threshold distance from the first location to the second location, the remote locator object has remained within a third threshold distance of the electronic device for a time threshold, and is not satisfied when, after the electronic device has moved more than the second threshold distance from the first location to the second location, the remote locator object has not remained within the third threshold distance of the electronic device for the time threshold.

2. The method of claim 1, further comprising:
while the remote locator object that is associated with the user other than the user of the electronic device is near the electronic device:
in accordance with a determination that the first criteria are not satisfied, forgoing automatically presenting the tracking alert.

3. The method of claim 1, further comprising:
while the remote locator object that is associated with the user other than the user of the electronic device is near the electronic device and before the first criteria are satisfied:

in accordance with a determination that one or more second criteria are satisfied, including a criterion that is satisfied when the user other than the user of the electronic device has attempted to locate the remote locator object, automatically presenting, without user input, a tracking alert that indicates that the remote locator object that is not associated with the user of the electronic device satisfies the one or more second criteria.

4. The method of claim 1, further comprising:
while the remote locator object that is associated with the user other than the user of the electronic device is near the electronic device and before the first criteria are satisfied:
  in accordance with a determination that one or more second criteria are satisfied, including a criterion that is satisfied when a current location of the electronic device is within a threshold distance of a predetermined location associated with the user of the electronic device, automatically presenting, without user input, a tracking alert that indicates that the remote locator object that is not associated with the user of the electronic device satisfies the one or more second criteria.

5. The method of claim 1, further comprising:
while the remote locator object that is associated with the user other than the user of the electronic device is near the electronic device and before the first criteria are satisfied:
  in accordance with a determination that one or more second criteria are satisfied, including a criterion that is satisfied when a current time is within a threshold time of a new identifier being selected for the remote locator object, automatically presenting, without user input, a tracking alert that indicates that the remote locator object that is not associated with the user of the electronic device satisfies the one or more second criteria.

6. The method of claim 1, wherein the first criteria include a criterion that is satisfied if no tracking alert associated with the remote locator object has been presented by the electronic device within a predefined time period.

7. The method of claim 1, wherein the first threshold distance is 10 feet.

8. The method of claim 1, wherein the third threshold distance is a value between 1 and 30 feet.

9. The method of claim 1, wherein the electronic device has moved more than the second threshold distance when the electronic device has moved from the first location to the second location that is more than 200 feet from the first location.

10. The method of claim 1, wherein the first criteria include a criterion that is satisfied when the remote locator object is not near a second electronic device that is associated with the user other than the user of the electronic device.

11. The method of claim 1, wherein the first criteria include a criterion that is satisfied when the electronic device has moved less than a fourth threshold distance after moving more than the second threshold distance during a second time threshold.

12. The method of claim 1, further comprising:
receiving, via the one or more input devices, a request to associate the electronic device with a respective object; and
in response to receiving the request to associate the electronic device with the respective object:
  in accordance with a determination that the respective object satisfies one or more second criteria, including a criterion that is satisfied when the respective object is a trackable object, automatically presenting an alert that indicates that the respective object is the trackable object.

13. The method of claim 1, further comprising:
receiving, via the one or more input devices, a request to view information about one or more trackable objects in an environment of the electronic device; and
in response to receiving the request to view the information about the one or more trackable objects in the environment of the electronic device, displaying, via the display generation component, one or more representations of the one or more trackable objects in the environment of the electronic device.

14. The method of claim 13, wherein the one or more trackable objects include a first trackable object associated with a first representation of the one or more representations, and the first representation is displayed with a representation of a respective user, other than the user of the electronic device, associated with the first trackable object.

15. The method of claim 13, further comprising:
in accordance with a determination that at least one trackable object is in the environment of the electronic device, displaying, via the display generation component, a visual indication that the at least one trackable object is in the environment of the electronic device,
wherein the request to view the information about the one or more trackable objects in the environment of the electronic device comprises selection of the visual indication that the at least one trackable object is in the environment of the electronic device.

16. An electronic device, comprising:
one or more processors;
memory; and
one or more programs, wherein the one or more programs are stored in the memory and configured to be executed by the one or more processors, the one or more programs including instructions for:
  while a remote locator object that is associated with a user other than a user of the electronic device is near the electronic device:
    in accordance with a determination that first criteria are satisfied, automatically presenting, without user input, a tracking alert that indicates that the remote locator object that is not associated with the user of the electronic device satisfies the first criteria, wherein the first criteria include:
      a first criterion that is satisfied when the remote locator object is within a first threshold distance of the electronic device at a first location and when the electronic device and the remote locator object have moved such that the remote locator object has remained within the first threshold distance of the electronic device while the electronic device has moved more than a second threshold distance from the first location to a second location, different from the first location, wherein the second threshold distance is greater than the first threshold distance, and
      a second criterion that is satisfied when, after the electronic device has moved more than the second threshold distance from the first location to the second location, the remote locator object has remained within a third threshold distance of the electronic device for a time threshold, and is not satisfied when, after the electronic device has moved more than the second threshold distance from the first location to the second location, the remote locator object has not remained within the third threshold distance of the electronic device for the time threshold.

17. A non-transitory computer readable storage medium storing one or more programs, the one or more programs comprising instructions, which when executed by one or more processors of an electronic device, cause the electronic device to perform a method comprising:
while a remote locator object that is associated with a user other than a user of the electronic device is near the electronic device:
in accordance with a determination that first criteria are satisfied, automatically presenting, without user input, a tracking alert that indicates that the remote locator object that is not associated with the user of the electronic device satisfies the first criteria, wherein the first criteria include:
a first criterion that is satisfied when the remote locator object is within a first threshold distance of the electronic device at a first location and when the electronic device and the remote locator object have moved such that the remote locator object has remained within the first threshold distance of the electronic device while the electronic device has moved more than a second threshold distance from the first location to a second location, different from the first location, wherein the second threshold distance is greater than the first threshold distance, and
a second criterion that is satisfied when, after the electronic device has moved more than the second threshold distance from the first location to the second location, the remote locator object has remained within a third threshold distance of the electronic device for a time threshold, and is not satisfied when, after the electronic device has moved more than the second threshold distance from the first location to the second location, the remote locator object has not remained within the third threshold distance of the electronic device for the time threshold.

18. The electronic device of claim 16, wherein the one or more programs further include instructions for:
while the remote locator object that is associated with the user other than the user of the electronic device is near the electronic device:
in accordance with a determination that the first criteria are not satisfied, forgoing automatically presenting the tracking alert.

19. The electronic device of claim 16, wherein the one or more programs further include instructions for:
while the remote locator object that is associated with the user other than the user of the electronic device is near the electronic device and before the first criteria are satisfied:
in accordance with a determination that one or more second criteria are satisfied, including a criterion that is satisfied when the user other than the user of the electronic device has attempted to locate the remote locator object, automatically presenting, without user input, a tracking alert that indicates that the remote locator object that is not associated with the user of the electronic device satisfies the one or more second criteria.

20. The electronic device of claim 16, wherein the one or more programs further include instructions for:
while the remote locator object that is associated with the user other than the user of the electronic device is near the electronic device and before the first criteria are satisfied:
in accordance with a determination that one or more second criteria are satisfied, including a criterion that is satisfied when a current location of the electronic device is within a threshold distance of a predetermined location associated with the user of the electronic device, automatically presenting, without user input, a tracking alert that indicates that the remote locator object that is not associated with the user of the electronic device satisfies the one or more second criteria.

21. The electronic device of claim 16, wherein the one or more programs further include instructions for:
while the remote locator object that is associated with the user other than the user of the electronic device is near the electronic device and before the first criteria are satisfied:
in accordance with a determination that one or more second criteria are satisfied, including a criterion that is satisfied when a current time is within a threshold time of a new identifier being selected for the remote locator object, automatically presenting, without user input, a tracking alert that indicates that the remote locator object that is not associated with the user of the electronic device satisfies the one or more second criteria.

22. The electronic device of claim 16, wherein the first criteria include a criterion that is satisfied if no tracking alert associated with the remote locator object has been presented by the electronic device within a predefined time period.

23. The electronic device of claim 16, wherein the first threshold distance is 10 feet.

24. The electronic device of claim 16, wherein the third threshold distance is a value between 1 and 30 feet.

25. The electronic device of claim 16, wherein the electronic device has moved more than the second threshold distance when the electronic device has moved from the first location to the second location that is more than 200 feet from the first location.

26. The electronic device of claim 16, wherein the first criteria include a criterion that is satisfied when the remote locator object is not near a second electronic device that is associated with the user other than the user of the electronic device.

27. The electronic device of claim 16, wherein the first criteria include a criterion that is satisfied when the electronic device has moved less than a fourth threshold distance after moving more than the second threshold distance during a second time threshold.

28. The electronic device of claim 16, wherein the one or more programs further include instructions for:
receiving, via one or more input devices, a request to associate the electronic device with a respective object; and
in response to receiving the request to associate the electronic device with the respective object:
in accordance with a determination that the respective object satisfies one or more second criteria, including a criterion that is satisfied when the respective object is a trackable object, automatically presenting an alert that indicates that the respective object is the trackable object.

29. The electronic device of claim 16, wherein the one or more programs further include instructions for:
receiving, via one or more input devices, a request to view information about one or more trackable objects in an environment of the electronic device; and
in response to receiving the request to view the information about the one or more trackable objects in the environment of the electronic device, displaying, via a display generation component, one or more representations of the one or more trackable objects in the environment of the electronic device.

30. The electronic device of claim 29, wherein the one or more trackable objects include a first trackable object associated with a first representation of the one or more representations, and the first representation is displayed with a representation of a respective user, other than the user of the electronic device, associated with the first trackable object.

31. The electronic device of claim 29, wherein the one or more programs further include instructions for:
in accordance with a determination that at least one trackable object is in the environment of the electronic device, displaying, via a display generation component, a visual indication that the at least one trackable object is in the environment of the electronic device,
wherein the request to view the information about the one or more trackable objects in the environment of the electronic device comprises selection of the visual indication that the at least one trackable object is in the environment of the electronic device.

32. The non-transitory computer readable storage medium of claim 17, wherein the method further comprises:
while the remote locator object that is associated with the user other than the user of the electronic device is near the electronic device:
in accordance with a determination that the first criteria are not satisfied, forgoing automatically presenting the tracking alert.

33. The non-transitory computer readable storage medium of claim 17, wherein the method further comprises:
while the remote locator object that is associated with the user other than the user of the electronic device is near the electronic device and before the first criteria are satisfied:
in accordance with a determination that one or more second criteria are satisfied, including a criterion that is satisfied when the user other than the user of the electronic device has attempted to locate the remote locator object, automatically presenting, without user input, a tracking alert that indicates that the remote locator object that is not associated with the user of the electronic device satisfies the one or more second criteria.

34. The non-transitory computer readable storage medium of claim 17, wherein the method further comprises:
while the remote locator object that is associated with the user other than the user of the electronic device is near the electronic device and before the first criteria are satisfied:
in accordance with a determination that one or more second criteria are satisfied, including a criterion that is satisfied when a current location of the electronic device is within a threshold distance of a predetermined location associated with the user of the electronic device, automatically presenting, without user input, a tracking alert that indicates that the remote locator object that is not associated with the user of the electronic device satisfies the one or more second criteria.

35. The non-transitory computer readable storage medium of claim 17, wherein the method further comprises:
while the remote locator object that is associated with the user other than the user of the electronic device is near the electronic device and before the first criteria are satisfied:
in accordance with a determination that one or more second criteria are satisfied, including a criterion that is satisfied when a current time is within a threshold time of a new identifier being selected for the remote locator object, automatically presenting, without user input, a tracking alert that indicates that the remote locator object that is not associated with the user of the electronic device satisfies the one or more second criteria.

36. The non-transitory computer readable storage medium of claim 17, wherein the first criteria include a criterion that is satisfied if no tracking alert associated with the remote locator object has been presented by the electronic device within a predefined time period.

37. The non-transitory computer readable storage medium of claim 17, wherein the first threshold distance is 10 feet.

38. The non-transitory computer readable storage medium of claim 17, wherein the third threshold distance is a value between 1 and 30 feet.

39. The non-transitory computer readable storage medium of claim 17, wherein the electronic device has moved more than the second threshold distance when the electronic device has moved from the first location to the second location that is more than 200 feet from the first location.

40. The non-transitory computer readable storage medium of claim 17, wherein the first criteria include a criterion that is satisfied when the remote locator object is not near a second electronic device that is associated with the user other than the user of the electronic device.

41. The non-transitory computer readable storage medium of claim 17, wherein the first criteria include a criterion that is satisfied when the electronic device has moved less than a fourth threshold distance after moving more than the second threshold distance during a second time threshold.

42. The non-transitory computer readable storage medium of claim 17, wherein the method further comprises:
receiving, via one or more input devices, a request to associate the electronic device with a respective object; and
in response to receiving the request to associate the electronic device with the respective object:
in accordance with a determination that the respective object satisfies one or more second criteria, including a criterion that is satisfied when the respective object is a trackable object, automatically presenting an alert that indicates that the respective object is the trackable object.

43. The non-transitory computer readable storage medium of claim 17, wherein the method further comprises:
receiving, via one or more input devices, a request to view information about one or more trackable objects in an environment of the electronic device; and
in response to receiving the request to view the information about the one or more trackable objects in the environment of the electronic device, displaying, via a display generation component, one or more representations of the one or more trackable objects in the environment of the electronic device.

44. The non-transitory computer readable storage medium of claim 43, wherein the one or more trackable objects include a first trackable object associated with a first representation of the one or more representations, and the first representation is displayed with a representation of a respective user, other than the user of the electronic device, associated with the first trackable object.

45. The non-transitory computer readable storage medium of claim 43, wherein the method further comprises:
- in accordance with a determination that at least one trackable object is in the environment of the electronic device, displaying, via a display generation component, a visual indication that the at least one trackable object is in the environment of the electronic device,
- wherein the request to view the information about the one or more trackable objects in the environment of the electronic device comprises selection of the visual indication that the at least one trackable object is in the environment of the electronic device.

\* \* \* \* \*